(12) United States Patent
Schneider et al.

(10) Patent No.: US 7,630,360 B2
(45) Date of Patent: Dec. 8, 2009

(54) METHODS AND APPARATUS TO PERFORM OUTDIAL FACSIMILE SERVICES

(75) Inventors: Marco Schneider, Austin, TX (US); Philip Charles Cunetto, Austin, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 531 days.

(21) Appl. No.: 11/363,394

(22) Filed: Feb. 27, 2006

(65) Prior Publication Data

US 2007/0086438 A1    Apr. 19, 2007

Related U.S. Application Data

(63) Continuation of application No. 11/254,183, filed on Oct. 19, 2005.

(51) Int. Cl.
H04L 12/66 (2006.01)
(52) U.S. Cl. ..................... 370/352; 370/356
(58) Field of Classification Search ............. 379/93.02, 379/207.02, 243; 370/352–356
See application file for complete search history.

(56) References Cited

U.S. PATENT DOCUMENTS

| | | | |
|---|---|---|---|
| 4,766,604 A | 8/1988 | Axberg | |
| 5,546,456 A | 8/1996 | Vilsoet et al. | |
| 5,608,786 A | 3/1997 | Gordon | |
| 5,687,220 A | 11/1997 | Finnigan | |
| 5,809,129 A | 9/1998 | Andersson et al. | |
| 5,819,047 A | 10/1998 | Bauer et al. | |
| 5,892,909 A | 4/1999 | Grasso et al. | |
| 5,896,440 A | 4/1999 | Reed et al. | |
| 6,026,086 A | 2/2000 | Lancelot et al. | |
| 6,041,103 A | 3/2000 | La Porta et al. | |
| 6,108,705 A | 8/2000 | Svennevik et al. | |
| 6,141,345 A | 10/2000 | Goeddel et al. | |
| 6,173,043 B1 | 1/2001 | Finnigan | |
| 6,212,261 B1 | 4/2001 | Meubus et al. | |
| 6,252,869 B1 | 6/2001 | Silverman | |
| 6,337,858 B1 | 1/2002 | Petty et al. | |
| 6,396,908 B1 | 5/2002 | O'Donovan et al. | |
| 6,421,424 B1 | 7/2002 | Creamer et al. | |

(Continued)

FOREIGN PATENT DOCUMENTS

EP    1093261    4/2001

(Continued)

OTHER PUBLICATIONS

Extended search report published on Jun. 6, 2007, for EP application No. 06121277.5, 7 pages.

(Continued)

*Primary Examiner*—Suhan Ni
(74) *Attorney, Agent, or Firm*—Hanley, Flight & Zimmerman, LLC

(57) ABSTRACT

Methods and apparatus to perform outdial facsimile services are disclosed. A disclosed method comprises sending an admittance request message containing a destination from a communication device to a gatekeeper, receiving an admittance response message containing an address of a gateway at the communication device, establishing a simple message transfer protocol (SMTP) session with the gateway, and transmitting a copy of a stored facsimile from the communication device via the gateway to the destination.

24 Claims, 78 Drawing Sheets

U.S. PATENT DOCUMENTS

| | | |
|---|---|---|
| 6,463,145 B1 | 10/2002 | O'Neal et al. |
| 6,477,172 B1 | 11/2002 | Burger et al. |
| 6,560,325 B2 | 5/2003 | Brown et al. |
| 6,748,057 B2 | 6/2004 | Ranalli et al. |
| 6,788,649 B1 | 9/2004 | Dugan et al. |
| 6,798,772 B2 | 9/2004 | Bergman et al. |
| 6,804,334 B1 | 10/2004 | Beasley et al. |
| 6,823,047 B1 | 11/2004 | Cruickshank |
| 6,831,966 B1 | 12/2004 | Tegan et al. |
| 6,845,505 B1 | 1/2005 | Adunuthula et al. |
| 6,859,927 B2 | 2/2005 | Moody et al. |
| 6,868,140 B2 | 3/2005 | Myers et al. |
| 6,876,734 B1 | 4/2005 | Summers et al. |
| 6,891,945 B2 | 5/2005 | Porter et al. |
| 6,904,139 B2 | 6/2005 | Brown et al. |
| 6,920,632 B2 | 7/2005 | Donovan et al. |
| 6,931,109 B1 | 8/2005 | Cook |
| 6,947,987 B2 | 9/2005 | Boland |
| 6,968,367 B1 | 11/2005 | Vassar et al. |
| 7,032,222 B1 | 4/2006 | Karp et al. |
| 7,035,252 B2 | 4/2006 | Cave et al. |
| 7,042,995 B1 * | 5/2006 | Praturi et al. .......... 379/207.02 |
| 7,096,043 B1 | 8/2006 | Sylvain |
| 7,333,472 B2 | 2/2008 | Yang et al. |
| 7,366,159 B1 | 4/2008 | Parlamas et al. |
| 2002/0023160 A1 | 2/2002 | Garrett et al. |
| 2002/0064149 A1 | 5/2002 | Elliott et al. |
| 2002/0100036 A1 | 7/2002 | Moshir et al. |
| 2002/0107003 A1 | 8/2002 | Martin et al. |
| 2002/0124057 A1 | 9/2002 | Besprosvan |
| 2002/0129095 A1 | 9/2002 | Hatalkar |
| 2002/0154748 A1 | 10/2002 | Powell et al. |
| 2003/0002487 A1 | 1/2003 | Fukui |
| 2003/0031178 A1 | 2/2003 | Haeri et al. |
| 2003/0051038 A1 | 3/2003 | Spicer et al. |
| 2003/0059023 A1 | 3/2003 | Crockett et al. |
| 2003/0108172 A1 | 6/2003 | Petty et al. |
| 2003/0126291 A1 | 7/2003 | Wang et al. |
| 2003/0131132 A1 | 7/2003 | Cheng et al. |
| 2003/0142668 A1 | 7/2003 | Wyatt |
| 2003/0219029 A1 | 11/2003 | Pickett |
| 2004/0001514 A1 | 1/2004 | Wookey et al. |
| 2004/0001579 A1 | 1/2004 | Feinberg et al. |
| 2004/0005046 A1 | 1/2004 | Deo et al. |
| 2004/0022237 A1 | 2/2004 | Elliott et al. |
| 2004/0037402 A1 | 2/2004 | Adamczyk et al. |
| 2004/0042605 A1 | 3/2004 | Evslin |
| 2004/0057569 A1 | 3/2004 | Busey et al. |
| 2004/0073468 A1 | 4/2004 | Vyas et al. |
| 2004/0088386 A1 | 5/2004 | Aggarwal |
| 2004/0105536 A1 | 6/2004 | Williams |
| 2004/0174979 A1 | 9/2004 | Hutton et al. |
| 2004/0203938 A1 | 10/2004 | Kulkarni |
| 2004/0205760 A1 | 10/2004 | Foote et al. |
| 2004/0228458 A1 | 11/2004 | Finnigan |
| 2004/0260839 A1 | 12/2004 | Onoda et al. |
| 2005/0025297 A1 | 2/2005 | Finnigan |
| 2005/0025298 A1 | 2/2005 | Finnigan |
| 2005/0036592 A1 | 2/2005 | Holt et al. |
| 2005/0050545 A1 | 3/2005 | Moakley |
| 2005/0068942 A1 | 3/2005 | Chu et al. |
| 2005/0073995 A1 | 4/2005 | Yeh et al. |
| 2005/0074026 A1 | 4/2005 | Soncodi et al. |
| 2005/0074109 A1 | 4/2005 | Hanson et al. |
| 2005/0074111 A1 | 4/2005 | Hanson et al. |
| 2005/0080905 A1 | 4/2005 | Dolinar et al. |
| 2005/0105464 A1 | 5/2005 | Acharya et al. |
| 2005/0108360 A1 | 5/2005 | Zellner |
| 2005/0117587 A1 | 6/2005 | Kawato |
| 2005/0149940 A1 | 7/2005 | Calinescu et al. |
| 2005/0152515 A1 | 7/2005 | Amir et al. |
| 2005/0157704 A1 | 7/2005 | Lim |
| 2005/0160428 A1 | 7/2005 | Ayachitula et al. |
| 2005/0172291 A1 | 8/2005 | Das et al. |
| 2006/0120282 A1 | 6/2006 | Carlson et al. |
| 2006/0147038 A1 | 7/2006 | Allain et al. |

FOREIGN PATENT DOCUMENTS

| | | |
|---|---|---|
| WO | WO 03/007489 | 1/2003 |
| WO | WO 03/019860 | 3/2003 |
| WO | WO 2004/012390 | 2/2004 |
| WO | WO 2004/028180 | 4/2004 |
| WO | WO 2004/032430 | 4/2004 |
| WO | WO 2005/057895 | 6/2005 |
| WO | WO 2005/089147 | 9/2005 |

OTHER PUBLICATIONS

U.S. Appl. No. 11/086,795, filed Mar. 22, 2005.
U.S. Appl. No. 10/247,808, filed Sep. 19, 2002.
U.S. Appl. No. 10/247,828, filed Sep. 19, 2002.
U.S. Appl. No. 11/253,536, filed Oct. 19, 2005, Schneider et al.
U.S. Appl. No. 11/253,404, filed Oct. 19, 2005, Schneider et al.
U.S. Appl. No. 11/253,537, filed Oct. 19, 2005, Cunetto et al.
U.S. Appl. No. 11/253,408, filed Oct. 19, 2005, Schneider et al.
U.S. Appl. No. 11/253,470, filed Oct. 19, 2005, Schneider et al.
U.S. Appl. No. 11/253,448, filed Oct. 19, 2005, Schneider et al.
U.S. Appl. No. 11/254,183, filed Oct. 19, 2005, Schneider et al.
SearchEnterpriseVoice.com. Definition: *dial peer*. http://searchenterprisevoice.techtarget.com, downloaded Sep. 19, 2005.
Puredata Support—IP Telephony—Glossary, http://www.puredata.com/supports/faqs/ip/glossary.html, downloaded Aug. 24, 2005.
Q.931 Protocol Overview. http://www.freesoft.org/CIE/Topics/126.htm, downloaded Aug. 24, 2005.
Configuring Voice over IP. Copyright 1992-2002 Cisco Systems, Inc. http://www.cisco.com, downloaded Sep. 19, 2005.
H.323 Protocols Suite. http://www.protocols.com/pbook/h323.htm, downloaded Sep. 21, 2005.
European Search Report dated Feb. 16, 2007, in corresponding European Application No. EP 06121274, 2 pages.
European Search Report mailed on Feb. 2, 2007, in corresponding EP Application No. 06121277.5, 4 pages.
United States Patent and Trademark Office, Official Action Dated Sep. 18, 2007, for related U.S. Appl. No. 11/254,183, 29 pages.
United States Patent and Trademark Office, Notices of Allowance and Allowability Dated Jun. 9, 2008, for related U.S. Appl. No. 11/254,183, 8 pages.
United States Patent and Trademark Office, Official Action Dated Dec. 23, 2008, for related U.S. Appl. No. 11/254,183, 6 pages.
United States Patent and Trademark Office, Official Action Dated Dec. 12, 2008, for related U.S. Appl. No. 11/363,479, 6 pages.
United States Patent and Trademark Office, Official Action Dated Sep. 4, 2008, for related U.S. Appl. No. 11/253,470, 32 pages.
United States Patent and Trademark Office, Official Action Dated Apr. 3, 2009, for related U.S. Appl. No. 11/254,183, 8 pages.
United States Patent and Trademark Office, Official Action Dated Apr. 13, 2009, for related U.S. Appl. No. 11/363,479, 16 pages.
United States Patent and Trademark Office, Office Action issued for U.S. Appl. No. 11/253,470, mailed on May 21, 2009, 25 pages.
United States Patent and Trademark Office, Office Action issued for U.S. Appl. No. 11/253,404, mailed on Jun. 23, 2009, 26 pages.
European Patent Office, Office Communication issued for European application No. 06121227.5, dated Jun. 10, 2009, 4 pages.
United States Patent and Trademark Office, "Non-Final Office Action," issued in connection with U.S. Appl. No. 11/253,537, on Jul. 17, 2009 (20 pages).
United States Patent and Trademark Office, "Non-Final Office Action," issued in connection with U.S. Patent Application Serial No. 11/253,536, on Aug. 31, 2009 (8 pp.).
United States Patent and Trademark Office, "Notice of Allowance," issued in connection with U.S. Patent Application Serial No. 11/254,183, on Sep. 21, 2009 (4 pp.).

* cited by examiner

| REAL-TIME ? | OUTDIAL COMM. SERVICE | DESCRIPTION |
|---|---|---|
| NO | PAGER NOTIFICATION | WHEN MESSAGE LEFT VIA INDIAL PAGE THE SUBSCRIBER |
| NO | REMINDER | DELIVER PRE-DETERMINED MESSAGE AT PRE-DETERMINED DATE OR TIME |
| NO | SPECIAL DELIVERY | FORWARD A MESSAGE LEFT VIA INDIAL TO SUBSCRIBER |
| NO | DELIVERY TO NON-SUBSCRIBER | FORWARD A MESSAGE LEFT VIA INDIAL TO A 3$^{RD}$ PARTY |
| NO | FAX PRINT/FORWARD | FORWARD A INDIAL FAX OR EMAIL TO A FAX NUMBER |
| YES | LIVE REPLY | DURING INDIAL VOICEMAIL SESSION, RETURN CALL TO 3$^{RD}$ PARTY |
| YES | CALL TRANSFER | TRANSFER OUT OF MESSAGE CENTER TO 3$^{RD}$ PARTY FROM INDIAL |
| YES | CALL TREE TRANSFER | TRANSFER TO 3$^{RD}$ PARTY FROM CALL TREE INDIAL |
| YES | SINGLE NUMBER REACH (FIND ME-FOLLOW ME) | LOCATES SUBSCRIBER, IF THEY WANT TO BE CONNECTED, THE CALLER IS CONNECTED TO SUBSCRIBER |

FIG. 3

```
                                    ┌─ 2055A
    2050A ─┐    2060 ─┐       ╱ ┌─ 2065
           DIAL-PEER VOICE 100 VOIP
           HUNTSTOP
           APPLICATION DETECT-APP
           DESTINATION-PATTERN 3143614612
    2050B ─┐ SESSION TARGET RAS ──────────── 2055B
           └ TECH-PREFIX 5# ─
           DTMF-RELAY H245-SIGNAL
           CODEC G711ULAW
           NO VAD
```

FIG. 11A

```
SUPER-GROUP 200
DESCRIPTION * CFN 3143504400-4420 CTN 3143504421-4424 *
ISDN SUPP-SERVICE TBCT
```

FIG. 11B

```
INTERFACE SERIAL7/0:23
DESCRIPTION * 7/0 3143604450-4451 *
NO IP ADDRESS
SUPER-GROUP 200
ISDN SWITCH-TYPE PRIMARY-NI
ISDN INCOMING-VOICE MODEM
ISDN SUPP-SERVICE TBCT
ISDN T203 10000
NO CDP ENABLE
```

FIG. 11C

```
DIAL-PEER VOICE 199 POTS
SUPER-GROUP 200
HUNTSTOP
APPLICATION DETECT-APP
DESTINATION-PATTERN ..........
SUPER-GROUP-LABEL TARGET 200
DIRECT-INWARD-DIAL
```

FIG. 11D

```
DIAL-PEER VOICE 198 POTS
SUPER-GROUP 200
DESTINATION-PATTERN 200#..........
```

FIG. 11E

| GATEWAY ID 2305 | APP PEER ID 2310 | ACCESS START 2315 | ACCESS END 2320 | TECH-PREFIX 2325 | APP 2330 | MC ID 2335 |
|---|---|---|---|---|---|---|
| DAL00GW0001 | 1024 | 3143504557 | 3143504564 | 4 | UC | AFU02 |
| DAL00GW0001 | 1025 | 3143504565 | 3143504582 | 5 | CT | AFU01 |

| GATEWAY ID 2305 | GW INTERFACE 2340 | SUPER GROUP ID 2345 | TBCT 2350 |
|---|---|---|---|
| DAL00GW0002 | SERIAL7/5:23 | 100 | YES |
| DAL00GW0004 | SERIAL 7/0:1:23 | 102 | NO |

| GATEWAY ID 2305 | OUTDIAL PEER ID 2355 | SUPER GROUP ID 2345 | DESCRIPTION 2360 |
|---|---|---|---|
| DAL00GW0001 | 10015 | 221 | |
| DAL00GW0001 | 10004 | 120 | |

| GATEWAY ID 2305 | FAX PEER ID 2365 | PATTERN 2370 | SUPER GROUP ID 2345 | DESCRIPTION 2375 |
|---|---|---|---|---|
| DAL00GW0001 | 20006 | 110#......... | 110 | |
| DAL00GW0001 | 20015 | 221#......... | 221 | |

```
! One trunk group per 2way or out only circuit group
! The "description" parameter value has no effect on configuration
!
trunk group 200
  description * CFN 3143504400-4420 CTN 3143504421-4424 *
  isdn supp-service tbct
!
!
trunk group 210
  description * SBCM Trunkgroup *
!
!
trunk group 201
  description * Outdial Only *
  isdn supp-service tbct
!
!
trunk group 221
  description * CA Private Outdial *
!
!
trunk group 222
  description * CA Private Outdial Only *
!
```
⎫
⎬ 2430
⎭

⎫ 2405A

⎫ 2405B

⎫ 2405C

⎫ 2405D

```
! One controller parameter set for each PRI interface on the gateway
! NOTE: The only variable is the interface name
! This section will be configured per MOP
!
controller T1 7/0
  framing esf
  linecode b8zs
  pri-group timeslots 1-24
!
! D-channel, Trunk Group Association
!   interface identifier to outdial trunk group
! One interface parameter group for each PRI D-channel on the gateway.
! Are the isdn T* parameters the same for every switch in every region?
! Variables: Interface name, "isdn supp-service tbct" only for tbct PRI
!
interface Serial7/0:23
  description * 7/0 3143604450-4451 *
  no ip address
  trunk-group 200
  isdn switch-type primary-ni
  isdn incoming-voice modem
  isdn supp-service tbct
  isdn T203 10000
  no cdp enable
```
⎫
⎬ 2435
⎭

```
!
! Configured according to MOP.
! One dial-peer voice X pots parameter group for each PRI interface on
! the gateway *with* a D-channel.
! >>> What else is needed for NFAS?
! Variables: dial-peer name, port argument
!
dial-peer voice 1 pots
 huntstop
 application detect-app
 direct-inward-dial
 port 7/0:D
!
! Gateway Application Dial Peer configuration via Ops database
!  Ops db provides access range which must be mapped to
!  "destination-pattern" argument.  If range is non-contiguous,
!  >1 dial peers are needed.
! One dial-peer voice <nm> voip per number range and MC application
! Variables: dial-peer name, tech prefix
!  tech prefix logically equals MC + application
dial-peer voice 100 voip
 huntstop
 application detect-app
 destination-pattern 314361461[6-9]
 session target ras
 tech-prefix 5#
 dtmf-relay h245-signal
 codec g711ulaw
 no vad
!
! Outdial Peer configuration via Ops database
!  outdial peer id, trunk group id from Ops database
! Variables: dial-peer name, <trunk group name> for
! trunkgroup and trunk-group-label parameters
! Note the dial-peer name does *not* have to be the
! same as the trunk group name
!
dial-peer voice 200 pots
 trunkgroup 200
 huntstop
 application detect-app
 destination-pattern ..........
 trunk-group-label target 200
 direct-inward-dial
!
dial-peer voice 201 pots
 trunkgroup 220
 huntstop
 application detect-app
 destination-pattern ..........
 trunk-group-label target 220
 direct-inward-dial
```

Blocks labeled: 2440 (top), 2415, 2420A, 2420B.

FIG. 18B

```
!
! Configure according to MOP
! mmoip dial-peer for fax
!
dial-peer voice 301 mmoip
 huntstop
 application fax_on_vfc_onramp_app out-bound
 destination-pattern ..........
 information-type fax
 session target mailto:$m$@bud01.umsafu.com
 dsn failure
!
! Fax Outdial peer configuration via Ops database
!  dial peer id
!  incoming called-number = outdial huntgroup & any called number
! One fax outdial peer per outdial trunk group that is fax
! capabable (from a UC perspective).
!
dial-peer voice 302 mmoip
 huntstop
 application fax-offramp
 information-type fax
 incoming called-number 5#..........
 dsn failure
```

| UNIFIED SUB-GROUP | AVAILABLE DEDICATED | AVAILABLE SHARED |
|---|---|---|
| SG-A | 10 | 6 |

| FEATURE | DEDICATED | LIMIT ON SHARED |
|---|---|---|
| Live Reply | 2 | 3 |
| Auto Attendant | 2 | 3 |
| Notification | 0 | 6 |
| Reminders | 0 | 6 |
| Fax | 0 | 6 |

| UNIFIED SUB-GROUP | AVAILABLE DEDICATED | AVAILABLE SHARED |
|---|---|---|
| SG-A | 10 | 10 |

| FEATURE | DEDICATED | LIMIT ON SHARED |
|---|---|---|
| Live Reply | 0 | 2 |
| Auto Attendant | 0 | 10 |
| Notification | 0 | 10 |
| Reminders | 0 | 10 |
| Fax | 0 | 10 |

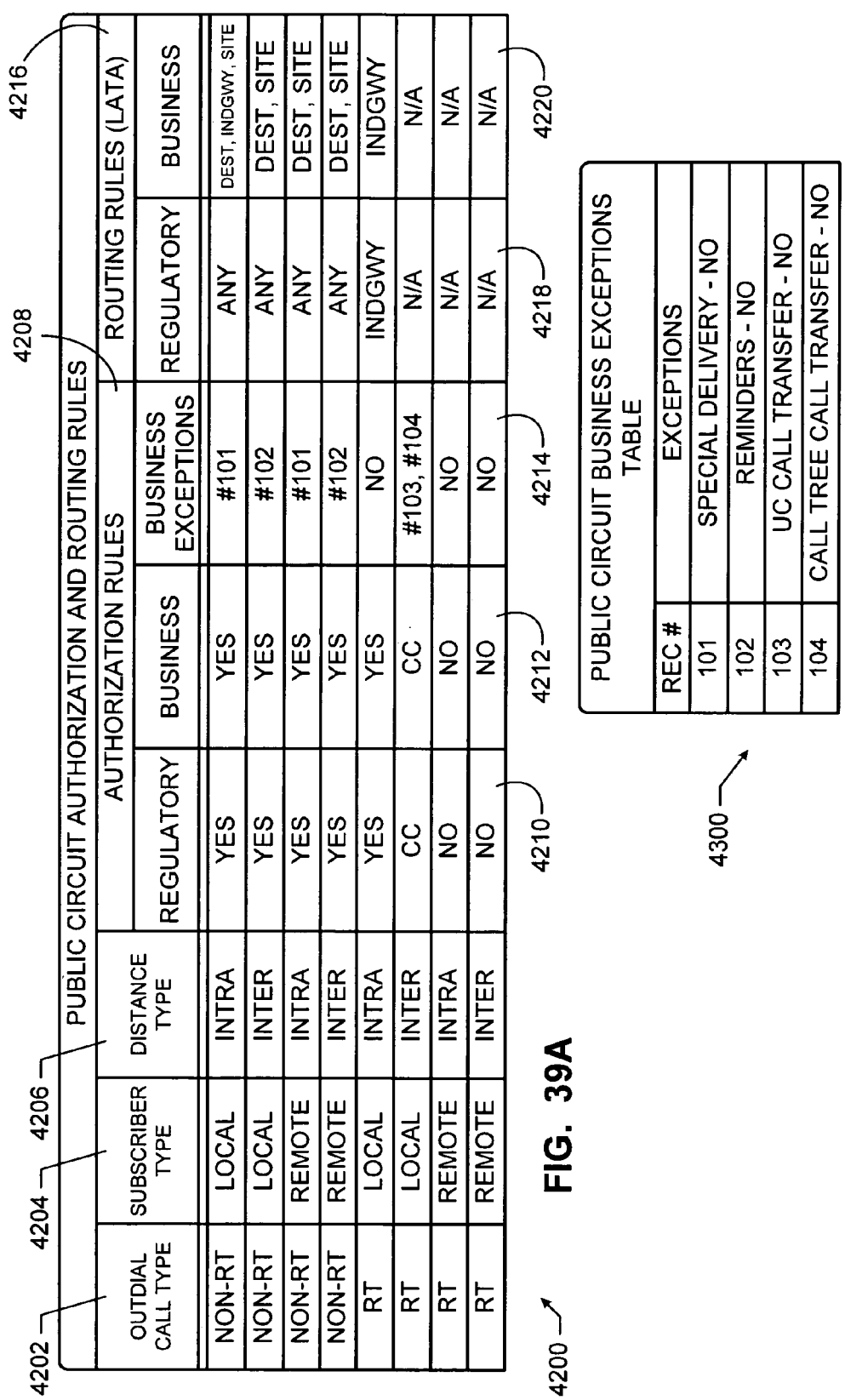

| | | PRIVATE CIRCUIT AUTHORIZATION AND ROUTING RULES | | | | |
|---|---|---|---|---|---|---|
| OUTDIAL CALL TYPE | SUBSCRIBER TYPE | DISTANCE TYPE | AUTHORIZATION RULES | | | ROUTING RULES (LATA) | |
| | | | REGULATORY | BUSINESS | BUSINESS EXCEPTIONS | REGULATORY | BUSINESS |
| NON-RT | LOCAL | INTRA | YES | YES | NO | ANY | DEST, INDGWY, SITE |
| NON-RT | LOCAL | INTER | YES | YES | NO | ANY | DEST, INDGWY, SITE |
| NON-RT | REMOTE | INTRA | YES | YES | NO | ANY | DEST, INDGWY, SITE |
| NON-RT | REMOTE | INTER | YES | YES | NO | ANY | DEST, INDGWY, SITE |
| RT | LOCAL | INTRA | YES | YES | NO | INDGWY | INDGWY |
| RT | LOCAL | INTER | YES | YES | NO | INDGWY | INDGWY |
| RT | REMOTE | INTRA | YES | YES | NO | INDGWY | INDGWY |
| RT | REMOTE | INTER | YES | YES | NO | INDGWY | INDGWY |

| SHARED CIRCUIT AUTHORIZATION AND ROUTING RULES ||||||||
|---|---|---|---|---|---|---|---|
| OUTDIAL CALL TYPE | SUBSCRIBER TYPE | DISTANCE TYPE | AUTHORIZATION RULES ||| ROUTING RULES (LATA) ||
| | | | REGULATORY | BUSINESS | BUSINESS EXCEPTIONS | REGULATORY | BUSINESS |
| NON-RT | LOCAL | INTRA | YES | YES | NO | ANY | DEST, INDGWY, SITE |
| NON-RT | LOCAL | INTER | YES | YES | NO | ANY | DEST, INDGWY, SITE |
| NON-RT | REMOTE | INTRA | YES | YES | NO | ANY | DEST, INDGWY, SITE |
| NON-RT | REMOTE | INTER | YES | YES | NO | ANY | DEST, INDGWY, SITE |
| RT | LOCAL | INTRA | YES | YES | NO | INDGWY | INDGWY |
| RT | LOCAL | INTER | CC | CC | NO | N/A | N/A |
| RT | REMOTE | INTRA | NO | NO | NO | N/A | N/A |
| RT | REMOTE | INTER | NO | NO | NO | N/A | N/A |

COMBINED AUTHORIZATION AND ROUTING RULES

| CIRCUIT TYPE | SUBSCRIBER TYPE | DISTANCE TYPE | AUTHORIZATION RESPONSE | | ROUTING RULES (LATA) | |
|---|---|---|---|---|---|---|
| | | | REMINDER | LIVE REPLY | REMINDER | LIVE REPLY |
| PUBLIC | LOCAL | INTRA | YES | YES | DEST, INDGWY, SITE | INDGWY |
| PUBLIC | LOCAL | INTER | NO | CC | N/A | N/A |
| PUBLIC | REMOTE | INTRA | YES | NO | DEST, SITE | N/A |
| PUBLIC | REMOTE | INTER | NO | NO | N/A | N/A |
| PRIVATE | LOCAL | INTRA | YES | YES | DEST, INDGWY, SITE | INDGWY |
| PRIVATE | LOCAL | INTER | YES | YES | DEST, INDGWY, SITE | INDGWY |
| PRIVATE | REMOTE | INTRA | YES | YES | DEST, INDGWY, SITE | INDGWY |
| PRIVATE | REMOTE | INTER | YES | YES | DEST, INDGWY, SITE | INDGWY |
| SHARED | LOCAL | INTRA | YES | CC | DEST, INDGWY, SITE | N/A |
| SHARED | LOCAL | INTER | YES | NO | DEST, INDGWY, SITE | N/A |
| SHARED | REMOTE | INTRA | YES | NO | DEST, INDGWY, SITE | N/A |
| SHARED | REMOTE | INTER | YES | NO | DEST, INDGWY, SITE | N/A |

| FEATURE 5035 | CURRENT NUMBER IN PROGRESS 5040 | RESERVED CAPACITY 5045 | MAXIMUM NUMBER ALLOWED 5050 |
|---|---|---|---|
| $F_1$ | $C_1$ | $R_1$ | $M_1$ |
| ⋮ | ⋮ | ⋮ | ⋮ |
| $F_N$ | $C_N$ | $R_N$ | $M_N$ |

FIG. 45

| FEATURE | CURRENT NUMBER IN PROGRESS | RESERVED CAPACITY | MAXIMUM NUMBER ALLOWED |
|---|---|---|---|
| A | 0 | 10 | 10 |
| B | 0 | 6 | 6 |
| C | 0 | 4 | 4 |

FIG. 46A

| FEATURE | CURRENT NUMBER IN PROGRESS | RESERVED CAPACITY | MAXIMUM NUMBER ALLOWED |
|---|---|---|---|
| A | 0 | 0 | 20 |
| B | 0 | 0 | 20 |
| C | 0 | 0 | 20 |

FIG. 46B

| FEATURE | CURRENT NUMBER IN PROGRESS | RESERVED CAPACITY | MAXIMUM NUMBER ALLOWED |
|---|---|---|---|
| A | 0 | 0 | 8 |
| B | 0 | 0 | 8 |
| C | 0 | 0 | 8 |

FIG. 46C

| FEATURE | CURRENT NUMBER IN PROGRESS | RESERVED CAPACITY | MAXIMUM NUMBER ALLOWED |
|---|---|---|---|
| A | 0 | 4 | 10 |
| B | 0 | 4 | 10 |
| C | 0 | 4 | 10 |

FIG. 46D

| FEATURE | CURRENT NUMBER IN PROGRESS | RESERVED CAPACITY | MAXIMUM NUMBER ALLOWED |
|---|---|---|---|
| A | 0 | 0 | 0 |
| B | 0 | 0 | 0 |
| C | 0 | 20 | 20 |

FIG. 46E

| FEATURE | CURRENT NUMBER IN PROGRESS | RESERVED CAPACITY | MAXIMUM NUMBER ALLOWED |
|---|---|---|---|
| A | 0 | 4 | 6 |
| B | 0 | 6 | 8 |
| C | 0 | 0 | 10 |

| Name | Type | Notes |
|---|---|---|
| Prefix | A6 | Normally NPA, sometimes NPA-NXX |
| LATA | 999 | Three digit LATA ID |
| TollFree | Bool | Indicates if a toll free prefix. For example, if Prefix is 800, this will be true. |

LATA-TO-NUMBER LOOK-UP TABLE

| Name | Type | Notes |
|---|---|---|
| KeyRule | PKey | Auto-generated |
| Description | A128 | |
| OutdialUnfiedSGType | enum | SBCM/public/private |
| InterLATA | Bool | Whether inter-LATA or intra-LATA |
| RemoteAccess | Bool | Whether a remote access subscriber |
| AuthorizePN | enum | Authorization Yes/No/CC for pager notification |
| AuthorizeRM | enum | Authorization Yes/No/CC for reminders |
| AuthorizeSD | enum | Authorization Yes/No/CC for special delivery |
| AuthorizeFaxPrint | enum | Authorization Yes/No/CC for fax print |
| AuthorizeMDNS | enum | Authorization Yes/No/CC for MDNS |
| AuthorizeLiveReply | enum | Authorization Yes/No/CC for live reply |
| AuthorizeCTA | enum | Authorization Yes/No/CC for CTA |
| AuthorizeSNR | enum | Authorization Yes/No/CC for SNR |
| RoutingPN | A32 | Routing order for pager notification |
| RoutingRM | A32 | Routing order for reminders |
| RoutingSD | A32 | Routing order for special delivery |
| RoutingFaxPrint | A32 | Routing order for fax print |
| RoutingMDNS | A32 | Routing order for MDNS |

REGULATORY AND BUSINESS
AUTHORIZATION AND ROUTING RULES
TABLE

| Name | Type | Notes |
|---|---|---|
| KeyEnterprise | PKey | Auto-generated |
| ID | A64 | Unique identifier string |
| Description | A128 | |
| Global | Bool | True if this is the (one and only) SBC public enterprise |
| DN | A128 | LDAP string DN reference into directory |

ENTERPRISE TABLE

| Name | Type | Notes |
|---|---|---|
| KeyODRG | PKey | Auto-generated |
| Name | A64 | Unique identification string |
| Description | A128 | |
| KeyEnterprise | FKey | Enterprise this policy is managed with |
| CircuitPN | enum | SBCM/public/private/disabled for pager notification |
| CircuitRM | enum | SBCM/public/private/disabled for reminders |
| CircuitSD | enum | SBCM/public/private/disabled for special delivery |
| CircuitFaxPrint | enum | SBCM/public/private/disabled for fax print |
| CircuitMDNS | enum | SBCM/public/private/disabled for MDNS |
| CircuitLiveReply | enum | SBCM/public/private/disabled for live reply |
| CircuitCTA | enum | SBCM/public/private/disabled for CTA |
| CircuitSNR | enum | SBCM/public/private/disabled for SNR |

OUTDIAL RESOURCE GROUP TABLE

| Name | Type | Notes |
|---|---|---|
| KeySite | PKey | Auto-generated |
| ID | A64 | Unique identification string |
| Description | A128 | |
| LATA | 999 | |

SITE INFORMATION TABLE

| Name | Type | Notes |
|---|---|---|
| KeyOutdialUnfiedSG | PKey | Auto-generated |
| ID | A64 | Unique identification string |
| Description | A128 | |
| KeySite | FKey | Site in which this outdial unified super-group is located |
| OutdialCircuits | N | Total outdial circuits |
| CircuitType | enum | SBCM/Public/Private |
| TwoWay | Bool | True if two-way, false if outdial only |
| LATA | 999 | |

OUTDIAL UNIFIED
SUPER-GROUP TABLE

| Name | Type | Notes |
|---|---|---|
| KeyAccessNumber | PKey | Access number in question |
| KeyOutdialUnfiedSG | FKey | Outdial unified super-group for which this access number may perform TBCT |

TWO B-CHANNEL TRANSFER
TABLE

| Name | Type | Notes |
|---|---|---|
| KeyUnifiedSubGroup | PKey | Auto-generated |
| ID | A64 | Unique identification string |
| Description | A128 | |
| KeyEnterprise | FKey | Assigned enterprise |
| KeyOutdialUnfiedSG | FKey | Outdial Unfied Super-Group |
| Total Circuits | N | Total number of circuits |
| CircMaxPN | N | Maximum outdial circuits for pager notification |
| CircDedPN | N | Circuits dedicated to pager notification |
| CircMaxRM | N | Maximum outdial circuits for reminders |
| CircDedRM | N | Circuits dedicated to reminders |
| CircMaxSD | N | Maximum outdial circuits for special delivery |
| CircDedSD | N | Circuits dedicated to special delivery |
| CircMaxMDNS | N | Maximum outdial circuits for MDNS |
| CircDedMDNS | N | Circuits dedicated to MDNS |
| CircMaxFaxPrint | N | Maximum outdial circuits for fax print |
| CircDedFaxPrint | N | Circuits dedicated to fax print |
| CircMaxLiveReply | N | Maximum outdial circuits for live reply |
| CircDedLiveReply | N | Circuits dedicated to live reply |
| CircMaxCTA | N | Maximum outdial circuits for CTA |
| CircDedCTA | N | Circuits dedicated to CTA |
| CircMaxSNR | N | Maximum outdial circuits for SNR |
| CircDedSNR | N | Circuits dedicated to SNR |
| RestrictedODRG | Bool | Whether only available for restricted ODRGs |

7090

UNIFIED SUB-GROUP TABLE

| Name | Type | Notes |
| --- | --- | --- |
| ID | A64 | Unique identification string |
| Description | A128 | |
| KeyUnifiedSubGroup | FKey | Unified Sub-Group |
| KeyODRG | FKey | ODRG in question |

7098

ODRG-TO-UNIFIED SUB-GROUP LINKAGE TABLE

| Name | Type | Notes |
| --- | --- | --- |
| KeyEnterpriseMC | PKey | Auto-generated |
| KeyEnterprise | FKey | Enterprise |
| KeyMC | FKey | Messaging Center |

PER-MESSAGE CENTER ENTERPRISE TABLE

| Name | Type | Notes |
| --- | --- | --- |
| KeyMC | PKey | Auto-generated |
| ID | N | Message center ID – unique number from 0 to 99 |
| KeySite | FKey | Foreign key for site |
| Description | A128 | |
| LDAPHost | A128 | Required by the ERT |
| IMAPHost | A128 | Required by the ERT |
| WebmailHost | A128 | Required by the ERT |
| SMTPHost | A128 | Required by the ERT |
| UCATHost | A128 | Required by the ERT |
| POPHost | A128 | Required by the ERT |
| Primary | Bool | Primary MC for ERT? Required by ERT |
| Retired | Bool | Retired MC for ERT? Required by ERT |

MESSAGE CENTER INFORMATION TABLE

| Name | Type | Notes |
|---|---|---|
| KeyAccessNumber | PKey | Auto-generated |
| AccessNumber | A10 | Ten digit |
| Description | A128 | Description |
| CFN | Bool | TRUE if CFN, FALSE if call tree access number |
| KeyEnterpriseMC | FKey | Enterprise and message center that this number is associated with |
| LATA | 999 | Indial gateway LATA |

ACCESS NUMBER TABLE

| Name | Type | Notes |
|---|---|---|
| RangeStart | A10 | Three to ten digits |
| RangeEnd | A10 | Three to ten digits |
| KeyAccessNumber | FKey | CFN these numbers forward to |

NUMBER RANGE TABLE

| Name | Type | Notes |
|---|---|---|
| KeyAdministrator | PKey | Auto-generated |
| AdministratorID | A64 | Unique identification string, used as login name |
| Name | A128 | |
| Password | A64 | Encrypted using a one-way algorithm |
| SearchDN | A256 | LDAP format string DN |
| KeyEnterprise | FKey | Enterprise (optional – not present for global administrators) |

ADMINISTRATOR TABLE

| Name | Type | Notes |
|---|---|---|
| KeyGroup | PKey | Auto-generated |
| Name | A64 | Unique identification string |
| Description | A128 | |

GROUP TABLE

| Name | Type | Notes |
|---|---|---|
| KeyPermission | PKey | Auto-generated |
| Name | A64 | Unique identification string |
| Description | A128 | |

PERMISSION TABLE

| Name | Type | Notes |
|---|---|---|
| KeyAdministrator | FKey | Administrator |
| KeyGroup | FKey | Group |

ADMINISTRATOR GROUP LINK TABLE

| Name | Type | Notes |
|---|---|---|
| KeyGroup | FKey | Group |
| KeyPermission | FKey | Permission |

PERMISSION GROUP LINK TABLE

FIG. 78

METHODS AND APPARATUS TO PERFORM OUTDIAL FACSIMILE SERVICES

RELATED APPLICATIONS

This patent arises from a continuation of U.S. application Ser. No. 11/254,183 entitled "Methods and Apparatus for Authorizing and Allocating Outdial Communication Services" and filed on Oct. 19, 2005. U.S. application Ser. No. 11/254,183 is incorporated herein by reference in its entirety.

FIELD OF THE DISCLOSURE

This disclosure relates generally to communication and/or messaging systems and/or services and, more particularly, to methods and apparatus for authorizing and allocating outdial communication services.

BACKGROUND

A growing percentage of consumers and business persons rely on an increasing number and type of communication services and technologies on a regular basis. For instance, it is not uncommon for a consumer to subscribe to a wireless telephone service, a land-line telephone service, and a broadband Internet access service. With multiple communication service subscriptions come multiple messaging stores (e.g., voicemail, facsimiles (i.e., faxes), electronic mail (i.e., e-mail), etc.) to monitor, read and/or reply to.

Service providers have recognized that providing a method that allows a subscriber to access their multiple and potentially disparate message stores from a central location using a common set of access tools is appealing to subscribers. For example, in the Unified Communications$^{SM}$ service offered by SBC Communications® voice messages, faxes and e-mails are integrated into a common mailbox, allowing subscribers to retrieve, forward and reply to messages via telephone, or online. The integrated message mailbox is accessible anywhere Internet access is available or via any wireless, land-line, and/or Voice over Internet Protocol (VoIP) telephone.

BRIEF DESCRIPTION OF THE DRAWINGS

FIG. 3 is a table identifying a set of example outdial communication services.

FIGS. 11A-E are example sections of a gateway configuration record.

FIGS. 18A-C collectively illustrate an example gateway configuration record.

FIG. 22 is an example table illustrating an example assignment of unified sub-group resources among a set of features.

FIG. 23 is an example table illustrating another example assignment of unified sub-group resources among a set of features.

FIG. 39A illustrates an example public circuit authorization and routing rules table having authorization and routing rules that are used by the example outdial authorizer of FIGS. 4 and 37 to determine whether to authorize outdial communication services and/or to provide related routing information.

FIG. 40 illustrates a public circuit business exceptions table to store business exceptions that are used by the example outdial authorizer of FIGS. 4 and 37 to determine whether to authorize outdial communication services.

FIG. 39B illustrates an example private circuit authorization and routing rules table having authorization and routing rules that are used by the example outdial authorizer of FIGS. 4 and 37 to determine whether to authorize outdial communication services and/or to provide related routing information.

FIG. 39C illustrates an example shared circuit authorization and routing rules table having authorization and routing rules that are used by the example outdial authorizer of FIGS. 4 and 37 to determine whether to authorize outdial communication services and/or to provide related routing information.

FIG. 41 illustrates an example combined authorization and routing rules tables having authorization and routing rules that are used by the example outdial authorizer of FIGS. 4 and 37 to determine whether to authorize outdial communication services and/or to provide related routing information.

FIG. 45 is an example resource allocation control table constructed in accordance with the teachings of the invention.

FIGS. 46A-F are example resource allocation control tables illustrating a variety of resource allocation configuration schemes.

FIGS. 61-64 depict example tables used to store global information related to the configuration of a communications network.

FIGS. 65-69 depict example tables used to store site-specific information related to particular sites having one or more message centers.

FIGS. 70-73 depict example tables used to store message center-specific information related to particular message centers.

FIGS. 74-78 depict example tables used to store administrator and administrator access privilege information associated with user access to information depicted in the example tables of FIGS. 61-78.

DETAILED DESCRIPTION

To facilitate review and understanding of the methods and apparatus disclosed herein, the present patent has been organized in accordance with the headings shown below.

I. Outdial Communication Service Architecture (paragraph [0070])
II. Policy Server (paragraph [00106]
III. Gateway Provisioning (paragraph [00155])
IV. Outdial Resource Groups (ODRGs) (paragraph [00178])
V. Outdial Authorizer (paragraph [00232])
VI. Resource Allocator (paragraph [00268])
VII. Call Transfer (paragraph [00299])
VIII. Operations Database (paragraph [00346])
IX. Example Processor Platform (paragraph [00411])

Methods and apparatus for authorizing and allocating outdial communication services are disclosed. An illustrated example system comprises an application server to initiate an outdial communication service, a gateway to transport the outdial communication service from the application server to an access network via a shared communication facility, and a policy server to selectively authorize the initiated outdial service and, if the outdial service is authorized, to allocate a portion of the shared communication facility to the authorized outdial service. An illustrated example policy server comprises an outdial authorizer to selectively authorize for a requested outdial communication service and sa resource allocator to selectively allocate of a portion of a shared communication resource to an authorized outdial communication service. An illustrated example method comprises requesting authorization from a policy server for an outdial communication service to a first endpoint. If authorization is received, requesting allocation of a shared communication resource between a gateway and the first endpoint for the outdial communication service and if an allocation is made, routing the outdial communication service to the first endpoint via a Voice over Internet Protocol (VoIP) network, the gateway, and the resource.

I. Outdial Communication Service Architecture

Figure 1:
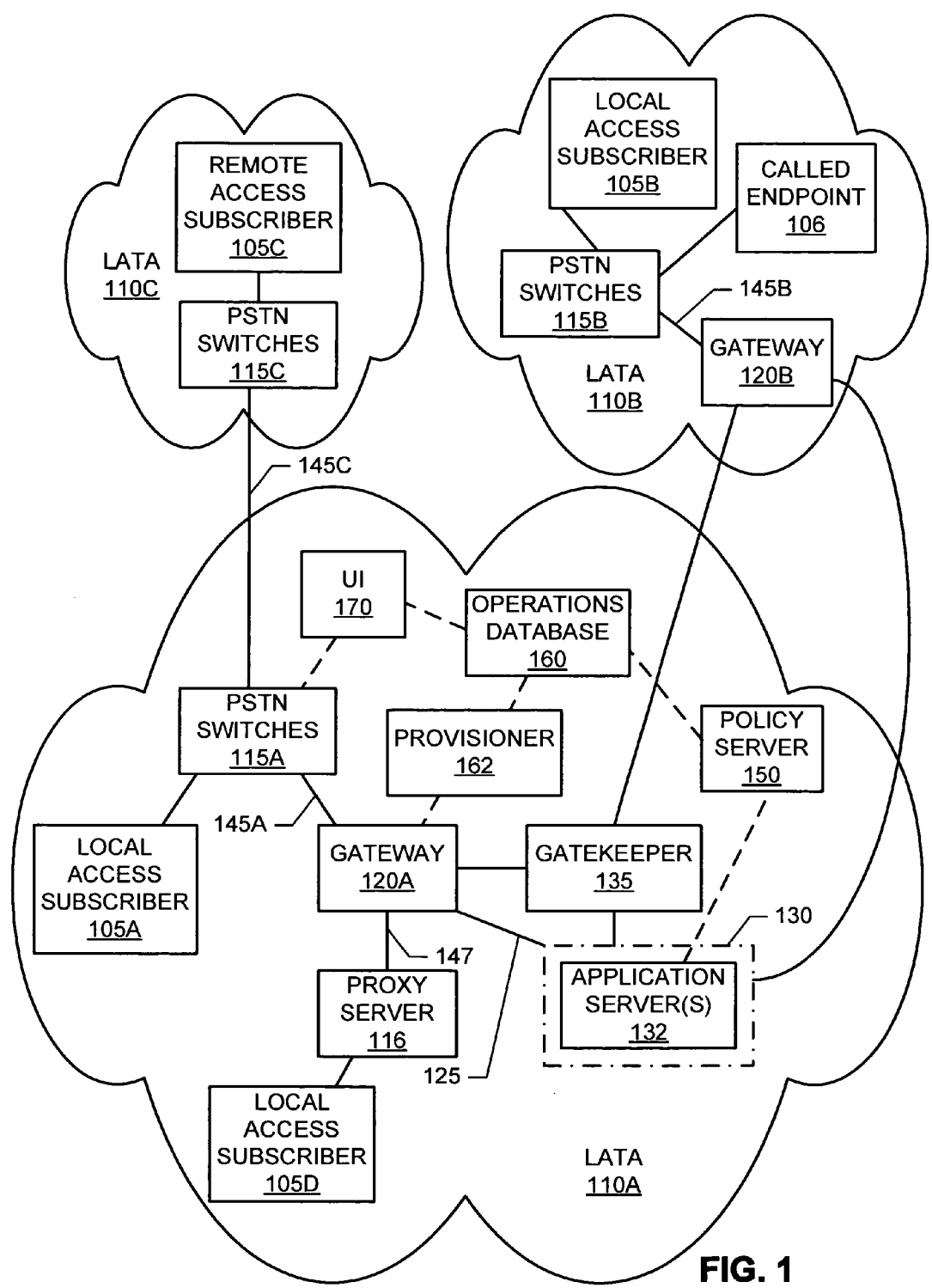
FIG. 1 is a schematic illustration of an example system constructed in accordance with the teachings of the invention and capable of authorizing and allocating outdial communication services.

FIG. 1 is a schematic illustration of an example communications and/or messaging system constructed in accordance with the teachings of the invention and capable of authorizing and allocating outdial communication services (e.g., telephone services, pager services, facsimile services, messaging services, alert services, etc.). In the illustrated example, an outdial communication service may be initiated either in response to an indial communication service initiated by, for example a subscriber, a person, a third-party, or a communication device and/or system (i.e., real-time), or by an application server associated with the example system of FIG. 1 (i.e., non-real-time). In the interest of brevity and ease of discussion, throughout the remainder of this patent references will be made to indial services initiated by a person and/or subscriber. However, persons of ordinary skill in the art will readily appreciate that the methods and systems described herein are equally applicable to indial services initiated by, for example, a communication device and/or system. In the example of FIG. 1, an indial communication service is a communication service between a person and a message center. The indial communication service is requested and/or initiated by a person and/or subscriber from, for example, a Voice over Internet Protocol (VoIP) telephone, a wireless telephone (e.g., cellular), a land-line telephone (e.g., via a public switched telephone network (PSTN)), personal digital assistant (PDA), Blackberry, computing device, communications device and/or a Personal Computer (PC). Example indial communication services include, for example, a subscriber and/or person dialing a telephone (e.g., wireless telephone, wired telephone, cordless telephone, VoIP telephone, etc.) to leave a message (e.g., leave a voice mail), retrieve a message (e.g., listen to a voicemail, retrieve an electronic mail, etc.) and/or access call tree services, etc. A subscriber may also utilize, for example, a PDA, a web enabled wireless phone, a PC and/or a Blackberry to, for instance, send and/or receive a text or electronic mail message. An indial communication service may utilize unidirectional or bi-directional communications. For example, allowing a user to interact with a unified messaging mailbox utilizes a bi-directional flow of voice and/or data.

In the illustrated example of FIG. 1, an outdial communication service is initiated by a message center (e.g., by an application server in a message center) to, for example, an endpoint and/or person. The endpoint and/or person may be associated with, for instance, a cellular, land-line or VoIP telephone number, a pager number, a voice mail box access number, a facsimile machine, a PC, a PDA, a Blackberry, an email address, an IP address, etc. In the example system of FIG. 1, an outdial communication service may be initiated by a message center in response to an ongoing indial communication service (e.g., a live reply), a previous indial communication service (e.g., an alert pager message) and/or may be initiated independently by the message center. Further, an outdial communication service may be a real-time and/or a non-real-time service.

In the illustrated example of FIG. 1, an example indial communication service is initiated by a person (e.g., a subscriber 105A) who is currently geographically located within a local access transport area (LATA) 110A and currently connected to a PSTN switch 115A. The person 105A may or may not be a subscriber of communication and/or messaging services provided by the example system of FIG. 1. To transport voice and/or data between the subscriber 105A and a message center 130, the example system of FIG. 1 includes a gateway 120A which interworks between the PSTN switch 115A and a packet-based network or connection 125 that communicatively couples the gateway 120A to the message center 130. The interworking between the PSTN switch 115A and the packet-based network 125 may be implemented using any of a variety of techniques. For instance, the network 125 in the example of FIG. 1 is based on protocols defined in the International Telecommunications Union (ITU) H.323 standard or the Session Initiated Protocol (SIP) as specified in Internet Engineering Task Force (IETF) Request for Comment (RFC) 2543.

To interact with the subscriber 105A, the example message center 130 includes any of a variety of application servers 132. For instance, the message center 130 of the illustrated example includes a call tree application server that provides automated prompts to a caller (e.g., subscriber 105A) and routes calls based on interactive input from the caller; and/or a unified messaging application server that plays greetings, records voice mail messages, stores the recorded messages, allows a subscriber to check and playback messages, etc. In the illustrated example of FIG. 1, an indial communication service may be routed to a first application server, and then based upon interaction(s) between a subscriber and the first application server the indial communication service may be redirected to a second application server. For example, a person may access a call-tree application server having a selectable option that transfers the indial service to a unified message application server to allow the person to leave a voicemail for a subscriber of the example system of FIG. 1. The transfer of an indial communication service between application servers is discussed in more detail below in Section VII in connection with FIGS. 49-53 and 54A-C.

To facilitate platform VoIP sessions between the gateway 120A and an application server 132 via the packet based network 125, the example system of FIG. 1 includes a gatekeeper 135. The gatekeeper 135 of the illustrated example is any of a variety of suitable devices for handling the admittance of VoIP sessions between H.323 endpoints (e.g., between the gateway 120A and the application server 132). It will be appreciated the gatekeeper 135 may include or be replaced, partially or wholly, by a proxy server, VoIP softswitch (i.e., softswitch) and/or a softswitch having, possibly, a reduced set of implemented features similar to those of a proxy server (i.e., a softswitch/proxy server) to handling the admittance of VoIP sessions for SIP endpoints. In the illustrated example, the gatekeeper 135 chooses an application server 132 based upon a technology prefix as determined by the gateway 120A from the telephone number (i.e., the access number) used by the person and/or subscriber 105A to access the message center 130, and provides routing information to the gateway 120A (e.g., the Internet Protocol (IP) address of the selected application server 132) so that the subscriber 105A can communicate with the selected application server 132 via the gateway 120A and the packet-based network 125.

For example, if the subscriber 105A accesses the message center 130 using an access number of a voice mail account, or a called party does not answer an incoming call and the call is forwarded to voice mail, the indial call is routed by the gateway 120A and the network 125 to a unified messaging application server 132. Likewise, a person 105A calling an access number associated with a call tree is routed to a call tree application server 132.

To facilitate call routing between the gateway 120A and the application server(s) 132, the gateway 120A of the illustrated example includes dial peers to act as a start or endpoint of an indial or outdial call. A dial peer may implement any of a variety of techniques and/or methods for terminating and/or originating calls and may be implemented using, for example, software executing on a general-purpose or specialized processor and/or as dedicated hardware. As used generically herein, a dial peer matches a specific dialed sequence of digits (i.e., an access number) to an addressable call endpoint. For example, when an indial call is received by the illustrated gateway 120A, the gateway 120A selects an indial dial peer based on information associated with the indial call (e.g., the access number that caused the gateway 120A to receive the indial call). In the illustrated example, each dial peer is associated with a unique combination of a specific message center 130 and an application server type that are configured to handle the indial call. In addition, each of the dial peer(s) of the illustrated example is associated to a technology prefix that is associated with a specific message center 130 and an application server type. For example, a first technology prefix indicates that the call seeks access to a voice mail messaging system at a first message center, and a second technology prefix indicates that the call seeks access to a call tree system at a second message center.

When the gateway 120A requests admittance of a platform VoIP session from the gatekeeper 135, the technology prefix of the dial peer associated with an indial call is passed from the gateway 120A to the gatekeeper 135. In the example system of FIG. 1, the technology prefix is prepended to the access number in the called party field of the admittance request. As discussed below, the gateway 120A parses the called party field to extract the technology prefix. The example gatekeeper 135 of FIG. 1 creates, stores and/or has access to a list of message centers 130, application servers 132 and the available technology prefixes with which the message centers and application servers are associated. For instance, the gatekeeper 135 creates and utilizes a table comprising a list of application server IP addresses associated with each technology prefix and the current processing load for each application server. When the gatekeeper 135 receives an admittance request from the gateway 120A which includes a technology prefix, the gatekeeper 135 uses the technology prefix to determine the specific message center and to select a specific application server 132 having the correct application server type and having the lightest current processing load (e.g., handling the smallest number of current indial and/or outdial calls), and returns the IP address of the selected application server 132 at the specific message center to the gateway 120A. In the example system of FIG. 1, each of application servers 132 periodically or aperiodically send to the gatekeeper 135 the technology prefix(es) supported by the application server 132 and their current processing load. Alternatively, the gatekeeper 135 could be provisioned by, for example, the operations database 160.

In the example system of FIG. 1 an access number is used to determine how an indial calls enters a messaging platform comprised of, for example, the gateway 120A, the gatekeeper 135, the message center 130, the policy server 150 and the operations database 160. In particular, the access number determines a communications path (e.g., a circuit group, or packet-based connection, etc.) that routes the indial call to a gateway (e.g., the gateway 120A) associated with the communications path. As discussed below, more than one gateway may be associated with a communications path. An access number may be one of a variety of access number types, for example, a call forwarding number (CFN), a call tree access number (CTAN), a re-directing number, direct inward dial (DID) number, mailbox number, etc.

The Local Exchange Routing Guide (LERG) which is published monthly by Telecordia Technologies specifies the set of legitimate telephone number ranges and maps them to specific LATAs. Based on the LERG, each access number and/or mailbox number is, thus, associated with a particular LATA. In the example system of FIG. 1, the LATA associated with a subscriber's mailbox number (e.g., their telephone number) is referred to as the subscriber LATA (i.e., home LATA) for that subscriber. Alternatively, the CFN may be used a proxy to determine the subscriber LATA. Likewise the subscriber LATA associated with a call tree application is the LATA associated with the CTAN and/or the call tree subscriber number for the call tree. The subscriber LATA is not affected by where an indial call is physically originated from, but is determined based on the mailbox number associated with the subscriber, a call tree subscriber number and/or a CTAN. Each gateway is physically located in a specific LATA that is referred to as the indial gateway LATA. The access number, thus, determines the indial gateway LATA. In the example system of FIG. 1 the subscriber LATA and the indial gateway LATA may be, but, are not necessarily the same LATA. For example, a person located in San Francisco, Calif. may be attempting to call a subscriber having a telephone number based in Chicago, Ill. If the subscriber does not answer their phone, the telephone call may, for example, be forwarded to a CFN (i.e., an access number) also associated with Chicago, Ill.). In turn, the telephone call is routed based on the call forwarding access number and to, for example, a particular circuit group and gateway located in Dallas, Tex. (using any of a variety of routing techniques) thereby becoming an indial call entering into a messaging platform. In this example, the subscriber LATA is the LATA that includes Chicago, Ill. and the indial gateway LATA is the LATA that includes Dallas, Tex.

As illustrated in FIG. 1, a subscriber (e.g., a subscriber 105B or 105C) may be associated with a subscriber LATA (e.g., a LATA 110B and/or a LATA 110C) that is different from the LATA 110A containing the message center 130. For example, the subscriber 105B is associated with the LATA 110B and connects to the message center 130 via a PSTN switch 115B and a gateway 120B, where both the gateway 120B and the PSTN switch 115B are also associated with the LATA 110B. In contrast, the subscriber 105C is associated with the LATA 110C and connects to the message center 130 via a PSTN switch 115C associated with the LATA 110C, and via the PSTN switch 115A and the gateway 120A of LATA 110A. In the illustrated example, the subscribers 105A and 105B are consider local access subscribers because the indial gateway LATAs used to transport data between the message center 130 and the subscribers are located within the respective subscriber LATA (e.g., the LATA 110A or 110B). However, the subscriber 105C is considered a remote access subscriber because the gateway 120A is located in LATA 110A which is different from the subscriber LATA 110C.

Instead of connecting to a gateway (e.g., gateway 120A) via a circuit-based connection to a PSTN switch (e.g., PSTN switch 115A), a subscriber and/or person (e.g., a subscriber 110D) may alternatively connect to the gateway 120A via an access VoIP packet-based connection using any of a variety of proxy servers (e.g., a proxy server 116) and/or IP based networks. To the extent that an access VoIP packet-based connection (e.g., connecting the subscriber 105D) and the network 125 both support SIP, the gateway 120A may, for example, include or be replaced, partially or wholly, by a session border controller, and the gatekeeper 135 may, for example, include or be replaced, partially or wholly, by a proxy server or softswitch/proxy server.

While for simplicity of illustration, the example system of FIG. 1 shows a single message center 130 located within the LATA 110A, the LATA 110A may alternatively contain any number of message centers. As used herein, two or more message centers located in the same LATA are referred to as "co-located message centers." Further, any number of LATAs may contain message centers. Preferably, LATAs that contain a message center are geographically distributed, and the plurality of co-located and/or geographically distributed message centers are connected via a Wide Area Network (WAN). Moreover, a LATA and/or communication and/or messaging system may contain any number of gateways and/or gatekeepers, and any PSTN switch may connect to any number of gateways. Additionally, the policy server 150 may be clustered into a plurality of communication and/or computing devices such that each of the plurality of communication and/or computing devices is assigned to authorization and/or resource allocation for a pre-determined set of unified subgroups, unified super-groups and/or LATAs. For example, when a LATA is not assigned to a particular one of the plurality of communication and/or computing devices, it will communicate with other one(s) of the plurality of communication and/or computing devices that handle authorization and/or resource allocation for the LATA. It will be readily apparent to persons of ordinary skill in the art that other distributed implementations of the policy server 150 may be utilized.

The connections and devices connecting a subscriber to a gateway will be referred to herein as the access network for the subscriber. For example, the circuit-based connection from the subscriber 105C to the PSTN switch 115C, the PSTN switch 115C, the connection from the PSTN switch 115C to the PSTN switch 115A, and the PSTN switch 115A constitute the access network associated with the subscriber 105C. Likewise, the packet-based connection from the subscriber 105D to the proxy server 116, the packet-based connection from the subscriber 105D to the gateway 120A and the proxy server 116 itself form the access network for subscriber 105D in that subscriber's current location. In the example of FIG. 1, an indial communication service is routed within an access network using any applicable technique suitable for that particular access network and/or technology.

To connect access networks with gateways for indial communication services, the example system of FIG. 1 employs shared indial communication facilities (e.g., a circuit-based communication facility 145A, a packet-based communication facility 147, etc.) which are provisioned for indial communication services. That is, a plurality of subscribers currently located within a LATA (e.g., the LATA 110B) and connected to a PSTN switch (e.g., the PSTN switch 115B) contend for and share one or more communication facilities (e.g., a facility 145B) to connect with one or more gateways (e.g., a gateway 120B). Statistically, all of the plurality of subscribers associated with the LATA 110B will not have simultaneous active indial communication services and, thus, the number of indial communication services concurrently supported by the shared facility 145B may be less than the number of subscribers.

In the illustrated example of FIG. 1, the access network currently associated with a subscriber utilizes a portion of a shared indial communication facility, if available, to connect a subscriber with a gateway and message center. As such, the access network(s) is responsible for allocating and managing the utilization of shared communication facilities available and provisioned for indial communication services.

In the example system of FIG. 1, circuit-based shared communication facilities are based on circuit groups. As used herein, a circuit group is a logical reference to one or more primary rate interfaces (PRIs) (e.g., Digital Signal Level 1 (DS1) circuits) emanating from, for example, a PSTN switch that uniquely serve a common set of access numbers that share the resources provided by the circuit group. As described above, a PSTN switch may connect to one or more gateways in any of a variety of configurations. For example, a PSTN switch may connect via two circuit groups to two gateways, wherein each circuit group is associated with respective ones of the gateways; a PSTN switch may connect to multiple gateways via a single circuit group; multiple PSTN switches may connect via multiple circuit groups to a single gateway; etc. It will be readily apparent to persons of ordinary skill in the art that a circuit group may also be referred to as a trunk group.

Circuit groups in the illustrated example of FIG. 1 may be distinguished based upon their usage. For example, indial circuit groups are provisioned and available for indial communication services. Outdial circuit groups are provisioned and available for outdial communication services. Flexible circuit groups are provisioned and available for indial and/or outdial communication services. As described above, an indial circuit group may support bi-directional transport of voice, data and/or other services and, thus, use of the term "indial" indicates that the service is initiated from outside the message center 130. As described below, outdial communication services are initiated by the message center 130 (e.g., by an application server 132) and may also include bi-directional transport of voice, data and/or other services. In the example of FIG. 1, an outdial communication service may be initiated by the message center 130 in response to an indial communication service (i.e., real-time) and/or may be independently initiated by the message center 130 (i.e., non-real-time).

As used in this patent, a unified super-group is a logical reference to one or more circuit groups and/or packet-based connections and/or networks, and unified super-groups are classified as either an indial unified super-group or an outdial unified super-group. An indial unified super-group may transport indial communication services and logically includes indial circuit groups and/or packet-based connections. An outdial unified super-group may logically include outdial circuit groups and/or packet-based connections that may transport outdial communication services and/or flexible circuit groups and/or packet-based connections that may transport either indial and/or outdial communication services.

Figure 2:
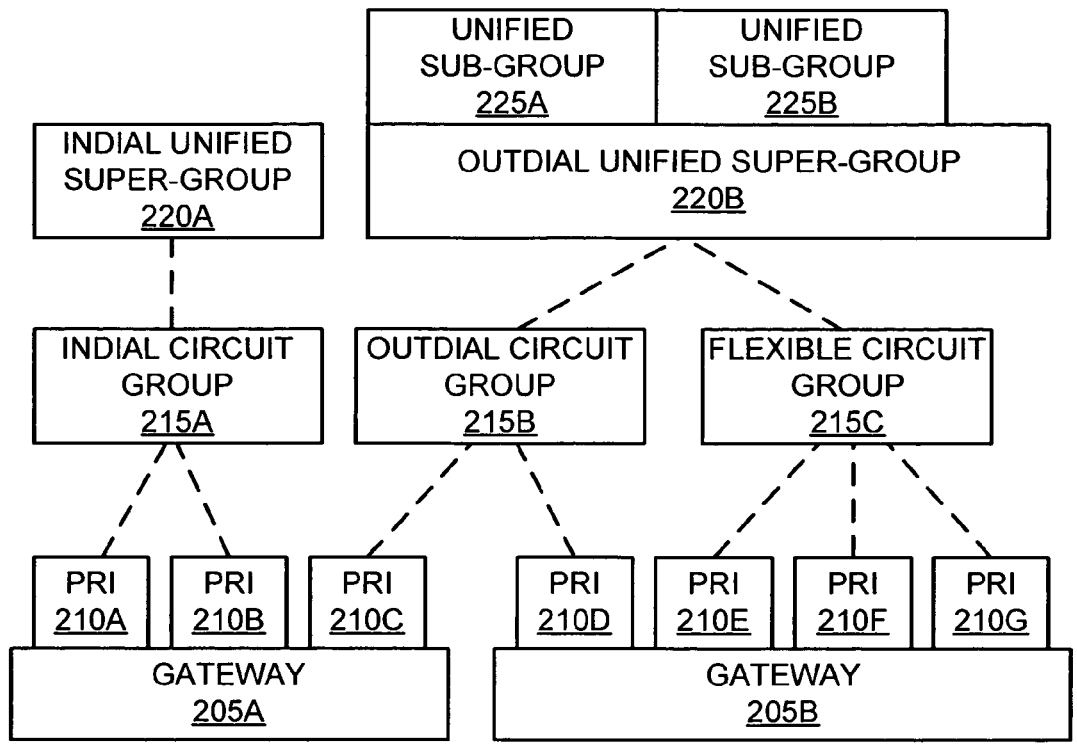
FIG. 2 illustrates example logical relationships between primary rate interfaces, circuit groups and/or unified super-groups.

FIG. 2 illustrates example logical relationships between PRIs, circuit groups and unified super-groups. In the illustrated example, a first gateway 205A is physically connected to one or more PSTN switches via PRIs 210A, 210B and 210C. A second gateway 205B is physically connected to one or more PSTN switches via PRIs 210D, 210E, 210F and 210G. An example indial circuit group 215A is a logical reference to PRI 210A and PRI 210B. An example outdial circuit group 215B is a logical reference to PRI 210C and PRI

210D. An example flexible circuit group 215C is a logical reference to PRIs 210E, 210F and 210G. Likewise, an example indial unified super-group 220A is logically comprised of indial circuit group 215A. An example outdial unified super-group 220B is logically comprised of outdial circuit group 215B and flexible circuit group 215C and contains constituent PRIs 210C-G that connect to multiple gateways (i.e., gateways 205A and 205B).

As illustrated in FIG. 2, unified sub-groups (e.g., unified sub-groups 225A and 225B) are logically constructed as portions of an outdial unified super-group (e.g., the outdial unified super-group 220B). In the example system of FIG. 1, unified sub-groups provide a further abstracted logical reference to unified super-group resources and provide a method for controlling and/or managing the number and/or types of outdial communications that may be active. Each outdial unified super-group can be split into one or more unified sub-groups such that the sum of the capacities of the unified sub-groups does not exceed the capacity of the outdial unified super-group. Unified sub-groups are discussed in more detail below in Section IV in connection with FIGS. 19-36.

As described in greater detail below, the example system of FIG. 1 may be implemented using one or more types of outdial and/or indial unified super-groups (e.g., one or more types of the outdial unified super-group 220B) and/or unified sub-groups (e.g., one or more types of the outdial unified sub-groups 225A and 225B). For instance, the example system may include a public type of outdial unified sub-group (i.e., a public outdial unified sub-group), a private type of outdial unified sub-group (i.e., a private outdial unified sub-group), and/or a shared type of outdial unified sub-group (i.e., a shared outdial unified sub-group), all of which are described in detail below. Generally, public unified sub-groups are comprised circuit groups for use by mass market subscribers of the example system of FIG. 1, but may also be used by enterprise customers. Private unified sub-groups are comprised of circuit groups owned and/or leased by a private enterprise (i.e., an enterprise client) and/or an alternative communications and/or messaging service provider. Shared unified sub-groups may be utilized by a private enterprise desiring a dedicated number of resources without owning and/or leasing specific circuit groups. As discussed below in Section V in connection with FIGS. 37-43, the authorization and/or routing rules may be different depending upon the use of private, public and/or shared unified sub-groups. It will be readily apparent to persons of ordinary skill in the art that additional types of unified sub-groups could be defined. For example, a VoIP unified sub-group that connects a SIP based access VoIP network via a session border controller to a platform VoIP network.

In the illustrated example of FIG. 1, each unified sub-group may be further classified into one or more classes based on one or more attributes, for example, a long distance class, a local class, a class that supports link release (i.e., Two B-Channel Transfer (TBCT)), a one-way class, a two-way class, etc. In the example system of FIG. 1 there may be more than one unified sub-group within any particular LATA and each of the unified sub-groups may belong to different sets of classes. For instance, a unified sub-group may be both a one-way and a local unified sub-group. In the illustrated example of FIG. 1, routing selection will be based on, among other things, the type(s) and/or class(es) of unified sub-group(s) associated with an ODRG and an outdial communication service type (i.e., feature) and the class(es) to which a unified sub-group belongs are inherited from the underlying unified super-group.

It will be readily apparent to persons of ordinary skill in the art that FIG. 2 illustrates example logical relationships that may or may not be implemented within any particular communication system. For instance, in the example system of FIG. 1, an outdial unified super-group logically includes either one-way or two-way circuit groups, not a mixture; only shared unified super-groups are associated with more than one unified sub-group; shared unified sub-groups can not contain two-way circuit groups; etc.

Returning to FIG. 1, gateways (e.g., the gateways 120A and 120B) are implemented using Cisco Communication System 5400 Gateways, and unified super-groups are realized as Cisco trunk group identifiers that may comprise, like unified super-groups, one or more circuit groups.

Outdial communication services are initiated by the message center 130 to an endpoint (e.g., a called endpoint 106, the persons and/or subscribers 105A, 105B, 105C and 105D, etc.). In the example of FIG. 1, an endpoint may be associated with a cellular, land-line or VoIP telephone number, a pager number, a voice mail box access number, a facsimile machine, a PC, a PDA, an email address, an IP address, etc. An endpoint may communicate with the message center 130 via any of a variety of access networks (e.g., circuit-based, packet-based, etc.). Further, an endpoint may be a local endpoint (i.e., if the access network currently associated with the endpoint is located within the same LATA as the gateway serving the endpoint) or a remote endpoint (i.e., if the current access network for the endpoint is located in a different LATA from the gateway serving the endpoint).

Some outdial communication services are initiated by the message center 130 in response to a current indial communication service (e.g., a live reply), or a previous indial communication service (e.g., setting a time for a future pager notification). Other outdial communication services are initiated independently by the message center 130. Further, some outdial communication services are real-time and some are non-real-time. An example set of outdial communication services is listed in FIG. 3. For instance, when the message center 130 receives a voicemail message for a subscriber, the message center 130 may send a notification to a subscriber's pager notifying them that a new voicemail has been received (i.e., pager notification outdial communication service). The message center 130 may also allow a subscriber reviewing a message to connect to the party who left the message (i.e., live reply outdial communication service), etc. Persons of ordinary skill in the art will appreciate that other services not shown in FIG. 3 may also be supported.

In the example of FIG. 1, when the message center 130 (e.g., one of the application servers 132) initiates an outdial communication service, it requests an authorization, routing and allocation of a communication path between the application server 132 and a called endpoint (e.g., the endpoint 106). For example, for a communication from the application server 132 to reach the endpoint 106, a communication path comprising the gateway 120B, a portion of an outdial unified super-group associated with the shared communication resource 145B, and the access network associated with the endpoint 106 may be authorized, routed and allocated. To handle the authorization, routing, and allocation of shared outdial unified super-groups for outdial communication services, the example system of FIG. 1 includes a policy and resource control server 150 (i.e., the policy server 150). In the illustrated example, the policy server 150 interacts with an application server (e.g., the application server 132) to authorize, route and allocate resources to an initiated outdial communication service. As described herein, the policy server 150 is used to authorize and/or allocated resources to outdial calls. However, persons of ordinary skill in the art will readily appreciate that the policy server 150 could also be used to admit indial calls, thus, allowing two-way unified sub-groups too have dedicated outdial capacity in addition to indial capacity. For instance, a softswitch or gatekeeper could contact the policy server 150 before admitting an indial call. Example interactions between an example policy server and an example application server are discussed below in Section II in connection with FIGS. 4-9.

To store database objects specifying the entities and communication resources comprising the example system of FIG. 1, the example system of FIG. 1 includes an operations database 160 that contains and specifies, among other things, mappings of PRIs to gateways, mappings of PRIs to circuit groups, mappings of circuit groups to unified super-groups, mappings of unified sub-groups to unified super-groups, mappings of access numbers, application servers, gatekeepers, etc. In the illustrated example, the operations database 160 is an Oracle based relational database and uses, among other things, the one-to-many feature of relational databases. That is, the operations database 160 uses primary and foreign keys to allow easy access of data, avoid duplication of data, and to promote data consistency. It will be apparent to persons of ordinary skill in the art that the operations database 160 could be implemented using any of a variety of methodologies and/or tools. For example, the operations database 160 could be implemented using Microsoft Access.

Information from the database 160 is loaded into and/or is accessible by the policy server 150. To provide a provisioning/configuration interface to the operations database 160, the example system of FIG. 1 includes graphical and/or command line user interface (UI) 170. Alternatively, data may be imported into the operations database 160 by mapping circuit information contained in a telephony circuit table provided by a telephone company (i.e., a telco) to appropriate elements and/or entries in the operations database 160.

A description of an example database 160, example interactions between the policy server 150 and the database 160, and an example UI 170 are found below in Section VIII in connection with FIGS. 55-86. Information from the database 160 may be used to provision and/or configure gateways, gatekeepers, proxy servers, session border controllers and/or softswitches. A description of example interactions between the database 160 and gateways, proxy servers, session border controllers and/or softswitches are found below in Section III in connection with FIGS. 10-18.

In the example system of FIG. 1, each subscriber, CTAN (i.e., the telephone number used to reach and/or access a call tree directly) and/or call tree subscriber number (i.e., a telephone number that is re-directed to a CTAN) is assigned an ODRG. The ODRG, among other things, defines one or more outdial unified sub-groups types (e.g., private, public or shared) that may be used to transport outdial communication services associated with subscribers, call tree subscriber numbers and/or call tree subscriber numbers assigned to the ODRG. When an outdial communication service is initiated, only those unified sub-group types available (i.e., assigned) to the ODRG may be considered when routing and/or allocating resources for the outdial service. If more than one unified sub-group type may be used to transport an outdial service requested by a member of an ODRG, the ODRG may specify the order in which the unified sub-group types should be tried. It will be readily apparent to persons of ordinary skill in the art that other numbers and/or identifiers could be used to determine an ODRG.

In the illustrated example of FIG. 1, there is one ODRG for all mass-market subscribers (i.e., individual subscribers not subscribing in association with a private enterprise). In the example system of FIG. 1, the ODRG for mass-market subscribers has access to all public unified sub-groups even if the public unified sub-group type is not specified by their ODRG. There may be one or more ODRGs for any private enterprise (i.e., a company leasing and/or purchasing communication services from a public service provider that are then used by the company to implement a private communications network). In the illustrated example, preferably no ODRG spans two or more private enterprises. A more complete description of an ODRG and utilization methods for ODRGs may be found in Section IV in connection with FIGS. 19-36.

Typically, real-time outdial communication services connect an indial service to an outgoing destination (i.e., an endpoint). Under ordinary circumstances, a pair of linked outdial and indial services each having a circuit-based access network utilize two circuit-based connections to one or more gateways: one for the indial service and one for the outdial service (i.e., a two-legged call). In the example of FIG. 1, the application server 132 may optionally bridge the packets between the two gateways using an Empty Capability Set (ECS) from the ITU H.323 standard. If the outdial gateway of a two-legged call is different than the indial gateway, this bridge will result in gateway-to-gateway routing of the packets.

For certain outdial features, for example, a live reply, the subscriber is returned to the application server 132 when the outdial service is completed and, thus, is bridged at the gateway level. However, for other outdial services (for example, a call transfer) a person and/or subscriber is not returned to the application server. In such cases, a preferred solution is to release the shared communication resource (e.g., a portion of unified sub-group and/or unified super-group) connecting the access network with the gateway for the indial and outdial calls and the platform VoIP communication path associated with the indial gateway (i.e., between the gateway and the application server 132) such that gateway and/or application server 132 resources are also no longer utilized. In the illustrated example of FIG. 1, this capability is referred to as "Link Release" and is accomplished via a TBCT. In the illustrated example of FIG. 1, TBCT may only be utilized if both the indial and the outdial communication service pass through the same PSTN switch and the same gateway.

It will be readily apparent to persons of ordinary skill in the art that a similar functionality could be implemented for an endpoint with a packet-based access network using any of a variety of techniques. For example, one or more session border controllers could form a bridge between the packet-based endpoints, the two endpoints could be provided with the IP address of each other thereby allowing the endpoints to communicate directly without requiring platform resources or involvement, etc.

In the example system of FIG. 1, TBCT capable unified super-groups and unified sub-groups support TBCT. However, since in the illustrated example TBCT is a property of individual circuit groups and their constituent PRIs, e.g., for a unified super-group and/or unified sub-group to support TBCT, the circuit groups and PRIs logically comprising the unified super-group and/or unified sub-group must also support TBCT. When routing and allocating resources for an outdial communication service for which TBCT is applicable, the policy server 150 preferably attempts to select an outdial unified sub-group that is TBCT capable and includes the same exact gateway(s) and PSTN switch (if applicable) as the indial communication service. In the example of FIG. 1, the policy server 150 maintains a list of TBCT capable outdial unified sub-groups for each access number. Thus, based on the access number used to initiate an indial service, the policy server 150 can determine appropriate outdial unified sub-groups that enable TBCT for a pair of indial and outdial services.

II. Policy Server

Figure 4:
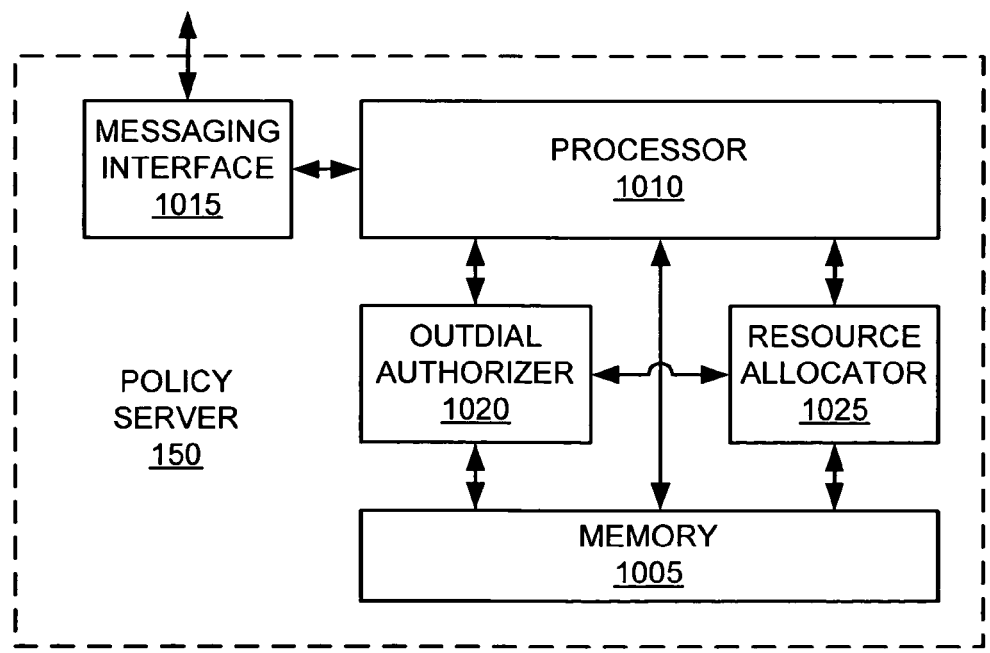
FIG. 4 is a schematic illustration of an example manner of implementing the example policy server of FIG. 1.

FIG. 4 is a schematic illustration of an example manner of implementing the example policy server 150 of FIG. 1. To store, among other things, the information received from the operations database 160, the example policy server of FIG. 4 includes a memory 1005. The memory 1005 of the illustrated example is implemented using a combination of volatile memory (e.g., random access memory (RAM)) and non-volatile memory (e.g., read only memory (ROM), FLASH memory, etc.). Preferably, the non-volatile memory is used to hold some or all the information from the database 160. The volatile memory may be used to store information relating to currently authorized and allocated outdial services as well as available shared outdial communication resources.

To control the example policy server 150 of FIG. 4 and to interact with message centers and/or application servers, the example policy server 150 of FIG. 4 includes a processor 1010 and a messaging interface 1015. The processor 1010 can be any of a variety of general and/or customized computing devices (e.g., the processor 8000 of FIG. 87). Using any of a variety of suitable techniques, the messaging interface 1015 transmits messages to and receives messages from message centers and/or application servers.

In a public telephone network, regulatory rules and/or laws are used to determine whether a telephone call or communication service initiated from a first location to a second location is allowed (i.e., authorized). The regulatory rules and/or laws may be used, in addition to network infrastructure, to determine how to route the telephone call or communication service. For instance a communication service from a first LATA to a second LATA may require a long distance connection and, therefore, may require that a calling card and/or long distance access number (e.g., 1-800-CALL-ATT) be utilized. The term calling card and/or long distance access number should not be confused with an access number that is used, as described above, to route an indial communication service. Further, even if regulatory rules and/or laws allow the communication service to be authorized, business operating parameters and/or communication/transport network configuration(s) may prohibit the call and/or service from being completed. For instance, there may not be an appropriate and/or available outdial circuit group that connects any gateway with any PSTN switch that can, in turn, connect to the desired endpoint.

It will be readily apparent to persons of ordinary skill in the art that a change in the configuration of the example system of FIG. 1 may mean that different regulatory rules and/or laws apply. For instance, if a gateway is added, a subscriber or endpoint may no longer be a remote access subscriber or endpoint. In the example system of FIG. 1, the business/configuration portions of outdial communication service authorization and routing rules form additional restrictions on or elaborations of regulatory rules and/or laws. Recognizing that regulatory and/or business/configuration restrictions may change over time, outdial authorization and routing rules are represented in an authorization and routing rules table. The authorization and routing rules table also includes entries that specify one or more routing rules (e.g., a sequence of LATAs). In the example system of FIG. 1 the routing rules can indicate that any LATA may be used to route the outdial communication service (e.g., by using a routing rule of ANY). As discussed below, based upon the routing rules, an appropriate LATA, unified sub-group type, unified sub-group, unified super-group and/or gateway are selected. As described below in Section V, the use of an authorization and routing rules table allows existing authorization rules and/or results, and/or routing rules to be easily changed by modifying table entries and/or adding or removing rows and/or columns of the table.

To authorize outdial communication services initiated by an application server 132 and to determine routing rules for an authorized outdial service, the example policy server of FIG. 4 includes an outdial authorizer 1020. The outdial authorizer 1020 accesses the authorization and routing rules table that may, for example, be stored in the memory 1005 to determine when a requested outdial communication service is permissible. The outdial authorizer 1020 may also access the authorization and routing rules table to determine one or more permissible routing rules (e.g., a sequence of one or more LATAs that may be used to complete the requested outdial service). A more complete description of an example outdial authorizer 1020 and an example authorization rules table may be found below in Section V in connection with FIGS. 37-43.

In the example system of FIG. 1, the policy server 150 selects a unified sub-group having the same unified sub-group type used to authorize the outdial service and located within the LATA currently being considered. Since there may be more than one unified sub-group within a particular LATA having the same unified sub-group type, the policy server 150 selects a particular unified sub-group based upon a pre-determined set of priorities and/or preferences. For example, for an outdial service that can use TBCT, the policy server 150 preferably selects a unified sub-group that supports TBCT. If the outdial service would be inter-LATA relative to an outdial gateway and the endpoint of the outdial service, the policy server 150 preferably selects a long-distance unified sub-group. If the outdial service would be intra-LATA relative to an outdial gateway and the endpoint of the outdial service, the policy server 150 preferably selects a local unified sub-group. Additionally, one-way unified sub-groups are preferred over non-TBCT unified sub-groups. The example system of FIG. 1 uses the LERG to determine the LATA associated with a destination number (i.e., destination LATA) and, thus, whether an outdial communication service is intra-LATA or inter-LATA based upon the destination LATA and the current LATA being considered to route the outdial call (i.e., the outdial gateway LATA).

It will be readily apparent to persons of ordinary skill in the art that other priorities and/or preferences for selecting a unified sub-group could be used and the policy server 150 may select a unified sub-group using any of a variety of techniques. For example, the policy server 150 may create sets of unified sub-groups located within the current LATA based upon unified sub-groups meeting an overlapping set of priorities and/or preferences and having at least some available capacity. For instance, for a non-TBCT long distance outdial service request, a first set may contain a list of long-distance one-way unified sub-groups, the next set may contain a list of long-distance unified sub-groups, etc. Preferably, a unified sub-group only appears in one of the sets. The policy server 150 then, for example, attempts to select a unified sub-group from the first set (i.e., the set meeting the most important and/or the largest number of priorities and/or preferences) before proceeding to the second set. If a unified sub-group from the first set can not be allocated, the policy server 150 then attempts to select a unified sub-group from the second set before proceeding to the third set, etc.

In the example system of FIG. 1, the policy server 150, from a set of unified sub-groups, selects first the unified sub-group having the lowest current utilization. If that unified sub-group can not be allocated, then the policy server 150 selects the unified sub-group having the second lowest utilization. The process continues until a unified sub-group can be allocated, or all unified sub-groups in the set have been tried. In the example system of FIG. 1, the loading of a unified sub-group is a sum of all current allocations for all features excluding dedicated indial on two-way unified sub-groups, and the utilization depends upon the type of unified sub-group. For example, for a private, public or one-way shared unified sub-group the utilization is the ratio of the load to the sum of available dedicated resources. For a two-way unified sub-group, the utilization is the ratio of the load to the sum of available shared resources.

Figure 6:
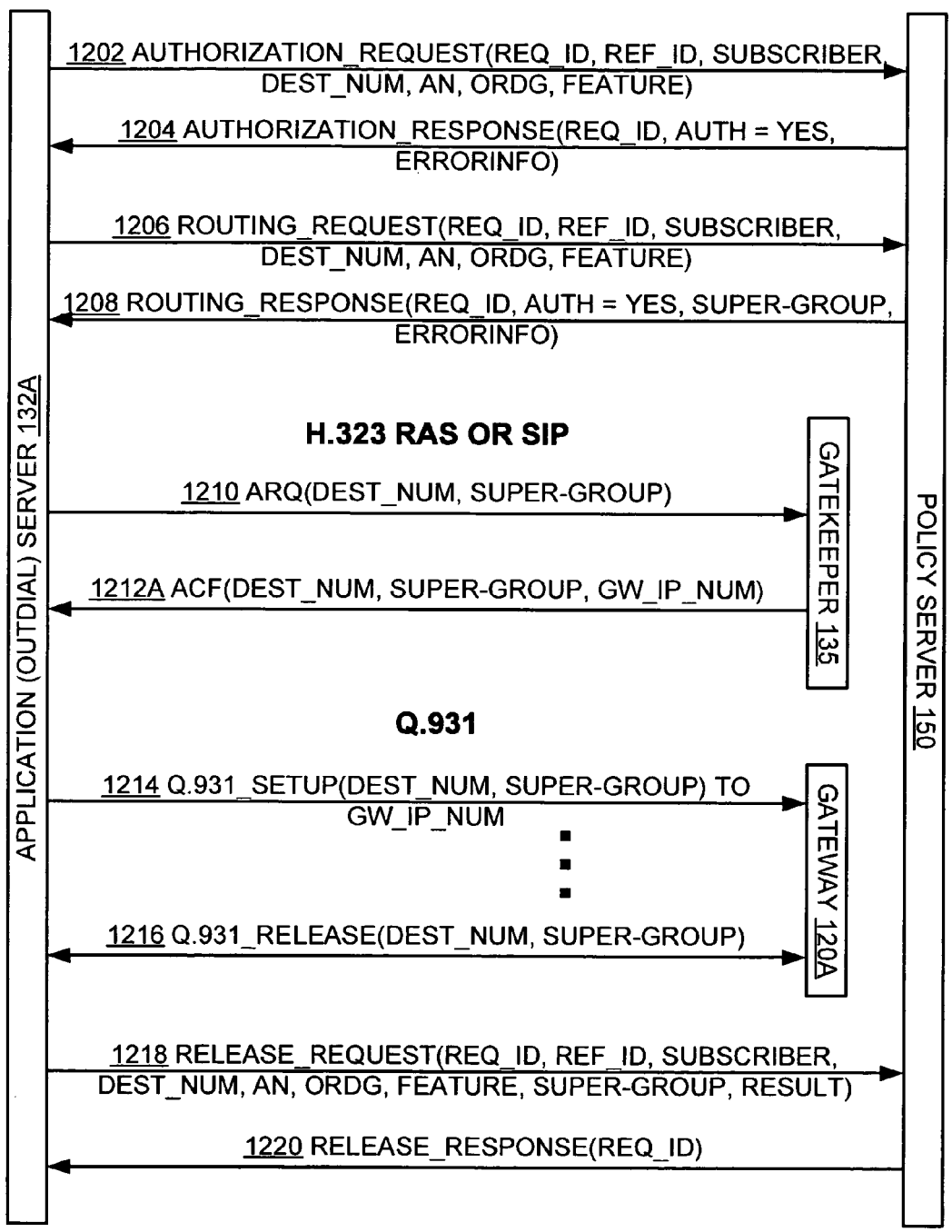

The policy server 150 may also utilize in the unified sub-group selection process the success of previous outdial call routing by, for instance, utilizing the call result information provided to the policy server 150 by an application server 132 in, for example, a Release_Request message (e.g., the message 1218 of FIG. 6). As discussed below, the call result may indicate SUCCESS, RESOURCE or FAILURE in the routing of the outdial communication service. For example, a call result of RESOURCE indicates that the gatekeeper successfully located the unified super-group selected and allocated by the policy server 150, but that there were no circuits were available on the unified super-group for the outdial service. In the example system of FIG. 1, a unified super-group is not considered for selection by the policy server 150 for a first pre-determined time period following the receipt of N RESOURCE call results within a second pre-determined time period (i.e., multiple RESOURCE result in a time period) and/or a third pre-determined time period following a FAILURE call result. If a pre-determined time period is set to zero, then the unified super-group is not removed from consideration in response to the corresponding call result.

It will be readily apparent to persons of ordinary skill in the art that the policy server 150 could select unified sub-groups using any of a variety of other selection techniques and/or methods. For example, the policy server 150 could first determine a sub-set of all the unified sub-groups having the correct unified sub-group type in the current LATA being processed and that have resources that can be allocated to the requested outdial service type (i.e., feature) by, for example, using the methods described in Section VI and in connection with FIGS. 44-48. This sub-set of unified sub-groups could then be sorted into sets as described below. Since only unified sub-groups that can have resources allocated to the feature will be included in a set, a unified sub-group from the non-empty set meeting the most important and/or the largest number of priorities and/or preferences may be selected. In particular, the policy server 150 will select the unified sub-group from the most preferred non-empty set having, as discussed, above the lowest utilization.

To allocate a portion (i.e., one or more resources) of a shared outdial communication facility along the route selected for an authorized outdial communication service, the example policy server 150 of FIG. 4 includes a resource allocator 1025. It will be readily apparent to persons of ordinary skill in the art that resources of a shared communication facility are not guaranteed to be available and that some outdial communication services (e.g., a live reply outdial communication service) may have higher priority or importance than other outdial communication services (e.g., a pager notification outdial communication service).

To increase the likelihood that a shared outdial communication facility resource is available for a higher priority outdial service, the example resource allocator 1025 implements feature based (i.e., outdial communication service type) unified sub-group resource control that includes dedicating a portion of a shared outdial facility to each feature. It will be readily apparent to persons of ordinary skill in the art that the total of all dedicated portions of a shared outdial facility should exceed one hundred percent of the shared outdial facility. If the entire portion of a shared outdial facility dedicated to a feature is currently in use, the resource allocator 1025 may allocate resources to a new initiation for the feature from a non-dedicated portion of the shared outdial facility. The extent of non-dedicated portions utilized by the feature may also be limited. For example, each of three features may be dedicated twenty-five percent of a shared outdial facility; with each feature restricted to a maximum of forty percent of the entire shared outdial facility.

It will be readily apparent to persons of ordinary skill in the art that by adjusting the relative portions of dedicated and shared resource allowed to be used by any given feature, the resource allocator 1025 may implement a desired balancing of priority and availability of outdial communication services. A more complete description of an example resource allocator 1025 may be found below in Section VI in connection with FIGS. 44-48. Having selected and allocated resources of a unified sub-group, the policy server returns to the application server 132 an identifier for the unified super-group that underlies the selected and allocated unified sub-group.

By using unified super-groups which are logical mappings to packet-based communication resources and/or circuit groups and unified sub-groups which are logical mappings to a portion of an outdial unified super-group, the example policy server 150 and/or the example resource allocator 1025 of FIGS. 1 and 4 may be implemented without having explicit and/or specific implementation details of gateways, underlying transport technologies (e.g., circuit-based, packet-based, etc.), communication facilities, and/or communication protocols (e.g., H.323, SIP, etc.) (i.e., resource and transport agnostic). For instance, the resource allocator 1025 of the illustrated example has access to the number of resources associated with an outdial unified super-group and/or unified sub-group, but does not need to know the makeup of the outdial unified super-group (i.e., number of associated PRIs, circuit groups, etc.). Further, by abstracting the capacity of a shared packet-based shared facility (e.g., the facility 147) into an outdial unified super-group having a specified number of resources (e.g., a number of supportable VoIP connections), the resource allocator 1025 can allocate outdial communication services to the packet-based shared facility in the same way it does so for a circuit-based shared facility.

Figure 5:
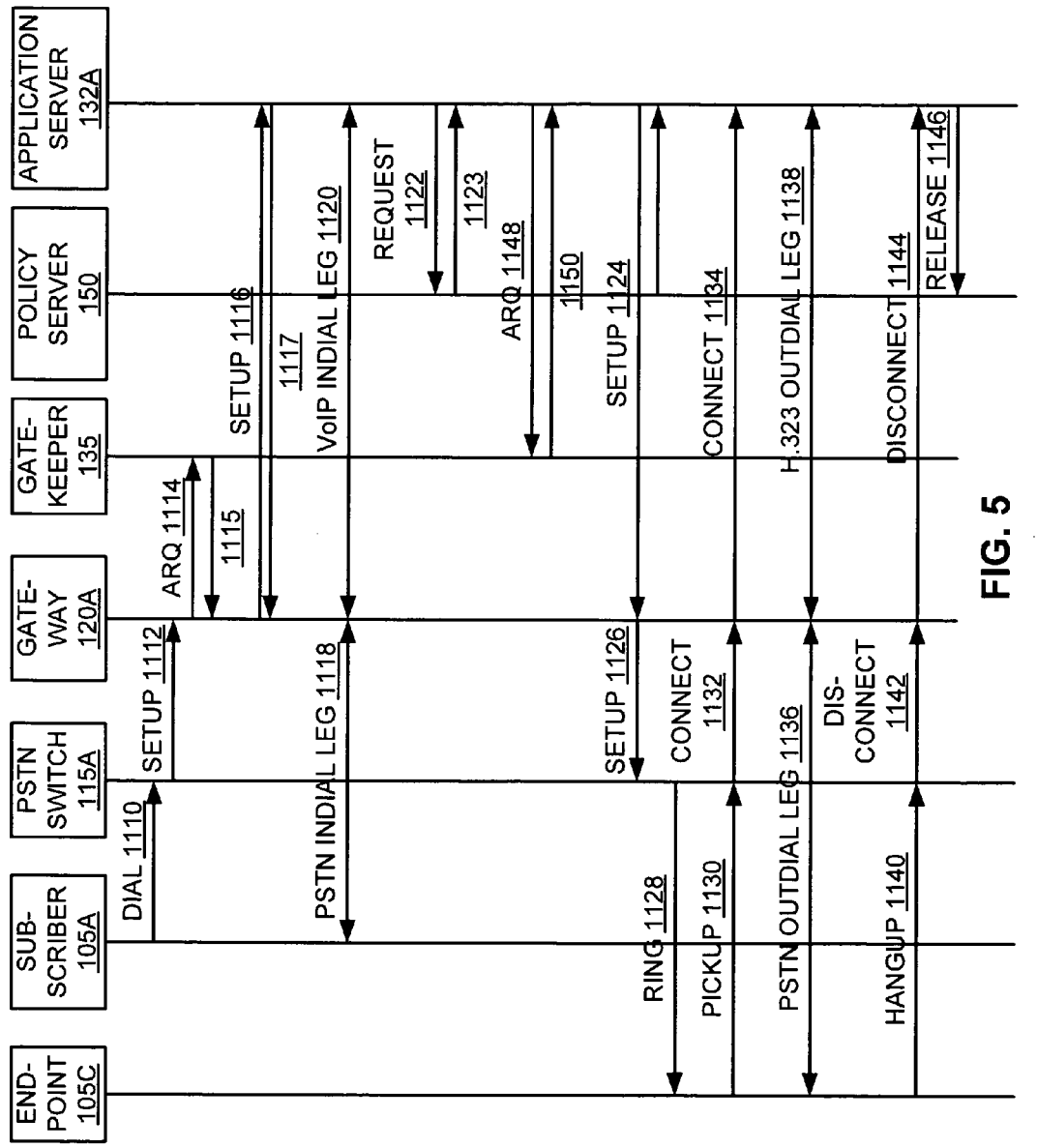
FIGS. 5-8 illustrate example message exchanges which may be executed by the example system of FIG. 1.

FIG. 5 illustrates an example message exchange in which an outdial communication service is initiated, authorized, routed, allocated and ended in response to an indial communication service, which may be executed by the example system of FIG. 1. For brevity and ease of understanding, not every message is illustrated in FIG. 5. The message exchanges illustrated are those representing key elements of an outdial communication service initiated, authorized, routed, allocated and ended in response to an indial communication service. The messages exchanges not shown will be readily apparent to persons of ordinary skill in the art. The example exchange of FIG. 5 begins with a subscriber 105A initiating an indial communication service by placing a telephone call 1110 to a message center (e.g., to access a voice-mail account). When the PSTN switch 115A receives the telephone call 1110, it sends a setup message 1112 to the gateway 120A. The gateway 120A contacts the gatekeeper 135 to obtain routing information to an appropriate application server by sending an admission request (ARQ) 1114 to the gatekeeper 135. The gateway 120A receives a response 1115 from the gatekeeper 135 that contains the IP address of the application server 132. Using the IP address of the application server 132 obtained from the gatekeeper 135, the gateway 120A sends a VoIP setup message 1116 to the application server 132 and receives a response 1117 back from the application server 132 confirming the establishment of a platform VoIP session and/or connection. Having successfully completed the message exchanges described above, a communication path between the subscriber 105A and the application server 132 is established. The established communications path includes a PSTN indial leg 1118 between the subscriber 105A and the gateway 120A and a platform VoIP indial leg 1120 between the gateway 120A and the application server 132.

Using the established communication path, the subscriber 105A can interact with the application server 132 to, for example, review messages in a voicemail account. During the example interactions illustrated in FIG. 5, the subscriber 105A causes a real-time live reply outdial communication service to be initiated by the application server 132. To initiate the outdial communication service, the application server 132 sends a combined authorization and routing request 1122 to the policy server 150. In the illustrated example, the policy server 150 responds 1123 with authorization approval and routing and resource allocation information (e.g., a selected unified super-group). The application server 132 then sends an ARQ message 1148 to the gatekeeper 135 and receives an ACF response message 1150 containing the IP address of a gateway connected to the unified super-group (e.g., the gateway 120A). The application server 132 then initiates a VoIP setup via a message 1124 that includes the selected unified super-group to the gateway 120A (using the IP address provided by the gatekeeper 135) which in turn initiates a setup via a message 1126 to the PSTN switch 115A. In response to the setup message 1126, the PSTN switch 115A establishes a connection to the endpoint 105C via the PSTN switch 115C. The PSTN switch 115C causes a telephone at endpoint 105C to ring 1128.

If, as in the illustrated example, a person at endpoint 105C answers the ringing telephone 1130, the PSTN switches 115A and 115C send a connect message 1132 to the gateway 120A indicating that a communications path has been established. The gateway 120A then completes the establishment of the platform VoIP session between the application server 132 and the gateway 120A for the outdial communication path via a connect message 1134. Having successfully completed the message exchanges described above, a communication path for the outdial communication service between the application server 132 and the endpoint 105C is established. The communications path of the illustrated example includes a PSTN outdial leg 1136 between the endpoint 105C and the gateway 120A and a platform VoIP outdial leg 1138 between the gateway 120A and the application server 132.

Using the communication paths between the subscriber 105A and the application server 132 and between the endpoint 105C and the application server 132, the subscriber 105A is able to communicate with the endpoint 105C. When, for example, the answering party at the endpoint 105C hangs up the telephone 1140, the PSTN switch 115C sends a disconnect message 1142 via the PSTN switch 115A to the gateway 120A to terminate the outdial communication service. Upon receiving the disconnect message 1142, the gateway 120A sends a VoIP disconnect message 1144 to the application server 132 who notifies the policy server 150 via a message 1146 that the outdial communication service has ended and that the allocated resource has been released.

From the foregoing, it will be readily apparent to persons of ordinary skill in the art that the example message exchange of FIG. 5 could have proceeded differently from that illustrated. For instance, the subscriber 105A may hang up and, thus, cause the outdial and indial communication services to be terminated. Alternatively or additionally, the policy server 150 may not authorize and/or successful allocate resources to the outdial communication service, in which case the application server 132 would notify the subscriber 105A of the rejection. Alternatively or additionally, the outdial communication service could have been initiated to an endpoint via a different gateway. Other examples abound.

Outdial communication request messages received by the example policy server 150 of FIG. 1 contain, among other things, one or more of the following parameters: destination number, access number, ODRG of a subscriber, call tree subscriber number and/or a CTAN, and feature (e.g., outdial communication service type). In response, the policy server 150, among other things, determines and provides via a response message one or more of an authorization approval (e.g., response of YES) or disapproval (e.g., a response of NO), a request for a calling card and/or long distance access number (e.g., a response of CC), routing information, resource allocation information (e.g., a selected unified super-group), etc.

FIG. 6 illustrates an example message exchange, that initiates, authorizes, routes, allocates and ends an outdial communication service that may be performed in response to and/or independent of an indial communication service, which may be executed by the example system of FIG. 1. To initiate the outdial communication service, the application server 132 sends an authorization request message 1202 to the policy server 150. The authorization message 1202 contains: (a) a REQ_ID (i.e., request ID) that allows requests sent to the policy server 150 and responses received from the policy server 150 to be correlated; (b) a REF_ID (i.e., reference ID) that allows routing requests and subsequent release requests to be correlated; (c) a subscriber identification; (d) a destination number (DEST_NUM) (i.e., called number); (e) an access number (AN) (e.g., a number used by the indial call to reach the application server 132); (f) an ODRG identifier; and (g) a feature (i.e., outdial communication service type) identifier. In response to the authorization request message 1202, the policy server 150 sends an authorization response message 1204 to the application server 132 that contains: (a) the REQ_ID from the request message 1202; (b) an AUTH value indicating whether the outdial service is authorization; and (c) an ERRORINFO flag that provides any appropriate status or error information.

For purposes of discussion, it is assumed that the policy server 150 authorizes the requested outdial service. Having received authorization for the outdial service, the application server 132 sends a routing request message 1206 to the policy server 150. The routing request message 1206 contains the same variables contained in the authorization request message 1202. In response to the routing request message 1206, the policy server 150 sends to the application server 132 a routing response message 1208 that contains, among other things, the unified super-group allocated to the outdial service. It will be readily apparent to persons of ordinary skill in the art that the authorization and routing requests, and the authorization and routing responses may be combined into a single message exchange and/or split into additional message exchanges. It will also be readily apparent to persons of ordinary skill in the art that if an authorization requires, for example, a calling card and/or long distance access number, the policy server 150 may indicate this requirement in the authorization response message 1204 and may delay authorization approval until the application server 132 provides to the policy server 150 the desired calling card and/or long distance access number obtained from the subscriber. In the example system of FIG. 1, the application server 132 normally sends a combined authorization and routing request, and an authorization request is used, for example, to pre-authorize a CFN. It will be readily apparent than an authorization request could also be used for other purposes, for example, to pre-authorize an outdial call to a specific telephone number (i.e., endpoint) prior to configuring a call tree application server with the specific telephone number.

Following successful completion of authorization and routing, the application server 132 initiates, for example, an H.323 registration admittance status (RAS) session with the gatekeeper 135 to setup the platform VoIP connection to a gateway. The RAS session may be initiated by sending an ARQ message 1210 to the gatekeeper 135 that contains the DEST_NUM and the unified super-group provided by the policy server 150. If the gatekeeper 135 admits the platform VoIP session requested by the application server 132, the gatekeeper 135 sends an admission confirmation (ACF) message 1212A that contains, among other things, the IP address of the gateway 120A (GW_IP_NUM). If the gatekeeper 135 rejects the ARQ, the gatekeeper 135 instead sends an admission rejection (ARJ) message. It will be readily apparent to persons of ordinary skill in the art that any other protocol (e.g., the SIP protocol) may alternatively be used between the application server 132 and the gatekeeper 135 and/or softswitch/proxy server.

Following a successful H.323 RAS session in which the platform VoIP session is admitted, the application server 132 initiates establishment of a platform VoIP session with the gateway 120A by, for example, initiating a setup message exchange based on the ITU Q.931 standard. To this end, the application server 132 of the illustrated example sends a Q.931 setup message 1214 to the IP address of the gateway 120 (GW_IP_NUM). The setup message 1214 contains, among other things, the unified super-group allocated by the policy server 150. Establishment of the platform VoIP session continues in the fashion described in the ITU H.225 standard (which is part of H.323) which, in turn, bases the setup upon the ITU Q.931 standard (i.e., a setup based upon ITU Q.931 as referenced herein). Having established the platform VoIP session, the application server 132 is able to communicate via the gateway 120A with the endpoint as described above in connection with FIG. 5.

To end the outdial communication service and terminate the platform VoIP session, either the gateway 120A or the application server 132 sends a Q.931 release message 1216. Having ended the platform VoIP session, the application server 132 sends to the protocol server 150 a release request message 1218 that contains, among other things, the RESULT field discussed in detail above. The policy server 150 acknowledges the release request message 1218 with a release response message 1220. The policy server 150 may log any outdial routing failures (e.g., call results of RESOURCE or FAILURE) to track discrepancies between expected and actual resource availability and/or may set alarms to report failures or other conditions that exceed a pre-determined threshold.

Figure 7:
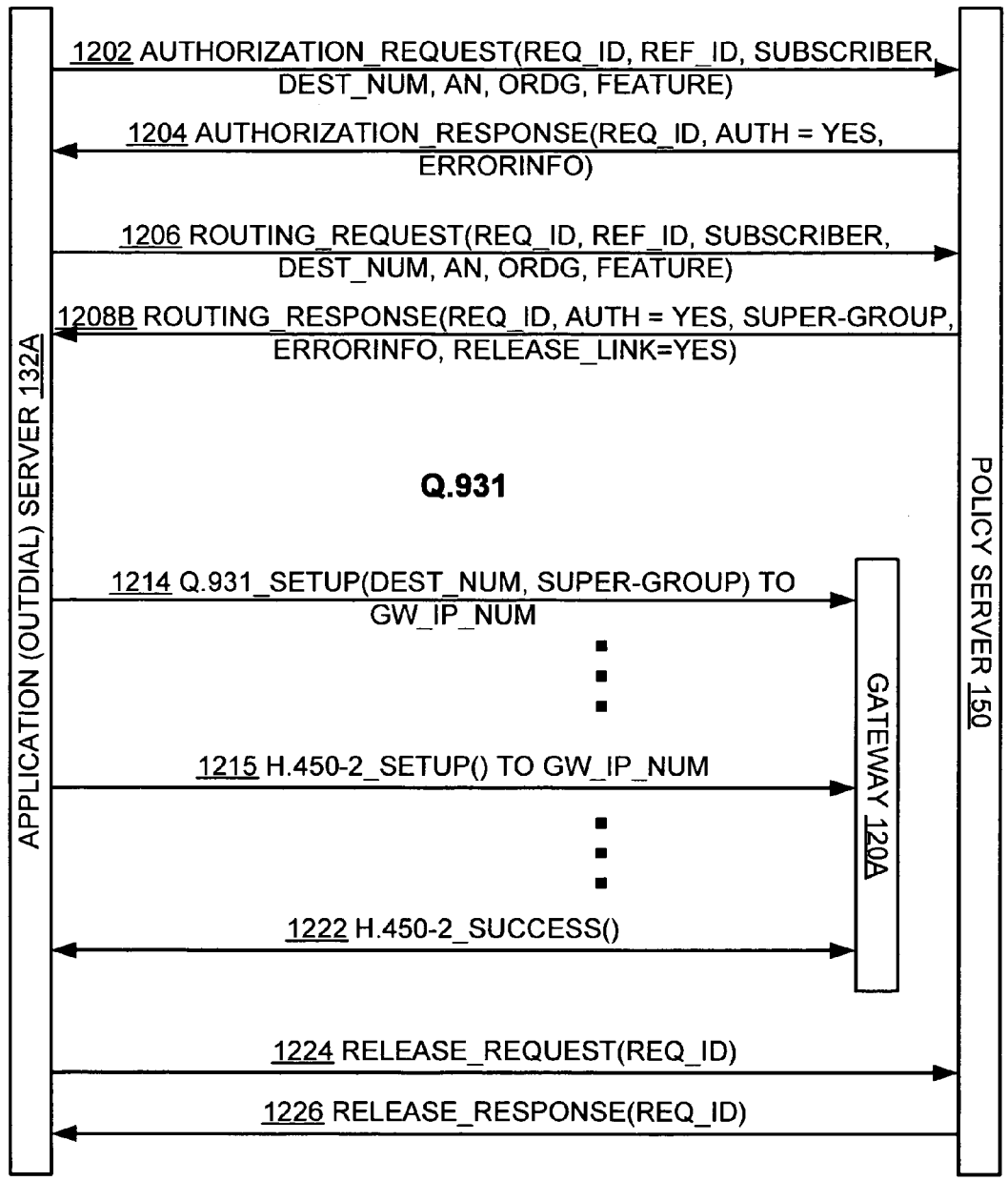

For outdial communication services for which a link release (i.e., TCBT) may be appropriate, the example message exchange of FIG. 6 may be appropriately modified as illustrated in the example message exchange of FIG. 7. The illustrated message exchange of FIG. 7 proceeds similarly to the example message exchange of FIG. 6 thru most of the authorization phase. Thus, the description of the first portion of FIG. 7 will not be repeated here. Instead, the interested reader is referred back to the corresponding description of FIG. 6. To facilitate this process, like operations have been numbered with like reference numerals in FIGS. 6 and 7.

In the illustrated example of FIG. 7, if the routing request message 1206 specifies an outdial service for which TCBT may be enabled, the policy server 150 selects, if available, a TCBT capable unified outdial sub-group or super-group connecting the same gateway(s) and the same PSTN switch (if applicable) as the indial service. If an appropriate TCBT capable outdial unified super-group or sub-group is available and allocated by the policy server 150, a routing response message 1208B sent by the policy server 150 to the application server 132 contains an additional parameter that indicates that a link release should be performed.

When the application server 132 receives the routing response message 1208B containing an indication that a link release should be performed, the application server 132 skips the H.323 RAS exchange with the gatekeeper 135 and instead initiates the outdial via the indial gateway 120A using the Q.931 protocol with the setup message 1214 and a ITU H.450-2 call transfer with a setup message 1215. In response to the H.450-2 setup message 1215, the indial gateway 120A interacts with the PSTN switch to perform the TCBT and provides a response 1222 to the application server 132 indicating success or failure of the TCBT. If successful, the application server 132 sends a release request message 1224 to the policy server 150 and the policy server 150 acknowledges the release request in a response message 1226.

Figure 8:
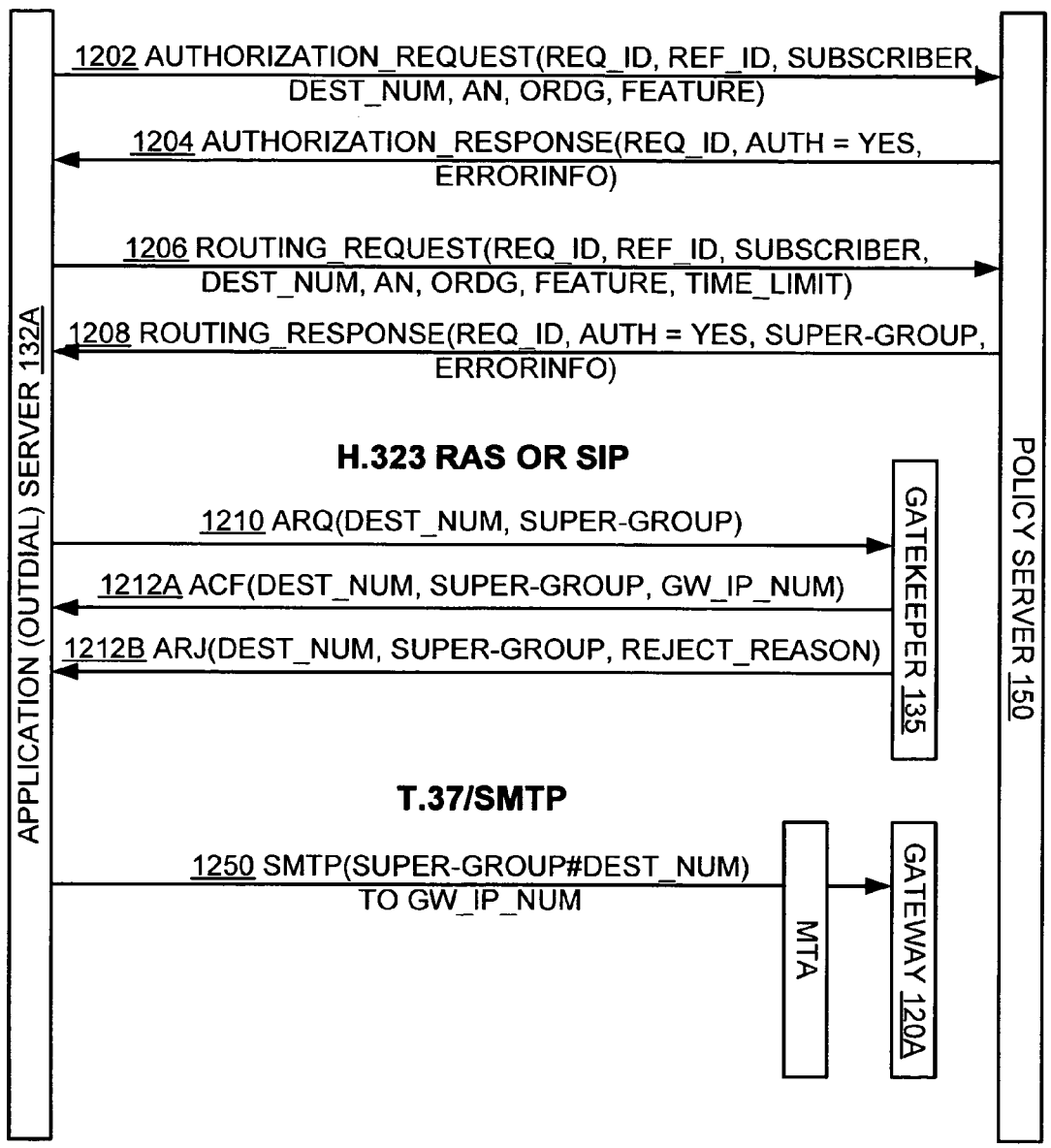

FIG. 8 illustrates an example message exchange, that initiates, authorizes, routes, allocates and establishes an Internet facsimile store-and-forward outdial communication service that may be performed in response to and/or independent of an indial communication service, which may be executed by the example system of FIG. 1. The illustrated message exchange of FIG. 8 proceeds similarly to the example message exchange of FIG. 6 thru the H.323 RAS phase. Thus, the description of the first portion of FIG. 8 will not be repeated here. Instead, the interested reader is referred back to the corresponding description of FIG. 6. To facilitate this process, like operations have been numbered with like reference numerals in FIGS. 6 and 8. However, in the example of FIG. 8, the application server 132A determines an estimate of the time duration for the facsimile outdial service and includes the estimate in the routing request message 1206.

Having received authorization and routing information from the policy server 150 and successfully completed an H.323 RAS exchange with the gatekeeper 135, the application server 132, using, for example, the protocols defined in the ITU T.37 standard, initiates a simple message transfer protocol (SMTP) session with the gateway 120 via a message transfer agent (MTA). Using the SMTP session, the application server 132 forwards a copy of the stored facsimile to the gateway 120A. The destination number provided by the application server 132 to the gateway 120A via the T.37 session is prefixed with the allocated unified super-group identifier. In the illustrated example of FIG. 1, each unified super-group supporting the facsimile outdial communication service has an associated dial peer to handle destination numbers prefixed by that unified super-group identifier.

In the example system of FIG. 1, the application server 132 determines a timer period duration based upon the estimated time to transmit the facsimile to the endpoint, and the duration is included in the authorization and/or routing request so that the policy server 150 can automatically release the allocated resource after the determined time period has elapsed. The application server 132 may, optionally, set the duration of the timer based upon a pre-determined time that is based on, for example, an average facsimile transmission time. If there is a subsequent error in attempting to transmit the facsimile, the application server 132 may send a release request message to the policy server 150 with, for example, a call result of FAILURE or RESOURCE as appropriate.

The example policy server 150 of FIG. 1 and the example exchanges of FIGS. 5-8 are implemented to be self-correcting, over time, without periodic or aperiodic re-synchronization with the application servers 132. In particular, each outdial feature type has a pre-determined time limit after which the policy server 132 may assume an outdial service has ended even if a release request message has not be received from the application server 132. In the example system of FIG. 1, the pre-determined feature-based time limits are long enough such that it is rarely expected that an outdial service of a particular type will exceed the corresponding limit. If an application server 132 fails within the longest of the pre-determined time limits, the policy server 150 will, over time, release each of the outdial resources associated with the application server 132. If the policy server 150 fails, then the example system of FIG. 1 performs a failover to a backup policy server. Initially, the backup policy server may authorize outdial calls for which outdial resources do not exist because existing outdial calls are not affected by the backup policy server. However, over time, all of the calls that existed at the time of failure of the policy server 150 will complete and the backup policy server will, over time, become synchronized with the application servers 132.

Alternatively, each application server 132 could send a periodic refresh message for each outdial call to the policy server 150. If the policy server 150 does not receive the periodic refresh message within a pre-determined time period (i.e., the application server has failed and, thus, the call is by definition released), the policy server 150 could take correction action, for example, release the resource allocation associated with the call. Other techniques for recovering and re-synchronizing after device, communication path and/or protocol exchange failures abound.

FIGS. 9A, 9B, 9C and 9D are flowcharts representative of example machine readable instructions that may be executed by a processor (e.g., the processor 8010 of FIG. 87) to implement the example policy server 150. The machine readable instructions of FIGS. 9A-D may be executed by a processor, a controller and/or any other suitable processing device. For example, the machine readable instructions of FIGS. 9A-D may be embodied in coded instructions stored on a tangible medium such as a flash memory, or RAM associated with the processor 8010 shown in the example processor platform 8000 and discussed below in conjunction with FIG. 87. Alternatively, some or all of the example machine readable instructions of FIGS. 9A-D and/or the policy server 150 may be implemented using an application specific integrated circuit (ASIC), a programmable logic device (PLD), a field programmable logic device (FPLD), discrete logic, hardware, etc. Additionally, some or all of the example machine readable instructions of FIGS. 9A-D and/or the policy server 150 may be implemented using software, firmware, hardware, and/or a combination of hardware and software and/or firmware. Also, some or all of the machine readable instructions of FIGS. 9A-D and/or the policy server 150 may be implemented manually or as combinations of any of the foregoing techniques. Further, although the example machine readable instructions of FIGS. 9A-D are described with reference to the flowcharts of FIGS. 9A-D, persons of ordinary skill in the art will readily appreciate that many other methods of implementing the policy server 150 may be employed. For example, the order of execution of the blocks may be changed, and/or some of the blocks described may be changed, eliminated, sub-divided, or combined.

Figure 9A:
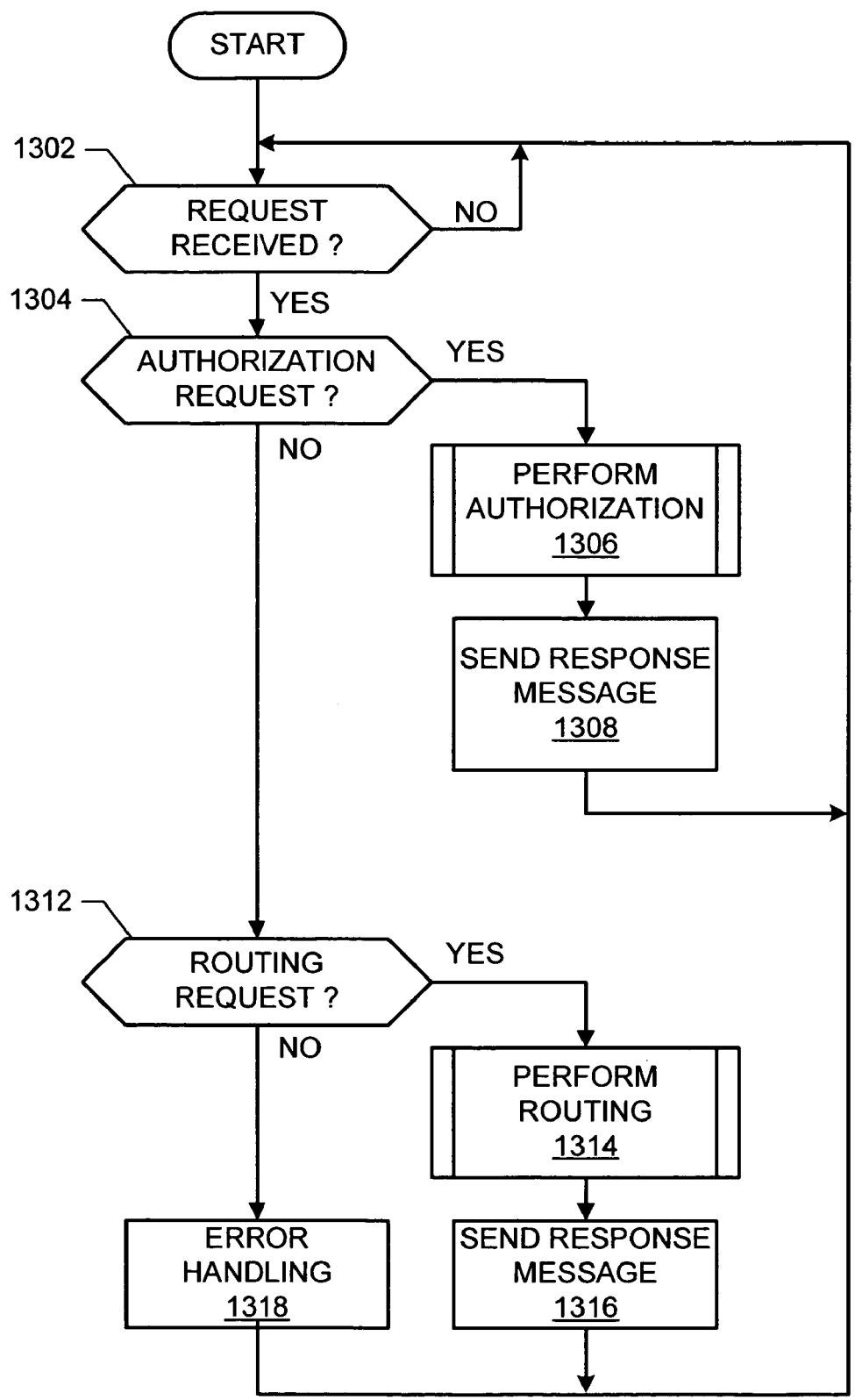
FIGS. 9A-D are flowcharts representative of example machine readable instructions which may be executed to implement the policy server of FIG. 1 and/or FIG. 4.

The example machine readable instructions of FIG. 9A begin with the policy server 150 waiting to receive an authorization or routing request (block 1302). If a request is not received (block 1302), the policy server 150 continues waiting. If a request is received (block 1302), the policy server 150 determines if the request is an authorization request (block 1304). Persons of ordinary skill in the art will appreciated that requests may be queued and processed sequentially and/or processed in parallel by, for example, separate processing threads.

Figure 9B:
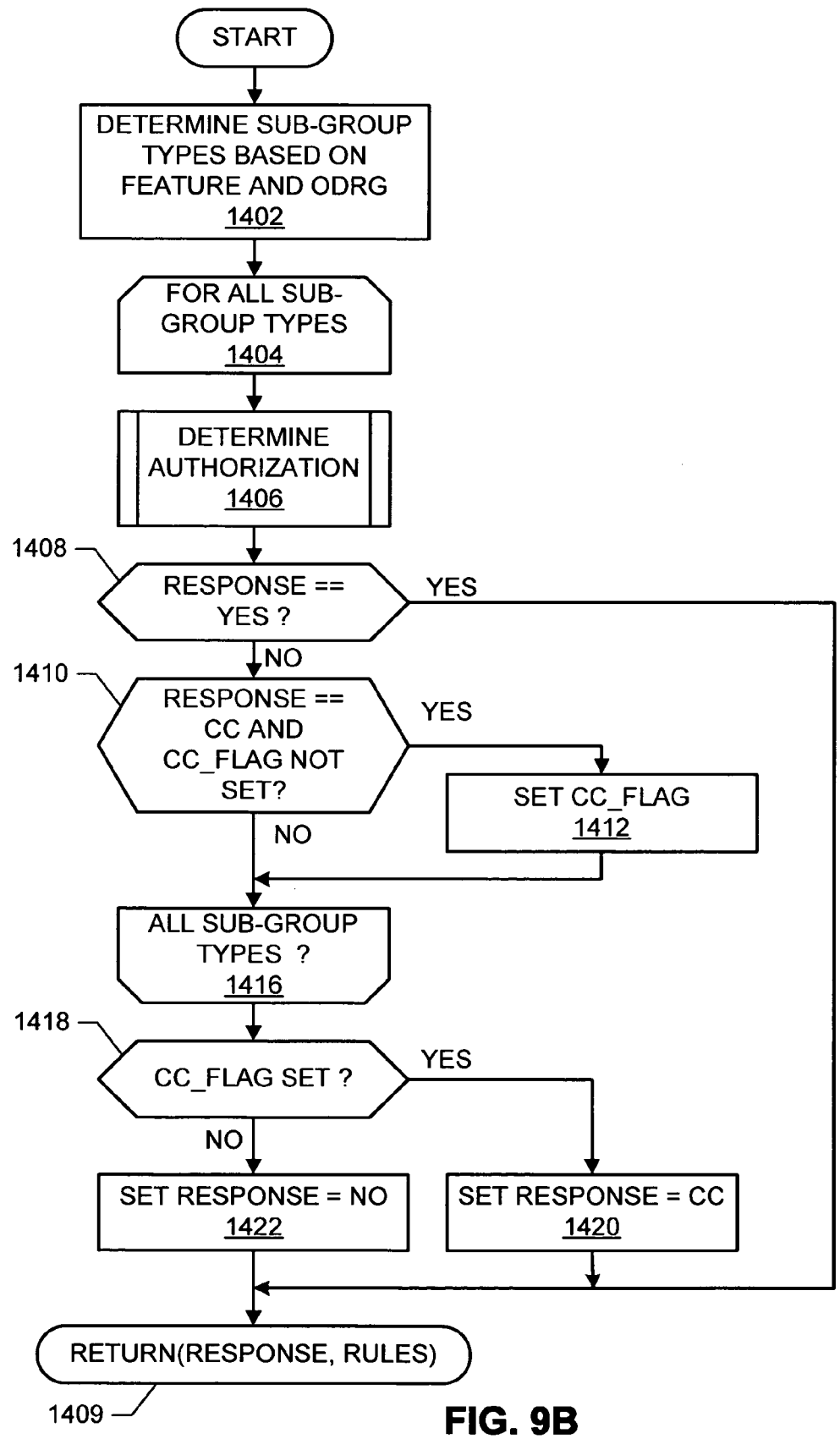

If an authorization request is received (block 1304), the policy server 150 determines an authorization for the requested outdial communication service using, for example, the example machine readable instructions of FIG. 9B and/or the methods described in Section V in connection with FIGS. 37-43 (block 1306). The policy server 150 then, as discussed above, sends a response message to, for example, the application server 132 (block 1308) and control then returns to block 1302 to wait for another request. Alternatively, before returning to block 1302 to wait for another request, the policy server 150 may, if the outdial service was authorized (e.g., a response of YES from the example machine readable instructions of FIG. 9B), save the unified sub-group type and/or the routing rules returned by, for example, the example machine readable instructions of FIG. 9B. In the example system of FIG. 1, the response message will indicate, among other things, YES the outdial service is authorized, NO the outdial service is not authorized, CC the outdial service may be authorized if a calling card and/or long distance access number is utilized, or ERROR is the authorization request could not be processed. A response of NO or ERROR may also include additional error information in the form of a human readable string indicating a cause of the authorization failure and/or reason the request could not be processed.

Returning to block 1304, if an authorization request is not received, the policy server 150 determines if a routing request was received (block 1312). If neither a routing request nor an authorization request was not received (block 1312), the policy server 150 performs suitable error processing (block 1318), for example, logging an un-supported request type, and control returns to block 1302 to wait for another request.

Figure 9C:
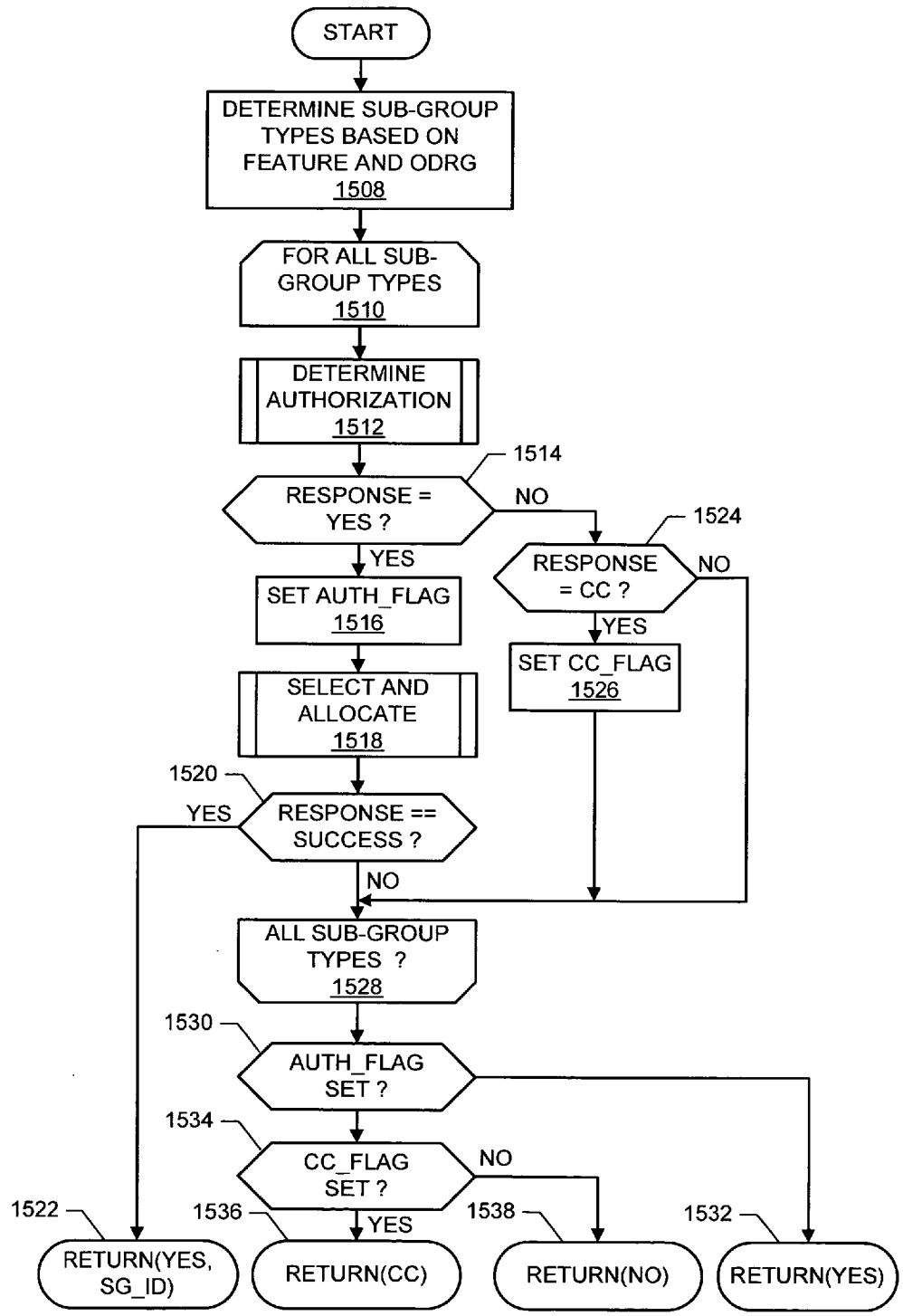

If a routing request was received (block 1312), the policy server 150 selects and allocates a route for the outdial service (i.e., a unified sub-group) using, for example, the example machine readable instructions of FIG. 9C and/or the methods described in Section VI in connection with FIGS. 44-48 (block 1314). The policy server 150 then, as discussed above, sends a response message to the application server 132 (block 1316) and control returns to block 1302 to wait for another request. In the example system of FIG. 1, the response message will indicate, among other things, YES the outdial service is authorized and identify a unified super-group over which to route the requested outdial communication service, YES the outdial service is authorized but no unified super-group could be selected and/or allocated, NO the outdial service is not authorized, CC the outdial service may be authorized if a calling card and/or long distance access number is utilized, or ERROR is the authorization request could not be processed. A response of NO or ERROR may also include additional error information in the form of a human readable string indicating a cause of the authorization failure and/or reason the request could not be processed.

The example machine readable instructions of FIG. 9B begin with the policy server 150 determining the types of unified sub-groups (e.g., public, private, shared) that may be used to route the call based on the outdial communication service type (i.e., feature) and the ODRG of the associated subscriber (block 1402). For each of the types of unified sub-groups that may be used to route the outdial service (block 1404), the outdial authorizer 1020 determines an authorization for the requested outdial service by, for example, implementing the methods described in Section V in connection with FIGS. 37-43 (block 1406). If the outdial authorizer 1020 returns a response of YES (block 1408), control returns from the example machine executable instructions of FIG. 9B to the example machine executable instructions of FIG. 9A with one or more return values indicating that the outdial service was authorized (e.g., a return value of YES) and specifying the routing rules (i.e., a sequence of LATAs and a unified sub-group type) (block 1409)

Returning to block 1408, if the response is not YES, the policy server 150 determines if the response is CC and if the CC_FLAG is not set (block 1410). If the response is CC and the CC_FLAG is not set (block 1410), the policy server 150 sets the CC_FLAG indicating that authorization may be possible with a calling card and/or long distance access number (block 1412). If not all of the types of unified sub-groups that may be used to route the outdial service have been processed (block 1416), control returns to block 1404 to process the next type of unified sub-group.

If all the types of unified sub-groups that may be used to route the outdial service have been processed (block 1416), the policy server 150 determines if the CC_FLAG is set (block 1418). If the CC_FLAG is set (block 1418), the policy server 150 sets the response value returned by the example machine readable instructions of FIG. 9B to CC (block 1420) and control returns from the example machine readable instructions of FIG. 9B to the example machine readable instructions of FIG. 9A with one or more return values indicating that the outdial service requires a calling card and/or long distance access number to be authorized (block 1409). If the CC_FLAG is not set (block 1418), the policy server 150 sets the response value returned by the example machine readable instructions of FIG. 9B to NO (block 1422) and control returns from the example machine readable instructions of FIG. 9B to the example machine readable instructions of FIG. 9A with one or more return values indicating that the outdial service is not authorized (block 1409).

The example machine readable instructions of FIG. 9C begin with the policy server 150 determining the unified sub-group types (e.g., public, private, shared) that may be used to route the call based on the outdial communication service type (i.e., feature) and the ODRG of the associated subscriber, CTAN and/or call tree subscriber number (block 1508). Then for each of the unified sub-group types that may be used to route the outdial service (block 1510), the outdial authorizer 1020 determines an authorization (e.g., YES, NO or CC) for the requested outdial service by, for example, implementing the methods described in Section V in connection with FIGS. 37-43 (block 1512). If the outdial authorizer 1020 returns a response of YES (block 1514), the policy server 150 sets the AUTH_FLAG (block 1516) and attempts to select and allocate a shared communication resource (i.e., a unified sub-group) using, for example, the example machine readable instructions of FIG. 9D (block 1518). If the selection and allocation was successful (block 1520), control returns from the example machine readable instructions of FIG. 9C to the example machine readable instructions of FIG. 9A with one or more return values indicating that allocation was successful (e.g., an authorization response of YES) and specifying the unified super-group to which the unified sub-group maps (e.g., a unified super-group identifier SG_ID) (block 1522). If the selection and allocation was not successful (block 1520), control proceeds to block 1528 to determine if all unified sub-group types have been processed.

Returning to block 1514, if the response from the outdial authorizer 1020 is not YES, the policy server 150 determines if the response is CC (block 1524). If the response is CC, the policy server 150 sets the CC_FLAG (block 1526). Control then proceeds to block 1528 to determine if all unified sub-group types have been processed.

If not all unified sub-group types have been processed (block 1528), control returns to block 1510 to process the next unified sub-group type. If all unified sub-group types have been processed (block 1528), the policy server 150 determines if the AUTH_FLAG was set (block 1530). If the AUTH_FLAG was set (block 1530), control returns from the example machine readable instructions of FIG. 9C to the example machine readable instructions of FIG. 9A with one or more return values indicating the outdial service was authorized (e.g., response of YES) but that a unified sub-group could not be selected and/or allocated (e.g., a NULL or missing SG_ID) (block 1532).

If the CC_FLAG is set (block 1534), control returns from the example machine readable instructions of FIG. 9C to the example machine readable instructions of FIG. 9A with one or more return values indicating that authorization requires a calling card and/or long distance access number (e.g., a value of CC) (block 1536). If the CC_FLAG is not set (block 1534), control returns from the example machine readable instructions of FIG. 9C to the example machine readable instructions of FIG. 9A with one or more return values indicating that authorization and allocation failed (e.g., a value of NO) (block 1538).

It will be readily apparent to persons of ordinary skill in the art that the example machine readable instructions of FIGS. 9A-C may optionally include an additional return condition that returns a response of ERROR. For example, the policy server 150 using any of a variety of techniques could verify the validity of one or more of an access number, a subscriber number, an ODRG, etc. to determine if the authorization or combined authorization and routing request can be processed and/or is valid. If, for example, one or more parameters are invalid, the policy server 150 could, for instance, return a response of ERROR together with a reason for the failure (e.g., invalid access number) to the application server 132A.

As illustrated in the example machine readable instructions of FIGS. 9A-C, the policy server 150 of the example system of FIG. 1 determines the most lenient authorization response and/or routing rules across all of the unified sub-group types. In other words, if any unified sub-group type result in an authorization result of YES, then the authorization response is YES. If no unified sub-group type results in an authorization result of YES, and if any unified sub-group type has an authorization result of CC, then the authorization response is CC. Otherwise, the authorization response is NO.

Figure 9D:
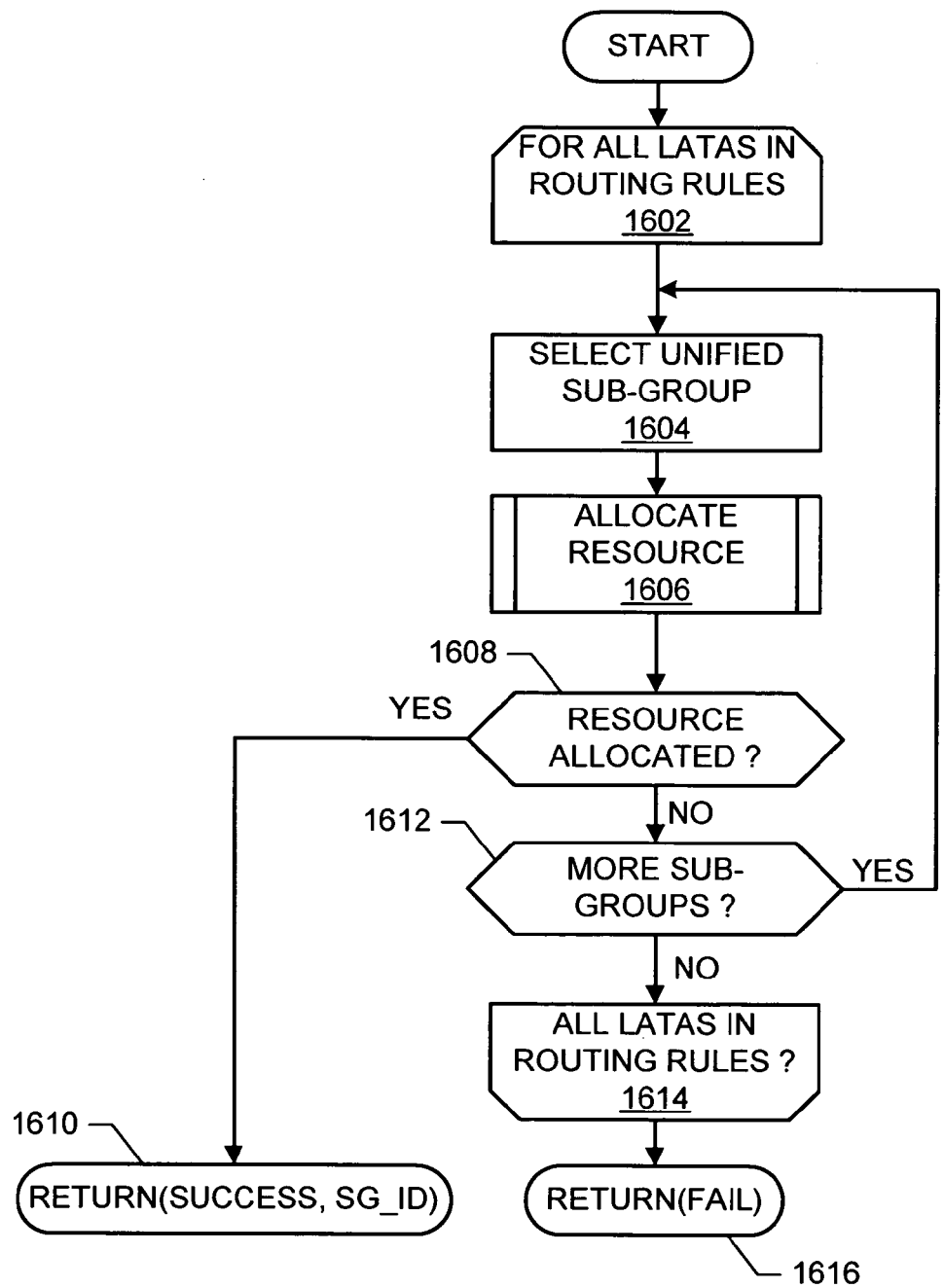

The example machine readable instructions of FIG. 9D begin with the policy server 150 processing each of the LATAs listed in the routing rules (block 1602). As discussed above, the policy server 150 selects and/or identifies a unified sub-group located within the current LATA to which an attempt to allocate a resource will be made (block 1604).

Having selected a particular unified sub-group (block 1604), the policy server 150 attempts to allocate resources of the selected unified sub-group to the requested outdial feature using, for example, the methods described in Section VI in connection with FIGS. 44-48 (block 1606). If resources are successfully allocated (block 1608), control returns from the example machine readable instructions of FIG. 9D to the example machine readable instructions of FIG. 9C with one or more return values indicating that allocation was successful and specifying the unified super-group to which the unified sub-group belongs (e.g., a unified super-group identifier SG_ID) (block 1610).

If a resource was not successfully allocated (block 1608), the policy server 150 determines if an additional unified sub-groups may be available in the current LATA (block 1612). If additional unified sub-groups may be available (block 1612), control returns to block 1604 to select another unified sub-group. If no additional unified sub-groups are available in the current LATA (block 1612), and not all LATAs specified in the routing rules have been processed (block 1614), control returns to block 1602 to process the next LATA. If all LATAs have been processed (block 1614) without successfully allocated a shared communication resource, control returns from the example machine readable instructions of FIG. 9D to the example machine readable instructions of FIG. 9C with one or more return values indicating that allocation failed (block 1616).

III. Gateway Provisioning

As discussed above, the example system of FIG. 1 may span multiple LATAs, include multiple message centers and application servers, and contain hundreds of gateways and tens of thousands of PRIs. Additionally, as more persons subscribe to the communication services provided by the illustrated example system of FIG. 1, new access numbers, PRIs, circuit groups, unified super-groups, unified sub-groups, proxy servers, session border controllers, VoIP softswitches (i.e., softswitches), softswitches, softswitch/proxy servers, and gateways are continually added. Further, the example system supports the routing of communication services from a first network (e.g., a PSTN network) into a VoIP network (e.g., a network created by the gateway 120A, the gatekeeper 135, the message center 130, and the policy server 150), and from the VoIP network into a second network. As such, the VoIP network contains multiple entry and exit communication paths. In comparison, traditional voicemail systems are built using numerous highly centralized all-in-one single vendor platforms, each one serving a predetermined set of customers in a specific geographic location. In such platforms, calls often enter and exit via a single gateway at a single location.

To perform automated provisioning of gateways (e.g., the gateways 120A and 120B), session border controllers and/or proxy server/softwitches, the example system of FIG. 1 includes a provisioner 162. The provisioner 162 extracts data representing the configuration of the example system of FIG. 1 from the operations database 160 to form a configuration record for a gateway, a session border controller, a proxy server, a softswitch and/or a softswitch/proxy server.

In the illustrated example of FIG. 1, the provisioner 162 receives a request to configure a gateway, a session border controller, a proxy server, a softswitch and/or a softswitch/proxy server from an administrator and/or a service provider associated with the illustrated system. In response to the configuration request, the provisioner 162 extracts appropriate configuration parameters from the operations database 160 using database queries, combines the configuration parameters with standard configuration data to form a configuration record, and configures the gateway, session border control, the proxy server, the softswitch and/or the softswitch/proxy server with the data in the configuration record. The provisioner 162 may also receive and accommodate a request to configure multiple gateways, session border controls, proxy servers, softswitches and/or softswitch/proxy servers.

In the interest of brevity and ease of discussion, throughout the remainder of this disclosure references will be made to configuring gateways. However, persons of ordinary skill in the art will readily appreciate that the methods and systems described herein are equally applicable to configuring proxy servers, session border controllers, proxy servers, softswitches and/or softswitch/proxy servers.

Figure 10:
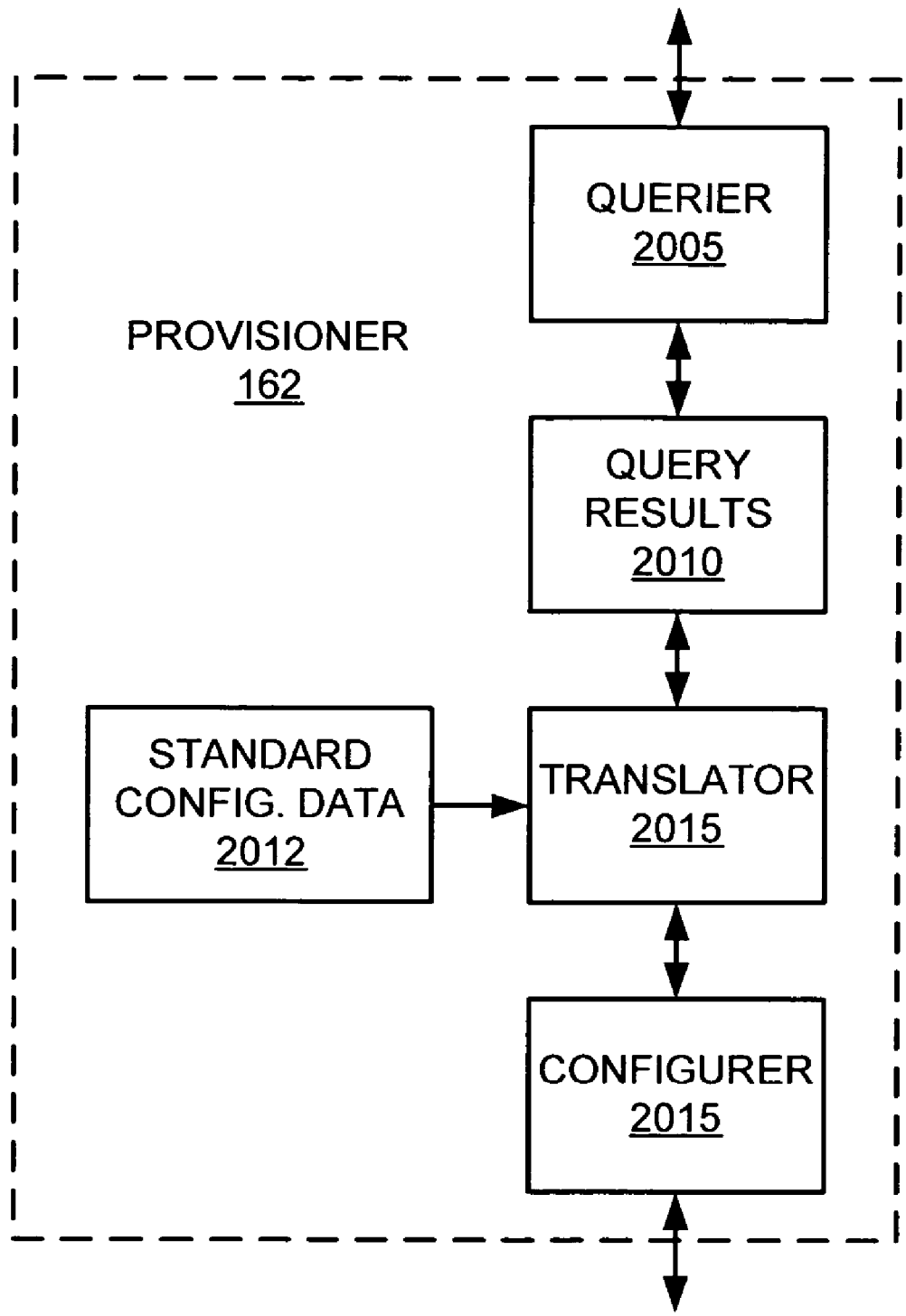
FIG. 10 is a schematic illustration of an example manner of implementing the provisioner of FIG. 1.

FIG. 10 is a schematic illustration of an example manner of implementing the provisioner 162 of FIG. 1. To perform queries of the operations database 160, the provisioner 162 of FIG. 10 includes a querier 2005. In the illustrated example, the querier 2005, using any of a variety of database query techniques, performs one or more database queries based on one or more criteria to determine one or more results 2010 representative of one or more configuration parameters (e.g., parameters, data, and/or variables) of the example system of FIG. 1. For example, using a structure query language (SQL) based script or tool the querier 2005 determines a mapping between a PRI and an interface of a particular gateway (e.g., the gateway 120A). In the example of FIG. 10, the results 2010 may be stored in either a volatile memory device or in non-volatile memory (e.g., a file on a hard disk drive). In the example system of FIG. 1, the results of each database query are, without loss of generality, concatenated to the end of a text-based file that is first emptied when a configuration request is received.

In the example of FIG. 1, gateways are configured using a text-based configuration record that contains one or more configuration record sections each containing one or more configuration parameters. To translate the query results 2010 into a configuration record appropriate for configuring a gateway, the example provisioner 162 includes a translator 2015. The translator 2015 using, for example, a practical extraction and reporting language (PERL) script, creates an appropriately formatted and structured configuration record section and/or configuration record that combines dynamic configuration parameters taken or derived from the results 2010 with standard configuration data and/or parameters 2012. For instance, in the example system of FIG. 1, gateways may be provisioned similarly (e.g., an identical number and type of PRIs) and, thus, a portion of the configuration record does not need to change from one gateway to the next and may be standardized across some or all of the example system of FIG. 1. The remaining configuration parameters of the configuration record (e.g., mapping of PRIs to gateways and/or gateway interfaces) are dynamic and/or semi-static and, thus, are determined from data stored in the operations database 160 (i.e., the results 2010). In the example of FIG. 10, the translator 2015 may require results from multiple database queries (completed by the querier 2005) to form a complete configuration record section and/or configuration record.

To configure a gateway, the example provisioner 162 of FIG. 10 includes a configurer 2015. Using any of a variety of techniques, the configurer 2015 configures the gateway using the configuration record. For example, the configurer 2015 may transfer (e.g., using file transfer protocol (FTP)) the configuration record to a gateway and then instruct the gateway to load the configuration record. Alternatively, the configurer 2015 may directly load the configuration record into the gateway.

Although not exhaustive, FIGS. 11A-E illustrate example configuration record sections suitable for use with a gateway manufactured by Cisco Systems, Inc. A configuration record and/or configuration record section for a gateway from a different manufacturer may differ in both format and/or content from the examples illustrated in FIGS. 11A-E. The example configuration record sections illustrated in FIGS. 11A-E include one or more lines of comments, text, parameters, values, symbols and/or data. For instance, lines of the examples of FIGS. 11A-E may specify a configuration parameter and, thus, may include, among other things, a parameter identifier (e.g., identifiers 2050A and 2050B), a parameter value, data, flag, etc. (e.g., values 2055A and 2055B), and, optionally, one or more additional configuration parameter values (e.g., values 2060 and 2065).

In the example system of FIG. 1, the gateways use patterns to identify a matching telephone number and, thus the examples of FIGS. 11A-E specify a telephone number or a range of telephone number via a pattern. For example, a pattern of 10 dots (i.e., . . . ) matches any telephone number. As discussed above, a gateway may include dial peers for handling indial communication services, outdial communication services, and/or facsimile print indial and/or outdial communication services.

In the example system of FIG. 1, each access number is associated with a unique combination of application server type and message center, and each technology prefix is also associated with a unique combination of application server type and message center. Thus, by transitivity, every access number is associated with a unique technology prefix. The example of FIG. 11A illustrates a configuration record section that associates an access number configuration parameter (i.e., a destination-pattern parameter identifier with a parameter value of 3143614612) with a technology prefix configuration parameter (i.e., the tech-prefix parameter identifier 2050B with the parameter value 2055B of 5#) and an application (i.e., indial) dial peer parameter (i.e., the dial-peer parameter identifier 2050A with a parameter value 2055A of 100 and additional parameter values 2060 and 2065).

The example of FIG. 11B illustrates a configuration record section that includes a unified super-group parameter (i.e., a super-group of 200) that is to be associated with the gateway. Similarly, the example of FIG. 11C is a configuration record section that associates a unified super-group (i.e., a super-group parameter of 200) with an interface or a portion of an interface of the gateway (i.e., an interface parameter of 7/0: 23).

The example of FIG. 11D is a configuration record section that associates an outdial dial peer (i.e., a dial-peer voice identification parameter of 199 POTS) with a unified super-group (i.e., a super-group parameter of 200). Likewise, the example of FIG. 11E illustrates a configuration record section associating a facsimile print dial peer (i.e., a dial-peer voice identification parameter of 198 POTS) with a unified super-group (i.e., a super-group parameter of 200).

Figure 12:
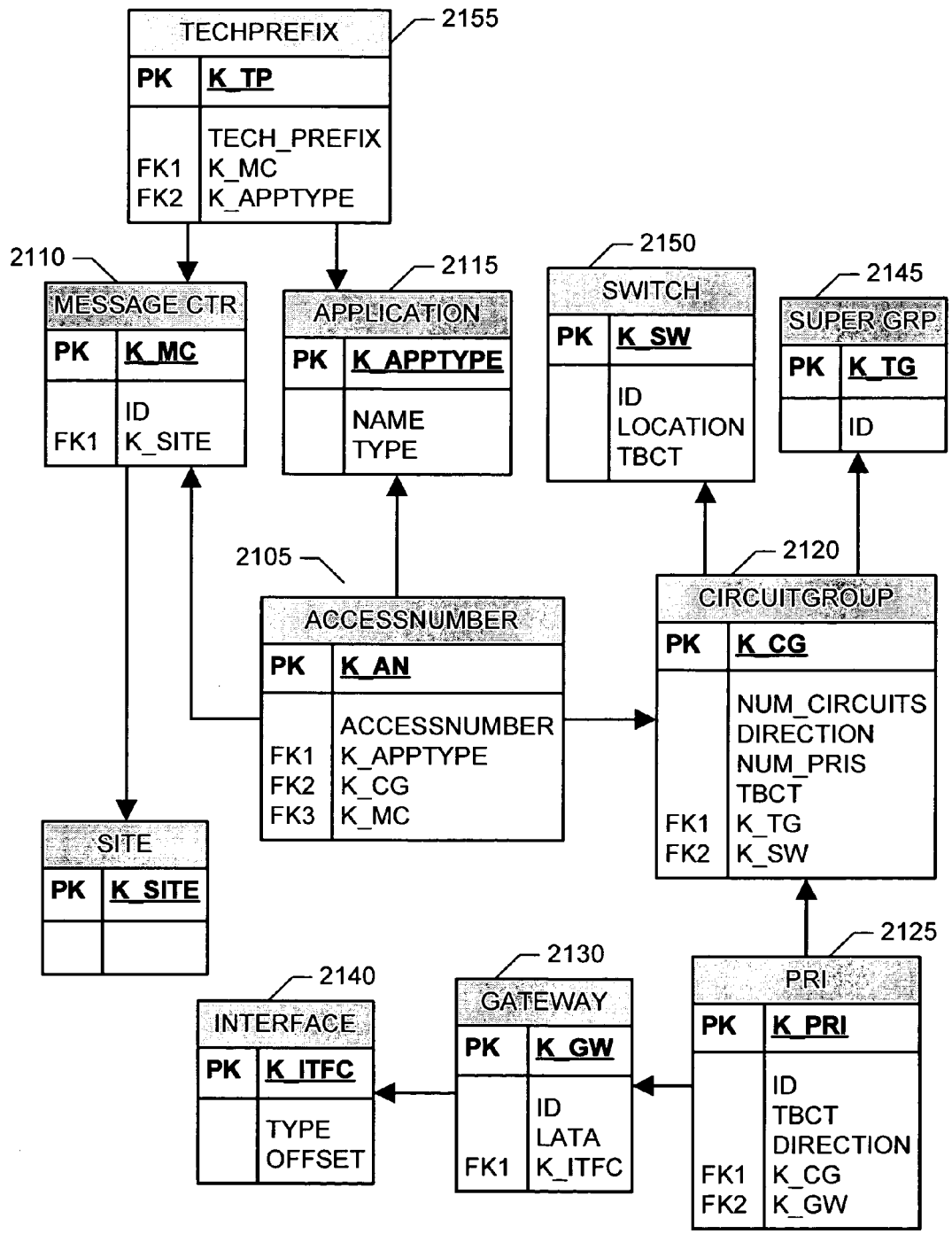
FIG. 12 is an entity relationship diagram illustrating an example portion of the operations database of FIG. 1.

FIG. 12 is an entity relationship diagram illustrating a portion of the operations database 160 that relates to the configuration of a gateway within the example system of FIG. 1. As illustrated, an access number entity 2105 contains, among other things, an assigned access number, and is associated to a message center entity 2110 (i.e., via the foreign key K_MC), an application entity 2115, and a circuit group entity 2120. Associated to the circuit group 2120 is at least one PRI entity 2125, where the PRI entity 2125 includes an identifier (ID), a direction indication (e.g., indial, outdial, etc.) and a flag indicating if the PRI entity 2125 supports TBCT. The PRI entity 2125 is also associated to a gateway entity 2130 that includes at least one interface entity 2140. The circuit group entity 2120 is also associated to a unified super-group entity 2145 and a PSTN switch entity 2150. A technology prefix entity 2155 is associated to the message center entity 2110 and the application entity 2115.

It will be apparent to persons of ordinary skill in the art that the example entity relationship diagram of FIG. 12 and, thus the operations database 160, represents example relationships among the various entities of the example system of FIG. 1 and, thus, represents the configuration parameters necessary to create a configuration record for the gateway entity 2130. For instance, although not exhaustive, the database queries illustrated in FIGS. 13A, 14A, 15A and 16A are example database queries performed in Microsoft Access on an example database having the example entity relationships illustrated in FIG. 12. The example database queries illustrated in FIGS. 13A, 14A, 15A and 16A obtain, among other things, configuration parameters for use in creating a gateway configuration record. It will also be readily apparent to persons of ordinary skill in the art that the example queries illustrated in FIGS. 13A, 14A, 15A and 16A could be performed using any of a variety of alternative techniques (e.g., using command-line SQL queries of an Oracle based database).

Figures 13A, 13B:
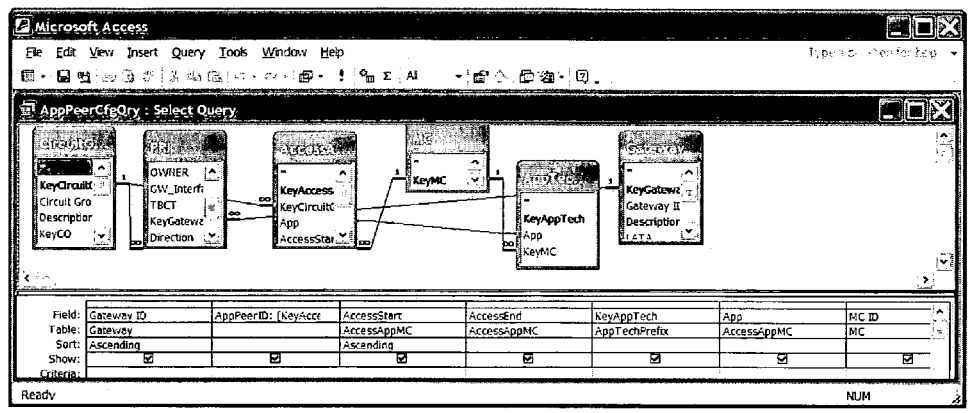
FIGS. 13A, 14A, 15A and 16A illustrate example database queries.
FIGS. 13B, 14B, 15B and 16B illustrate example database query result tables resulting from the example database queries of FIGS. 13A, 14A, 15A and 16A.
Figures 14A, 14B:
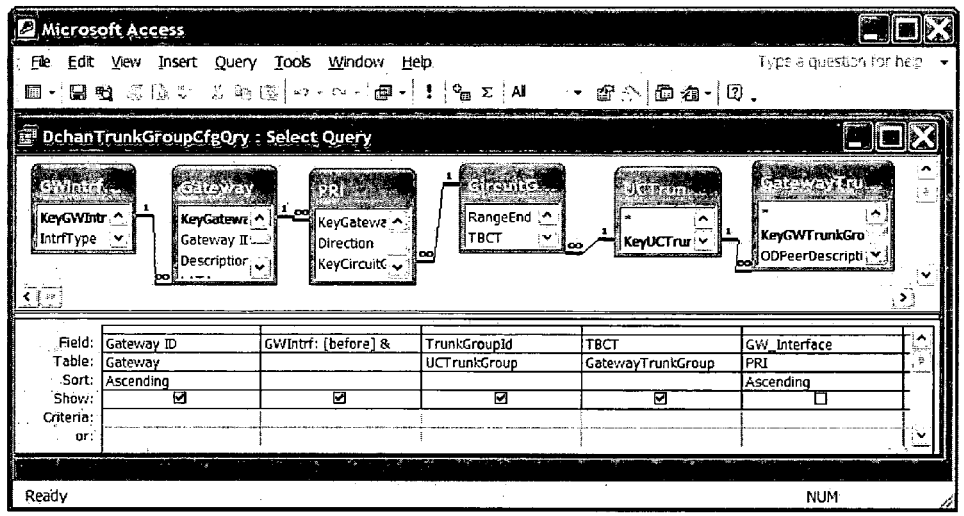
Figures 15A, 15B:
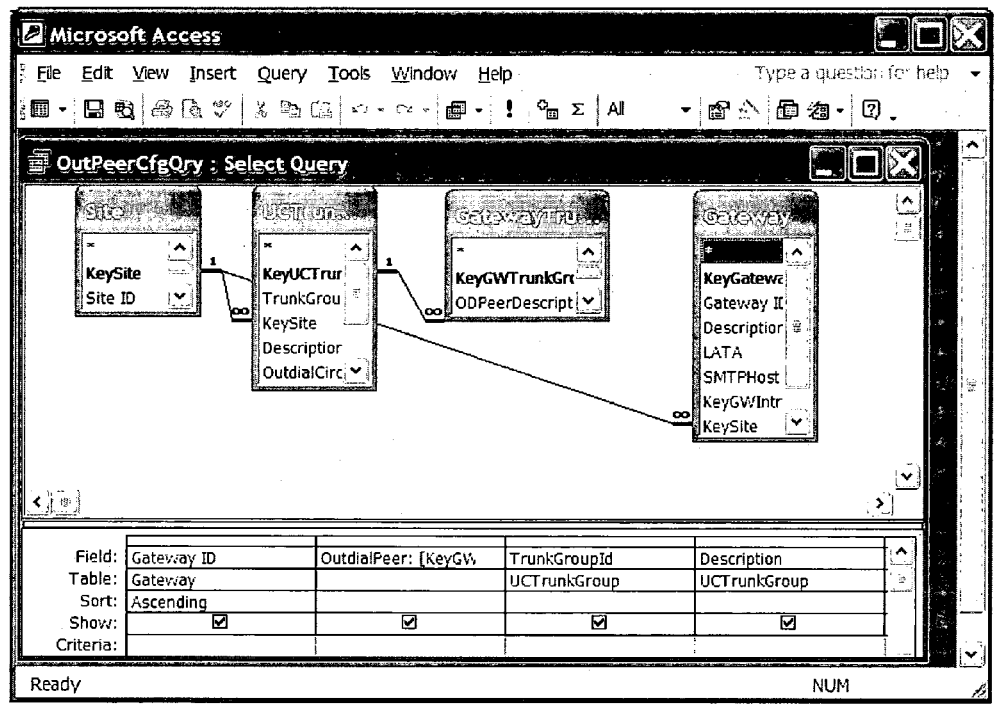
Figures 16A, 16B:
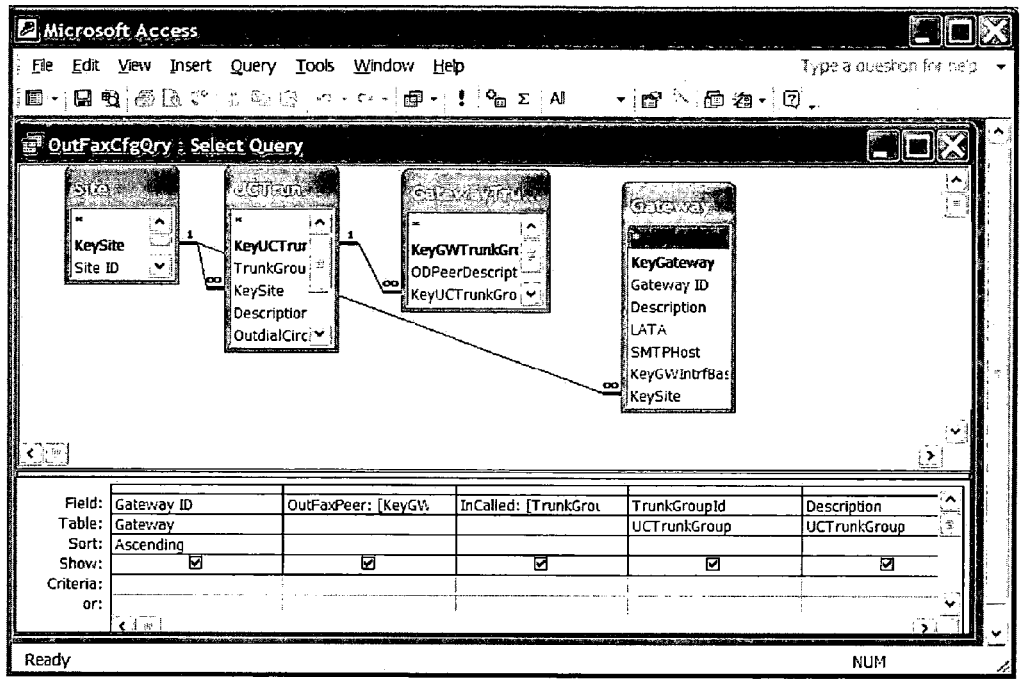

The example queries of FIGS. 13A, 14A, 15A and 16A result in, among other things, the example query results illustrated in FIGS. 13B, 14B, 15B and 16B, respectively. In the illustrated examples of FIGS. 1 and 12, the example results of FIG. 13B represent dynamic configuration parameters necessary for creating a gateway configuration record section like that illustrated in FIG. 11A. Likewise, the example results of FIGS. 14B, 15B and 16B represent dynamic configuration parameters necessary to create gateway configuration record sections like those illustrated in FIGS. 11C, 11D and 11E, respectively.

The query illustrated in FIG. 13A returns for a pre-determined Gateway ID 2305, one or more sets of associated values that include an application dial-peer identifier 2310, an access number start 2315 and an access number end 2320 that may be used to determine a telephone number matching pattern, a tech-prefix 2325, an application type 2330 and a message center identifier 2335 as illustrated in FIG. 13B. Likewise, the example query of FIG. 14A returns for a pre-determined Gateway ID 2305, one or more sets of associated values as illustrated in FIG. 14B that include a gateway interface 2340, a unified super-group identifier 2345 and a TBCT enable flag 2350.

Similarly, the query illustrated in FIG. 15A returns for a pre-determined Gateway ID 2305, one or more sets of associated values that include an outdial dial-peer identifier 2355, a unified super-group identifier 2345 and a description 2360 as illustrated in FIG. 15B. Likewise, the example query of FIG. 16A returns for a pre-determined Gateway ID 2305, one or more sets of associated values as illustrated in FIG. 16B that include a gateway interface 2340, a fax dial-peer identifier 2365, telephone number matching pattern 2370, a unified super-group identifier 2345 and a description 2375.

Figure 17:
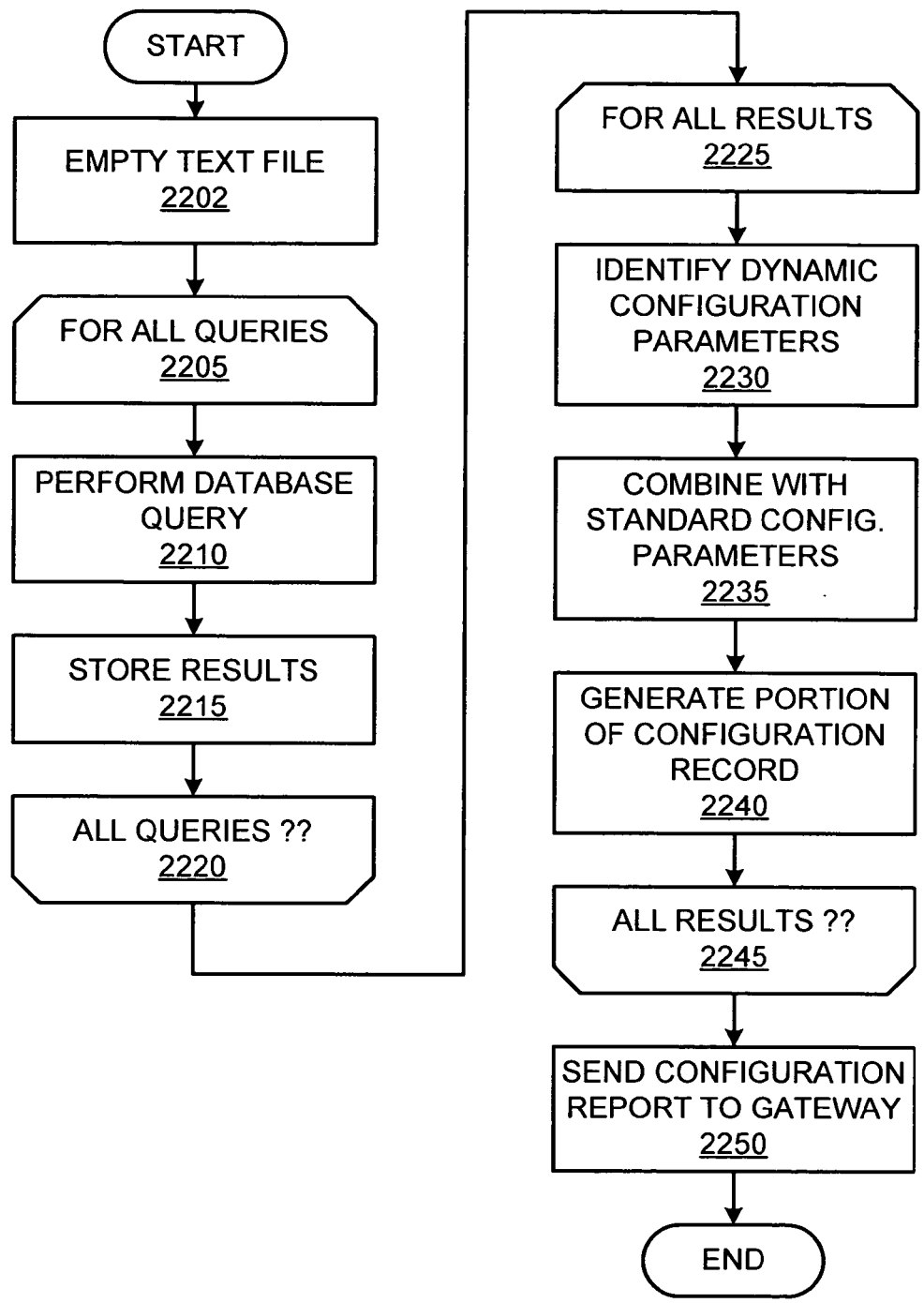
FIG. 17 is a flowchart representative of example machine readable instructions which may be executed to implement the provisioner of FIG. 1.

FIG. 17 is flowchart representative of example machine readable instructions that may be executed by a processor (e.g., the processor 8010 of FIG. 87) to implement the example provisioner 162 of FIGS. 1 and/or 10. The machine readable instructions of FIG. 17 may be executed by a processor, a controller and/or any other suitable processing device. For example, the machine readable instructions of FIG. 17 may be embodied in coded instructions stored on a tangible medium such as a flash memory, or RAM associated with the processor 8010 shown in the example processor platform 8000 and discussed below in conjunction with FIG. 87. Alternatively, some or all of the example machine readable instructions of FIG. 17 and/or the provisioner 162 of FIG. 1 may be implemented using an application specific integrated circuit (ASIC), a programmable logic device (PLD), a field programmable logic device (FPLD), discrete logic, hardware, etc. Additionally, some or all of the example machine readable instructions of FIG. 17 and/or the provisioner 162 may be implemented using software, hardware, firmware, and/or a combination of hardware and software and/or firmware. Also, some or all of the machine readable instructions of FIG. 17 and/or the provisioner 162 of FIG. 1 may be implemented manually or as combinations of any of the foregoing techniques. Further, although the example machine readable instructions of FIG. 17 are described with reference to the flowcharts of FIG. 17, persons of ordinary skill in the art will readily appreciate that many other methods of implementing the provisioner 162 may be employed. For example, the order of execution of the blocks may be changed, and/or some of the blocks described may be changed, eliminated, sub-divided, or combined.

The example machine readable instructions of FIG. 17 begin when the provisioner 162 receives a gateway configuration request. The querier 2005 first creates or empties a results text file (block 2202). Next, for each of the database queries necessary to gather all configuration parameters to create a gateway configuration record section and/or configuration record (block 2205), the querier 2005 performs a database query using, for example, SQL queries (block 2210) and stores the result 2010 by, for example, concatenating them to the end of the results text file (block 2215). If all database queries have not been completed (block 2220), control returns to block 2205 and the querier 2005 performs the next database query. Alternatively, the database query results 2010 could be stored in volatile memory.

If all database queries have been completed (block 2220), the translator 2015 processes the results 2010 of each database query (e.g., each section of the results text file, section of volatile memory, or each or a plurality of text files if results 2010 are stored in individual files) (block 2225). For each of the results 2010 (block 2225), the translator 2110 using, for example, a PERL script identifies, extracts and/or determines dynamic configuration parameters from the results 2010 (block 2230). Some configuration parameters may be computed from one or more parameters or variables in the results 2010. For example, the interface parameter (e.g., interface serial 7/0:23 of the example of FIG. 11C) is a combination of fields from the interface entity 2140 of FIG. 12. The translator 2110 then combines the dynamic configuration parameters with standardized configuration parameters (block 2235) and creates a configuration record section and/or a configuration record (block 2240). If not all results 2010 have been translated (block 2245), control returns to block 2225 and the translator 2110 translates the next database results 2010.

If all results 2010 have been translated (block 2245), the configurer 2115 loads the configuration record into the gateway or sends the configuration record to the gateway (block 2250), and ends the example machine executable instructions of FIG. 17.

It will be readily apparent to persons or ordinary skill in the art that the translator 2110 may alternatively not proceed serially through the database query results 2010. For example, the translator 2110 may make multiple passes through the results 2010 to create all the configuration record sections of one type, and then pass through the results 2010 again to create configuration record sections of another type.

FIGS. 18A-C collectively illustrate a portion of an example gateway configuration record suitable for a gateway manufactured by Cisco Systems, Inc. resulting from execution of the example machine executable instructions of FIG. 17. Without any loss of generality, in the illustrated example of FIGS. 18A-C unified super-groups are referred to as trunk groups. The example configuration record of FIG. 18A-C contains, among other things, one or more of each of the example configuration record sections illustrated in FIGS. 11A-E. For example, example sections 2405A-D, 2410, 2415, and 2420A-B correspond to the example section of FIG. 11B, FIG. 11C, FIG. 11A, FIG. 11D, respectively. The example configuration record of FIG. 18A-C also contains comment lines and other standard configuration record sections (e.g., sections 2430, 2435, 2440, 2445, etc.).

IV. Outdial Resource Group (ODRG)

Figure 19:
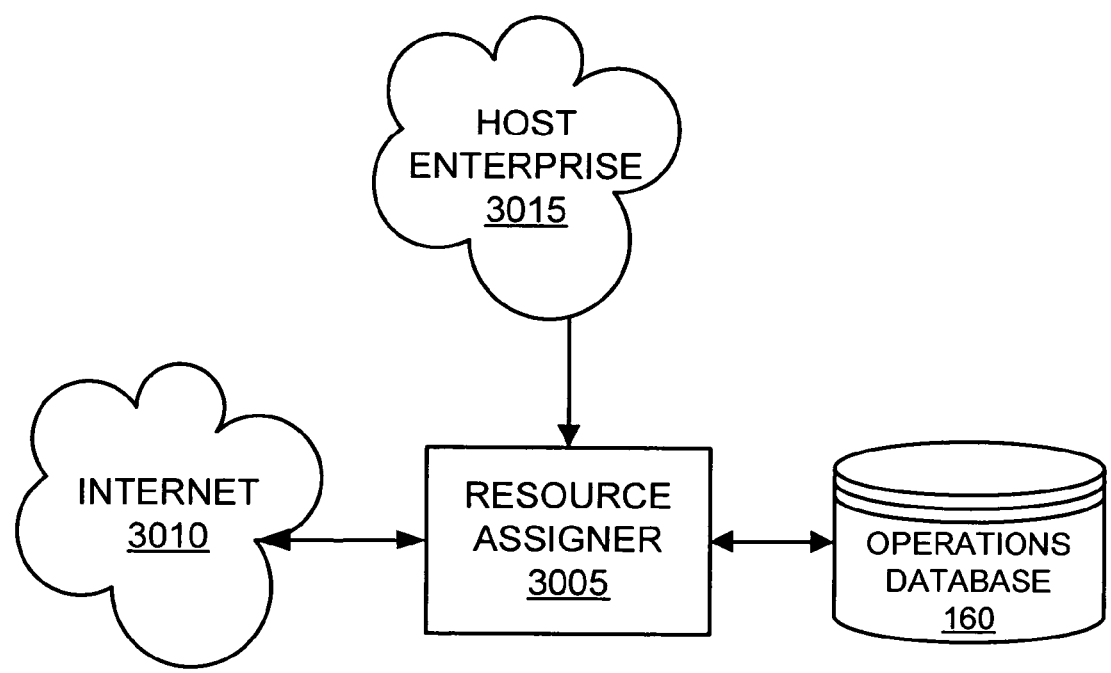
FIG. 19 is a schematic illustration of an example system for allocating sub-group and outdial resource groups.

FIG. 19 illustrates an example apparatus for assigning and/or allocating unified sub-group and ODRG resources. In the illustrated example, the apparatus is implemented by a resource assigner 3005 and the operations database 160. The resource assigner 3005 is structured to receive inputs from one or more administrators employed by, or otherwise associated with, a host enterprise (e.g., a service provider, a third party service provider, etc.) or a client enterprise of the host enterprise (e.g., a private or public corporation, a partnership, a school, a university, etc.). To this end, the resource assigner 3005 of the illustrated example is communicatively connected to the Internet or an intranet 3010 to enable one or more administrators to interface with the resource assigner 3005 to, for example, view and/or change the allocation of shared outdial communication resources (e.g., unified sub-groups) and/or make assignments related to ODRGs, as will be discussed in greater detail below. As shown in FIG. 19, the host enterprise 3015 may also interface directly to the resource assigner 3005 via a direct communicative connection (e.g., via the UI 170) and/or a connection via the Internet/intranet 3010.

In the example system of FIG. 19, the host enterprise 3015 (e.g., acting as a primary host enterprise) is the proprietor of the messaging system and/or platform (comprised of, for example, the gateway 120A, the gatekeeper 135, the message center 130, the policy server 150 and the operations database 160 of FIG. 1) and various communication resources such as, for example, some or all of the PSTN switches 115A-C, some or all of the communication facilities 145A-C, and/or some or all of the PRIs (e.g., a DS1, DS3, OC-48, etc.). For instance, the example the circuit groups 215A-C, their constituent PRIs and their logically related unified super-groups and unified sub-groups may be communication resources owned by the host enterprise 3015. Alternatively, a host enterprise 3015 (e.g., acting as a secondary host enterprise) may purchase, lease, contract or otherwise obtain communication and/or messaging services from a primary host enterprise, and then resell the thus acquired communication and/or messaging services to one or more mass-market subscribers and/or one or more client enterprises. A secondary host enterprise may additionally or alternatively be a proprietor of various private communication resources such as, for example, PRIs, private unified sub-groups, etc. operated by the secondary host enterprise, or leased from and/or provided by a communication service provider (e.g., a telco). As discussed below, in addition to the inherent relationship discussed above between a primary and a secondary host enterprise, host and secondary enterprises may differ in any of a variety of other ways. In the interest of brevity and clarity, throughout the following discussion the term host enterprise 3015 is used to refer to a primary host enterprise 3015 and/or a secondary host enterprise 3015, unless explicitly noted otherwise.

In the example system of FIG. 1, a host enterprise 3015 sells and/or provides messaging and/or communication services to a client enterprise and/or client subscribers. For instance, the host enterprise 3015 may sell and/or otherwise provide mailboxes (i.e., messaging services) to a client enterprise and make a portion of the host enterprise's communication resources available for the routing of indial calls to the mailboxes and the routing of outdial call from the mailboxes on behalf of persons associated with the client enterprise (e.g., employees). As such, all or a part of the communication resources of the host enterprise 3015 may be assigned (e.g., leased, assigned, sold, etc.), allocated and/or partitioned (e.g., exported) so as to be available to one or more client subscribers and/or client enterprises as discussed in greater detail below. Examples of such partitions are represented by the example unified sub-groups 225A and 225B of FIG. 2. A client enterprise may additionally or alternatively be a proprietor of various private communication resources such as, for example, PRIs, private unified sub-groups, etc. leased from and/or provided by a communication service provider (e.g., a telco), over which indial and/or outdial calls associated with the client enterprise may be routed. The client may further utilize a combination of private communication resources and host enterprise provided and/or partitioned communication resources.

While there may be any of a variety of relationships amongst host 3015 and client enterprises, for example, a client enterprise could utilize resource provided by multiple host enterprises 3015, persons of ordinary skill in the art will recognize that any particular communication and/or messaging system may implement certain restrictions. For instance, in the example system of FIG. 1, a host enterprise 3015 can not be both a host 3015 and a client enterprise (e.g., a client enterprise can not provide services to another client enterprise) and a client enterprise can be linked to only one host enterprise 3015.

The host enterprise 3015 may configure assignment and/or partition parameters by interacting with the resource assigner 3005. Those configured parameters are stored in an operations database 160. The client enterprise may also configure the some of the parameters by interacting with the resource assigner 3005 via the communicative connection to the intranet/Internet 3010.

In the interest of brevity and ease of discussion, throughout the remainder of this disclosure references will be made to a host enterprise 3015 assigning and/or partitioning communication resources to one or more client enterprises. However, persons of ordinary skill in the art will readily appreciate that the methods and systems described herein are generally applicable to assigning and/or partitioning communication resources to one or more mass market subscribers, individuals, client subscribers, etc.

Figure 20:
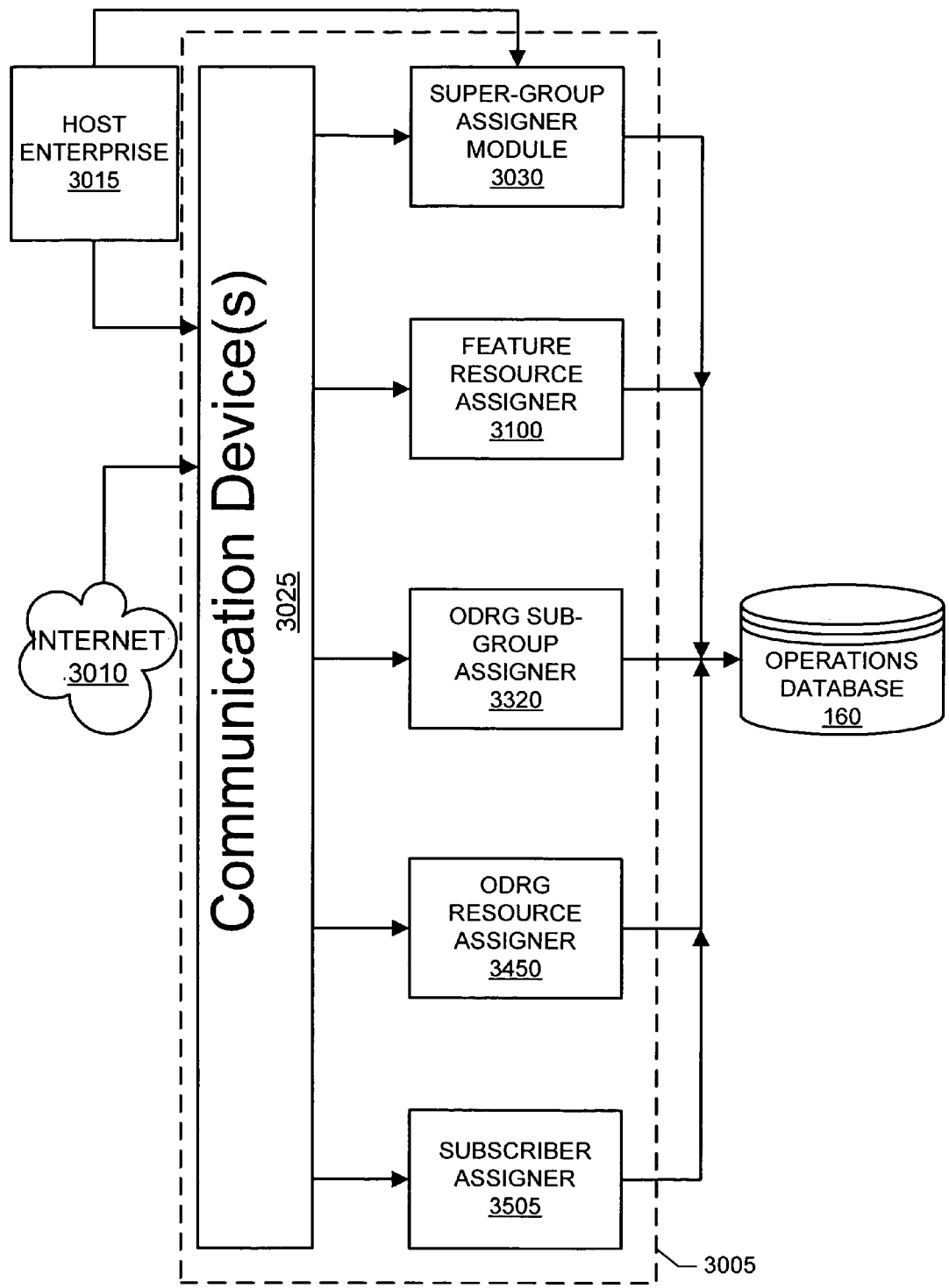
FIG. 20 is a schematic illustration of the example resource assigner of the system of FIG. 19.

FIG. 20 illustrates an example implementation of the resource assigner 3005 of FIG. 19. In the illustrated example, the host enterprise 3015 and/or a client enterprise may access resource assigner 3005 modules via, for example, the Internet/intranet 3010 and one or more communication devices 3025. The communication devices 3025 may enable communication via web-pages and/or graphical and/or command-line user interfaces and/or kiosks (e.g., the UI 170 of FIG. 1). In the illustrated example of FIG. 20, the resource assigner 3005 includes a super-group assigner module 3030, a feature resource assigner 3100, and ODRG sub-group assigner 3320, an ODRG resource assigner 3450 and a subscriber assigner 3505, each of which interacts with the communication device(s) 3025 to provide an interface to receive and process inputs to set and/or modify communication and/or system resource configuration parameters which are stored in the operations database 160.

Figure 21:
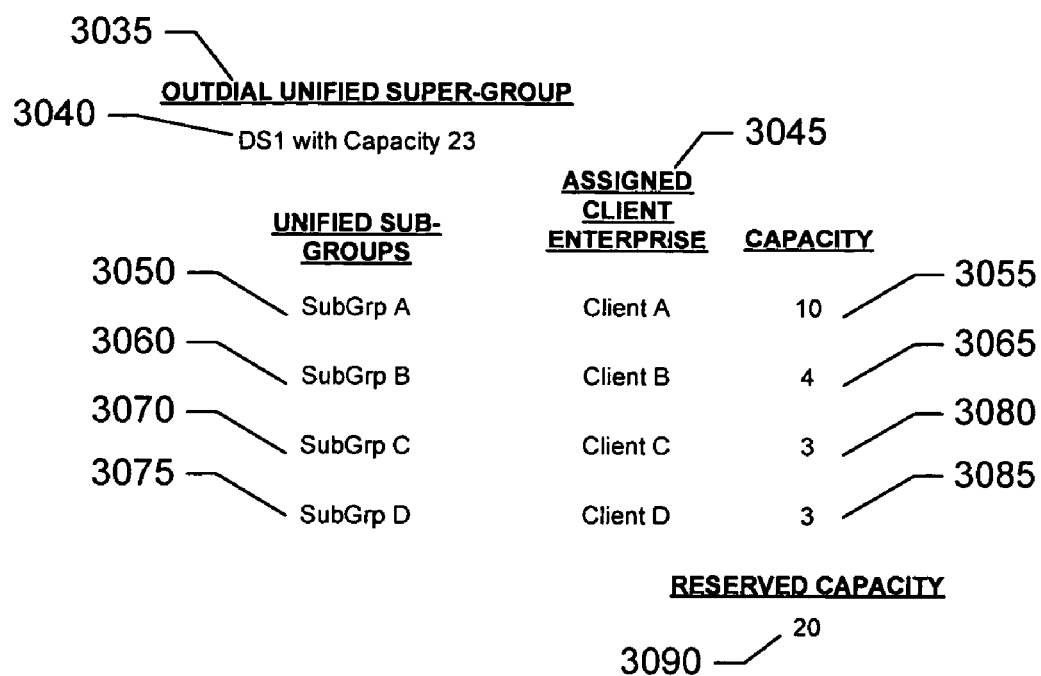
FIG. 21 is an example table illustrating an example assignment of outdial unified super-group resources among unified sub-groups.

For instance, the super-group assigner module 3030 facilitates partitioning of the resources of a unified super-group among unified sub-groups as shown in FIG. 21. For example, by partitioning a shared unified super-group into multiple unified sub-groups, or associating a single unified sub-group with a private unified super-group. In the illustration of FIG. 21, an example outdial shared unified super-group 3035 is comprised of a DS1 having a capacity of 23 data and/or voice channels 3040. The primary host enterprise 3015 may assign, allocate, make available and/or partition some or all of the resources of the shared unified super-group 3035 to one or more client enterprises 3045 (e.g., Client A, Client B, Client C and Client D). In the example of FIG. 21, the shared unified super-group 3040 is divided (partitioned) into four unified sub-groups (A-D) 3050, 3060, 3070 and 3075. In the illustrated example, unified sub-group A 3050 is assigned a capacity of 10 channels 3055, unified sub-group B 3060 is assigned a capacity of 4 channels 3065, and unified sub-groups C and D (3070, 3075) are each assigned a capacity of 3 channels (3080, 3085). As divided in the example of FIG. 21, the combined capacity of unified sub-groups A through D consume 20 channels 3090, thereby leaving 3 available for other purposes. Each of the unified sub-groups A through D may, in turn, be assigned and/or otherwise made available to the Clients A-D as illustrated in FIG. 21. For instances, Client A may associate one or more ODRGs with the unified sub-group A and, thus, persons associated with client A assigned to one of the associated ODRGs may have their outdial calls routed over the resources of the unified sub-group A.

As discussed above, unified sub-groups for outdial communications are categorized in at least three different ways. The first category, public unified sub-groups are, for example, circuit groups owned, leased or otherwise allocated to a primary host enterprise and intended for use by mass market customers, but may also be made available to one or more client enterprises. The second category, private unified sub-groups are, for example, circuit groups owned, leased or otherwise directly allocated and/or provisioned to a secondary host enterprise and/or a client enterprise. The third category, shared unified sub-groups are, for example, created from shared unified super-groups owned, leased or otherwise allocated to a primary host enterprise and then sub-divided into unified sub-groups which are then assigned and/or made available to one or more client enterprises needing or desiring a number of resources in addition to, or as an alternate to, any private unified sub-groups they may possess and/or have access to. While in the example system of FIG. 1 each shared unified sub-groups created from a shared unified super-group is assigned to only one client enterprise, and a private unified super-group may be associated with only one unified sub-group but may be made available to multiple client enterprises, persons of ordinary skill in the art will readily appreciate that any of a variety of mappings between unified super-groups, unified sub-groups and client enterprises may be implemented. As will be discussed later, a client enterprise may use a combination of unified sub-group types and the selection and/or utilization of such sub-groups may be feature dependent.

As discussed in Section VI, unified sub-groups may also be assigned to provide dedicated and/or shared resources for one or more specific features. Because outdial resources are limited, in the illustrated example some features are assigned and/or allocated more resources and, thus, a higher probability of successful completion when requesting to consume unified sub-group resources for an outdial communication service. For example, the host enterprise 3015 and/or a client enterprise may define Reminder features to take precedence over a Live Reply feature so that subscribers are more likely to receive, for example, their wake-up call on time. Of course, a feature can only complete via a given unified sub-group if the unified sub-group has available resources that are not already consumed by another service. Therefore, when both a Reminder and a Live Reply feature compete for unified sub-group resources, if, as in the above example, the Reminder service is assigned more resources, the resources in contention are, generally, more likely to be available to the Reminder feature than to the Live Reply feature. In other words, because there are limited network resources in any given unified sub-group, to the extent network demand is sufficiently high to exceed those resources, the resources required to perform the Reminder feature are more likely to be available to execute that feature than the resources required to perform the Live Reply feature, if the unified sub-group is configured to assign more resources to the Reminder feature relative to the Live Reply feature. It will be understood that even though a service is assigned more resources than others services, there may not be resources available to complete resource request for either service.

Returning to FIG. 20, the feature resource assigner module 3100 facilitates defining the partitioning of the resources of a unified sub-group on a feature by feature basis. As discussed earlier, the host enterprise 3015 and/or a client enterprise may access the feature resource assigner module 3100 via the communication device(s) 3025 through, for example, dynamic web-pages and/or a graphical and/or command-line user interface, a kiosk, or other user interface. FIG. 22 illustrates an example unified sub-group configuration table 3110 containing parameters at least some of which may be modified by the host enterprise 3015 and/or a client enterprise to assign resources of a unified sub-group to one or more features utilizing a unified sub-group. The example unified sub-group 3050 of FIG. 21 has a name SubGrp A (SG-A) 3120 and includes 10 channels 3130 available for dedication and/or assignment to one or more features (see FIG. 21). Of the 10 channels 3130, the unified sub-group SG-A 3120 allocates 6 channels 3140 to one or more features on a shared basis. As was discussed with reference to FIG. 21, in this example the unified sub-group SG-A 3050 has a total capacity of 10 channels and the example configuration of FIG. 22 allocates 6 of those channels to shared features. Thus, the illustrated example leaves a maximum of 4 remaining channels for dedication to various features. In the illustrated example, the features capable of consuming SG-A 3120 resources include Live Reply 3145, Auto Attendant 3150, Notifications 3155, Reminders 3160, and Fax 3165. The total of the dedicated capacities over all the features cannot exceed the dedicated capacity for SG-A (in this example, 4 channels). In the example of FIG. 22, the Live Reply feature 3145 has a shared limit of 3 and a dedicated limit of 2. Therefore, a maximum of 5 channels may be used to service the Live Reply feature at any given time. Because only 2 channels are dedicated to the Live Reply 3150 feature, in the example of FIG. 22, a maximum of 2 channels may be used to accommodate Live Reply callers at any given time. Dedication of resources to real time features such as Live Reply and Auto Attendant may improve the likelihood of a resource being available to those features, while features deemed less important (e.g., non-real-time features) may, for example, only be allocated shared resources.

FIG. 23 illustrates another example unified sub-group configuration table 3170 whose parameters have been defined by interaction with the feature resource assigner 3100. The table 3170 illustrates another example configuration of the example unified sub-group SubGrp A 3050 of FIG. 21 which is again labeled SG-A 3120 in FIG. 23. The example unified sub-group SG-A 3120 is defined to have 10 available dedicated channels 3130 (see FIG. 21) of which 10 are available as shared channels 3185 in the example of FIG. 23. Unlike the example of FIG. 22, the example unified sub-group configuration illustrated in FIG. 23 assigns all of its channels to features in a shared manner. None of its channels are dedicated to any particular feature. With the exception of the Live Reply feature 3190, all of the other features may share the unified sub-group SG-A 3120 equally, up to the physical limit imposed by the total number of channels in the sub-group (i.e., 10). However, the Live Reply feature 3190 is restricted such that it may consume no more than 2 channels at any given time. In the illustrated example of FIG. 23, four out of the five example features (i.e., Auto Attend, Notification, Reminders, and Fax) have the capability of entirely consuming the sub-group resources because none of the features are provided with dedicated channels and no limit, other than the physical limit of the 10 channels in the sub-group, is imposed in the "Limit On Shared" column. Of course, whenever one feature is consuming all of the resources, other features are blocked. To distribute the resource use such that no single features may, in itself, entirely consume all of the resources, the "Limit On Shared" values for each of the shared features may be reduced to a number less than the amount of physically available channels (e.g., to a number less than 10 such as, for instance, 5). Limiting each feature to, for example, using a maximum of 5 channels at any given time (e.g., by setting the "Limit On Shared" field to 5 for each feature) would limit each feature to using no more than 50% of the total capacity of the sub-group at any given time, thereby permitting one or more other features to function simultaneously, while leaving open the possibility that two of the features may consume 100% of the capacity at any given time. Of course, other limits on shared resources may be implemented to achieve other results.

Figure 24:
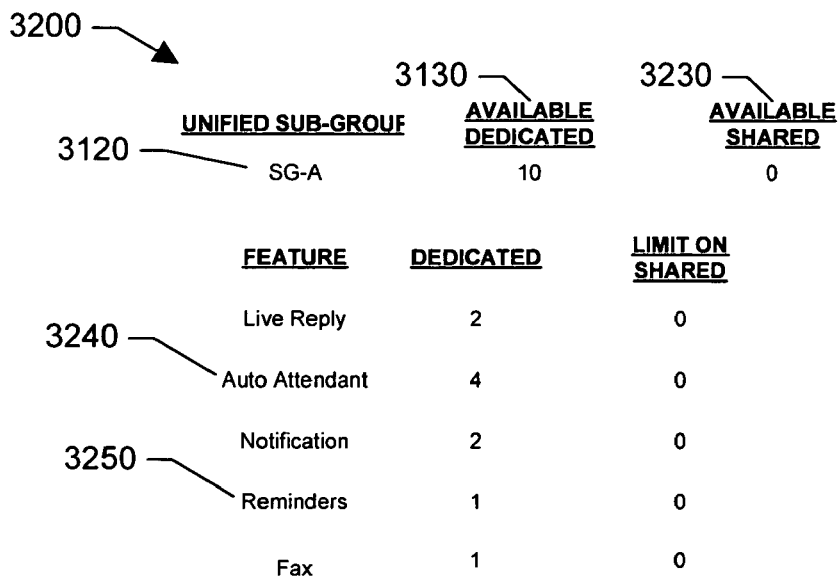
FIG. 24 is an example table illustrating still another example assignment of unified sub-group resources among a set of features.

FIG. 24 illustrates another example unified sub-group configuration table 3200 whose parameters have been set through interaction with the feature resource assigner 3100. The table 3170 illustrates another example configuration of the example unified sub-group SubGrp A 3050 of FIG. 21 which is again labeled SG-A 3120 in FIG. 24. In the illustrated example, unified sub-group SG-A 3120 has 10 channels 3130 (see FIG. 21). All of those 10 channels 3130 have been made available for dedication since no channels have been made available for sharing (i.e., there are not available shared channels 3230). In contrast with the example of FIG. 23 in which all of the channels were shared, in the example of FIG. 24 all of the channels are dedicated across the various features. For instance, 2 channels have been dedicated to the Live Reply feature, 4 channels have been dedicated to the Auto Attendant feature, 2 channels have been dedicated to the Notification feature, 1 channel has been dedicated to the Reminders feature, and 1 channel has been dedicated to the Fax feature.

Figure 25:
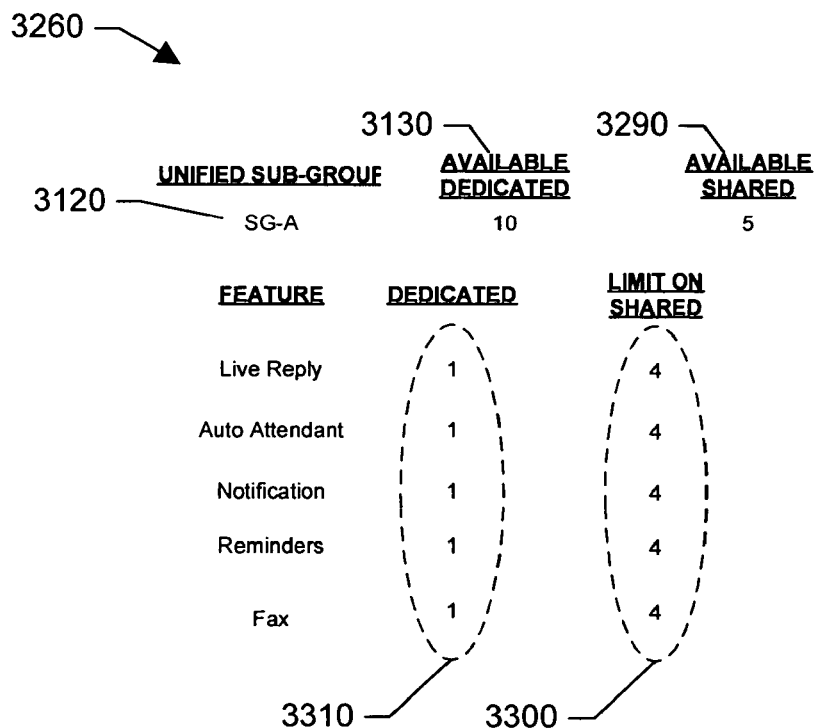
FIG. 25 is an example table illustrating yet another example assignment of unified sub-group resources among a set of features.

FIG. 25 illustrates yet another example unified sub-group configuration table 3260 whose parameters have been set through interaction with the feature resource assigner 3100. The table 3260 illustrates another example configuration of the example unified sub-group SubGrp A 3050 of FIG. 21 which is again labeled SG-A 3120 in FIG. 25. In the illustrated example, the unified sub-group SG-A 3120 has 10 available dedicated channels 3130 (see FIG. 21) of which 5 are allocated as shared channels 3290. However, each of the features applies a limit of only 4 shared channels 3300 and 1 dedicated channel 3310. As a result, no single feature can utilize more than 50% (i.e., 1 dedicated plus 4 shared equals 5 out of 10) of the total available channels at any time. As can be seen from the foregoing examples, unified sub-groups may be configured in such a manner to accommodate varying subscriber needs and/or enterprise priorities and/or preferences.

Returning to FIG. 20, the ODRG sub-group assigner module 3320 facilitates assignment of ODRGs to a unified sub-group. As discussed, above, the host enterprise 3015 or a client enterprise (e.g., Client A or B of FIG. 21) may interact with the ODRG sub-group assigner module 3320 via the communication device(s) 3025 to associate an ODRG with a unified sub-group. For example, a client enterprise may associate one or more of their ODRGs with one or more unified sub-groups that have been assigned and/or made available (i.e., exported) to the client enterprise by a host enterprise and with one or more private sub-groups possessed by the client enterprise. For instance in the example system of FIG. 1, a shared unified sub-group made available by a primary host enterprise or a private unified sub-group made available by a secondary host enterprise. As discussed above, ODRGs facilitate a flexible method of assigning, allocating and sharing communication resources.

As will be discussed more fully in connection with the policy server 150, when an outdial service call is initiated by a subscriber, the ODRG associated with a subscriber dictates which unified sub-group types may be used to accommodate the outdial communication service request. In particular, in the illustrated example, every subscriber, call tree subscriber number, and/or CTAN is assigned to an ODRG. Further, every ODRG is associated with one or more unified sub-group types. Therefore, assigning a subscriber, call tree subscriber number, and/or CTAN to an ODRG allows the example system of FIG. 1 to determine the communication resources that may be used for outdial communication services.

Returning to FIG. 20, the ODRG sub-group assigner 3320 facilitates the creation of unified sub-groups and editing of the properties of newly created and/or existing unified sub-groups. For instance, the example ODRG sub-group assigner 3320 of FIG. 20 interacts with an administrator of the host enterprise 3015 or a client thereof via the communication device(s) 3025 to name one or more unified sub-groups and define its properties. Defining the properties of a sub-group includes, for example, assigning one or more available ODRGs to the unified sub-group.

Figure 26A:
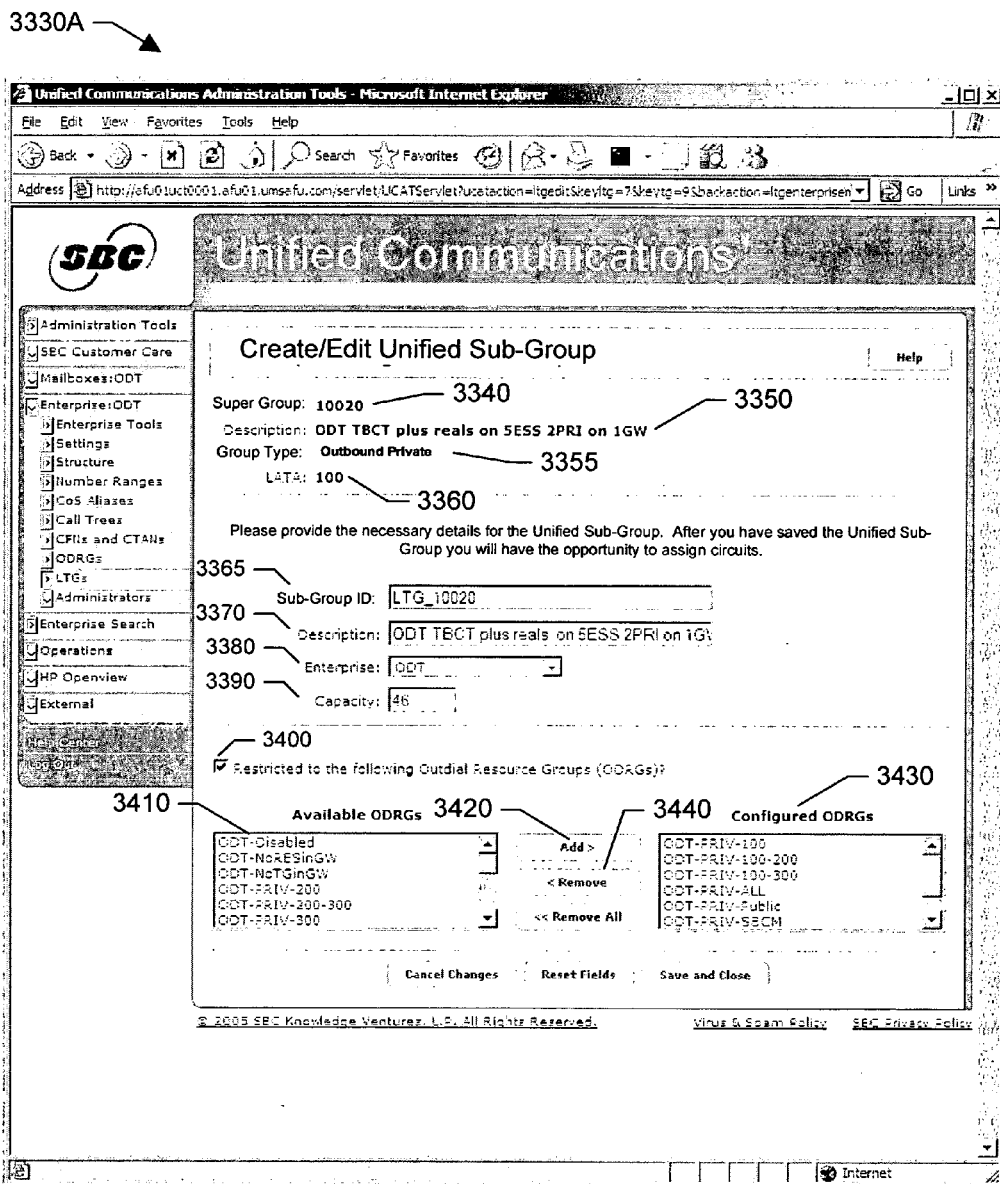
FIGS. 26A and 26B are example unified sub-group creation and editing interfaces for the example ODRG subgroup assignor of FIG. 20.

An example graphical user interface (GUI) 3330A provided by the ODRG sub-group assigner 3320 for creating and editing unified sub-groups is shown in FIG. 26A. As shown in FIG. 26A, the interface 3330A may be implemented as a web page, or by any other format. A client enterprise may use the example interface 3330A to configure both unified sub-groups assigned and/or available to the client enterprise by the host enterprise 3015 and the unified sub-groups owned directly by the client enterprise. The host enterprise uses the example interface 3330A to configure only those unified sub-groups owned by the host enterprise. As also shown in FIG. 26A, creation or editing of a unified sub-group will occur in view of the unified super-group to which it is associated and/or belongs (i.e., its parent) and, accordingly, not all parameters of a unified sub-group are editable via the ODRG sub-group assigner 3320. For example, some parameters of the unified super-group are defined by the host enterprise 3015 and are not subject to change by a client enterprise (e.g., an administrator of the client enterprise) via the ODRG sub-group assigner 3320. Further, the ODRG sub-group assigner 3320 of the illustrated example is not structured to modify properties of the unified super-group. Thus, for example, as identified at the top of the example GUI 3330A, the name of the unified super group 3340 associated with the unified sub-group is determined and set by the host enterprise 3015 via the super-group assigner module 3030. Similarly, the description of the unified super group 3350 is a function of the unified super-group and is not a parameter that is editable by the ODRG sub-group assigner 3320. As a further example, the group type 3355 is set by the host enterprise 3015 and is not editable via the ODRG sub-group assigner 3320. Similarly, the LATA 3360 with which the unified sub-group is associated is a function of the physical location of communication resources associated with the unified sub-group and is, thus, not subject to change. Further, an enterprise identifier 3380 to which the unified sub-group belongs is not editable via the ODRG sub-group assigner 3320. Additionally, the capacity 3390 of the unified sub-group is a limitation of the unified sub-group set by the host enterprise 3015 and is not editable via the ODRG sub-group assigner 3320.

In the illustrated example, unified sub-group creation and editing is performed by modifying one or more fields in the GUI 3330A. Example editable fields include, but are not limited to, a unified sub-group ID 3365 (i.e., a name for the unified sub-group), and a unified sub-group description 3370 (e.g., an explanation of a characteristic of the sub-group).

Each unified sub-group is associated with a list of one or more ODRGs that represent which subscribers (e.g., employees, students, etc. of a client enterprise) may have access to its resources. By default, in the illustrated example all ODRGs associated with a unified sub-group type can use the resources of a unified sub-group having the matching unified sub-group type. However, if the "Restricted to the following Outdial Resource Groups (ODRGs)" check-box 3400 is selected in FIG. 26A, then specific ODRGs may be associated and/or disassociated with/from the unified sub-group, thus, overriding the default condition of an ODRG. The ODRG management option (check-box 3400) permits the host enterprise 3015 or a client enterprise to manage ODRG resources.

The example configuration interface 3330A of FIG. 26A includes a list of available ODRGs 3410. Any of the ODRGs in the list 3410 may be associated with the unified sub-group by selecting an ODRG from the list 3410 and choosing an add function 3420. ODRGs that are associated with the unified sub-group are listed in a configured ODRG list 3430. ODRGs in the configured ODRG list 3430 may be disassociated from the unified sub-group by selecting the ODRG and choosing a remove function 3440. Indial and outdial calls associated with subscribers, call tree subscriber numbers and/or CTANs belonging to any of the ODRGs listed in the configured ODRG list 3430 may use the unified sub-group listed in the unified sub-group ID 3365.

In addition to the editing restrictions mentioned above, various restrictions may be applied to types of information a client enterprise can view via the ODRG sub-group assigner 3320. For example, a client cannot edit or view the assigned and/or partitioned resources underlying a unified sub-group, however, may be able to view resource parameters assigned or leased to another client enterprise, etc. It will be readily apparent to persons of ordinary skill in the art that a messaging and/or communication system and/or service may implement alternative and/or additional restrictions to those described above in connection with FIGS. 26A-B and below in connection with FIGS. 27 and 28.

Figure 26B:
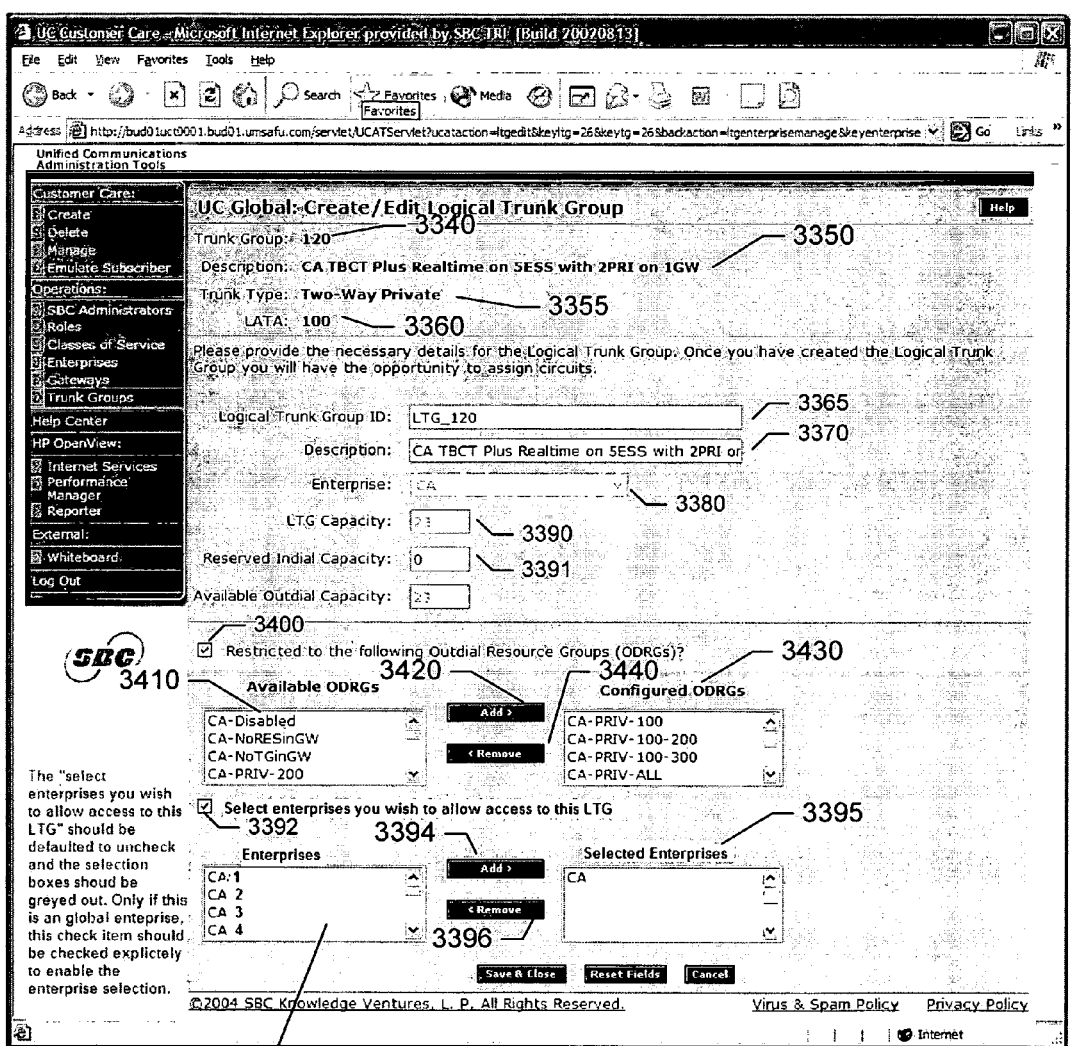

An example graphical user interface (GUI) 3330B provided by the ODRG sub-group assigner 3320 for creating and editing unified sub-groups is shown in FIG. 26B by an administrator of the host enterprise 3015. As shown in FIG. 26B, the interface 3330B may be implemented as a web page, or by any other format. Without any loss of generality, in the illustrated example of FIG. 26B unified sub-groups are referred to as logical trunk groups. The example interface 3330B is similar to the example interface 3330A of FIG. 26A and, thus, the description of portions of FIG. 26B will not be repeated here. Instead, the interested reader is referred back to the corresponding description of FIG. 26A. To facilitate this process, like elements have been numbered with like reference numerals in FIGS. 26A and 26B.

The example configuration interface 3330B of FIG. 26B includes an editable field 3391 to specify the number of resources of the unified sub-group reserved for indial calls. Each unified sub-group is also associated with a list of one or more client enterprises may have access to its resources. By default, in the illustrated example all client enterprises are associated with a unified super-group and can use the resources of the unified sub-group. However, if the "Select enterprises you wish to allow access to this LTG" check-box 3392 is selected in FIG. 26B, then specific client enterprises may be associated and/or disassociated with/from the unified sub-group, thus, over-riding the default condition of a unified sub-group. In the example system of FIG. 1, the example interface 3330B is used by a host enterprise 3015 for configuring two-way private unified sub-groups. However, persons of ordinary skill in the art will readily appreciate that the example interface 3330B could be used by a host enterprise 3015 to associate client enterprises with other types of unified sub-groups.

The example configuration interface 3330B of FIG. 26B includes a list of available client enterprises 3393. Any of the client enterprises in the list 3393 may be associated with the unified sub-group by selecting a client enterprise from the list 3393 and choosing an add function 3394. Client enterprises that are associated with the unified sub-group are listed in a selected client enterprises list 3395. Client enterprises in the selected client enterprise list 3395 may be disassociated from the unified sub-group by selecting the client enterprise and choosing a remove function 3396. Indial and outdial calls associated with subscribers, call tree subscriber numbers and/or CTANs belonging to any of the client enterprises listed in the selected client enterprise list 3396 may use the unified sub-group listed in the unified sub-group ID 3365 (assuming they also belong to a configured ODRG for the unified sub-group).

Returning to FIG. 20, the example resource assigner 3005 includes an ODRG resource assigner module 3450 to facilitate ODRG parameter configuration. For instance, the example ODRG resource assigner module 3450 of FIG. 20 interacts with an administrator from the host enterprise 3015 or a client enterprise thereof via the communication device(s) 3025 to enable and/or disable features for the ODRG and/or to determine the type(s) of unified sub-groups (e.g., private, public, etc.) that may be used to route an outdial service.

Figure 27:
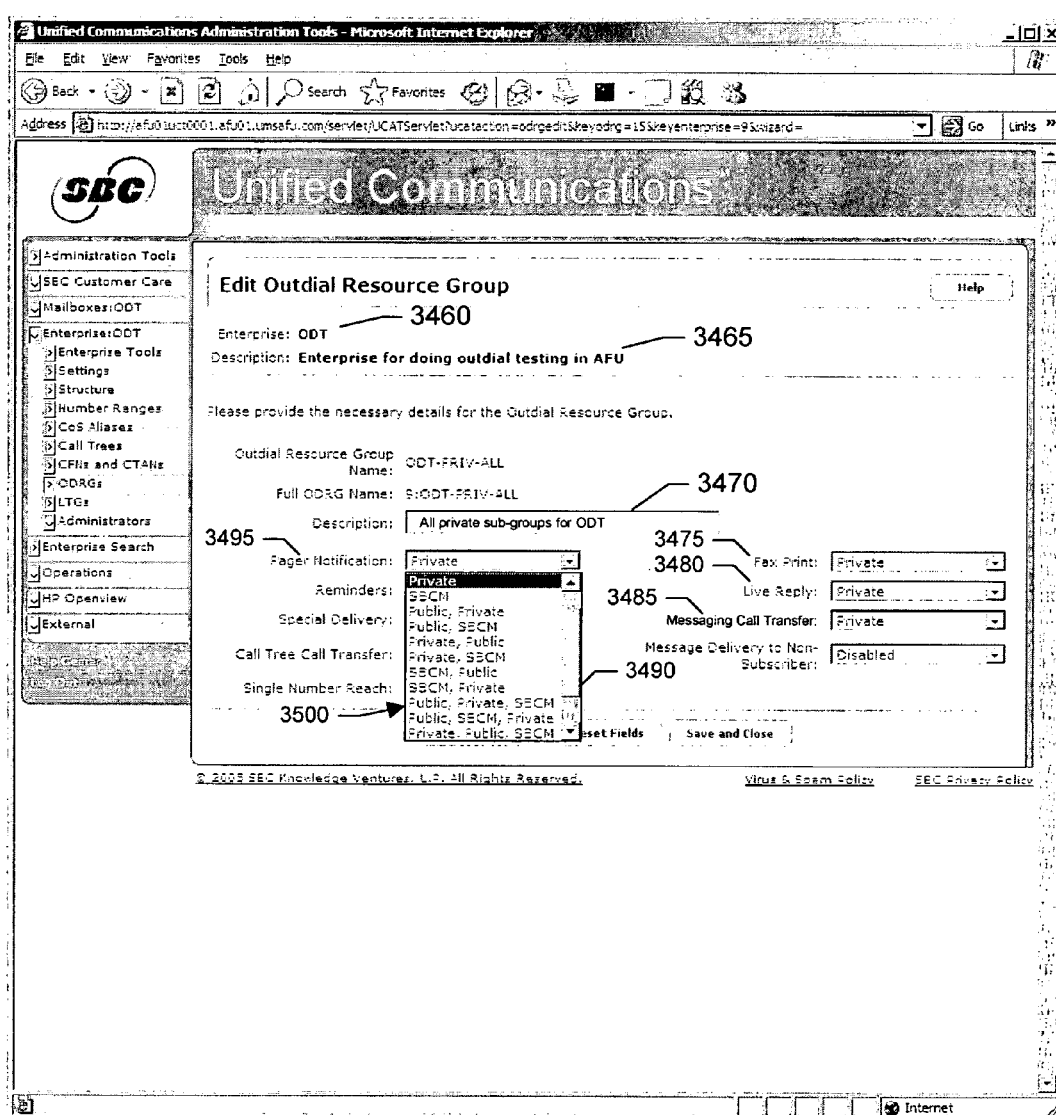
FIG. 27 is an example outdial resource group editing interface for the example ODRG resource assignor of FIG. 20.

An example Internet-based graphical user interface 3455 provided by the example ODRG resource assigner module 3450 of FIG. 20 is shown in FIG. 27. In the example GUI of FIG. 27, various parameters of the ODRG are identified at the top of the screen 3455 including, but not limited to, an enterprise identifier 3460 to which the ODRG belongs, and an enterprise description 3465. In the illustrated example, editing of ODRG may include editing an ODRG description 3470 and/or editing unified sub-group type usage and prioritization for various features. For instance, in the illustrated example, the Fax Print feature 3475, the Live Reply feature 3480, and the Messaging Call Transfer feature 3485 are all assigned to only utilize unified sub-groups have a unified sub-group type of private.

In the example of FIG. 27, unified sub-group type assignments may be made to various features. For example, the example GUI of FIG. 27 includes a drop-down selection box 3490 for a Pager Notification feature 3495. Selections within the drop-down selection box 3490 identify various permutations of unified sub-group types, in prioritized order, to be used, as described above, when authorizing and/or routing an outdial communication service. For example, a selection of "Public, Private, SBCM" 3500 indicates that the Pager Notification feature 3495 first attempts to use public unified sub-groups, then private unified sub-groups, and finally SBCM unified sub-groups. In the example of FIG. 27, a SBCM unified sub-group type refers to a shared unified sub-group type. Similar drop-down selection boxes are provided for the other features on the GUI 3455.

Returning to FIG. 20, the example resource assigner 3005 includes a subscriber assigner module 3505 to facilitate the assignment of subscribers to ODRGs. For instance, the example subscriber assigner module 3505 of FIG. 20 interacts with an administrator from the host enterprise 3015 or a client enterprise thereof via the communication device(s) 3025 in order to associate a particular subscriber with a particular ODRG.

Figure 28:
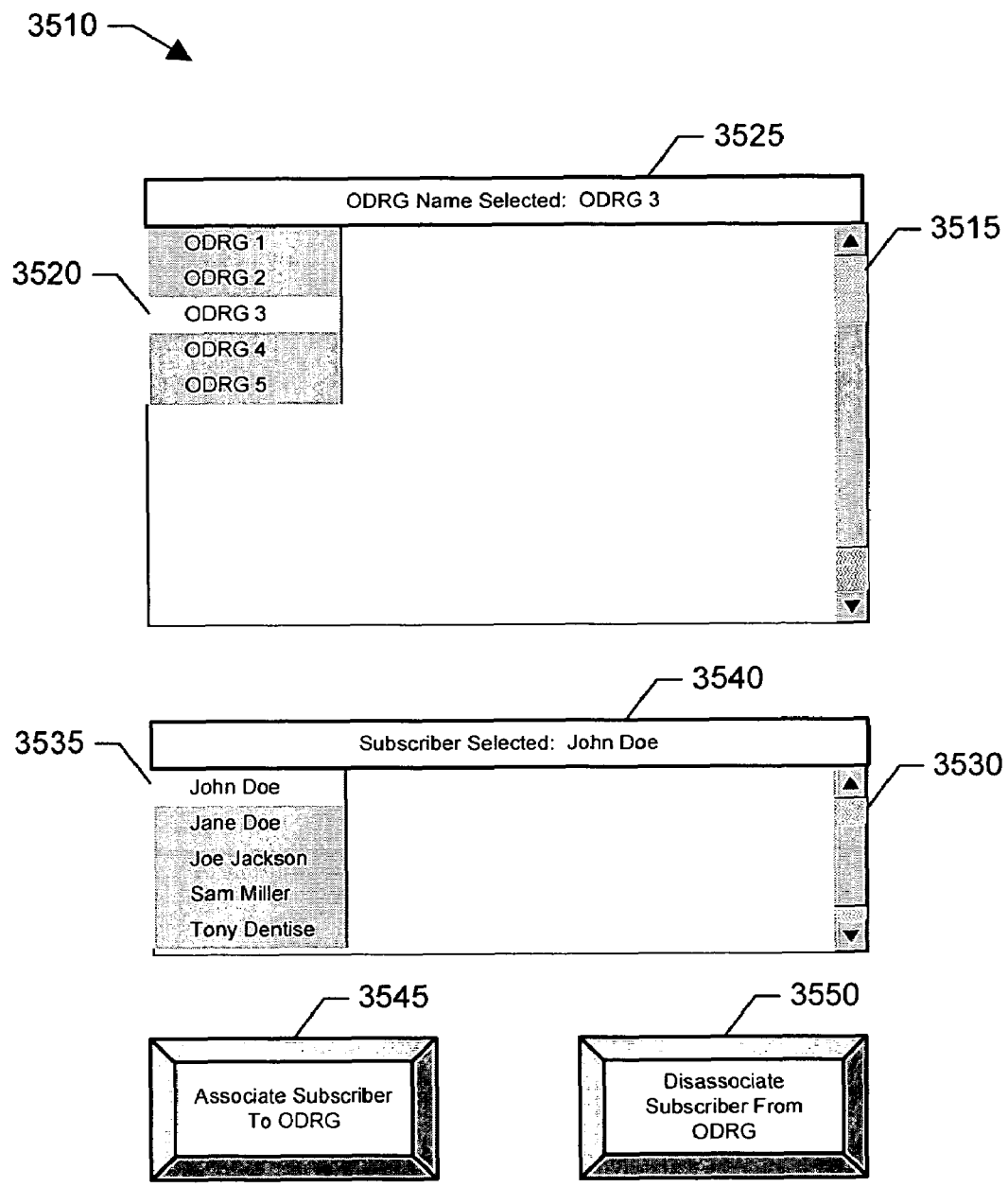
FIG. 28 is an example subscriber assigning interface for the example subscriber assignor of FIG. 20.

An example Internet-based graphical user interface 3510 provided by the example subscriber assigner module 3505 of FIG. 20 is shown in FIG. 28. In the example GUI of FIG. 28, selection of an ODRG from a drop down field 3515 and selection of a subscriber from a drop-down field 3530 is enabled to associate or disassociate the selected subscriber and the selected ODRG. In the example of FIG. 28, ODRG 3 3520 has been selected and is displayed on a selection indicator 3525. Similarly, John Doe has been selected 3535 and is displayed on a subscriber selection indicator 3540. After the ODRG and subscriber are selected, either an associate button 3545 or disassociate button 3550 may be selected to associate or disassociate the selected subscriber to/from the selected ODRG, respectively. The assignment of subscribers to ODRGs in the example system of FIG. 1, allows a host enterprise and/or a client enterprise to specify which subscribers have access to which sets of unified sub-groups (i.e., shared communication resources).

In the example system of FIG. 1, mass market subscribers of a host enterprise are associated with a mass market ODRG and public unified sub-groups are implicitly associated with the mass market ODRG. It will be apparent to persons of ordinary skill in the art that a communications and/or messaging system may, for mass market subscribers, associate ODRGs and unified sub-groups differently.

The combination of ODRGs and the sharing of unified sub-groups allows the client enterprise 3045 to implement hybrid ODRGs. A hybrid ODRG may point to one or more unified sub-group types that are privately owned by the client enterprise 3045 (FIG. 21) (e.g., a private PSTN based unified sub-group purchased by the client enterprise 3045) and to one or more other unified sub-groups that are shared by one or more client enterprises (e.g., a private unified sub-group made available by the host enterprise to the client enterprise 3045 and, potentially, to other client enterprises). For instance, the client enterprise may utilize VoIP telephony and messaging services provided by the host enterprise for a first set of persons (e.g., employees) together with messaging services provided by the host enterprise for PSTN based persons. Such a client enterprise, thus, contains, for example, mailboxes that are both PSTN and VoIP based. As a result, employing hybrid ODRGs permits outdial support for subscribers having access points, accounts and/or mailboxes that are associated with dissimilar unified sub-groups and/or communications networks.

Figure 29:
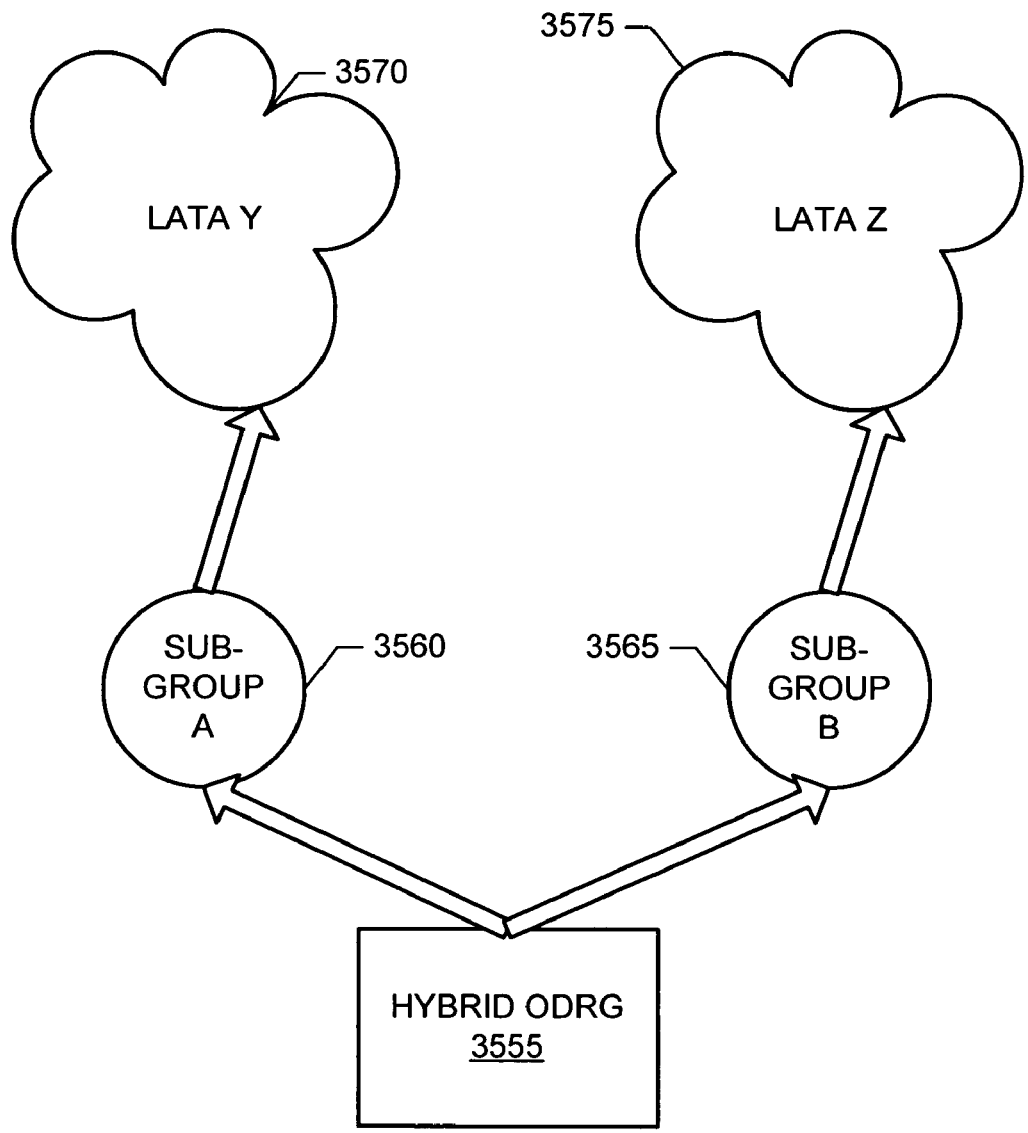
FIG. 29 is a schematic illustration of an example hybrid ODRG structure.

For example, FIG. 29 illustrates a subscriber's hybrid ODRG 3555, a sub-group A 3560, and sub-a group B 3565. For example, the client enterprise may have be assigned and/or have had the unified sub-group A 3560 made available by a host enterprise (e.g., a VoIP unified sub-group) and may own the unified sub-group B 3565 (e.g., a private PSTN unified sub-group). As a result, the subscriber's hybrid ODRG 3555 references both unified sub-groups (3560, 3565) to better facilitate various indial and/or outdial communication features. The hybrid ODRG permits, for example, entering the host enterprise's messaging platform via one network (e.g., PSTN or VoIP) or LATA Y 3570 and then attempts to exit the platform to another network (e.g., VoIP or PSTN) or LATA Z 3575. For instance, it is possible to enter a call tree via the host provided sub-group B 3565 (e.g., VoIP) and then transfer to a mailbox that is PSTN based and, thus, would normally have used the client enterprise's unified sub-group 3560 to enter the platform. Since there may not be a PSTN unified sub-group (i.e., a client unified sub-group) in the indial gateway LATA of the call tree, the mailbox may need access to the host's unified sub-group 3565 to authorize and/or allocate any subsequent outdial communication service if, for example, an outdial is restricted to exiting the messaging platform via the indial gateway LATA.

Flowcharts representative of example machine readable instructions for implementing the resource assigner 3005 of FIGS. 19 and 20 are shown in FIGS. 30-35. In this example, the machine readable instructions comprise a program for execution by: (a) a processor such as the processor 8010 shown in the example computer 8000 discussed below in connection with FIG. 55, (b) a controller, and/or (c) any other suitable processing device. The program may be embodied in software stored on a tangible medium such as, for example, a flash memory, a CD-ROM, a floppy disk, a hard drive, a digital versatile disk (DVD), or a memory associated with the processor 8010, but persons of ordinary skill in the art will readily appreciate that the entire program and/or parts thereof could alternatively be executed by a device other than the processor 8010 and/or embodied in firmware or dedicated hardware in a well known manner (e.g., it maybe implemented by an application specific integrated circuit (ASIC), a programmable logic device (PLD), a field programmable logic device (FPLD), discrete logic, etc.). For example, any or all of the resource assigner 3005, the super-group assigner module 3030, the feature resource assigner 3100, the ODRG sub-group assigner 3320, the ODRG resource assigner 3450 and/or the subscriber assigner 3505 could be implemented by software, hardware, and/or firmware. Also, some or all of the machine readable instructions represented by the flowcharts of FIGS. 30-35 may be implemented manually. Further, although the example program is described with reference to the flowcharts illustrated in FIGS. 30-35, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 30:
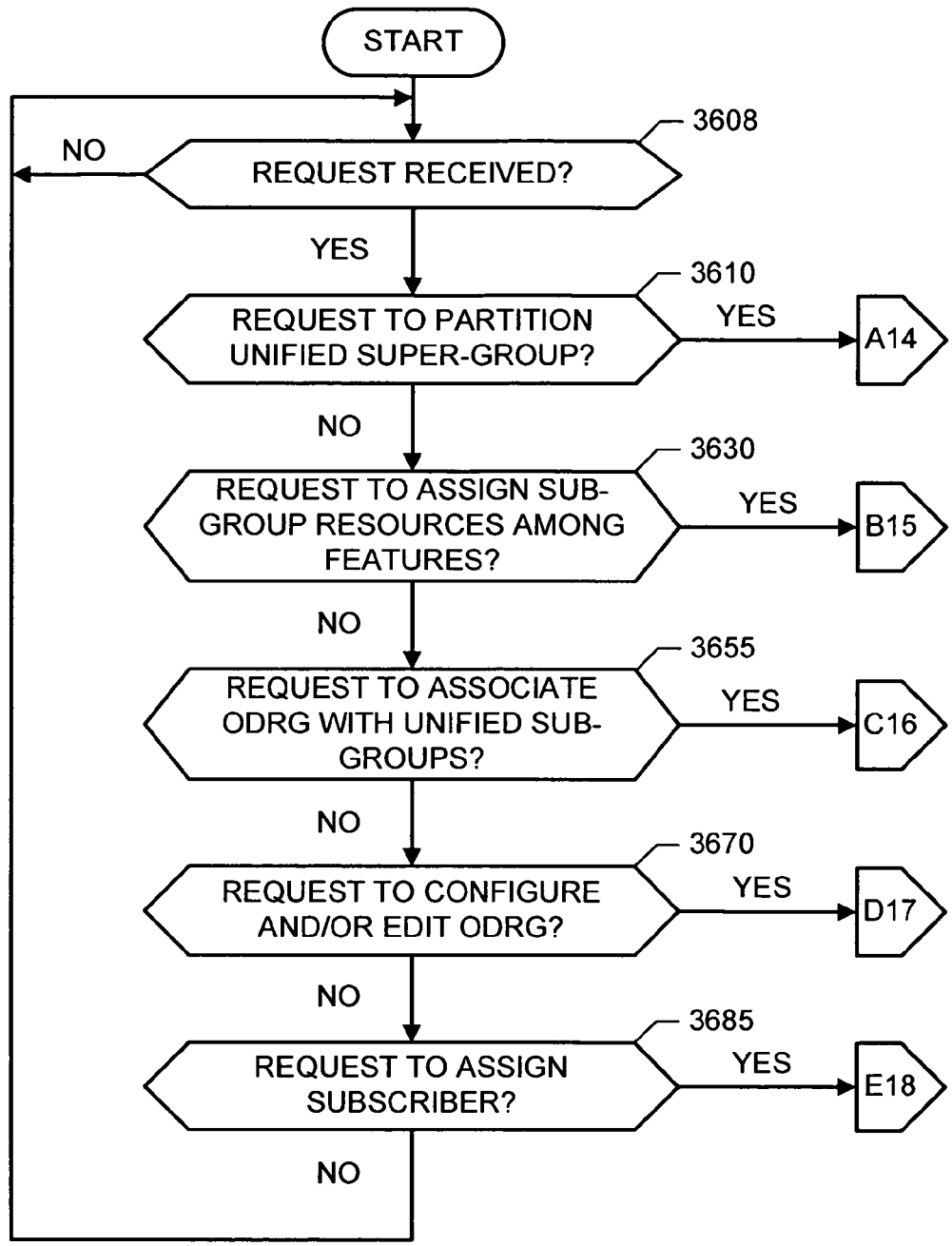
FIGS. 30-35 are flowcharts representative of example machine readable instructions which may be executed to implement the example resource assigner 3005 of FIGS. 19-20.
Figure 31:
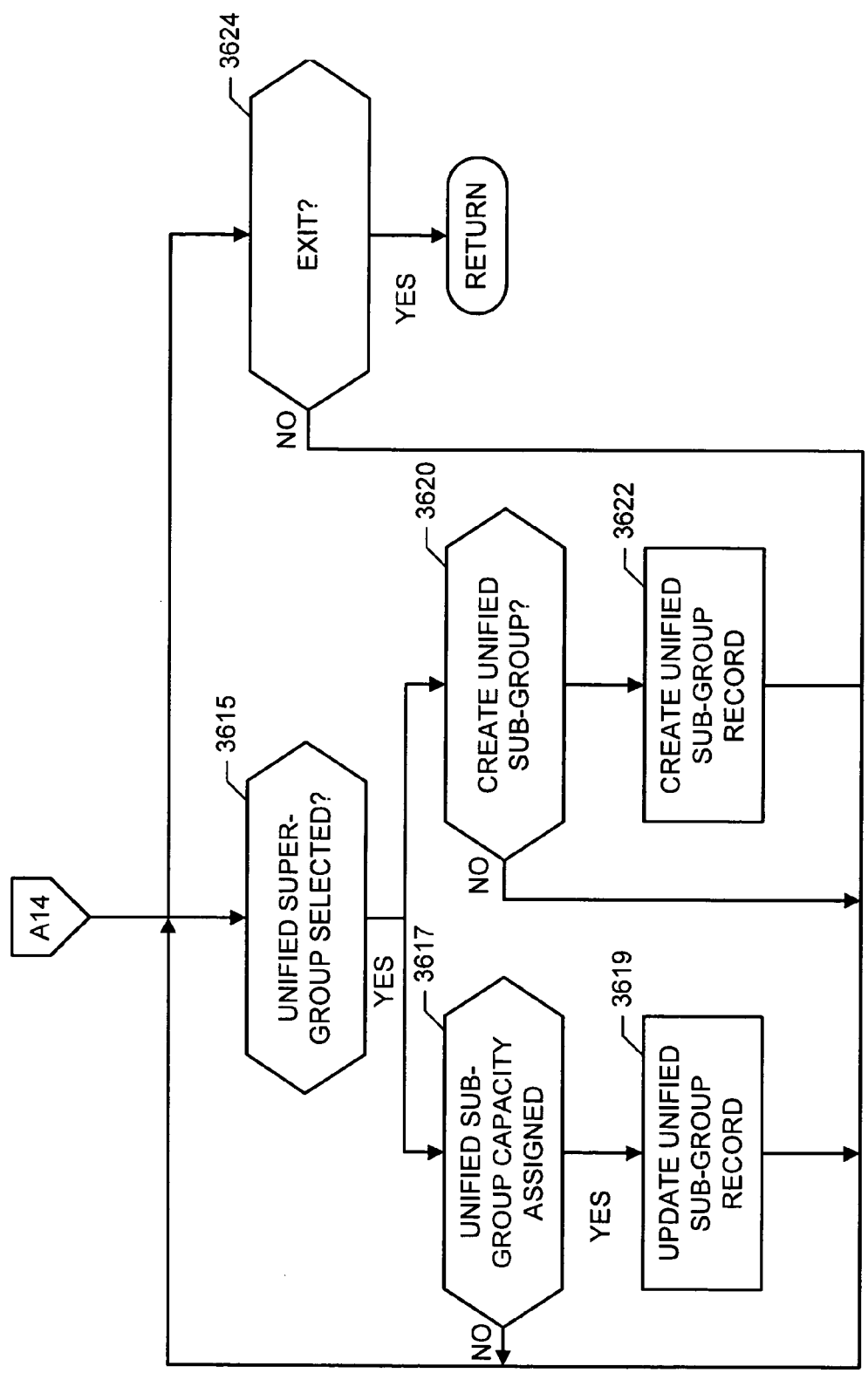

The example machine readable instructions of FIG. 30 begin with the resource assigner 3005 waiting to receive a communication from a user such as an administrator of the host enterprise 3015 or an administrator of a client enterprise (block 3608). When a communication is received, the resource assigner 3005 examines the instruction to determine if it is a request to interact with the super-group assigner module 3030, the feature resource assigner 3100, the ODRG sub-group assigner 3320, the ODRG resource assigner 3450 and/or the subscriber assigner 3505. If the received communication is a request to access the super-group assigner 3030 to, for example, assign and/or partition a super-group (block 3610), control advances FIG. 31 where a graphical user interface is provided to the requesting user. The graphical user interface provides the user with an opportunity to select a unified super-group (block 3615) or to exit from the graphical user interface (block 3624). When a unified super-group (e.g., the unified super-group 3035 of FIG. 21) is selected (block 3615), the super-group assigner module 3030 retrieves the record of the selected unified super-group from the operations database 160. The super-group assigner module 3030 then provides the user with an opportunity to create a new unified sub-group from the selected super-group (block 3620) and/or to adjust the capacity of existing unified sub-groups associated with the selected super-group (block 3617). In the example of FIG. 31, the super-group assigner module 3030 enables the user to indicate a desire to create a new unified sub-group by entering a unique unified sub-group name (e.g., sub-group A) in a field of a graphical user interface (block 3620). When such an input is received, the super-group assigner module 3030 creates a new unified sub-group record within the operations database 160 (block 3622).

If at block 3617, the super-group assigner module 3030 determines that the user has entered a new value in the capacity field associated with a unified sub-group, the super-group assigner module 3030 updates the record of the corresponding unified sub-group to reflect the capacity assignment (block 3619). The total capacity of the unified super-group may be allocated among one or more unified sub-groups in any desired fashion as described above. For example, the example unified sub-groups of FIG. 21 were assigned, respectively, 10 channels for sub-group A 3050, 4 channels for sub-group B 3060, and 3 channels for sub-groups C 3070 and D 3075.

Whenever a user adjusts the capacity of a unified sub-group (Blocks 3617 and 3619) or creates a new unified sub-group (blocks 3620 and 3622), control returns to the top of the flowchart of FIG. 31, where the user is provided the opportunity to select a different unified super-group (block 3615), to exit the super-group assigner module 3030 (block 3624) such that control returns to the example machine readable instructions of FIG. 30, to create another unified sub-group for the currently selected super-group (block 3620), and/or to adjust the capacity of an existing unified sub-group associated with the currently selected unified sub-group (block 3617).

Figure 32:
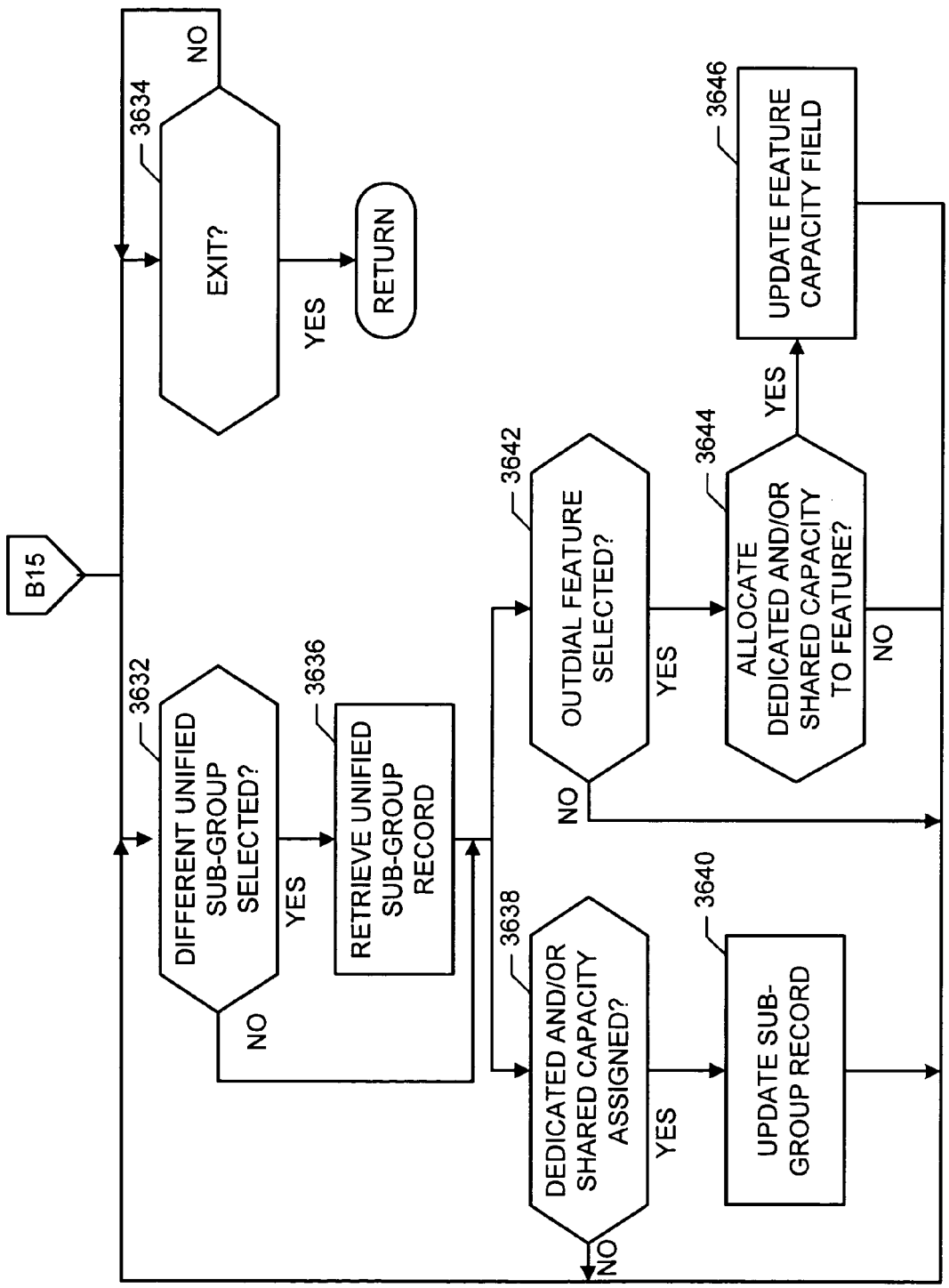

Returning to FIG. 30, if the received communication is a request to access the feature resource assigner 3100 to, for example, configure a unified sub-group (block 3630), control advances to FIG. 32 where a graphical user interface is provided to the requesting user. The graphical user interface provides the user with an opportunity to select a unified sub-group (block 3632) or to exit from the graphical user interface (block 3634). When a unified sub-group is selected (block 3632), the feature resource assigner 3100 retrieves the record for the selected unified sub-group from the operations database 160 (block 3636).

The feature resource assigner 3100 then provides the user with an opportunity to adjust the dedicated capacity and/or the shared capacity assigned to the selected sub-group (block 3638), and/or to select an outdial communication service type (i.e., feature) for capacity adjustment (block 3642). As noted above, the total capacity for a unified sub-group is set by the super-group assigner module 3030, not by the feature resource assigner 3100. However, the feature resource assigner 3100 provides the user with the opportunity to categorize the capacities of the unified sub-group into dedicated resources and shared resources on a per feature basis (block 3638). When the user enters a new value into the fields of the graphical user interface to indicate the division of resources between the dedicated and shared categories for a feature (block 3638), the feature resource assigner 3100 updates the record of the unified sub-group (block 3640).

Returning to block 3642 of FIG. 32, if a user selects an outdial feature, the graphical user interface associated with the feature resource assigner 3100 provides the user with the opportunity to define the number of dedicated resources and/or the number of shared resources that the currently selected unified sub-group is to assign to the currently selected feature (block 3644). The feature resource assigner 3100 stored the values (if any) entered into the dedicated and/or shared resource fields for the resource selected at block 3642 in the record for the unified sub-group (block 3646). An example of allocating the resources of a sub-group among features is shown in FIG. 22 where the Live Reply feature 3145 is shown to have been assigned a dedicated capacity of 2 channels and a shared capacity of 3 channels.

Whenever a user adjusts the dedicated and/or shared capacity of a unified sub-group (blocks 3638 and 3640), selects a feature (block 3642), and/or allocates dedicated and/or shared resources to a feature (blocks 3642 and 3644), control returns to the top of the flowchart of FIG. 32, where the user is provided the opportunity to select a different unified sub-group (block 3632) or to return to the example machine readable instructions of FIG. 30.

Figure 33:
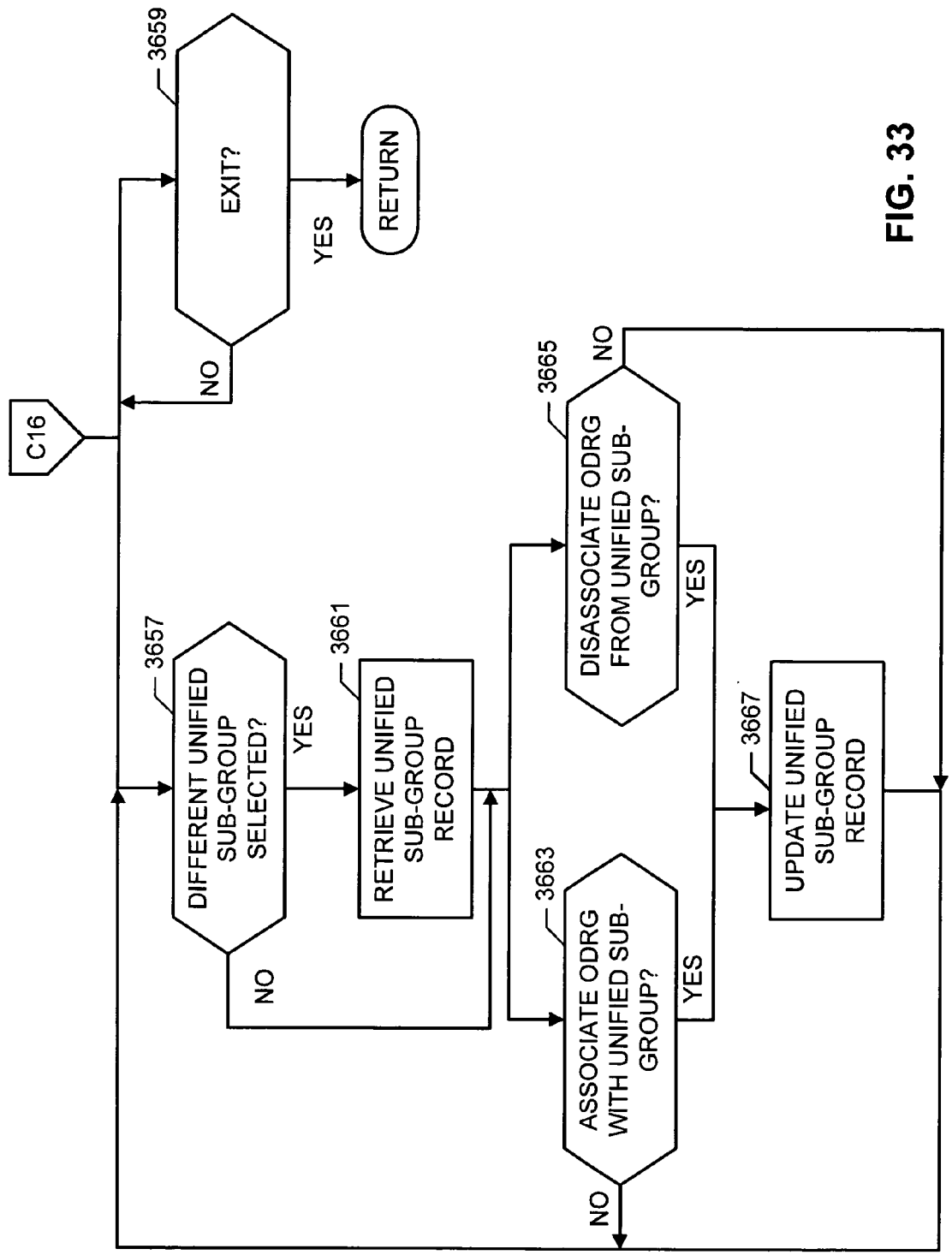

Returning to FIG. 30, if the received communication is a request to access the ODRG sub-group assigner 3320 to, for example, assign various ODRGs to one or more unified sub-groups (block 3655), control advances to FIG. 33 where a graphical user interface such as the graphical user interface shown in FIG. 26A is provided to the requesting user. The graphical user interface provides the user with an opportunity to select a unified sub-group (block 3657) or to exit from the graphical user interface (block 3659). When a unified sub-group is selected (block 3657), the ODRG sub-group assigner 3320 retrieves the record for the selected unified sub-group from the operations database 160 (block 3661). As shown in the example of FIG. 26A, a sub-group may be selected by, for example, entering its name in the Sub-Group Id field 3365 or selecting its name from a drop down menu associated with that field 3365.

Once a unified sub-group is selected (block 3657), the ODRG sub-group assigner 3320 provides the user with an opportunity to associate an ODRG with the selected sub-group (block 3663) or to disassociate an ODRG from the selected sub-group (block 3665). In the example of FIG. 26A, this opportunity is provided by enabling the user to select one or more ODRGs from a list 3410 of available ODRGs and/or a list 3430 of ODRGs already associated with the sub-group selected at block 3657. If the user enters an instruction to associate an ODRG with the sub-group (block 3663) and/or to disassociate an ODRG from the sub-group (block 3665), the ODRG sub-group assigner 3320 updates the record of the unified sub-group to reflect the change (block 3667).

Whenever a user associates or disassociates an ODRG with/from a sub-group (block 3663 or 3665), control returns to the top of the flowchart of FIG. 33, where the user is provided the opportunity to select a different unified sub-group (block 3657), to exit the ODRG sub-group assigner 3320 (block 3659) such that control returns to the example machine readable instructions of FIG. 30, to associate another ODRG with the currently selected unified sub-group (block 3663), and/or to disassociate another ODRG from the currently selected unified sub-group (block 3665).

Figure 34:
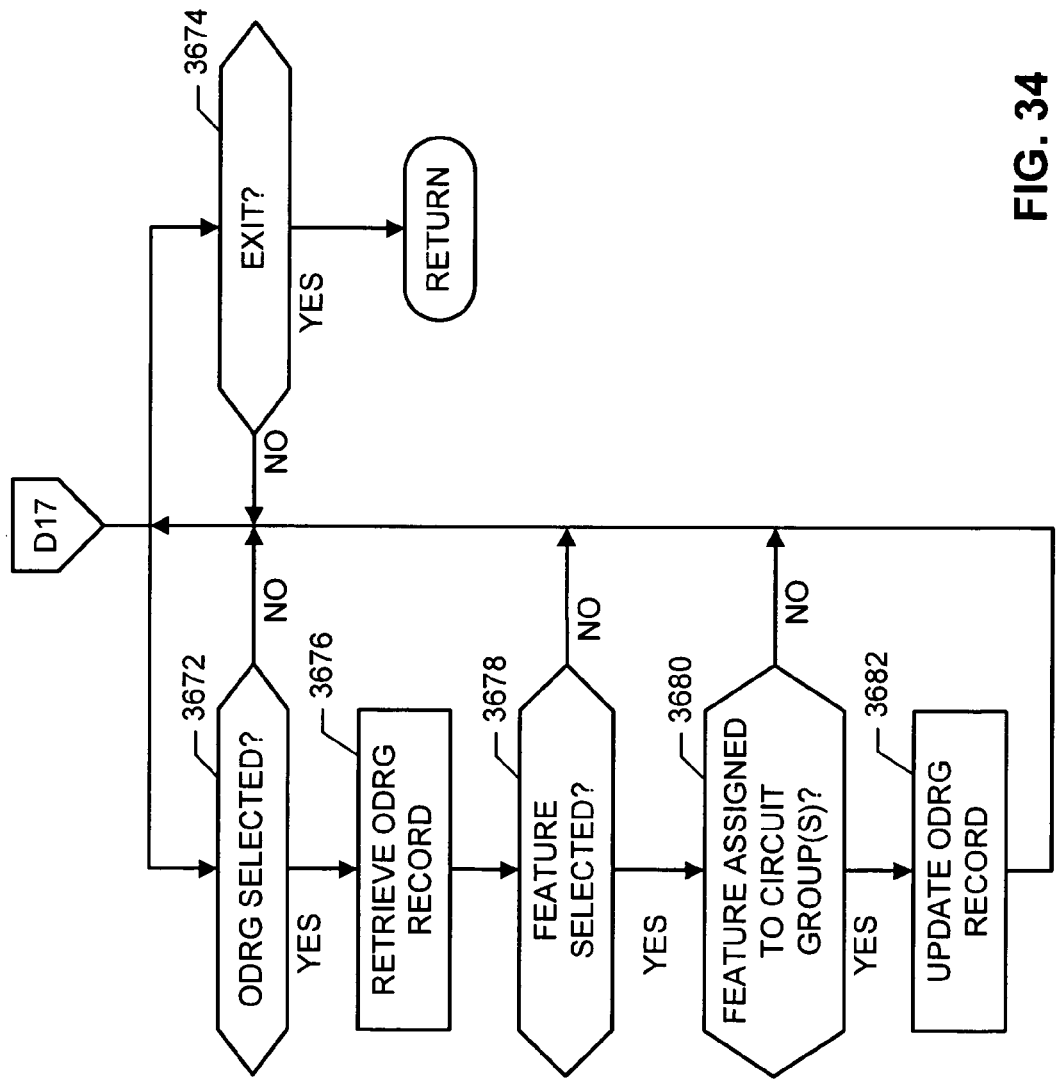

Returning to FIG. 30, if the received communication is a request to access the ODRG resource assigner 3450 to, for example, indicate the unified sub-group resources that a selected ODRG is to use to implement various features (block 3670), control advances to FIG. 34 where a graphical user interface (e.g., the graphical user interface of FIG. 27) is provided to the requesting user. The graphical user interface provides the user with an opportunity to select an ODRG (block 3672) or to exit from the graphical user interface (block 3674) of the ODRG resource assigner 3450 such that control returns to the example machine readable instructions of FIG. 30. When an ODRG is selected (block 3672), the ODRG resource assigner 3450 retrieves the record for the selected ODRG from the operations database 160 (block 3676).

Once an ODRG is selected (block 3672), the ODRG resource assigner 3450 provides the user with an opportunity to select a feature (block 3678). In the example of FIG. 27, selection of a feature at block 3678 results in a drop down menu wherein a user can select one or more types of unified sub-groups that may be used by the ODRG in servicing the associated feature and/or the user can disable the feature for the selected ODRG (block 3680). If one or more unified sub-group types (e.g., private, public, shared (i.e., SBCM), etc.) are assigned to a feature (block 3680), the ODRG resource assigner 3450 updates the record of the ODRG (block 3682).

Whenever a user selects a feature (block 3678) and/or assigns one or more unified sub-group types to a feature (blocks 3680 and/or 3682), control returns to the top of the flowchart of FIG. 34, where the user is provided the opportunity to select a different ODRG (block 3672), to exit the ODRG resource assigner 3450 (block 3674) such that control returns to the example machine readable instructions of FIG. 30, to select a different feature (block 3678), and/or to change the unified sub-group type(s) assigned to the currently selected feature (block 3680).

Figure 35:
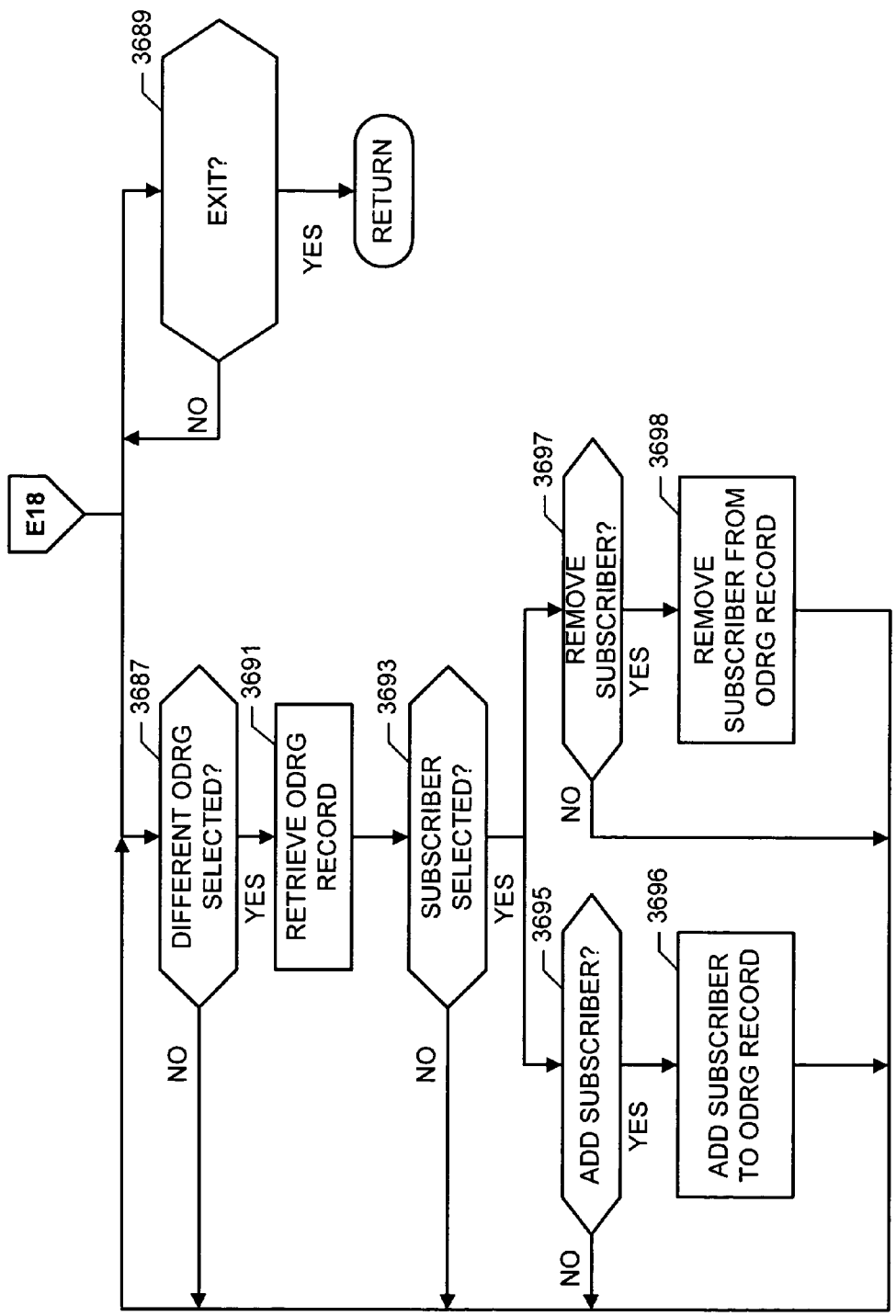

Returning to FIG. 30, if the received communication is a request to access the subscriber assigner 3505 to, for example, assign one or more subscribers to an ODRG (block 3685), control advances to FIG. 35 where a graphical user interface such as the GUI of FIG. 28 is provided to the requesting user. The graphical user interface provides the user with an opportunity to select an ODRG (block 3687) or to exit from the graphical user interface (block 3689) associated with the subscriber assigner 3505.

When an ODRG is selected (block 3687), the subscriber assigner 3505 retrieves the record for the selected ODRG from the operations database 160 (block 3691). The subscriber assigner 3505 then provides the user with an opportunity to select a subscriber from a database of subscribers (block 3693). When the user selects a subscriber (e.g., from the list 3535 of subscribers in FIG. 28) (block 3693), the graphical user interface associated with the subscriber assigner 3505 provides the user with the opportunity to associate the subscriber with the ODRG selected at block 3695, and/or, if the selected subscriber is already associated with the selected ODRG, to disassociate the subscriber from the currently selected ODRG (block 3697). If a subscriber is to be associated with the ODRG (block 3695), the subscriber assigner 3505 stores an identifier which is preferably uniquely associated with the subscriber in the record for the ODRG (block 3696). Similarly, if a subscriber is to be disassociated from the ODRG (block 3697), the subscriber assigner 3505 removes the identifier of the subscriber from the record for the ODRG (block 3698).

Whenever a user associates or dissociates a subscriber to/from an ODRG (blocks 3695 and 3697), selects a subscriber (block 3693), and/or selects an ODRG (block 3687), control returns to the top of the flowchart of FIG. 35, where the user is provided the opportunity to select a different ODRG (block 3687), to exit the subscriber assigner 3505 (block 3689) and thus return to the example machine readable instructions of FIG. 30, to select a different subscriber (block 3693), to add another subscriber to the currently selected ODRG (block 3695), and/or to disassociate another subscriber from the currently selected ODRG (block 3697).

Figure 36:
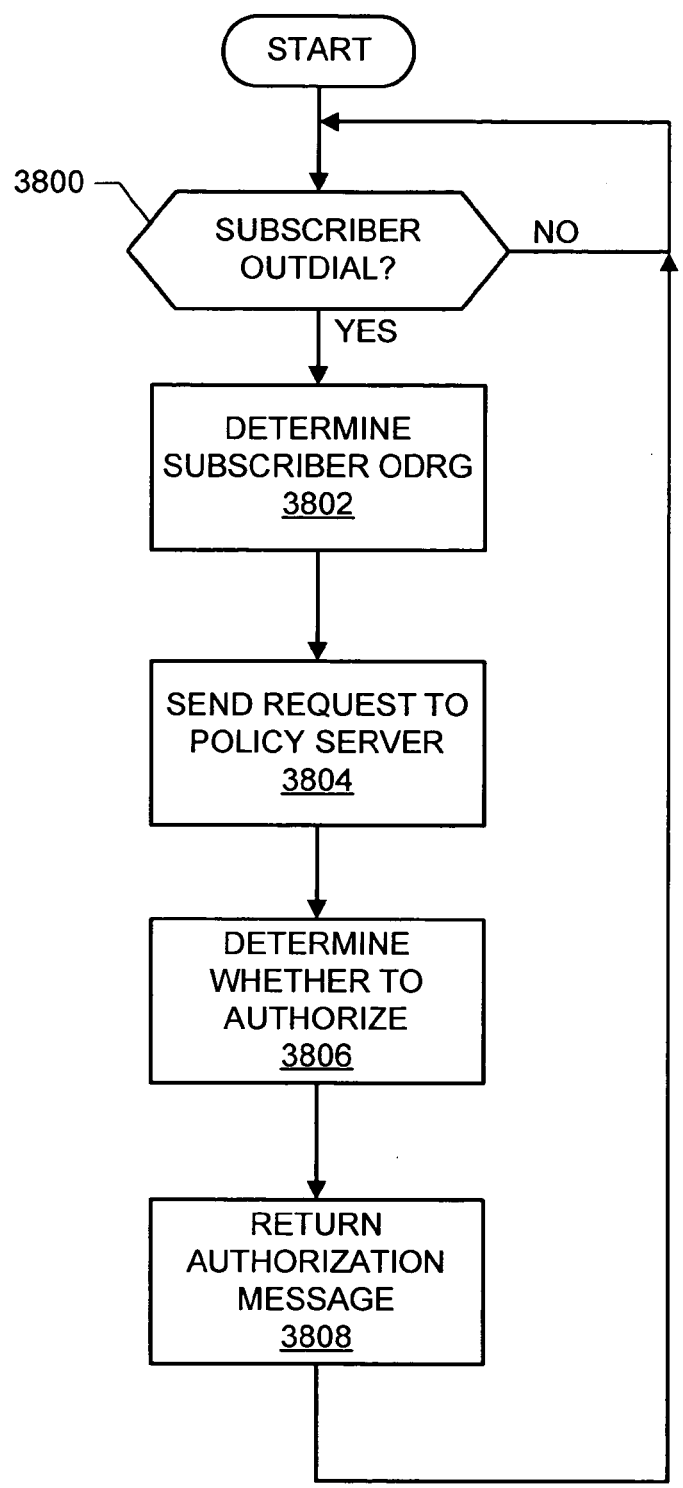
FIG. 36 is a flowchart representative of example machine readable instructions which may be executed by an application server to prepare a request for authorization and/or resource allocation in response to an indial call and to provide a response to the same.

FIG. 36 is a flowchart representative of example machine readable instructions that may be executed by one or more processors (e.g., the processor 8010 of FIG. 55) of, for example, an application server 132 and a policy server 150 to prepare a request for authorization and/or resource allocation for an outdial call and to provide a response to the same. The machine readable instructions of FIG. 36 may be executed by a processor, a controller and/or any other suitable processing device. For example, the machine readable instructions of FIG. 36 may be embodied in coded instructions stored on a tangible medium such as a flash memory, or RAM associated with the processor 8010 shown in the example processor platform 8000 and discussed below in conjunction with FIG. 55. Alternatively, some or all of the example machine readable instructions of FIG. 36 may be implemented manually or as combinations of any of the foregoing techniques. Further, although the example machine readable instructions of FIG. 36 is described with reference to the flowchart of FIG. 36, persons of ordinary skill in the art will readily appreciate that many other methods of implementing the machine readable instructions may be employed. For example, the order of execution of the blocks may be changed, and/or some of the blocks described may be changed, eliminated, sub-divided, or combined.

The example machine readable instructions of FIG. 36 begins with the application server 132A waiting to receive a request to initiate an outdial service from, for example, a subscriber (block 3800). When a request is received (block 3800), the application server 132A determines the ODRG to which the subscriber belongs (block 3802) by, for example, performing a look up in a directory (discussed below in Section VIII) associated with and/or linked to the operations database 160. The application server 132A then forwards an authorization service request message or combined routing and request message to the policy server 150 (block 3804). As discussed earlier, the authorization request may include, among other items, the subscriber identification, the ODRG identifier, and the feature identifier.

As discussed above, the ODRG identifier permits a determination of one or more unified sub-group types that could potentially be utilized. Based on the unified sub-group types, the ODRG, the feature and/or the current allocation of unified sub-group resources, the policy server 150 can make a determination as to whether the outdial call can currently be authorized and can select a route (block 3806). The policy server 150 then returns an authorization or combined authorization and routing response message to the application server 132A indicating whether the outdial call is authorized or authorized and routed (block 3808). Control then returns to block 3800 to wait for another subscriber outdial request.

Persons of ordinary skill in the art will appreciate that, although for simplicity of discussion, the above flowchart has been described with reference to a particular temporal order, there is no intention to limit the examples to any such temporal order. For example, it is likely that the machine readable instructions represented by the flowchart of FIG. 36 would be executed by spawning multiple threads to handle multiple requests in parallel.

V. Outdial Authorizer

Figure 37:
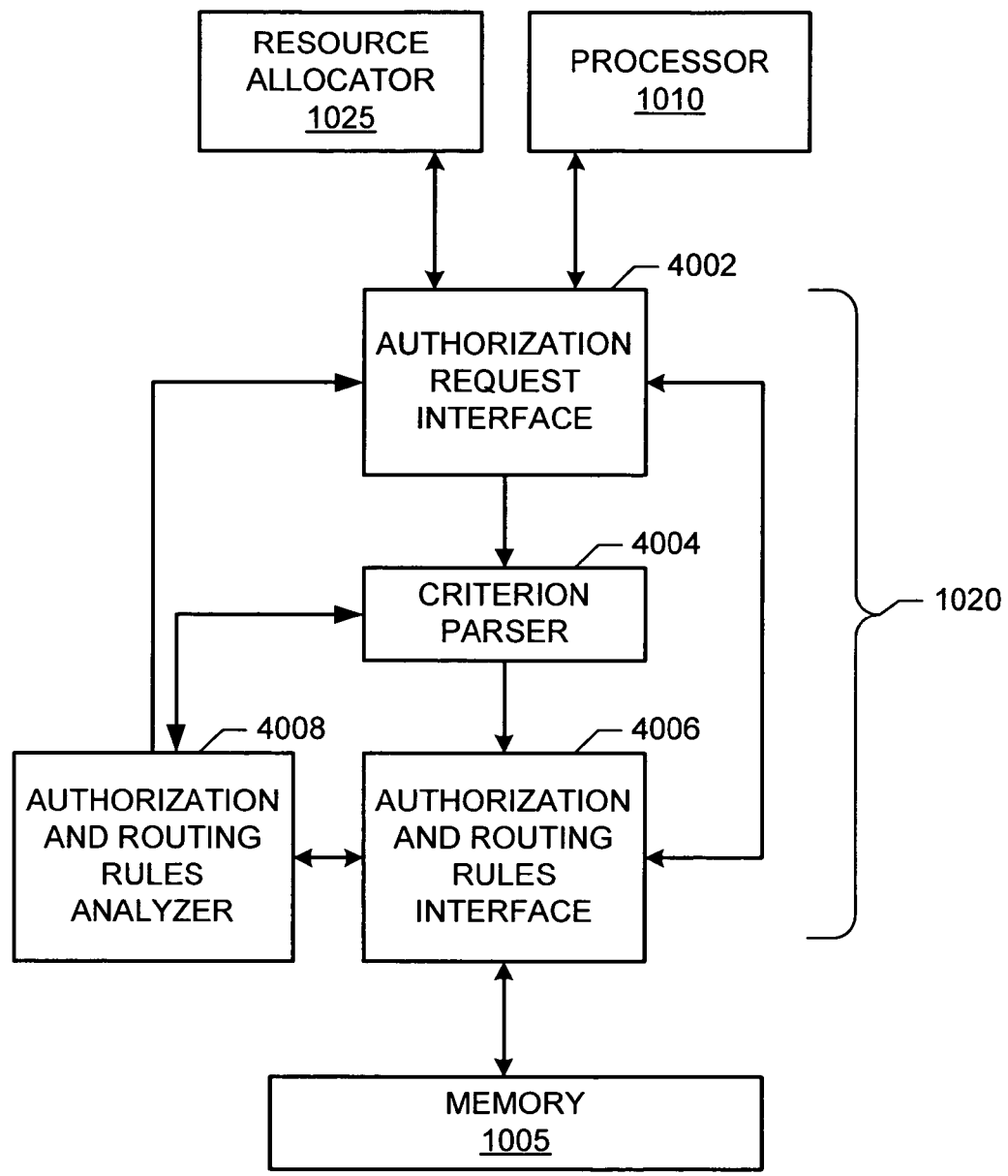
FIG. 37 depicts an example implementation of the outdial authorizer of FIG. 4.

FIG. 37 depicts an example implementation of the outdial authorizer 1020 of FIG. 4. As described above, the outdial authorizer 1020 may be used to determine an authorization (e.g., YES, NO or CC) for an outdial communication service call (e.g., one of or the example outdial communication services listed in FIG. 3) initiated by any of the application servers 132 ((FIG. 1), and/or to provide routing rules to the processor 1010 (FIG. 4) for an authorized outdial communication service call. In particular, upon initiating an outdial communication service call, the requesting application server 132 (e.g., one of the application servers 132 that initiated the outdial communication service call) communicates an authorization request or combined authorization and routing request to the policy server 150 which, in turn, provides an authorization request to the outdial authorizer 1020. The outdial authorizer 1020 uses rules stored in one or more authorization and routing data structures (e.g., tables 4200, 4300, 4400, 4500 and/or 4700 of FIGS. 39A-C, 40 and 411) to determine whether to authorize the requested outdial communication service call and, additionally or alternatively, if the service call is authorized, to determine associated routing rules based on one or more communication criteria (e.g., a real-time or non-real-time status (i.e., outdial call) type, an outdial communication service (i.e., feature) type, a subscriber type criterion, a unified sub-group type, a distance type, etc.) associated with the outdial communication service call.

As shown in FIG. 37, the example outdial authorizer 1020 includes an authorization request interface 4002 communicatively coupled to the processor 1010. The authorization request interface 4002 is provided to receive authorization requests for outdial communication service calls communicated by the application servers 132 to the policy server 150. In particular, the messaging interface 1015 (FIG. 4) obtains the authorization or combined authorization and routing requests and forwards the requests to the processor 1010, which, in turn, forwards authorization requests to the authorization request interface 4002. The authorization request interface 4002 also communicates the responses to the authorization requests determined by the outdial authorizer 1020 to the processor 1010.

To parse communication criterion associated with each outdial authorization request, the outdial authorizer 1020 includes a criterion parser 4004 that is communicatively coupled to the authorization request interface 4002. In the illustrated example, the authorization request interface 4002 extracts, isolates, or otherwise obtains a criteria portion (e.g., one or more criterion field(s) and/or variables of a bitstream implementing the outdial authorization request) from the outdial authorization request and communicates the criterion portion to the criterion parser 4004. Of course, in an alternative example implementation the authorization request interface 4002 may communicate the outdial authorization request in its entirety to the criterion parser 4004. In either case, the criterion parser 4004 parses or separates each criterion on which the outdial authorizer 1020 bases authorization decisions and/or determines routing rules for authorized outdial communication service calls.

The example outdial authorizer 1020 of FIG. 37 uses various example criterion to determine an authorization for outdial communication services and/or to determine associated routing rules. An example criterion is an outdial call type (e.g., real-time or non-real-time outdial call). Real-time and non-real-time outdial communication services are described above in Section I and in connection with FIG. 3.

Another example criterion is a subscriber type (e.g., a local subscriber or a remote subscriber) associated with the requested outdial communication service. As described above in connection with FIG. 1, the subscribers 105A and 105B (FIG. 1) are example local access subscribers, while the subscriber 105C (FIG. 1) is depicted as an example remote access subscriber. Also as described above, whether a subscriber is local or remote may be determined from the access number associated with the subscriber, for example, the CFN associated with a subscriber's mailbox, a CTAN, a call tree subscriber number, etc.

Yet another example criterion is a distance type associated with the requested outdial service (e.g., intra-LATA or inter-LATA). Within the United States, the PSTN is divided into LATAs that originally were geographic regions assigned to one or more telephone companies for providing communication services. For example, an intra-LATA call is a telephone call between two telephone companies within the same region (i.e., LATA) and may, for example, be a local call or a local toll call (e.g., a call that originates and terminates in the same LATA). An inter-LATA call is a telephone call between two local exchange carriers in different regions and may, for example, be a long-distance call (e.g., an inter-state call or a call that originates in one LATA and terminates in a different LATA).

A further example criterion is the feature type of the requested outdial communication service, which may include, for instance, any of the outdial communication service types (i.e., feature types) shown in FIG. 3.

Yet a further example criterion is the circuit type (e.g., public, private, shared, VoIP, etc.) of outdial unified sub-groups (e.g., the outdial unified sub-group 225A and 225B) that may be selected, allocated and over which the outdial communication service may be routed. In the example system of FIG. 1, the type of a unified sub-group is inherited from the underlying unified super-group. As described in greater detail below in connection with FIG. 38, the example system of FIG. 1 may be implemented using one or more types of outdial unified sub-groups (e.g., one or more types of the outdial unified sub-group 225A and 225B). Example types of unified sub-groups and unified super-groups are discussed in more detail above in Section I and in connection with FIG. 2.

Returning now to the example implementation of the outdial authorizer 1020 of FIG. 37, to retrieve authorization and routing rules from one or more data structures (e.g., the tables 4200, 4300, 4400, 4500 and/or 4700 of FIGS. 39AA-C, 40 and/or 41) stored in the memory 1005, the outdial authorizer 1020 is provided with an authorization and routing rules interface 4006 communicatively coupled to the criterion parser 4004. In the illustrated example, the criterion parser 4004 communicates the parsed criteria to the authorization and routing rules interface 4006, which, in turn, uses the criteria to retrieve a corresponding authorization response (e.g., YES, NO or CC), corresponding authorization rules and/or corresponding routing rules from the memory 1005 for each of the outdial communication services requested by the application servers 132.

To analyze the authorization rules and/or the routing rules, the outdial authorizer 1020 is provided with an authorization and routing rules analyzer 4008 communicatively coupled to the authorization and routing rules interface 4006. In the illustrated example, after retrieving the authorization and routing rules from the memory 1005 based on the criteria provided by the criterion parser 4004, the authorization and routing rules interface 4006 communicates the authorization and routing rules to the authorization and routing rules analyzer 4008, which, in turn, determines whether the requested outdial communication service call is authorized (e.g., an authorization response of YES, NO or CC) and determines the routing rules to be to be followed when selecting a route and routing the requested outdial communication service call. The authorization and routing rules analyzer 4008 of the illustrated example communicates the determined authorization and/or routing rules to the authorization request interface 4002 that, in turn, communicates some or all of the same information to the processor 1010. The processor 1010 then provides an authorization or a combined authorization and routing response to the application server 132. In the illustrated example, the communicated authorization may include, for example, a YES response indicating that the outdial service is authorized, a NO response indicating that the outdial service is not authorized, or a CC response indicating that a calling card and/or long distance access number is required to authorized the outdial service. If the response is NO, any reason for rejection, if applicable may also be provided.

Figure 38:
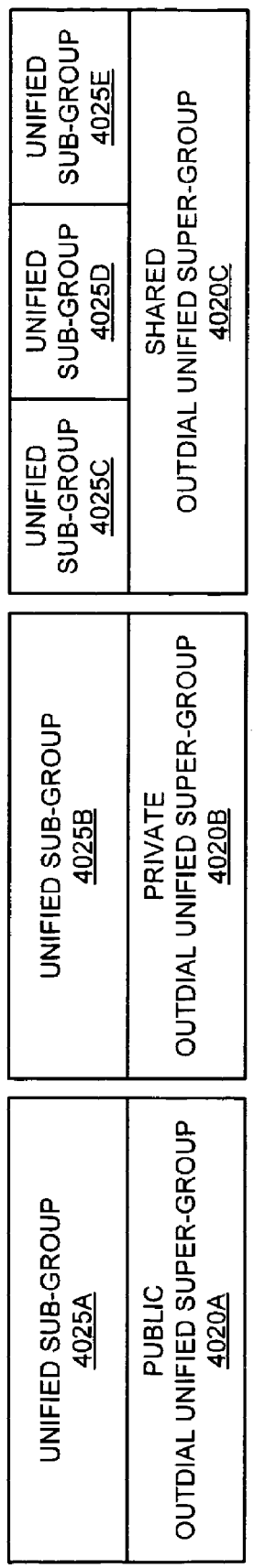
FIG. 38 illustrates example logical relationships between different types of outdial unified super-groups and unified sub-groups.

FIG. 38 illustrates example logical relationships between different types of outdial unified super-groups (e.g., the outdial unified super-group 220B of FIG. 2) and unified sub-groups (e.g., the unified sub-groups 225A and 225B of FIG. 2). In the illustrated example, types of outdial unified super-groups that may be implemented in the example system of FIG. 1 include a public outdial unified super-group 4020A, a private outdial unified super-group 4020B, and a shared outdial unified super-group 4020C. VoIP unified super-groups may also be implemented by the example system of FIG. 1. In the illustrated example, the different types of outdial unified super-groups are provided to serve different types of consumers. For example, the public outdial unified super-group 4020A may be provided to serve general consumers (e.g. mass market consumers, personal subscriber consumers, residential subscriber consumers, public consumers, etc.) or enterprise consumers that do not have access to or need access to the private outdial unified super-group 4020B or the shared outdial unified super-group 4020C. The private outdial unified super-group 4020B may be owned by and/or serve an enterprise consumer such as, for example, a private enterprise or a VoIP service provider. The shared outdial unified super-group 4020C may be provided to serve a plurality of enterprise consumers that collectively share the capacity (e.g., bandwidth capacity) of the shared outdial unified super-group 4020C but desire a guaranteed portion of the underlying unified super-group 4020C.

As shown in FIG. 38, each of the public outdial unified super-group 4020A and the private outdial unified super-group 4020B of the example system of FIG. 1 is associated with a respective unified sub-group 4025A and 4025B. In contrast, the shared outdial unified super-group 4020C is associated with a plurality of unified sub-groups 4025C, 4025D, and 4025E so that each enterprise consumer or customer that shares a portion of the shared outdial unified super-group 4020C can access the shared outdial unified super-group 4020C via its respective one of the unified sub-groups 4025C, 4025D, and 4025E. In the example system of FIG. 1, a unified sub-group inherits its type (e.g., public, private, shared, VoIP) from the underlying unified super-group. For instance, the unified sub-group 4025B is a private unified sub-group, the unified sub-group 4025C is a shared unified sub-group, etc. As described below, authorization and routing rules associated with making or establishing outdial communication service calls are based on a unified sub-group circuit type (e.g., public type, private type, shared and/or VoIP type) and other criteria (e.g., the criteria described above in connection with the criteria parser 4004 of FIG. 37) associated with the outdial communication service calls.

FIG. 39A illustrates an example public circuit authorization and routing rules table 4200 having authorization and routing rules that are used by the outdial authorizer 1020 to determine whether to authorize outdial communication services and/or to provide related routing rules. The public circuit authorization and routing rules table 4200 is used to correlate authorization and routing rules to one or more criteria (e.g., the criteria described above in connection with the criteria parser 4004 of FIG. 37). In the illustrated example, the public circuit authorization and routing rules table 4200 is stored in the memory 1005 (FIGS. 4 and 37) and includes a plurality of entries (i.e., rows), each having a set of criteria and respective authorization and routing rules. In an example implementation, to authorize an outdial communication service intended to be made via a public type of outdial unified sub-group (e.g., the public unified sub-group 4020A of FIG. 38), the outdial authorizer 1020 accesses the public circuit authorization and routing rules table 4200 via the authorization and routing rules interface 4006 (FIG. 37) to retrieve the authorization and routing rules for that particular outdial communication service based on criteria obtained via the criteria parser 4004 (FIG. 37).

As shown in FIG. 39A, the example public circuit authorization and routing rules table 4200 includes a outdial call type criterion column 4202, a subscriber type criterion column 4204, and a distance type criterion column 4206. The example authorization and routing rules interface 4006 (FIG. 37) uses the outdial call type criterion column 4202 to retrieve authorization and routing rules based on whether an outdial communication service is a non-real-time or a real-time service. The example authorization and routing rules interface 4006 uses the subscriber type criterion column 4204 to retrieve authorization and routing rules based on whether the outdial communication service is associated with a local subscriber or a remote subscriber. The example authorization and routing rules interface 4006 uses the distance type criterion column 4206 to retrieve authorization and routing rules based on whether the outdial communication service is associated with an intra-LATA call (e.g., a local call or a local toll call) or an inter-LATA call (e.g., a long distance call).

The illustrated example public circuit authorization and routing rules table 4200 includes an authorization rules section 4208 having authorization rules associated with regulatory rules and/or laws and/or business rules. Specifically, as shown in FIG. 38, the authorization rules section 4208 includes a regulatory authorization rules column 4210, a business authorization rules column 4212, and a business exceptions column 4214. The regulatory authorization rules column 4210 of the illustrated example indicates whether outdial services are allowed (e.g., an authorization response of YES, NO or CC) based on regulatory rules and/or laws (e.g., Federal laws, rules of the Federal Communications Commission (FCC), network operator regulatory requirements, etc.). The business authorization rules column 4212 of the illustrated example indicates whether outdial services are allowed (e.g., an authorization response of YES, NO or CC) based on business operating parameters established by businesses or enterprises leasing or using the public circuit. In the example system of FIG. 1, the business authorization rules column 4212 and the business exceptions column 4214 discussed below conform to the regulatory rules and/or laws. The example system of FIG. 1 may optionally include an authorization and routing rules table entry method and/or authorization and routing rules table verification method that ensure that the business rules and/or exceptions conform to regulatory rules and/or laws. The business exceptions column 4214 of the illustrated example includes exceptions (e.g., authorization exception rules) to the business authorization rules indicated in the business authorization rules column 4212. For example, if a business authorization rule indicates that a particular outdial communication service is authorized (i.e., authorization response of YES), the business exceptions column 4214 may be associated with particular circumstances to which the general authorization does not apply and/or is restricted (e.g., is overridden). In the illustrated example, the business exceptions column 4208 includes record entry values (e.g., # 102, # 103, # 104, etc.) or pointers that reference a public circuit business exceptions table such as the example table 4300 shown in FIG. 40. In this case, the authorization and routing rules interface 4006 (FIG. 37) may retrieve exceptions from the public circuit business exceptions table 4300 if the business exceptions column 4214 indicates that one or more business exceptions applies to a particular outdial communication service.

As illustrated in FIG. 40, example business exception for record number 101 indicates that special delivery outdial communication services are not allowed. Other example business exceptions are stored in record number 102, which indicates that reminders are not allowed; record number 103, which indicates that a UC call transfer is not allowed; and record number 104, which indicates that a call tree call transfer is not allowed. Of course, any other types of exception may be provided in addition to, or in place of, the examples described herein. Although the example business exceptions are shown in a separate table (e.g., the public circuit business exceptions table 4300 of FIG. 40), in some example implementations, the business exceptions may be stored directly in entries within the business exceptions column 4214. Business exceptions may also specify additional constraints associated with a feature. For example, the business authorization rules column 4212 may indicate that all features are authorized for outdial except for one feature that requires a calling card and/or long distance access number.

As shown in the regulatory and business authorization rules columns 4210 and 4212, an outdial communication service may be indicated as authorized (i.e., YES), not authorized (i.e., NO), or may be authorized only if a calling card and/or long distance access number is provided (i.e., CC). Authorization rules indicating YES cause the outdial authorizer 1020 to return an authorization response of YES, authorization rules indicating NO cause the outdial authorizer 1020 to return an authorization response of NO, and authorization rules indicating CC cause the outdial authorizer 1020 to return a CC request authorization response message.

To determine routing rules to be used when selecting, allocating and/or routing outdial communication services, the illustrated public circuit authorization and routing rules includes a routing rules section 4216 having a regulatory routing rules column 4218 and a business routing rules column 4220. The regulatory routing rules column 4218 indicates via which LATAs the outdial communication services may be routed and are based on regulatory rules and/or laws.

The business routing rules column 4220 indicates via which LATAs the outdial communication service may be routed and are based on business operating parameters and/or rules. In the example system of FIG. 1, the types of LATAs from which an outdial service may be routed include the subscriber's home (i.e., HOME) LATA, the indial gateway (i.e., INDGWY) LATA, the destination (i.e., DEST) LATA, and the site (i.e., SITE) LATA. The site LATA is the LATA in which, for example, the subscriber's mailbox is hosted, that is, the LATA where the message center hosting the subscriber's mailbox is physically located, and the destination LATA is the LATA to which the destination telephone number for the outdial communication service is associated. Each of the business routing rules column entries contain an ordered sequence of one or more LATAs from which the processor 1010 may attempt to select a unified sub-group, allocate resources and/or route the outdial communication service. The regulatory routing rules reflect the permissible LATAs from which an outdial call may be routed, but may not be listed in any specific order. The processor 1010 will process the sequence of LATAs in the order listed in the business routing rules entry. The routing rules column entries may contain, additionally or alternatively, an entry of, for example, ANY indicating that any LATA or any set of LATAs may be used. As described above, the processor 1010 processes the ordered sequence of LATAs determined by the outdial authorizer while selecting and attempting to allocate resources to a unified sub-group.

FIGS. 39B and 39C illustrate a private circuit authorization and routing rules table 4400 and an example shared circuit authorization and routing rules table 4500, respectively. The structure and the types of information stored in each of the authorization and routing rules tables 4400 and 4500 are substantially similar to the structure and types of information described above in connection with the public circuit authorization and routing rules table 4200 of FIG. 39A. The example outdial authorizer 1020 of the illustrated example accesses the private circuit authorization and routing rules table 4400 to obtain authorization and routing rules for outdial communication service authorization requests intended to be made via private outdial unified sub-groups (e.g., the private outdial unified sub-group 4025B of FIG. 38). Additionally, the outdial authorizer 1020 of the illustrated example accesses the shared circuit authorization and routing rules table 4500 to obtain authorization and routing rules for outdial communication service authorization requests intended to be made via shared outdial unified sub-groups (e.g., the shared outdial unified sub-groups 4025C-E of FIG. 38). Preferably, a network operator or a business may selectively change or modify any of the authorization rules, routing rules, and/or business exceptions in the tables 4200, 4300, 4400, 4500 at any time without affecting or without needing to change any of the other rules or exceptions previously stored therein. Since, the business authorization and routing rules and/or exceptions preferably conform to the regulatory authorization and routing rules and/or laws, a change in the regulatory rules column 4210 and/or the regulatory routing rules column 4218 generally requires a change to one or more of business rules column 4212, business exceptions column 4214, the business routing rules column 4220 or the business exceptions table 4300.

FIG. 41 illustrates an example combined circuit authorization and routing rules table 4700 having authorization and routing rules that are used by the outdial authorizer 1020 to determine whether to authorize outdial communication services and/or to determine related routing rules. The combined circuit authorization and routing rules table 4700 is used to correlate authorization responses and routing rules to one or more criteria (e.g., the criteria described above in connection with the criteria parser 4004 of FIG. 37). In the illustrated example, the combined circuit authorization and routing rules table 4700 is stored in the memory 1005 (FIGS. 4 and 37) and includes a plurality of entries (i.e., rows), each having a set of criteria and respective authorization responses and routing rules. The example routing rules table 4700 illustrates an alternative implementation to the authorization and routing rules tables 4200, 4300, 4400 and 4500. In particular, recognizing that business rules are further refinements of regulatory rules and/or laws the content of the authorization and routing rules tables 4200, 4300, 4400 and 4500 can be re-arranged and re-indexed to form the combined authorization and routing rules table 4700 illustrated in FIG. 41. It will be readily apparent that other implementations of authorization and routing rules table(s) may be utilized. For example, the rows and/or columns may be rearranged and/or the table may be indexed differently. Further, an authorization and routing rules table may be implemented as one or more data structures, for example, an array of data structures.

As shown in FIG. 41, the example public circuit authorization and routing rules table 4700 includes a circuit type criterion column 4702, a subscriber type criterion column 4704, and a distance type criterion column 4706. The example table 4700 further includes an authorization response section 4708 having a plurality of authorization response columns (e.g., column 4710 and column 4712) associated with each of a plurality of feature types, and a routing rules section 4714 having a plurality of routing rules columns (e.g., column 4716 and column 4718) associated with each of the plurality of feature types.

As discussed above, an authorization request or combined authorization and routing request received by the policy server 150 contains information to allow the policy server 150 to determine, among other things, the subscriber type, one or more circuit types (i.e., unified sub-group types) that may be used to route the outdial service call, a distance type and a feature type. The policy server 150 in an authorization request sent to the outdial authorizer 1020 includes, among other things, the subscriber type, a particular one of the one or more circuit types, the distance type and the feature type. The outdial authorizer 1020 using any of a variety of techniques uses the provided types to determine an authorization response and/or routing rules. For example, the outdial authorizer 1020 uses the circuit type (e.g., PRIVATE), subscriber type (e.g., LOCAL) and distance type (e.g., INTRA) to determine a row 4720 of the authorization and routing rules table 4700. Within the determined row 4720, the outdial authorizer 1020 uses the feature type (e.g., REMINDER) to select one of the plurality of columns (e.g., column 4710) in the authorization response section 4708. The authorization response contained in the table entry located by row 4720 and column 4710 (e.g., YES) is the authorization response provided by the outdial authorizer 1020 to the processor 1010. Likewise, the routing rules contained in the table entry located by row 4720 and column 4716 (e.g., DEST, INDGWY, SITE) are returned by the outdial authorizer 1020 to the processor 1010.

It will be readily apparent to persons of ordinary skill in the art that authorization and routing rules tables (e.g., the tables 4200, 4300, 4400, 4500 and 4700) can be readily modified and/or extended. For example, additional criterion columns can be added (e.g., to accommodate new circuit types), additional authorization rules can be added (e.g., to accommodate changes in regulatory rules and/or laws), additional authorization responses can be defined, additional routing rules can be defined (e.g., for new types of LATAs), etc. Further, the authorization and routing tables could be implemented using one or more of hard-coded logic, an ASIC, a PLD, a FPLD, discrete logic, hardware, firmware, software, etc.

Figure 42:
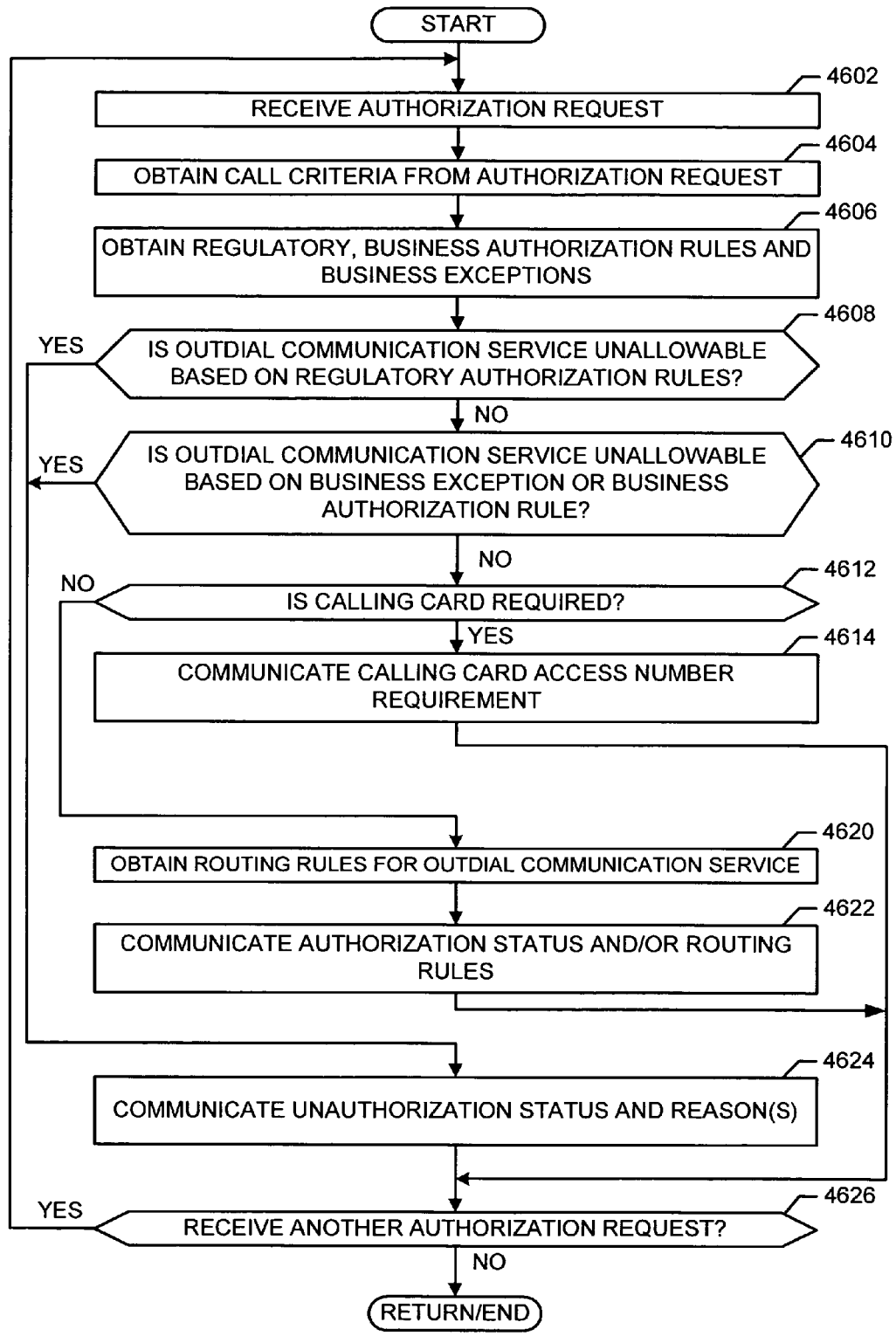
FIGS. 42 and 43 are flow diagrams representative of example machine readable instructions that may be executed to implement the example outdial authorizer of FIGS. 4 and 37.
Figure 43:
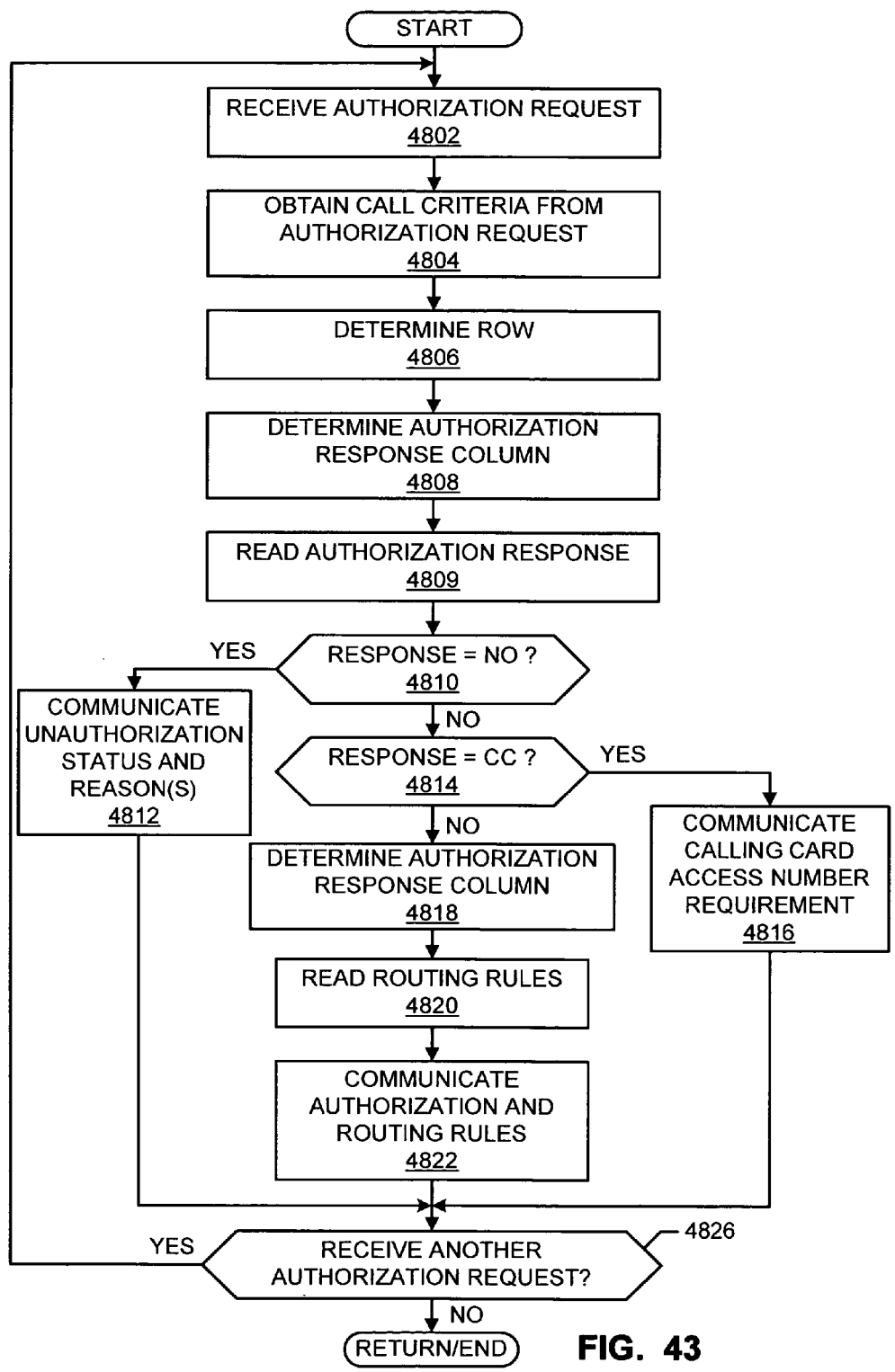

FIGS. 42 and 43 are flow diagrams representative of example machine readable instructions that may be executed to implement the example outdial authorizer 1020 of FIGS. 4 and 37. As described above, the outdial authorizer 1020 determines whether to authorize a requested outdial service based on one or more rules stored in authorization and routing rules tables (e.g., the authorization and routing rules tables 4200, 4400, and 4500 of FIGS. 39A-C and/or the combined authorization and routing rules table 4700 of FIG. 41). The machine readable instructions of FIGS. 42-43 may be executed by a processor, a controller and/or any other suitable processing device. For example, the machine readable instructions of FIGS. 42-43 may be embodied in coded instructions stored on a tangible medium such as a flash memory, or RAM associated with the processor 8010 shown in the example processor platform 8000 and discussed below in conjunction with FIG. 87. Alternatively, some or all of the example machine readable instructions of FIGS. 42-43 and/or the outdial authorizer 1020 may be implemented using an application specific integrated circuit (ASIC), a programmable logic device (PLD), a field programmable logic device (FPLD), discrete logic, hardware, firmware, etc. Also, some or all of the machine readable instructions of FIGS. 42-43 and/or the outdial authorizer 1020 may be implemented manually or as combinations of any of the foregoing techniques. Further, although the example machine readable instructions of FIGS. 42-43 are described with reference to the flowcharts of FIGS. 42-43, persons of ordinary skill in the art will readily appreciate that many other methods of implementing the outdial authorizer 1020 may be employed. For example, the order of execution of the blocks may be changed, and/or some of the blocks described may be changed, eliminated, sub-divided, or combined.

The example machine readable instructions of FIG. 42 begin when, as described above, the authorization request interface 4002 (FIG. 37) receives an authorization request (block 4602) for an outdial communication service call from the processor 1010 (FIG. 4). The criterion parser 4004 (FIG. 37) then obtains the call criteria from the authorization request (block 4604). For example, the authorization request interface may communicate the criteria portion of the authorization request or the authorization request in its entirety to the criterion parser 4004, and the criterion parser 4004 may extract or otherwise obtain the call criteria (e.g., the call criteria described above in connection with FIG. 37) associated with the outdial communication service for which the authorization request was generated.

The authorization and routing rules interface 4006 (FIG. 37) then retrieves the regulatory and business authorization rules from the memory 1005 corresponding to the criteria received from the criterion parser 4004 at block 4604 (block 4606). Specifically, the authorization and routing rules interface 4006 accesses the appropriate one of the authorization and routing rules tables 4200, 4400, and 4500 to retrieve the regulatory and business authorization rules and the business exceptions based on the call criteria. At block 4606, the authorization and routing rules interface 4006 also retrieves any applicable business exceptions from a business exceptions table (e.g., the public circuit business exceptions table 4300 of FIG. 40).

The authorization and routing rules analyzer 4008 (FIG. 37) then determines if the outdial communication service is unallowable (i.e., not authorized) based on the regulatory authorization rules (block 4608). For example, in the case of a call intended to be made via a public circuit, if the entry under the regulatory authorization rules column 4210 (FIG. 39A) associated with the call criteria indicates that the service is not allowed (e.g., indicates NO), then the authorization and routing rules analyzer 4008 determines that the outdial communication service is not authorized. If the requested outdial service is not authorized based on regulatory rules and/or laws (block 4608), the authorization and request interface 4002 communicates to the processor 1010 (FIG. 4) that the requested outdial service is not authorized (i.e., an authorization response of NO) and indicates any status and/or reason for the rejection (block 4624). Control then proceeds to block 4626 to determine if another authorization request needs to be processed.

If the requested outdial communication service is not rejected based on regulatory rules and/or laws (block 4608), the authorization and routing rules analyzer 4008 determines if the outdial service is unallowable based on the business rules and/or the business exceptions (block 4610). For example, in the case of a call intended to be made via a public unified sub-group, if the entry under the business authorization rules column 4212 (FIG. 39A) associated with the call criteria indicates that the service is not allowed (e.g., indicates NO), then the authorization and routing rules analyzer 4008 determines that the outdial communication service is unallowable (i.e., not authorized). Further, even if the business authorization rules column 4212 associated with the call criteria indicates that the service is allowed (e.g., indicates YES), the business exceptions may indicate that the features is unallowable (i.e., not authorized). If the requested outdial service is not authorized based on business rules and/or business exceptions (block 4610), the authorization and request interface 4002 communicates to the processor 1010 (FIG. 4) that the requested outdial service is not authorized (i.e., an authorization response of NO) and indicates any status and/or reason for the rejection (block 4624) and control proceeds to block 4626 to determine if another authorization request needs to be processed.

If the requested outdial communication service is not rejected based on regulatory rules and/or laws and/or business rules and/or business exceptions (block 4610), then the authorization and routing rules analyzer 4008 determines if either the regulatory rules and/or laws and/or the business rules and/or business exceptions indicate that a calling card and/or long distance access number is required to authorized the requested outdial service (block 4612). If a calling card and/or long distance access number is required (block 4612), the authorization and request interface 4002 communicates to the processor 1010 (FIG. 4) that the requested outdial service can not be authorized without a calling card and/or long distance access number (i.e., an authorization response of CC) (block 4614) and control proceeds to block 4626 to determine if another authorization request needs to be processed.

If a calling card and/or long distance access number is not required (i.e., the outdial communication service is, thus, allowed) (block 4612), then the authorization and routing rules interface 4006 obtains the routing rules (block 4620) from an authorization and routing rules table (e.g., one of the authorization and routing rules tables 4200, 4400, and 4500 of FIGS. 39A-C) and the authorization and request interface 4002 communicates to the processor 1010 that the requested outdial service was authorized (i.e., an authorization response of YES) and provides the determined routing rules (block 4622) to the processor 1010 (FIG. 4). If the outdial authorizer 1020 determines that it should receive another authorization request (block 4626), then control is passed back to block 4602. Otherwise, the example machine executable instructions of FIG. 42 are ended and/or control is returned to a calling function or process.

The example machine readable instructions of FIG. 43 begin when, as described above, the authorization request interface 4002 (FIG. 37) receives an authorization request (block 4802) for an outdial communication service call from the processor 1010 (FIG. 4). The criterion parser 4004 (FIG. 37) then obtains the call criteria from the authorization request (block 4804). For instance, the authorization request interface may communicate the criteria portion of the authorization request or the authorization request in its entirety to the criterion parser 4004, and the criterion parser 4004 may extract or otherwise obtain the call criteria associated with the outdial communication service for which the authorization request was generated. In the example machine readable instructions of FIG. 43, the call criteria are circuit type, subscriber type, distance type and feature type.

The authorization and routing rules analyzer 4008 then determines the row of the authorization and routing rules table 4700 based upon the circuit type, the subscriber type and the distance type (block 4806) and determines the column of the authorization response section 4708 of the table 4700 based upon the feature type (block 4808). Using the determined row and column, the authorization and routing rules interface 4006 reads the authorization response from the table (block 4809).

If the authorization response read from the table is NO (block 4810), the authorization and request interface 4002 communicates to the processor 1010 (FIG. 4) that the requested outdial service is not authorized (i.e., an authorization response of NO) and indicates any status and/or reason for the rejection (block 4812) and control proceeds to block 4826 to determine if another authorization request needs to be processed.

If the authorization response read from the table is not NONOT (block 4810) and is CC (block 4814), the authorization and request interface 4002 communicates to the processor 1010 (FIG. 4) that the requested outdial service requires a calling card and/or long distance access number to be authorized (i.e., an authorization response of CC) (block 4816) and control proceeds to block 4826 to determine if another authorization request needs to be processed.

If the authorization response is neither NOT (block 4810) nor CC (block 4814), the requested outdial communication service is authorized. The authorization and routing rules analyzer 4008 determines the column of the routing rules section 4714 of the table 4700 based upon the feature type (block 4818). Using the determined row and column, the authorization and routing rules interface 4006 reads the routing rules from the table (block 4820). The authorization and request interface 4002 communicates to the processor 1010 that the requested outdial service was authorized (i.e., an authorization response of YES) and provides the determined routing rules (block 4822) to the processor 1010 (FIG. 4). If the outdial authorizer 1020 determines that it should receive another authorization request (block 4826), then control is passed back to block 4802. Otherwise, the example machine executable instructions of FIG. 43 are ended and/or control is returned to a calling function or process.

If only an authorization for an outdial service request is required (e.g., not a combined authorization and routing request), the example machine readable instructions of FIGS. 42 and 43 may be modified, for example, to not read and/or obtain routing rules and to not return routing rules to the processor 1010.

VI. Resource Allocator

As discussed above, the resources of a shared outdial communication facility are not guaranteed to be available for allocation to an outdial service request. Additionally, a service provider may desire that some outdial communication services (e.g., a live reply outdial communication service) have a higher priority or importance than other outdial communication services (e.g., a pager notification outdial communication service). To address these and other aspects of shared resource allocation, the resource allocator 1025 of FIG. 4 implements a feature-based (i.e., outdial communication service type based) resource allocation control protocol to realize a flexible and configurable resource allocation method. The flexible resource allocation method implement in the example system of FIG. 1 supports the dedication (i.e., reserving) of portions of a shared outdial facility to one or more features, and allows an outdial service request to be allocated resources from non-reserved portions of the shared communication facility. For instance, each feature can be guaranteed access to some minimum number of resources of the shared outdial communication facility; resource allocations may be made to support a defined amount of over-subscription to enable communication transport efficiencies due to statistical multiplexing; and resource allocations may also be made that ensure that a sub-set of features do not keep other features from having access to the shared resources.

Figure 44:
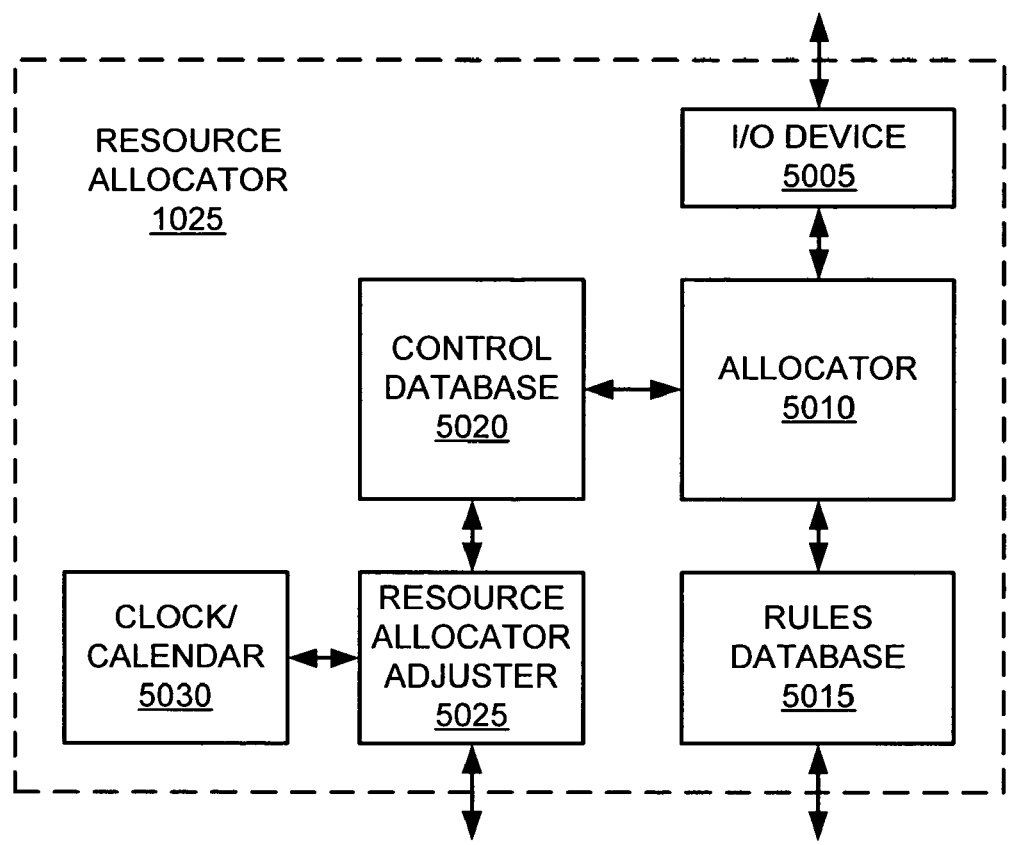
FIG. 44 is a schematic illustration of an example manner of implementing the resource allocator of FIG. 4.

FIG. 44 is a schematic illustration of an example manner of implementing the resource allocator 1025 of FIG. 4. To receive and to respond to allocation requests the example resource allocator 1025 of FIG. 44 includes an input/output (I/O) device 5005. In the example of FIG. 44, the I/O device 5005 receives and responds to requests by receiving and transmitting messages.

To determine whether to allocate a resource of a shared communication facility to an outdial communication service in response to a received allocation request, the example resource allocator 1025 of FIG. 44 includes an allocator 5010. The allocator 5010 uses allocation constraints (e.g., constraints, rules, criteria, and/or conditions) stored in a rules database 5015 and resource allocation control variables (e.g., parameters, states of parameters, variables, data, values, etc.) stored in a control database 5020 to make allocation decisions. In the illustrated example of FIG. 44, the allocation constraints stored in the rules database 5015 are one or more constraints that affect whether or not an allocation is made. Example allocation constraints are discussed below in connection with EQNS. 1-6. In the illustrated example of FIG. 44, allocation control variables stored in the control database 5020 is implemented as a resource allocation control table.

To allow an administrator and/or service provider of the example system of FIG. 4 to modify and/or adjust the resource allocation control variables stored in the control database 5020, the example resource allocator 1025 includes a resource allocator adjuster 5025. The resource allocator adjuster 5025 may also utilize a clock/calendar 5030 to modify and/or adjust the resource allocation control variables as a function of time-of-day or day-of-week.

While throughout the remainder of this disclosure references will be made to allocating resources of a circuit-based unified sub-groups, persons of ordinary skill in the art will readily appreciate that the methods and systems described herein are equally applicable to packet-based and/or VoIP unified sub-groups. While with VoIP technology the number of resources is not strictly limited, as more calls are allocated performance may degrade and lead to an unacceptable voice quality. Thus, resource allocation may be performed to not only to limit the total number of calls on a packet-based and/or VoIP unified sub-group, but also to manage the allocations amongst the outdial features within the specified limit.

FIG. 45 illustrates an example resource allocation control table. In the illustrated example of FIG. 45, each row in the table corresponds to a feature (i.e., outdial communication service type) and contains four parameters and/or values: (a) $F_i$ 5035 is a feature type identifier, (b) $C_i$ 5040 is the number of resources (e.g., outdial calls) currently allocated to feature $F_i$ 5035, (c) $R_i$ 5045 is the number of resources reserved (i.e., dedicated) for allocation to feature $F_i$ 5035, and (d) $M_i$ 5050 is the maximum number of resources that may be allocated to feature $F_i$ 5035. Throughout the remainder of this section, the subscript j will be used to refer to a specific feature for which resource allocation is being currently determined and the subscript i will be used to refer generically to one feature and/or collectively to all features.

One or more resource allocation control tables such as that illustrated in FIG. 45 may be created, defined, updated, utilized and/or maintained for one or more shared communication facilities, one or more outdial circuit groups, one or more outdial unified super-groups and/or one or more unified sub-groups. For example, if the policy server 150 of FIGS. 1 and 4 and/or the resource allocator 1025 of FIG. 4 perform authorization and/or resource allocation based on outdial unified super-groups, then, in the illustrated example, a resource allocation control table will exist and be utilized for each outdial unified super-group. Likewise, if authorization and/or resource allocations are based on unified sub-groups, then a control table will exist and be utilized for each unified sub-group. In the example system of FIG. 1, a control table is utilized for each unified sub-group. Each unified sub-group has an associated maximum capacity T that is the maximum number of resources of the unified sub-group that may be allocated to any outdial communication service (i.e., feature).

It will be readily apparent to persons of ordinary skill in the art that alternative parameters could be used to construct a resource allocation control table. For example, a parameter $L_i$ could be used instead of the parameter $M_i$ 5050, where $L_i$ is the maximum number of non-reserved shared resources that may be allocated to a feature $F_i$ 5035 (e.g., such that $L_i = M_i$ 5050−$R_i$ 5045).

FIGS. 46A-F illustrate example unified sub-groups configurations that illustrate the flexibility of the example resource allocation control table of FIG. 45. Although not exhaustive, the examples of FIGS. 46A-F illustrate the diversity of resource allocation configurations achievable by adjusting the parameters associated with three features A, B and C for a unified sub-group having a total capacity T=20. FIG. 46A illustrates an example resource allocation configuration that reserves all of the capacity of the unified sub-group with amongst the three features, thus, allocating to each of the features an independent sub-set of the unified sub-group resources. FIG. 46B illustrates an example resource allocation configuration that contains no reserved capacity, but allows each of the three features to utilize the entire unified sub-group.

FIG. 46C is an example resource allocation configuration illustrating statistical multiplexing by not allowing any of the three features to exceed 40% of the total capacity. In the example of FIG. 46C, the unified sub-group is statistically multiplexed and over-subscribed, since all three features cannot simultaneously utilize 40% of the total capacity. The example configuration of FIG. 46D is similar to the example of FIG. 46C except each feature is guaranteed a minimum number of resources.

FIG. 46E illustrates an example resource allocation configuration where all the resources of the unified sub-group are reserved for a single feature. FIG. 46F illustrates an example resource allocation configuration that combines elements of the examples of FIG. 46D and FIG. 46B. In particular, features A and B are each configured with reserve and maximum capacities, and feature C has no reserved capacity but is allowed to fully utilize all of the non-reserved capacity of the unified sub-group.

In the illustrated examples of FIGS. 1, 4 and 45, the parameters T, Ri 5045 and Mi 5050 are provisioned configuration parameters determined by an administrator and/or service provider of the example system of FIG. 4. They may be static parameters that do not change, or they may be dynamic or semi-static parameters that change over time (e.g., on a predetermined basis as a function of time-of-day or day-of-week). For example, more resources could be reserved for alert outdial services between 5 am and 8 am to ensure timely delivery of wake-up alerts. It will be readily apparent to persons of ordinary skill in the art that the state of the parameter Ci 5040 changes as outdial communication services are authorized, allocated and/or released. In the illustrated examples of FIGS. 1, 4 and 44, the example resource allocation control table of FIG. 45 and the parameter T collectively represent the state of the unified sub-group and are stored in the control database 5020.

In the illustrated examples of FIGS. 1 and 4, the allocator 5010 allocates one or more resources to an outdial service request (signified by subscript j) or rejects the request based upon the current state of the unified sub-group stored in the control database 5020 (e.g., the current contents of the example resource allocation control table of FIG. 45 plus the capacity T) to ensure that the state of the unified sub-group remains valid after any allocation of resources (i.e., satisfy the allocation constraints stored in the rules database 5015). In the example system of FIG. 1, a state of a unified sub-group is valid if it satisfies four allocation constraints (e.g., constraints, conditions, criteria, and/or rules). First, the sum of all the reserved capacities $R_i$ 5045 does not exceed the capacity T of the unified sub-group (i.e., $$\left(\text{i.e., } \sum_i R_i \le T\right).$$

Second, for each feature $F_i$ 5035 the reserved capacity $R_i$ 5045 does not exceed the maximum capacity $M_i$ 5050, and the maximum capacity $M_i$ 5050 is not so large as to prevent a specific features $F_j$ 5035 (where j≠i) from simultaneously being able to utilize its reserved capacity $R_j$ 5045 (i.e., $$\left(\text{i.e., } R_j \le M_j \le T - \sum_{i \ne j} R_i\right).$$

Third, no feature $F_i$ 5035 is allocated more resources than the maximum capacity $M_i$ 5050 (i.e., $C_i < M_i$). Fourth, sufficient idle capacity always must remain to allow all features $F_i$ 5035 to simultaneously utilize their reserved capacity $R_i$ 5045 (i.e., $$\left(i.e., \sum_i \max(0, (R_i - C_i)) \leq I, \text{ where } I = T - \sum_i C_i\right).$$

The first two criteria define a valid configuration as they depend only upon the static and/or semi-static unified sub-group configuration parameters T, $R_i$ 5045 and $M_i$ 5050. In the illustrated example of FIG. 1, an administrator and/or the service provider of the example system of FIG. 1 is responsible for setting a valid configuration for the unified sub-group that meets the first two conditions. Alternatively, the resource allocator adjuster 5025 and/or the allocator 5010 may reject a configuration or proposed changes to a configuration that do not satisfy these constraints by, for example, returning an error message to the administrator and/or the service provider. The latter two conditions represent the dynamic state characteristics of the unified sub-group and, thus, may be affected by the resource allocation method implemented by the allocator 5010. Preferably, the allocator 5010 implements a resource allocation method that, given a currently valid state and/or valid configuration, ensures that the state of the unified sub-group remains valid after each resource allocation and/or resource release. That is, if the state of the unified sub-group is currently valid, the allocator 5010 preferably only allocates a resource to a request if the resulting state would remain valid.

It will be readily apparent to persons of ordinary skill in the art that the state of a unified sub-group may become invalid if the configuration of the unified sub-group is modified by the resource allocator adjuster 5025 in response to an administrator and/or a time-of-day or day-of-week change. For instance, if five resources are allocated to a feature Fj 5035 (i.e., Cj=5) before a configuration change that modifies the maximum Mj 5050 to be less than 5, then the state of the unified sub-group becomes invalid due to the configuration change. Thus, it is desirable that the resource allocation method implemented by the resource allocator 1025 be capable, over time, to ensure that the state of the unified sub-group returns to a valid state. For example, the allocator 5010 will not allocate any more resources to a feature Fj 5035 until the current number Cj 5040 is less than or equal to Mj 5050.

An example resource allocation method allocates a resource to a specific outdial service request (signified by subscript j) if the current number of resources allocated to a feature Cj 5040 is less than the maximum that may be allocated Mj 5050, and if the number of additional resources required to allow all features to simultaneously utilize their reserved capacity is less than the current amount of idle capacity. The number of additional resources required to allow all features $F_i$ 5035 to simultaneously utilize their reserved capacity $R_i$ 5045 may be expressed mathematically as shown in EQN. 1, and the current idle capacity I may be expressed mathematically as shown in EQN. 2.

$$\text{Unused\_Reserved} = \sum_{i \neq j} \max[0, (R_i - C_i)] \quad \text{(EQN. 1)}$$

$$I = T - \sum_i C_i \quad \text{(EQN. 2)}$$

The example resource allocation method may be mathematically expressed as shown in EQN. 3.

```
IF      Cj < Mj AND Unused_Reserved < I
THEN    Allocate a resource to the outdial service request    (EQN. 3)
ELSE    Reject the outdial service request
END
```

It will be readily apparent to persons of ordinary skill in the art that other resource allocation methods may be implemented. For example, an alternative resource allocation method may be mathematically expressed as shown in EQN. 4.

```
IF Cj ≧ Mj
THEN    Reject the outdial service request
ELSE
        IF Cj ≧ Rj AND Unused_Reserved ≧ I
        THEN Reject the outdial service request              (EQN. 4)
        ELSE Allocate a resource to the outdial service request
        END
END
```

As described above, each feature Fj 5035 requires one resource unit per outdial service request. It will be readily apparent to persons of ordinary skill in the art that the example resource allocation methods could be easily extended to handle a different and/or variable number of resources per service request. For example, each feature Fj 5035 could have a pre-determined associated number of required resources per request. Alternatively, an allocation request message received by the resource allocator 1205 could specify a number of requested resources.

As also discussed above, the configuration of a unified sub-group could be adjusted on, for example, a time-of-day or day-of-week basis. In the illustrated example of 4, the current state of the unified sub-group may become invalid as a result of a resource allocation configuration change, but not as a result of the actions of the allocator 5010. The example resource allocation methods described and expressed above may be modified such that, over time, the allocator 5010 causes the state of the unified sub-group returns to a valid state. For example, the resource allocation methods may be modified to reject outdial service requests until the state is valid unless allocating a resource to the request would not affect the validity of the state. In particular, a metric F that represents how far the current state is from being valid may be computed using the mathematical expression of EQN. 5, where the values of $R_i$ are the new configured values. A valid state has a metric F that is greater than or equal to zero and, thus, a metric F that is less than zero can be used to detect an invalid state.

$$F = I - \sum_i \max[0, (R_i - C_i)] \quad \text{(EQN. 5)}$$

An alternative example resource allocation method that handles and/or recovers, over time, from a current invalid state may be mathematically expressed as shown in EQN. 6.

```
IF F < 0 and Cj ≧ Rj
THEN    Reject the outdial service request
ELSE
        IF Cj ≧ Mj                                      (EQN. 6)
        THEN Reject the outdial service request
        ELSE
            IF Cj ≧ Rj AND Unused_Reserved ≧ I
            THEN Reject the outdial service request
            ELSE Allocate a resource to the outdial service request
            END
        END
END
```

Figure 47:
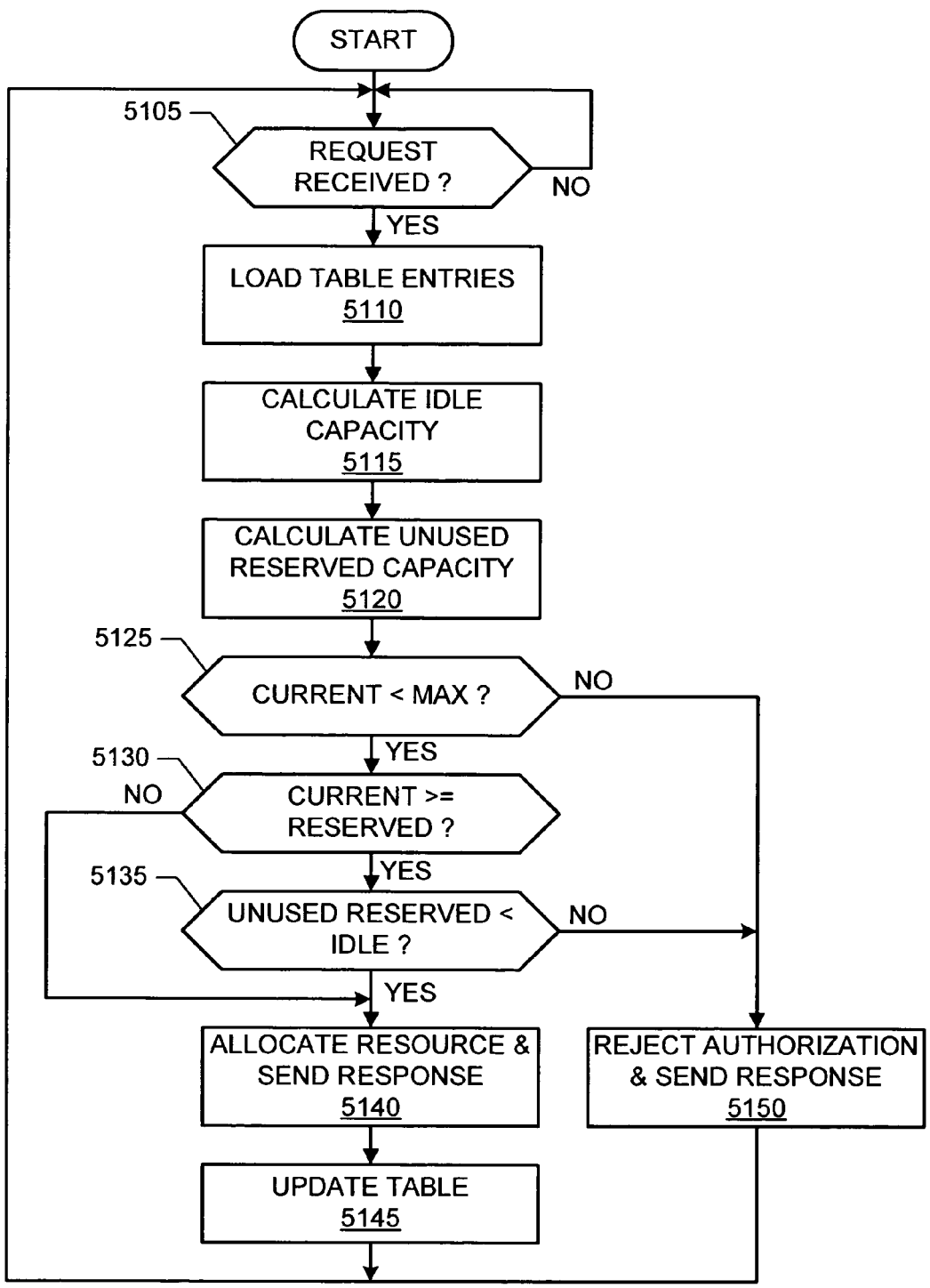
FIGS. 47 and 48 are flowcharts representative of example machine readable instructions which may be executed to implement the resource allocator of FIG. 4 and/or the resource allocation methods mathematically expressed in EQNS 1-6.
Figure 48:
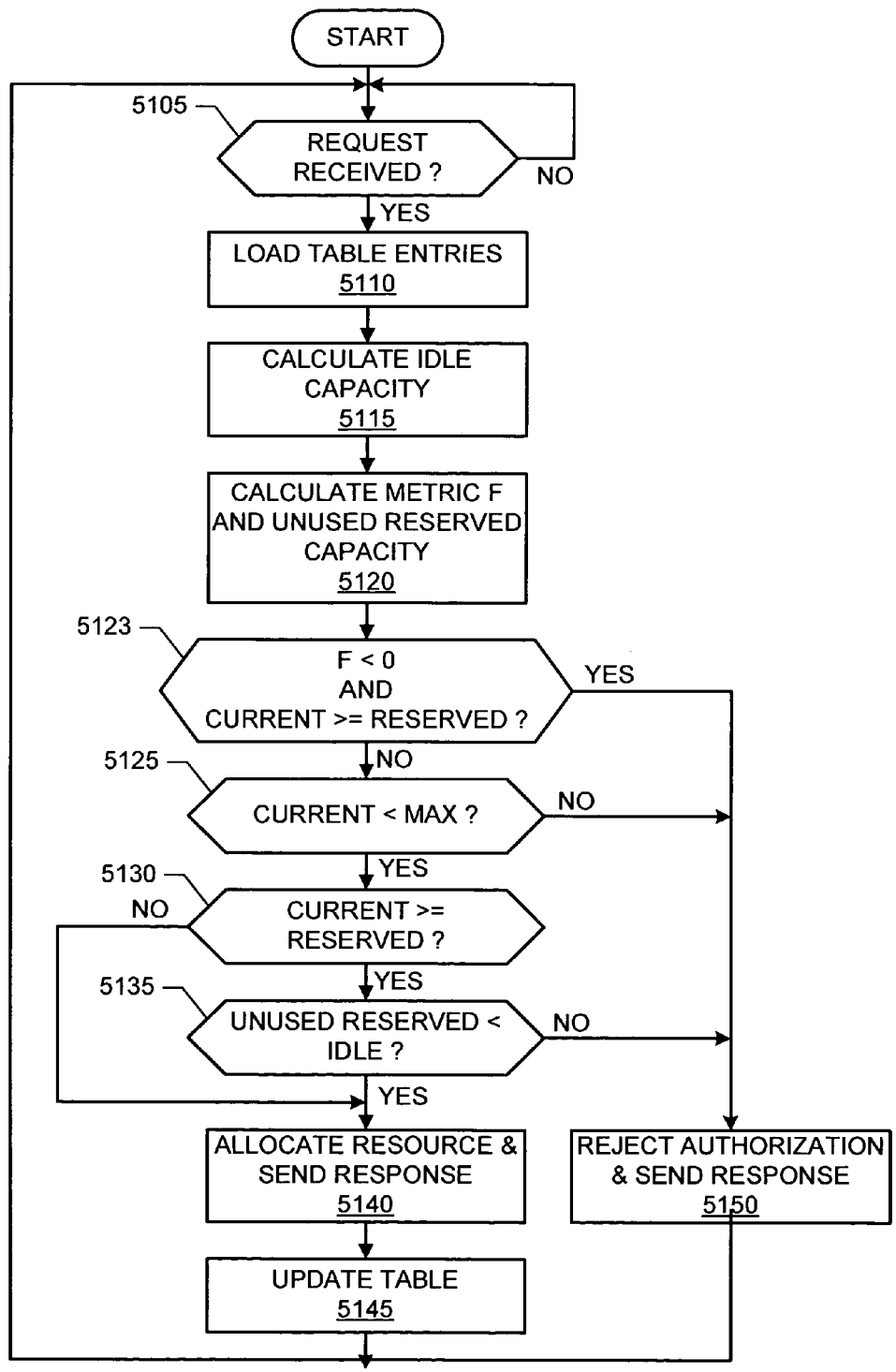

FIGS. 47 and 48 are flowcharts representative of example machine readable instructions that may be executed by a processor (e.g., the processor 8010 of FIG. 87) to implement the example resource allocator 1025 of FIG. 4, the example allocator 5050 of FIG. 44 and/or the example resource allocations methods expressed in EQNS 1-6. The machine readable instructions of FIGS. 47 and 48 may be executed by a processor, a controller and/or any other suitable processing device. For example, the machine readable instructions of FIGS. 47 and 48 may be embodied in coded instructions stored on a tangible medium such as a flash memory, or RAM associated with the processor 8010 shown in the example processor platform 8000 and discussed below in conjunction with FIG. 87. Alternatively, some or all of the example machine readable instructions of FIGS. 47 and 48, the allocator 5010, the rules database 5015, the control database 5020, the resource allocator adjuster 5025, and/or, more generally, the resource allocator 1025 may be implemented using an application specific integrated circuit (ASIC), a programmable logic device (PLD), a field programmable logic device (FPLD), discrete logic, hardware, etc. Additionally, some or all of the example machine readable instructions of FIGS. 47 and 48, the allocator 5010, the rules database 5015, the control database 5020, the resource allocator adjuster 5025, and/or, more generally, the resource allocator 1025 may be implemented using software, firmware, hardware, and/or a combination of hardware and software and/or firmware. Also, some or all of the machine readable instructions of FIGS. 47 and 48, the allocator 5010, the rules database 5015, the control database 5020, the resource allocator adjuster 5025, and/or, more generally, the resource allocator 1025 may be implemented manually or as combinations of any of the foregoing techniques. Further, although the example machine readable instructions of FIGS. 47 and 48 are described with reference to the flowcharts of FIGS. 47 and 48, persons of ordinary skill in the art will readily appreciate that many other methods of implementing the policy server 150 may be employed. For example, the order of execution of the blocks may be changed, and/or some of the blocks described may be changed, eliminated, sub-divided, or combined.

The example machine readable instructions of FIG. 47 begin with the resource allocator 1025 waiting to receive an allocation request from the processor 1010 (block 5105). Persons of ordinary skill in the art will appreciated that allocation requests may be queued and processed sequentially and/or processed in parallel by, for example, separate processing threads. If an allocation request is not received (block 5105), the resource allocator 1025 continues waiting (block 5105).

If an allocation request is received (block 5105), the resource allocator 1025 loads the resource allocation control table for the unified sub-group specified in the allocation request (if not already available in memory) and reads the row of the table corresponding to the requested outdial communication service type Fj 5035 (block 5110). The resource allocator 1025 then computes the idle capacity I of the unified sub-group by, for example, using the mathematical expression of EQN. 2 (block 5115) and computes the unused reserved capacity by, for example, using the mathematical expression of EQN. 1 (block 5120).

If the current number of resources allocated to the requested outdial communication service type (i.e., feature) Cj 5040 is less than the maximum Mj 5050 that may be allocated to the feature Fj 5035 (block 5125), the resource allocator 1025 determines if the current number of resources allocated to the requested outdial communication service type (i.e., feature) Cj 5040 is greater than the number of reserved resources Rj 5045 (block 5130). If the current number of resources allocated to the requested outdial communication service type (i.e., feature) Cj 5040 is greater than or equal to the number of reserved resources Rj 5045 (block 5130), the resource allocator 1025 determines if the unused reserved capacity is less than the idle capacity I (block 5135).

If the unused reserved capacity is less than the idle capacity I (block 5135), the resource allocator 1025 allocates a resource to the requested outdial service request and sends a response to the processor 1010 (block 5140), updates the current number of resources allocated to the requested outdial communication service type (i.e., feature) Cj 5040 stored in the table (block 5145) and control returns to block 5105 to await another allocation request.

If the unused reserved capacity is not less than the idle capacity I (block 5135), the resource allocator 1025 rejects the resource allocation request and sends a response indicating the same to the processor (block 5150) and control returns to block 5105 to await another allocation request.

Returning to block 5130, if the current number of resources allocated to the requested outdial communication service type (i.e., feature) Cj 5040 is less than the number of reserved resources Rj 5045, the resource allocator 1025 allocates a resource to the requested outdial service request and sends a response to the processor 1010 (block 5140), updates the current number of resources allocated to the requested outdial communication service type (i.e., feature) Cj 5040 stored in the table (block 5145) and control returns to block 5105 to await another allocation request.

Returning to block 5125, the current number of resources allocated to the requested outdial communication service type (i.e., feature) Cj 5040 is not less than the maximum Mj 5050 that may be allocated to the feature, the resource allocator 1025 rejects the resource allocation request and sends a response indicating the same to the processor (block 5150) and control returns to block 5105 to await another allocation request.

The example resource allocation method illustrated in the example machine readable instructions of FIG. 48 includes the ability to handle recovery from an invalid unified sub-group state. The example machine readable instructions of FIG. 48 proceed similarly to the example machine readable instructions of FIG. 47 and, thus, discussion of portions similar to the example of FIG. 47 will not be repeated here. Instead, the interested reader is referred back to the corresponding description of FIG. 47. To facilitate this process, like operations have been numbered with like reference numerals.

The example machine readable instructions of FIG. 48 proceed similarly to the example machine readable instructions of FIG. 47 through block 5115. The resource allocator 1025 computes the unused reserved capacity by, for example, using the mathematical expression of EQN. 1 and the metric F by, for example, using the mathematical expression of EQN. 5 (block 5120). If the metric F is less than zero and the current number of resources allocated to the requested outdial communication service type (i.e., feature) Cj 5040 is not less than the number of reserved resources Rj 5045 (block 5123), the resource allocator 1025 rejects the resource allocation request and sends a response indicating the same to the processor (block 5150) and control returns to block 5105 to await another allocation request. Otherwise, control proceeds to block 5125 and the example machine executable instructions of FIG. 48 continue proceeding as described in connection with the example machine executable instructions of FIG. 47.

VII. Call Transfers

Figure 49:
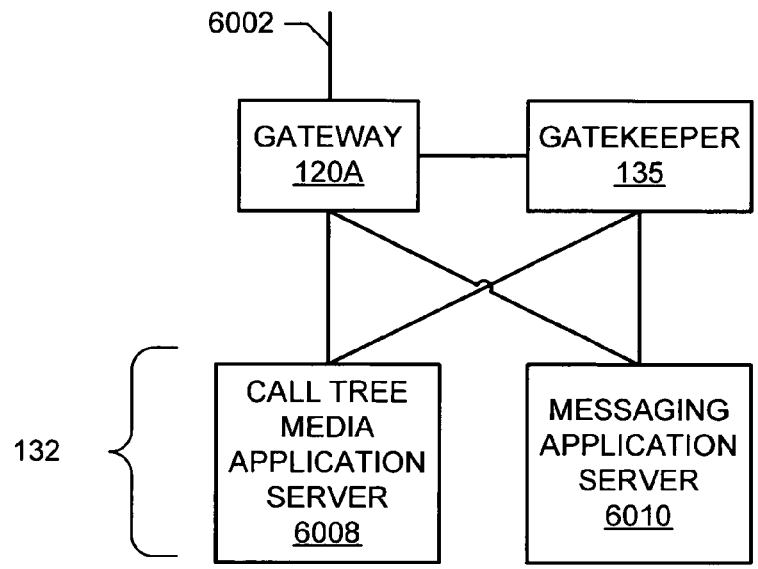
FIG. 49 is a schematic illustration of a portion of the example system of FIG. 1 including multiple application servers.

FIG. 49 is a schematic illustration of a portion of the example system of FIG. 1 including multiple application servers 132. The example system of FIG. 49 includes a communication facility 6002, a gateway 120A, a gatekeeper 135, (although gateway 120A and gatekeeper 135 are discussed in the following examples, persons of ordinary skill in the art will readily appreciate that the following description could alternatively or additionally apply to any gateway and/or gatekeeper including, for example, the gateway 120B) and application servers 132 (referenced as a call tree media server 6008 and a messaging application server 6010). As discussed above in Sections I, II and V, the authorization and/or routing of outdial communication service calls (i.e., outdial calls) depends upon regulatory rules and/or laws, and/or upon business requirements that, in turn, depend upon, for example, a subscriber LATA and an indial gateway LATA. Example parameters in determining a subscriber LATA and/or an indial gateway LATA include an access number by which an indial call enters a messaging platform (e.g., a messaging platform comprised of the gateway 120A, the gatekeeper 135, the message center 130, the policy server 150 and the operations database 160) and/or a mailbox number associated with a subscriber.

The example system of FIG. 49 is capable, among other things, of transferring an indial communication service call (i.e., an indial call) from one of the application servers 6008, 6010 to another one of the application servers 6008, 6010. In the illustrated example, the indial call transfer is completed such that, among other information, information pertinent to authorizing and/or routing an outdial call associated with the original indial call (i.e., access information) is carried over from the application server initiating the transfer (i.e., the originating or first application server) to the application server receiving the transferred indial call (i.e., the destination or second application server). In the example systems of FIG. 49 and/or FIG. 1, the access information may include parameters that represent or specify an indial gateway LATA, Mailbox number (MBN) and/or a subscriber LATA, or from which an indial gateway LATA, MBN and/or a subscriber LATA can be determined (e.g., an access number, etc.). Further, the example system of FIG. 49 is such that the resulting call setup utilized to complete the call transfer is similar to a call setup utilized to establish an indial call that was received directly from an access network (e.g., to a call setup for a call that was not transferred). As a result, the destination application server may require no modification to accept and/or to receive the transferred call transfer. This feature is desirable in situations where modification of an application server is expensive, time-intensive, and/or not possible.

By conveying access information from the first application server to the second application server as part of the call transfer, the second application server is able to provide accurate and/or complete access information to the policy server 150 such that the policy server 150 can correctly authorize and/or route an outdial communication service initiated by the second application server.

The example communication facility 6002 of FIG. 49 may be the same or substantially similar to the circuit-based communication facility 145A and/or the packet-based communication facility 147. The example communication facility 6002 is capable of connecting access networks with the gateway 120A. In particular, the example communication facility 6002 is capable of transmitting an indial call to the gateway 120A. The indial call may be received from a PSTN, from another VoIP network, or from any other network capable of handling calls.

An indial call entering a messaging platform via the communication facility 6002 may be accompanied by one or more parameters. An example set of parameters is Calling Party: <initiating phone number>, Called Party: <phone number to route to > and Redirecting Number: <phone number that caused redirection>.

In the illustrated example, indial calls entering via the communication facility 6002 include a phone number where the call was initiated (calling party), a phone number where the call is currently to be routed (called party), and a phone number from which the call was last redirected (redirecting number). For instance, in an example scenario, a call may be made from a first phone number (i.e., a calling number) to a second phone number (i.e., a subscriber's telephone number or mailbox number) and then redirected to a third phone number corresponding to a voice message box. At the time that the call reaches the communication facility 6002, the calling party field of the call setup stores the first phone number, the called party field of the call setup stores the third phone number, and the redirecting number field of the call setup stores the second phone number. The third phone number (i.e., called party number) may be a CFN, a CTAN, a toll-free access number, or any other number associated with an application server. In the example systems of FIGS. 1 and/or 49, the called number is the access number by which the indial call enters a messaging platform and represents some or all of the access information necessary to authorize and/or route the indial call and any associated outdial call.

The indial call may include a limited set of the parameters and/or may include other parameters not described here. Although not exhaustive, an indial call directed to a messaging application server 6010 may take on any of the following example forms:

A) A third party calls a subscribers mailbox (i.e., subscriber's telephone number):

Calling Party: Phone Number from which third party calls

Called Party: CFN (call forwarding number associated with the subscriber's mailbox)

Redirecting Number: MBN (subscriber's mailbox number)

B) A subscriber calls their CFN from their own phone:

Calling Party: MBN

Called Party: CFN

Redirecting Number: <none>

C) A subscriber calls their own MBN from their own phone:

Calling Party: MBN

Called Party: CFN or Toll Free Number

Redirecting Number: MBN

D) A subscriber calls their CFN from another phone:
   Calling Party: Other Number
   Called Party: CFN
   Redirecting Number: <none>

In the cases where the MBN is not provided as part of the indial call (i.e., it is not in one of the indial call parameters, for example, see example D above), the messaging application server 6010 requests the MBN from the caller or subscriber in order to create a full context for the indial call. For example, the messaging application server 6010 may use an interactive voice response (IVR) system to prompt a caller to provide an MBN by speaking the MBN or entering the MBN using a touchtone keypad of an electronic communication device. It will be readily apparent that similar indial usage scenarios can be considered for the access of a call tree application server 6008. For instance, in example D the CFN could be replaced by a CTAN, or in example A the CFN could be replaced by a CTAN and the MBN replaced by a call tree subscriber number.

It will be readily apparent that some devices and/or communication protocols utilized in a communication system may include limitations that do not allow some or all of these parameters to be used. For example, the ITU H.323 standard includes the supplementary call transfer service protocol ITU H.450-2 to initiate a call transfer, but the ITU H.450-2 protocol does not support a redirecting number parameter. As explained in detail below, modifications are made to, for instance, the gateways 120A, 120B, and/or the application servers to enable access information (e.g., an access number) to be communicated in a call transfer request and/or process, for example, in a request made pursuant to the H.450-2 protocol.

The example gateway 120A may be any gateway device including, for example, a gateway device made by Cisco Systems, Inc. The gateway 120A of the illustrated example interworks between the communication facility 6002 and the call tree media server 6008 and/or the messaging application server 6010 as described above. The gateway 120A of the illustrated example is also capable, as described above, of associating a dial peer with an indial call based on one or more parameters associated with the call (e.g., an access number). As previously described, each dial peer is also associated with an application server type and a specific message center. To determine to where an indial call should be routed (i.e., to an application server type at a specific message center), a dial peer associates the dial peer's provisioned technology prefix (e.g., 5#, 8#, etc.) with an indial call that contains an access number associated with the dial peer. In the illustrated examples of FIGS. 1 and/or 49, an ARQ message sent by the gateway 120A to the gatekeeper 135 contains a called party number comprising the technology prefix pre-pended to (e.g., concatenated to the front of) the access number. Of course, persons of ordinary skill in the art will recognize that many variations in the technology prefix syntax (e.g., they may be implemented as suffixes instead of prefixes) and/or in the number of and/or association of dial peers is possible. In addition, the association of technology prefixes may be accomplished using any other method of determining the features required for a particular indial call.

The gateway 120A of the illustrated example is capable of receiving a request to transfer a call from one of the application servers 6008, 6010 to another one of the application servers 6008, 6010. The request to transfer the call may be made using, for example, the H.450-2 protocol and/or any of a variety of call transfer protocols and/or call transfer processes appropriate to, for example, an H.323 or SIP based VoIP network 125 (FIG. 1). In the interest of brevity and for ease of discussion, throughout the remainder of this patent reference will be made to the H.450-2 protocol and/or to transferring an indial call from the call tree media application server 6008 to the messaging application server 6010. However, persons of ordinary skill in the art will readily appreciate that the methods and systems described herein are equally applicable to call transfers using other call transfer protocols and/or processes, and/or to call transfers between other types of devices and/or application servers 132.

As mentioned above, the redirecting number parameter is not supported by an H.450-2 transfer request. Therefore, in the illustrated example, a call transfer request includes the value of the original called party number (i.e., the access number) of the original indial call in the called party field of the call transfer request. For instance, in the illustrated example the parameters for a call transfer request may be Calling Party: <Original Calling Party Number> and Called Party: <MBN>#TP1<Original Called Party Number>.

When such a request is received by the gateway 120A, the gateway 120A of the illustrated example will parse the called party field of the call transfer request using, for example, a tool command language (Tcl) script to obtain from the request one or more of the individual elements (e.g., the MBN, the technology prefix, the original called party, etc.). Of course, the gateway 120A may implement any other method for parsing the request parameters and may utilize any programming language to parse the parameters such as, for example, C, C++, C#, Java, Visual Basic, COBOL, Python, PERL, Bourne-Again Shell (BASH), etc.

As described above, the gatekeeper 135 of the illustrated examples of FIGS. 1 and/or 49 is responsible for admitting indial and/or transferred calls received at a gateway. In the illustrated example, the gateway 120A sends an ARQ message for an indial call and/or a call transfer and passes the parameter(s) associated with the indial call and/or the call transfer to the gatekeeper 135. The admittance and setup of indial calls were fully discussed above in Sections I and II and in connection with FIGS. 5-8 and, in the interest of brevity, will not be further discussed here. For a call transfer, the gateway 120A sends an ARQ message that includes, among other things, a called party number comprising the technology prefix concatenated with the original called party (i.e., the access number for the original indial call) and a redirecting number comprising the MBN. When the gatekeeper 135 receives the ARQ, it selects, as discussed above, an appropriate destination application server for the call transfer based on the technology prefix and returns the IP address of the identified destination server to the gateway 135.

The example system of FIG. 49 includes the example call tree media server 6008 and the example messaging application server 6010. The example call tree media server 6008 of FIG. 49 is capable of, for example, providing call tree services to indial calls received from the gateway 120A. Example implementations of the call tree media server 6008 include call tree media servers made by Converse, Inc.

The example messaging application server 6010 of FIG. 49 is capable of, for example, providing voice messaging services to indial calls received from the gateway 120A. An example message application server is the UOne Server from LogicaCMG plc. Persons of ordinary skill in the art will recognize that the illustration of the call tree media server 6008 and/or the messaging application server 6010 are examples and any number or variety of application servers provisioning any number of features or services may be provided in a system.

The call tree services of the call tree media server 6008 include the option to transfer an indial call to messaging services provided by, for example, the messaging application server 6010. To this end, the call tree media server 6008 is capable of determining a MBN associated with the call transfer. For example, the call tree media server 6008 may include or use an IVR system to prompt a caller to provide a MBN by speaking the MBN or by entering the MBN. Alternatively, a MBN may be associated with one or more branches or terminating points of a call tree. For example, the call tree application may determine via a user input or selection that the caller wishes to leave a message for a technical support team, the call tree application may then use a pre-determined MBN for the technical support team as stored in the call tree description and/or definition.

In the example system of FIGS. 1 and/or 49, the call tree media server 6008 is capable of accessing a directory service to determine the technology prefix associated with a messaging application server at the messaging center serving the determined MBN. In the illustrated example, the directory service is an email routing table (ERT). However, any other directory capable of associating an identifier (e.g., a technology prefix) with a subscriber (e.g., a MBN) may alternatively be used. In response to a request from the call tree media server 6008, the ERT of the illustrated example returns a technology prefix associated with a mailbox number. An example method of transferring a call will be described in detail in conjunction with FIGS. 54A, 54B and 54C.

Figure 50:
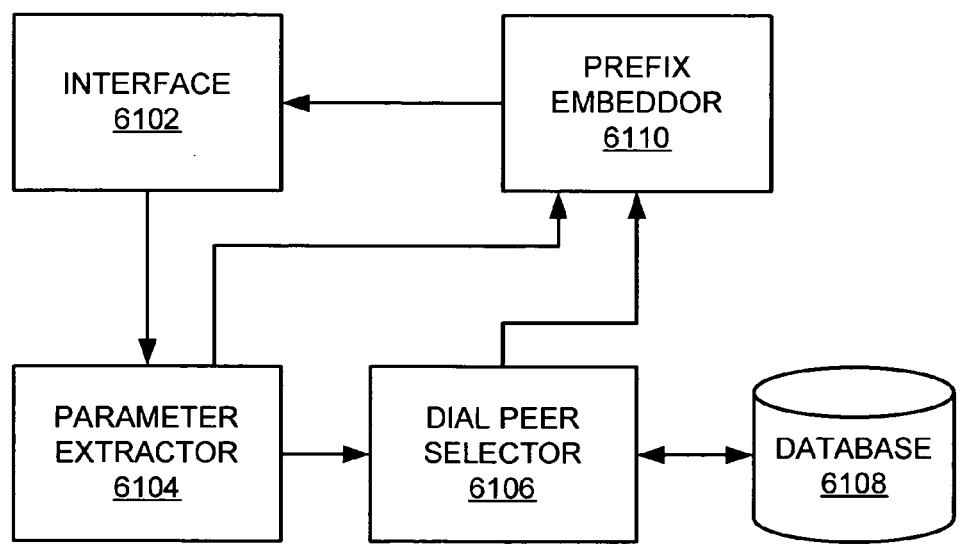
FIG. 50 is a block diagram of an example implementation of a portion of the gateway of FIG. 49.

FIG. 50 is a block diagram of an example implementation of a portion of the gateway 120A of FIG. 49. Persons of ordinary skill in the art will appreciate that the block diagram of FIG. 50 illustrates a portion of the gateway 120A that implements some or all of the control and/or signaling within the gateway 120A and/or between the gateway 120A and other elements of the example system of FIGS. 1 and/or 49. For simplicity of illustration, other portions of the gateway 120A which are not pertinent to this discussion are not included in the diagram.

The example gateway 120A of FIG. 50 includes, among other things, an interface 6102, a parameter extractor, 6104, a dial peer selector 6106, a database 6108, and a prefix embeddor 6110. The interface 6102 is capable of providing communication between the gateway 120A and other connected devices. For example, the interface 6102 enables communication between the gateway 120A and the communication facility 6002, the gatekeeper 135, the call tree media server 6008, and/or the messaging application server 6010 of FIGS. 1 and/or 49. The interface may implement any method of providing communication between devices such as, for example, a wired network connection, a wireless network connection, a connection to a PSTN, connection to an access VoIP network, connection to a platform VoIP network, etc. In the example system of FIG. 1, the database 6108 includes, among other things, configuration parameters for the gateway 120A as described in Section III and in connection with FIGS. 10-11 and 18A-C.

The example parameter extractor 6104 extracts data from the parameters associated with an indial call and/or a call transfer request received via the interface 6102. For example, the example parameter extractor 6104 is capable of retrieving the calling phone number, the called phone number, and the redirecting phone number from the parameters associated with an indial call. The example parameter extractor 6104 is additionally capable of extracting parameters from a call transfer request received from an application server 132 such as, for example, the call tree media server 6008. For example, when the example parameter extractor 6104 receives a call transfer request from the call tree media server 6008, the called party parameter associated with the call includes a combination of the MBN, the technology prefix, and the original called number (e.g., the original access number). The parameter extractor 6104 utilizes a Tcl script to extract the individual parameters associated with the call transfer request. As previously described, the parameter extractor 6104 may utilize any other programming language to parse the parameters such as, for example, C, C++, C#, Java, Visual Basic, COBOL, Python, PERL, BASH, etc. The example parameter extractor 6104 passes extracted parameters to the dial peer selector 6106 and the prefix embeddor 6110.

The dial peer selector 6106 is capable of selecting a dial peer associated with an indial call. For example, as described above, the dial peer selector 6106 can match the access number extracted by the parameter extractor 6104 with patterns of access numbers supported by one or more dial peers. The dial peer selector 6106 is additionally or alternatively capable of selecting a dial peer based on the technology prefix determined from a call transfer request by the parameter extractor 6104. The example dial peer selector 6106 receives parameters from the parameter extractor 6104 and queries the database 6108 to locate a dial peer to associate (i.e., match) with the call. For example, the example dial peer selector 6106 may query the database 6108 with the called party number parameter and/or technology prefix to perform a pattern match of the called party parameter and/or technology prefix against one or more parameters stored in the database 6108. The database 6108 may be any database and/or table capable of associating call parameters and/or technology prefixes with a dial peer. Alternatively, each dial peer (not shown) of the example gateway 120A of FIG. 50 is capable to perform pattern matching against each incoming indial call and automatically activates for an indial calling having an access number falling within a range of called party numbers provisioned for the dial peer.

The example prefix embeddor 6110 is capable of receiving parameters including a technology prefix from either or both of the parameter extractor 6104 and the dial peer selector 6106 and associating the parameters with an indial call and/or a call transfer. The example prefix embeddor 6110 combines the technology prefix with the called phone number to form the called party field. For instance, for a call transfer request, the technology prefix is the technology prefix received in the call transfer request and the called phone number is the original called party number also received in the call transfer request. For example, the prefix embeddor 6110 may insert the technology prefix before the value for the called party number in the called party field. The prefix embeddor 6110 passes the parameters associated with the call to the interface for incorporation into a message and/or transmission to another device such as, for example, the communication facilities 6002, the gatekeeper 135, and/or the application servers 132.

Figure 51:
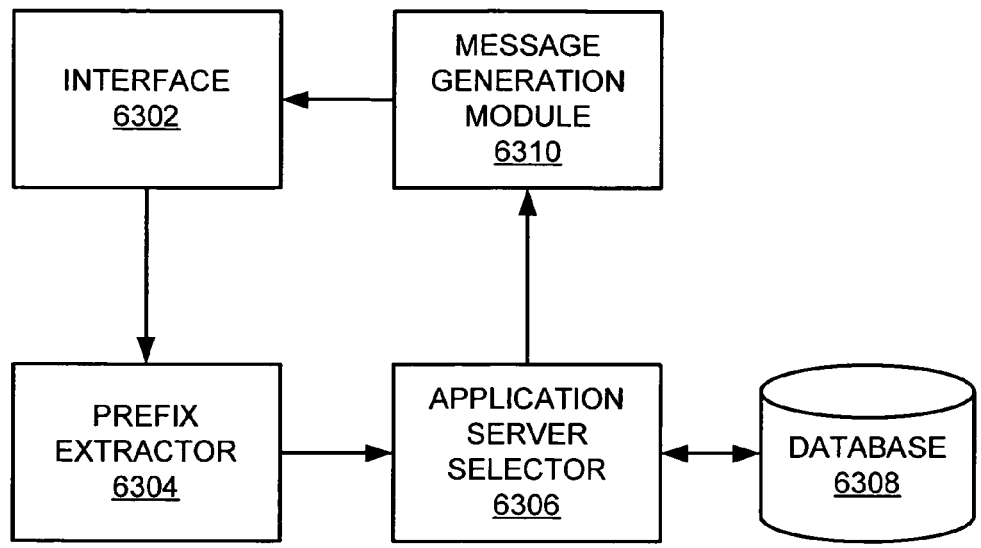
FIG. 51 is a block diagram of an example implementation of a portion of the gatekeeper of FIG. 49.

FIG. 51 is a block diagram of an example implementation of a portion of the gatekeeper 135 of FIG. 49. Persons of ordinary skill in the art will appreciate that the block diagram of FIG. 50 illustrates a portion of the gatekeeper 135 that implements some or all of the control and/or signaling within the gatekeeper 135 and/or between the gatekeeper 135 and other elements of the example system of FIGS. 1 and/or 49. For simplicity of illustration, other portions of the gatekeeper 135 which are not pertinent to this discussion are not included in the diagram.

The gatekeeper 135 includes an interface 6302, a prefix extractor 6304, a server selector 6306, a database 6308, and a message generation 6310. The interface 6302 is capable of providing communication between the gatekeeper 135 and other connected devices. For example, the interface 6302 enables communication between the gatekeeper 135 and the gateway 120A, the call tree media server 6008, and/or the messaging application server 6010 of FIG. 49. The interface may implement any method of providing communication between devices such as, for example, a wired network connection, a wireless network connection, a connection to a PSTN, a connection to a platform VoIP network, etc.

The example prefix extractor 6304 is capable of receiving an ARQ message and extracting parameters associated with the ARQ message. For example, the example prefix extractor extracts a technology prefix embedded in the called party field. The prefix extractor 6304 then passes the extracted parameters to the application server selector 6306.

The server selector 6306 receives parameters associated with an ARQ message from the prefix extractor 6304 and queries the database 6308 to determine an address of an application server (e.g., an IP address). The selection of an application server is discussed above in Sections I and II and, in the interest of brevity, will not be discussed further here. The server selector 6306 passes the ARQ message and the application server address to the message generation module 6310.

The example message generation module 6310 receives an ARQ message and its associated parameters and generates an ACF message to confirm the ARQ message and to provide the IP address of the selected application server. The message generation module 6310 transmits that ACF message to the interface 6302 for communication. For example, if the gateway 120A transmits an ARQ message to the gatekeeper 135, the interface 6302 returns the ACF message including a selected server address to the gateway 120A.

It will be readily apparent to persons of ordinary skill in the art that call transfers that preserve access information as described above may be implemented without modification of the gatekeeper 135.

Figure 52:
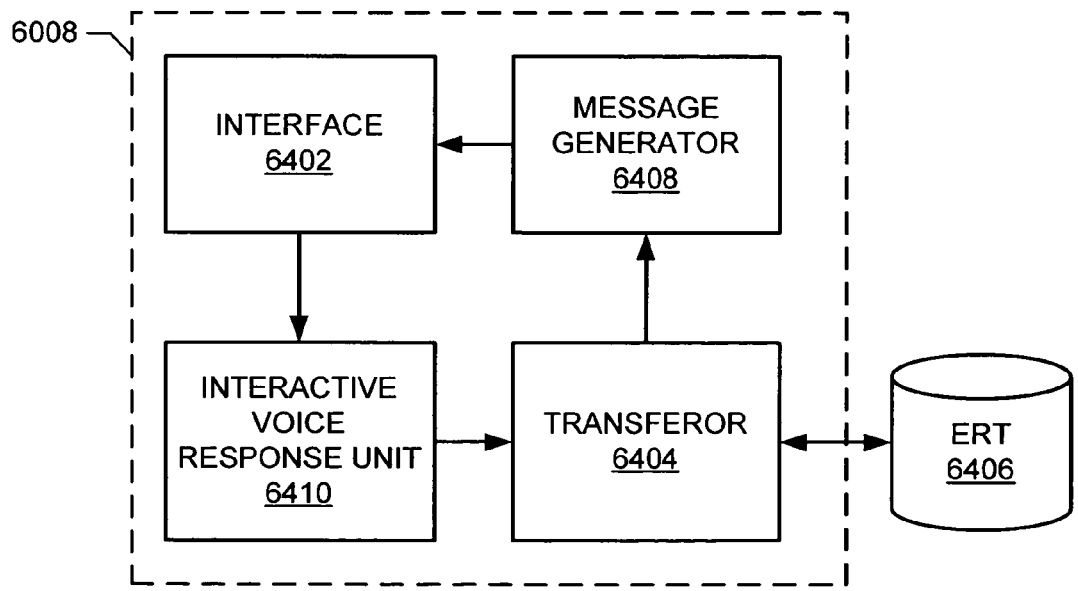
FIG. 52 is a block diagram of an example implementation of a portion of the media server of FIG. 49.

FIG. 52 is a block diagram of an example implementation of the call tree media server 6008 of FIG. 49. Persons of ordinary skill in the art will appreciate that the block diagram of FIG. 52 illustrates a portion of the call tree media server 6008. For simplicity of illustration, other portions of the call tree media server 6008 which are not pertinent to this discussion are not included in the diagram. In the example systems of FIGS. 1 and/or 49, a call tree application is comprised of a call tree media server (e.g., the call tree media server 6008 of FIG. 52) and an application server. A call tree and/or a call tree media server 6008 may be implemented using any of a variety of additional and/or alternative methods and/or techniques. The example call tree media server 6008 includes an interface 6402, a transferor 6404, an ERT 6406, a message generator 6408, and an IVR unit 6410. The IVR unit 6410 provides audible menu choices and responds to responses entered, for example, by a touch tone keypad of an electronic communication device to enable a calling party to select services or provided by a user speaking responses.

The interface 6402 is capable of providing communication between the call tree media server 6008 and other connected devices. For example, the interface 6008 enables communication between the call tree media server 6008 and the gateway 120A and/or the gatekeeper 135 of FIG. 49. The interface 6402 may implement any method of providing communication between devices such as, for example, a wired network connection, a wireless network connection, a connection to a PSTN, a platform VoIP network, etc.

The example transferor 6404 is capable of receiving an instruction to transfer an indial call from the interactive voice response unit 6410 (i.e., the call tree media server 6008) to another application server such as the messaging application server 6010. In response to the call transfer instruction, the example transferor 6404 determines as described above, a MBN to which the indial call will be transferred. The example transferor 6404 then queries the ERT 6406 with the destination of the call transfer request (i.e., the MBN) to determine a technology prefix associated with the MBN. The ERT 6406, among other things, associates call transfer destinations with technology prefixes.

The example message generator 6408 receives the MBN and the technology prefix associated with the call transfer request and generates a message to request a call transfer. The example message generator 6408 formats the request according to the H.450-2 protocol. However, the message generator 6408 may alternatively utilize any other message format capable of requesting a call transfer. The example message generator 6408 concatenates and/or inserts the MBN, the technology prefix and the original called party number (i.e., original access number) in the called party parameter field of the call transfer request. However, persons of ordinary skill in the art will recognize that any other method of associating the parameters (e.g., the MBN, the technology prefix and the original called party number) with the call transfer request may alternatively be used. The example message generator 6408 passes the call transfer request message to the interface 6402 for transmission to the gateway 120A or to any other location capable of handling a call transfer request.

Figure 53:
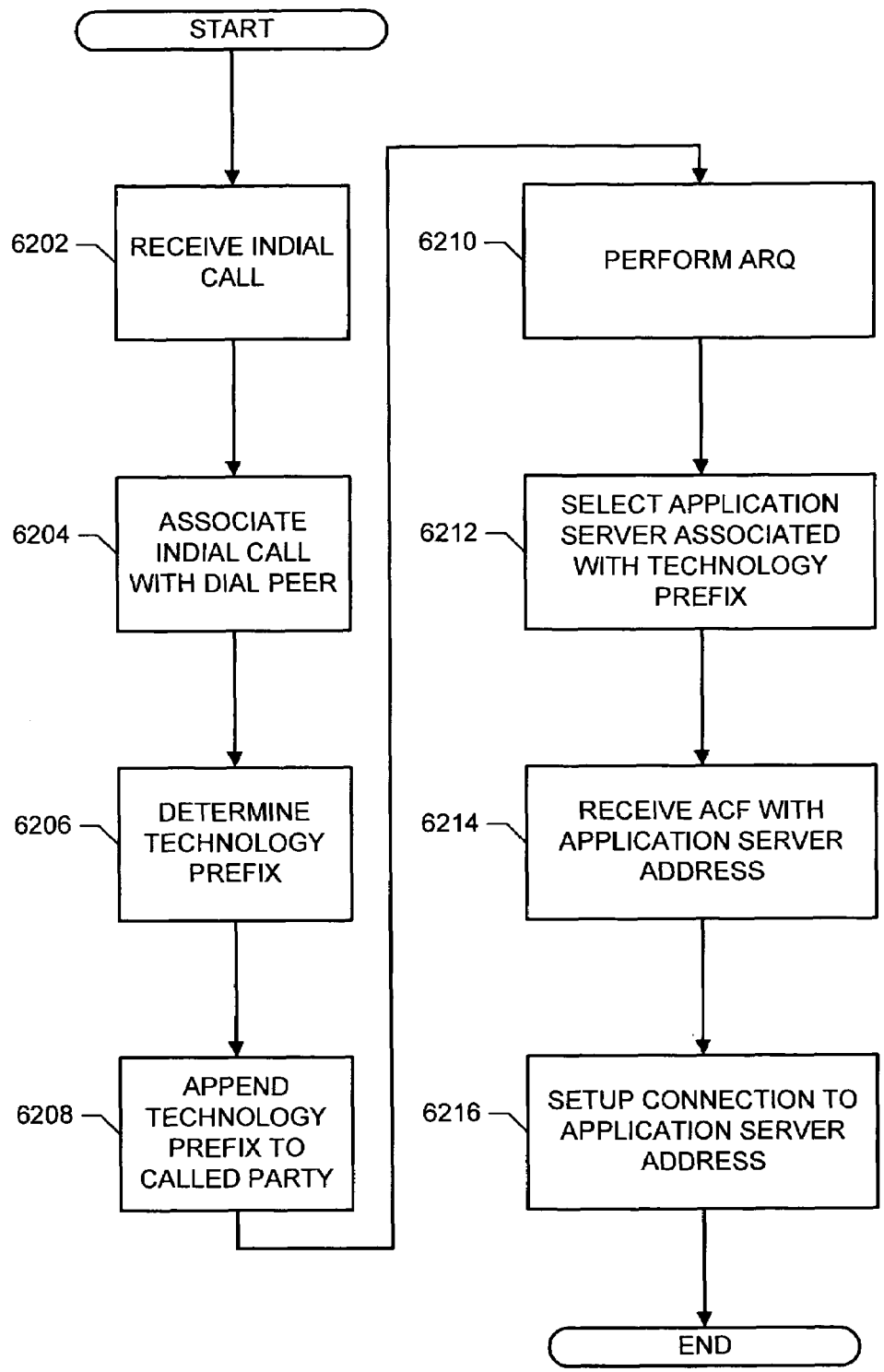
FIG. 53 is a flowchart representative of example machine readable instructions that may be executed to handle an indial call to the call tree media server of FIG. 49.

FIG. 53 is a flowchart representative of example machine readable instructions that may be executed to handle an indial call to the call tree media server 6008 of FIG. 49. In this example, the machine readable instructions comprise a program for execution by a processor such as the processor 8010 shown in the example computer 8000 discussed below in connection with FIG. 87. The program may be embodied in software stored on a tangible medium such as a CD-ROM, a floppy disk, a hard drive, a digital versatile disk (DVD), or a memory associated with the processor 8010, but persons of ordinary skill in the art will readily appreciate that the entire program and/or parts thereof could alternatively be executed by a device other than the processor 8010 and/or embodied in firmware or dedicated hardware in a well known manner. For example, any or all of the interfaces 6102, 6302, 6402, parameter extractor 6104, dial peer selector 6106, prefix embeddor 6110, prefix extractor 6304, server selector 6306, message generation module 6310, transferor 6404, message generator 6408 and/or the interactive voice response unit 6410 could be implemented by software, hardware, and/or firmware. Further, although the example program is described with reference to the flowchart illustrated in FIG. 53, persons of ordinary skill in the art will readily appreciate that many other methods of implementing the example gateway 120A, the example gatekeeper 135, the example call tree media server 6008 and/or the example message application server 6010 may alternatively be used. For example, the order of execution of the blocks may be changed, and/or some of the blocks described may be changed, eliminated, or combined.

The machine executable instructions of FIG. 53 are executed when an indial call is received via, for example, the communication facility 6002 at the gateway 120A (block 6202). For example, an indial call may be received by the interface 6302 of the example gateway 120A with the following parameters Calling Party: 555-999-1111,
Called Party: 555-999-2222, and
Redirecting Party: None, where 555-999-1111 is the phone number of the party that initiated the indial call, 555-999-2222 is a CTAN, and the redirection party was not used. This may occur, for example, when a person calls a call tree directly and, thus, will be routed to a call tree application server without a redirecting number.

Upon receiving the indial call (block 6202), the dial peer selector 6106 associates the call with a dial peer based on the parameters received with the call (e.g., the access number 555-999-2222) (block 6204). The dial peer selector 6106 then determines the technology prefix for the indial call based on the technology prefix provisioned to the dial peer (block 6206). The prefix embeddor 6104 receives the technology prefix from the dial peer selector 6106 and then, as described above, combines the technology prefix with the called party parameter (block 6208). For example, the technology prefix may be inserted in the called party parameter prior to the value for the called party (e.g., 1#555-999-2222). However, persons of ordinary skill in the art will recognize that any other method of embedding the technology prefix in the parameters may alternatively be used.

After the technology prefix has been combined with the called party parameter, the gateway 120A sends an ARQ message to the gatekeeper 135 using the updated parameters associated with the call (block 6210). The interface 6402 of the gatekeeper 135 receives the ARQ. The prefix extractor 6304 retrieves the technology prefix from the ARQ message. The server selector 6306 then selects an application server at a specific message center that is associated with the technology prefix (block 6212). After selecting the appropriate application server 132 (e.g., the call tree media server 6008), the message generation 6310 generates an ACF message including the address of the selected application server 132 (e.g., the call tree media server 6008). The interface 6302 then transmits the ACF message to the gateway 120A (block 6214). The address may be any type of address format capable of specifying the location of an application server such as an IP address, hardware address, etc.

After receiving the ACF message with the address of the appropriate application server 132 (e.g., the call tree media server 6008), the gateway 120A, as described above, creates a connection between the dial peer associated with the indial call and the appropriate application server 132 (e.g., the call tree media server 6008) (block 6216). Accordingly, the indial call is connected with the user interface of the appropriate application server 132 (e.g., the call tree media server 6008).

Figure 54A:
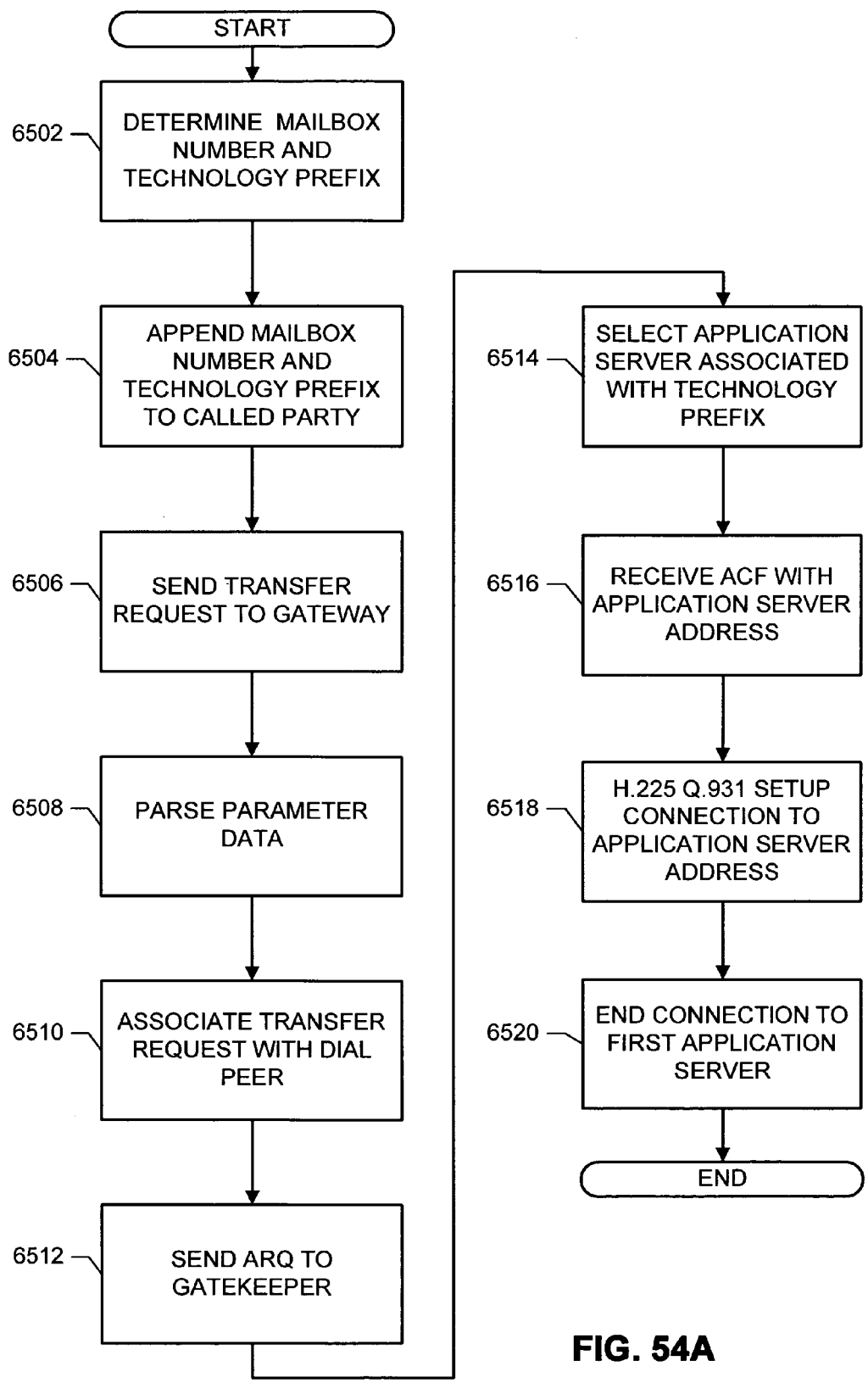
FIGS. 54A, 54B and 54C are flowcharts representative of example machine readable instructions that may be executed to transfer a call from the call tree media server to the messaging application server of FIG. 49.
Figure 54B:
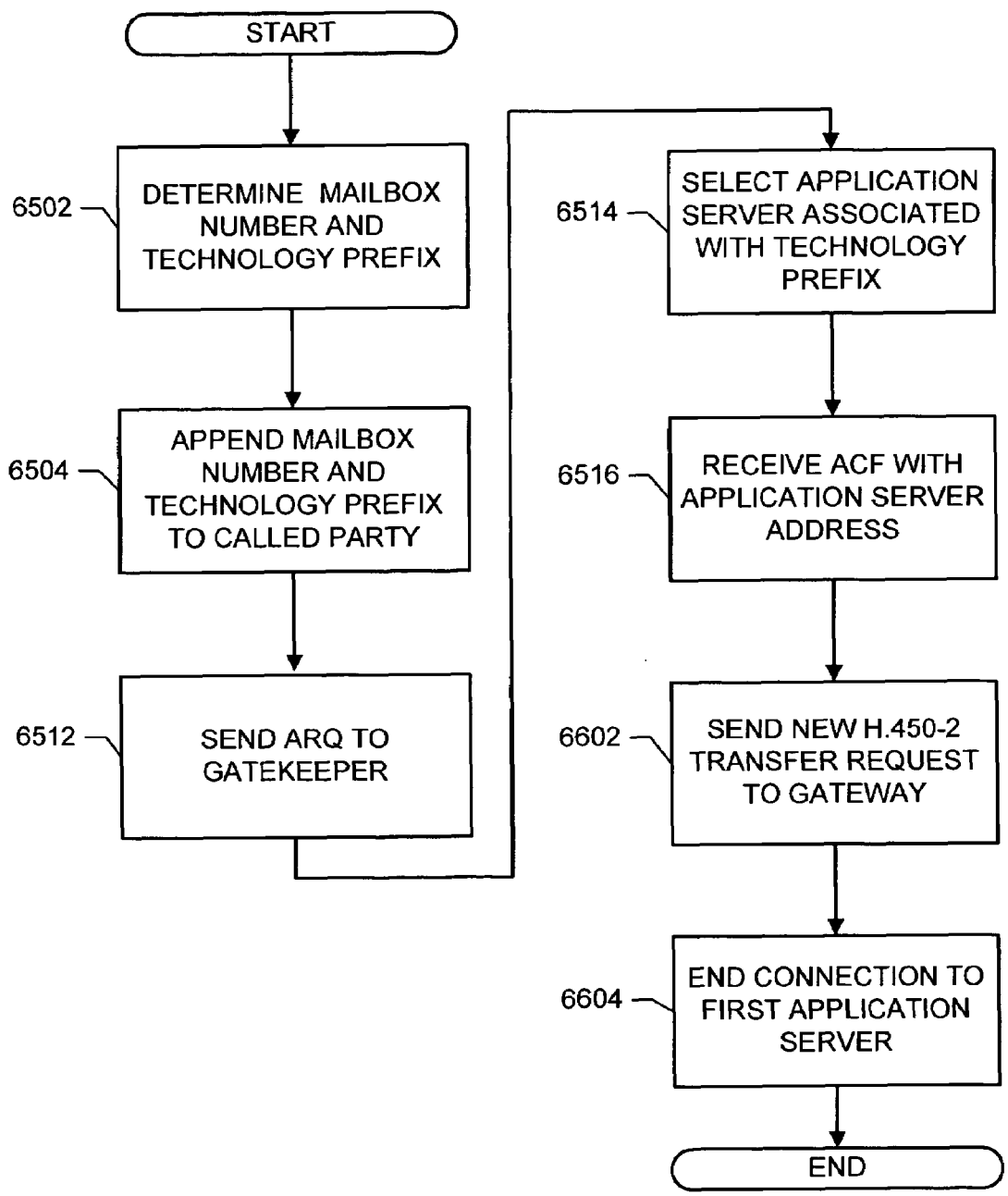
Figure 54C:
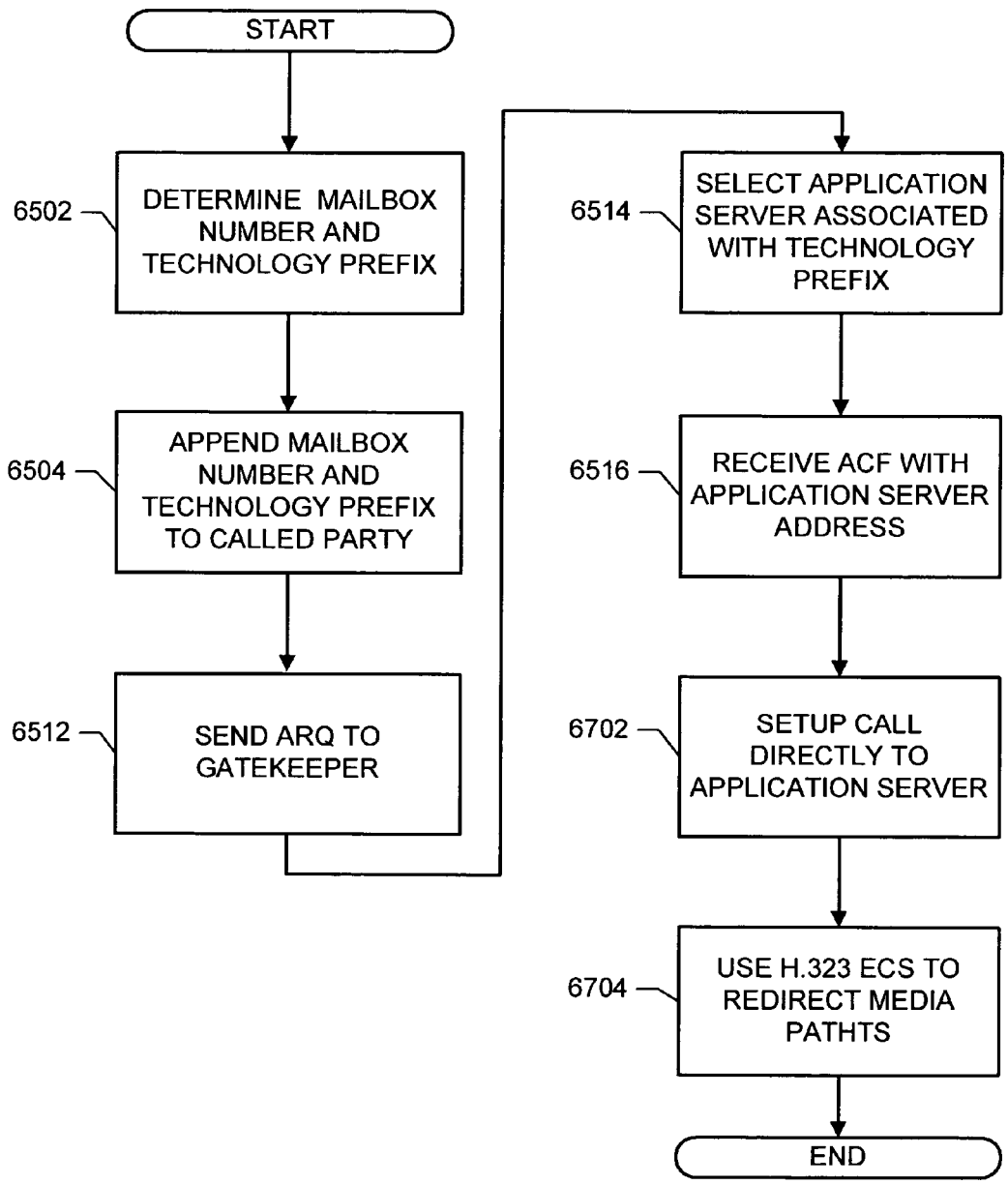

FIGS. 54A, 54B and 54C are flowcharts representative of example machine readable instructions that may be executed to transfer a call from a first application server 132 (e.g., the call tree media server 6008) to a second application server 132 (e.g., the messaging application server 6010 of FIG. 49). For example, the interactive voice response unit 6410 of the call tree media server 6008 may include an option for the user to transfer to a voice mail box on the messaging application server 6010 to leave a voice message or to listen to currently stored voice messages. The flowchart of FIG. 54 will be described with reference to this example.

In the example, of FIGS. 54A-C, the machine readable instructions comprise a program for execution by a processor such as the processor 8010 shown in the example computer 8000 discussed below in connection with FIG. 87. The program may be embodied in software stored on a tangible medium such as a CD-ROM, a floppy disk, a hard drive, a digital versatile disk (DVD), or a memory associated with the processor 8010, but persons of ordinary skill in the art will readily appreciate that the entire program and/or parts thereof could alternatively be executed by a device other than the processor 8010 and/or embodied in firmware or dedicated hardware in a well known manner. For example, any or all of the interfaces 6102, 6302, 6402, parameter extractor 6104, dial peer selector 6106, prefix embeddor 6110, prefix extractor 6304, server selector 6306, message generation module 6310, transferor 6404, message generator 6408 and/or the interactive voice response unit 6410 could be implemented by software, hardware, and/or firmware. Further, although the example program is described with reference to the flowchart illustrated in FIGS. 54A-C, persons of ordinary skill in the art will readily appreciate that many other methods of implementing the example gateway 120A, 120B, the example gatekeeper 135, the example call tree media server 6008 and/or the example message application server 6010 may alternatively be used. For example, the order of execution of the blocks may be changed, and/or some of the blocks described may be changed, eliminated, or combined.

The machine executable instructions of FIG. 54A are executed when a request is to be made to transfer an indial call from a first application server 132 (e.g., the call tree media server 6008) to a second application server 132 (e.g., the messaging application server 6010). The indial call may be established for, by example, executing the machine executable instructions of FIG. 53. Upon initiating the call transfer, the transferor 6404 of the application server 132, as described above, determines a MBN (e.g., 555-999-4444) and a technology prefix (e.g., 5#) associated with the MBN to which the call will be transferred (block 6502).

Once the MBN and the technology prefix associated with the call transfer are determined (block 6502), both the technology prefix and the original called party number (i.e., the access number) associated with the call are combined and stored with the called party parameter of a transfer request (block 6504). For example, the called party parameter field may contain the MBN, followed by the technology prefix, followed by the original called party value. In addition, a delimiter such as the pound sign (#) may be used to separate the MBN from the technology prefix value. Thus, the example parameters associated with the call transfer request may be Calling Party: 555-999-1111 and
Called Party: 555-999-4444#5#555-999-2222.

A call transfer request is sent to the gateway 120A by the message generator 6408 of the call tree media server 6008 (block 6506). For example, the call tree media server 6008 may make a H.450-2 transfer request to initiate the call transfer or may make a transfer request using any other protocol and/or process for initiating a call transfer. The H.450-2 transfer request does not support the redirecting number parameter as previously described. Therefore, in the illustrated example the example combined parameter described above is placed in the called party field of the H.450-2 transfer request.

When the call transfer request is received by, for example, the gateway 120A (block 6506), the parameter extractor 6104 of the gateway 120A parses the called party parameter of the call transfer request to obtain the individual parameters embedded in the request (block 6508). The dial peer selector 6106 then associates the call transfer with a dial-peer based on one or more of the individual parameters (e.g., the technology prefix) (block 6510). The prefix embeddor 6110 creates an ARQ message including the original access number that was stored in the called party field of the call transfer request as well as the other data from the request (e.g., the technology prefix). For example, the prefix embeddor 6110 may create a new ARQ message with the parameters Calling Party: 555-999-1111,
Called Party: 5#555-999-2222 and
Redirecting Number: 555-999-4444.

Then the gateway 120A sends the ARQ message to the gatekeeper 135 (block 6512). The prefix extractor 6304 of the gatekeeper 135 extracts the technology prefix and, as described above, selects an application server based on the technology prefix (block 6514). After selecting the messaging application server 6010 (block 6514), the message generation 6310 causes the interface 6302 to transmit an ACF message to the gateway 120A which includes the address of the messaging application server 6010 (block 6516). The ACF message is received by the gateway 120A (block 6516).

After receiving the ACF (block 6516), the interface 6102 of the gateway 120A connects the call to the address associated with the ACF message using the Q.931 call setup described in above (block 6518). For example, the call is connected to the messaging application server 6010 with the mailbox number 555-999-4444 stored in the redirecting number field. In other words, the call appears to the messaging application server 6010 as though it has come directly to the messaging application server 6010 as an indial call instead of as a call transfer from the call tree media server 6008. Compared to an indial call, the call transfer arrives at the messaging application server 6010 with the following parameters Calling Party: Original Calling Party Number,
Called Party: TP#CTAN and
Redirecting Number: MBN.

As such, the messaging application server 6010 may use the CTAN as the access number in any subsequent outdial request rather than a CFN (as is the normal indial usage case for the messaging application server 6010). In the example systems of FIGS. 1 and/or 49, the messaging application server 6010 uses the MBN to identify the subscriber and, thus, the messaging application server 6010 does not need to directly utilize and/or interpret the CTAN or CFN contained in a set of indial and/or call transfer parameters. However, when the messaging application server 6010 is initiating a non-real-time outdial (i.e., which is not tied to an indial and/or a call transfer) the messaging application server 6010 determines an access number (e.g., a CFN) from the MBN.

Once the call transfer is successful, the gateway 120A ends the connection with the first server (e.g., call tree media server 6008) (block 6520). Ending this connection frees ports on the gateway 120A and the call tree media server 6008 to handle other indial calls.

The example machine executable instructions of FIGS. 54B and 54C illustrate alternative call transfer methods to the example machine executable instructions of FIG. 54A. The alternative methods illustrated in FIGS. 54B and 54C may be used, for example, with a gateway supporting an H.450-2 call transfer to an IP address or an application server capable of accepting a call setup directly from another application server. The illustrated example machine executable instructions of FIGS. 54B-C proceed similarly to the example machine executable instructions of FIG. 54A and, thus, the description of the first portion of FIGS. 54B and 54C will not be repeated here. Instead, the interested reader is referred back to the corresponding description of FIG. 54A. To facilitate this process, like operations have been numbered with like reference numerals in FIGS. 54A-C. However, in contrast to the example machine readable instructions of FIG. 54A, in the example machine readable instructions of FIGS. 54B and 54C, the first application server sends the ARQ message to the gatekeeper 135 (block 6512) and receives the ACF messages from the gatekeeper 135 (block 6516).

Referring to FIG. 54B, after receiving the ACF message from the gatekeeper 135 (block 6516), the first application server initiates and completes an H.450-2 call transfer request with the application server address from the ACF message as the call transfer endpoint and with the calling parameters as discussed above (block 6602). Once the call transfer is successful (block 6602), the gateway 120A ends the connection with the first server (e.g., call tree media server 6008) (block 6404) (block 6604). Ending this connection frees ports on the gateway 120A and the call tree media server 6008 to handle other indial calls.

Referring to FIG. 54C, after receiving the ACF message from the gatekeeper 135 (block 6516), the first server initiates and establishes a call directly to the second server using the address of the second server from the ACF message (block 6702). Once the call is established, the first server uses H.323 ECS to direct the associated media paths to the destination server (block 6704).

VIII. Operations Database

To securely manage a host enterprise's messaging platform and/or communications system, an enterprise customer's hierarchical structure and corresponding communication network components, and to securely manage communication components for mass market subscribers, the example systems and methods described herein are implemented using data structures stored in the operations database 160 and one or more directories (e.g., X.500 directories) stored in one or more message centers (e.g., the message center 130). In the example system of FIG. 1, one directory is associated with each message center, however, other combinations of directories, message centers abound. The example systems and methods use the operations database 160 and the directory (ies) to store information about client enterprises and/or mass market consumers. That information is used by various components (e.g., the policy server 150, the message center 130, the provisioner 162, the application servers 132A, etc.) for establishing or making outdial communication service calls for enterprise and mass market subscribers. For instance, the policy server 150 uses SQL queries of the operations database 160 to populate a local (e.g., cached) data structure for use in authorizing outdial calls and/or allocating communication resources to outdial calls. The policy server 150 may, for example, load the local data structure on initialization and periodically update the information and/or a configuration change to the operations database 160 could trigger an update of the local data structure. Alternatively, the policy server 150 could query the operations database 160 to access the information at the time the information is needed. The provisioner 162, as discussed above, uses information stored in the operations database 160 to provision and/or configure gateways. The application servers 132A use the directory(ies) to, for example, determine an ODRG for a subscriber, CTAN and/or call tree subscriber number.

In the interest of brevity and ease of discussion, throughout the remainder of this section references may be made to a single directory, a single message center. However, persons of ordinary skill in the art will readily appreciate that the methods and systems described herein are equally applicable to a plurality of directories for a plurality of message centers. Further, while reference is made to a single operations database 160, persons of ordinary skill in the art will readily appreciate that the operations database 160 could be implemented by more than one operations database using any of a variety of techniques. For example, an operations database could be associated with each messaging site (where a messaging site may contain one or more messaging centers) where the operations database for a site contains information related to that site, and one of the operations database could be designated the primary and additionally contain information that pertains to all sites. Other example configurations abound. Additionally, while reference is made below to site-specific information and/or site-specific data structures, it will be readily apparent to persons of ordinary skill in the art that, for example, a shared data structure could store configuration information for a plurality of sites and the shared data could be replicated into the plurality of sites. It will be further recognized that some devices, for example, the policy server 150, the gateway 120A and/or the gatekeeper 135 may implement functionality for a plurality of sites and, thus, the local data structure used by the policy server 150, the gateway 120A and/or the gatekeeper 135 may contain configuration information for a plurality of sites.

As described in greater detail below, the example operations database 160 and the directory are used to store information related to, for example, one or more enterprise operation hierarchies, authorization and routing policies, one or more communication network configurations, etc. In other words, the operations database 160 stores information associated with a host enterprise, one or more client enterprises, and mass market subscribers and is used to enable communications between a messaging platform and/or system (that may contain more than one message center) and one or more communications network(s) (i.e., global information that covers more than one message center). In contrast, the directory in the message center 130 is used to store information particular to the subscribers of the client enterprises or the host enterprise served by the message center 130. The information stored in the directory is used by the message center to implement the communication and/or messaging functions (e.g., mailboxes, call trees, etc.) for each subscriber associated with that directory.

A host or client enterprise having a plurality of locations (e.g., a plurality of buildings or campuses) and/or providing communication and/or message services to a geographically disparate set of persons (e.g., subscribers, employees, students, etc.) may be served by a plurality of message centers (e.g., a plurality of message centers similar to the message center 130); each serving one of the plurality of locations or a pre-determined geographic region. In such a case, each of the plurality of message centers will have a directory having information that is specific to the persons served by the respective message center. Also, each of the directories is communicatively coupled to and coordinated with the operations database 160 to reflect information related to configurations, policies, rules, etc. of enterprises as a whole.

Figure 55:
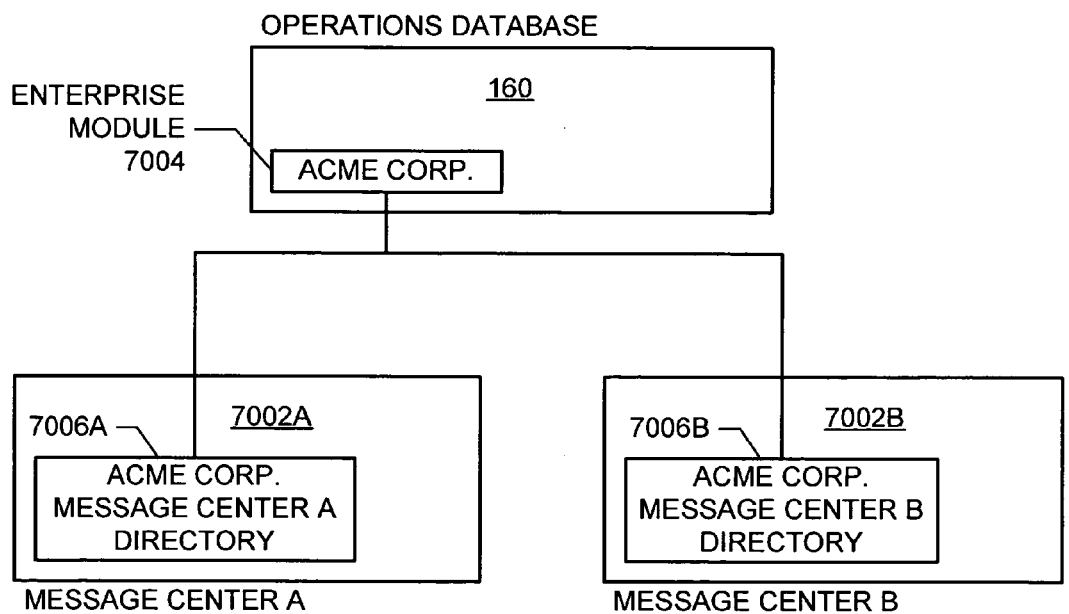
FIG. 55 illustrates an entity relationship between the example operations database 160 and two example message centers.

FIG. 55 illustrates an entity relationship between the operations database 160 and two example message centers, namely message center A 7002A and message center B 7002B. In the illustrated example, the message center A 7002A may be used, for example to serve an enterprise's first set of persons (e.g., employees principally co-located in a building or on a campus, a geographically associated set of subscribers, etc.) and the message center B 7002B may be used, for example, to serve another set of persons (e.g., additionally employees principally located in another building or on another campus, a second geographically associated set of subscribers, etc.). As shown, the operations database 160 includes an enterprise module 7004 having a distinguished name ("DN") of ACME CORP. that represents the enterprise Acme Corp. The message center A 7002A of the illustrated example includes a first directory 7006A and the message center B 7002B of the illustrated example includes a second directory 7006B. The first and second directories 7006A and 7006B may be implemented, for example, using X.500 databases and correspond to the Acme Corp. enterprise module 7004 stored in the operations database 160.

The enterprise module 7004 is used to store data structures (e.g., the tables of FIGS. 61-69) having information related to network configurations, authorization and routing policies and/or rules, etc. that dictate how the message centers 7002A and 7002B communicate with one or more communications networks. The enterprise module 7004 may include general information associated with the communications network(s) related to the communication network(s) served by the operations database 160 and some of the information specific to the enterprise Acme Corp. Although one enterprise module is shown (e.g., the enterprise module 7004), in other example implementations, the operations database 160 may include any number of enterprise modules. In this case, each enterprise module may correspond to a different host or client enterprise, and each of the enterprise modules may be used to provide communication services for the subscribers of respective enterprise. The example enterprise module 7004 of FIG. 55 is illustrated in greater detail in FIG. 56.

The example directories 7006A and 7006B of FIG. 55 are used to store data structures (e.g., the tables of FIGS. 70-78) having information related to persons associated with the enterprise Acme Corp. and served by the message centers 7002A and 7002B, respectively. The data structures in the directories 7006A and 7006B may also include some information that is copied or retrieved from the enterprise module 7004. The example directories 7006A and 7006B of FIG. 55 are illustrated in greater detail in FIG. 57.

An administrator may exchange information, modify information, retrieve information, or otherwise interact with the directories 7006A and 7006B and/or the operations database 160 using standard application program interfaces that are available as libraries from most operating systems and programming languages. In some example implementations, database interfaces may be implemented using graphical user interfaces (GUIs) or command line interfaces (e.g., the user interface 170 of FIG. 1). The interfaces used and/or the accessibility of various portions of the directories 7006A and 7006B and/or the operations database 160 may vary depending upon whether the administrator is associated with a host enterprise or a client enterprise.

Figure 56:
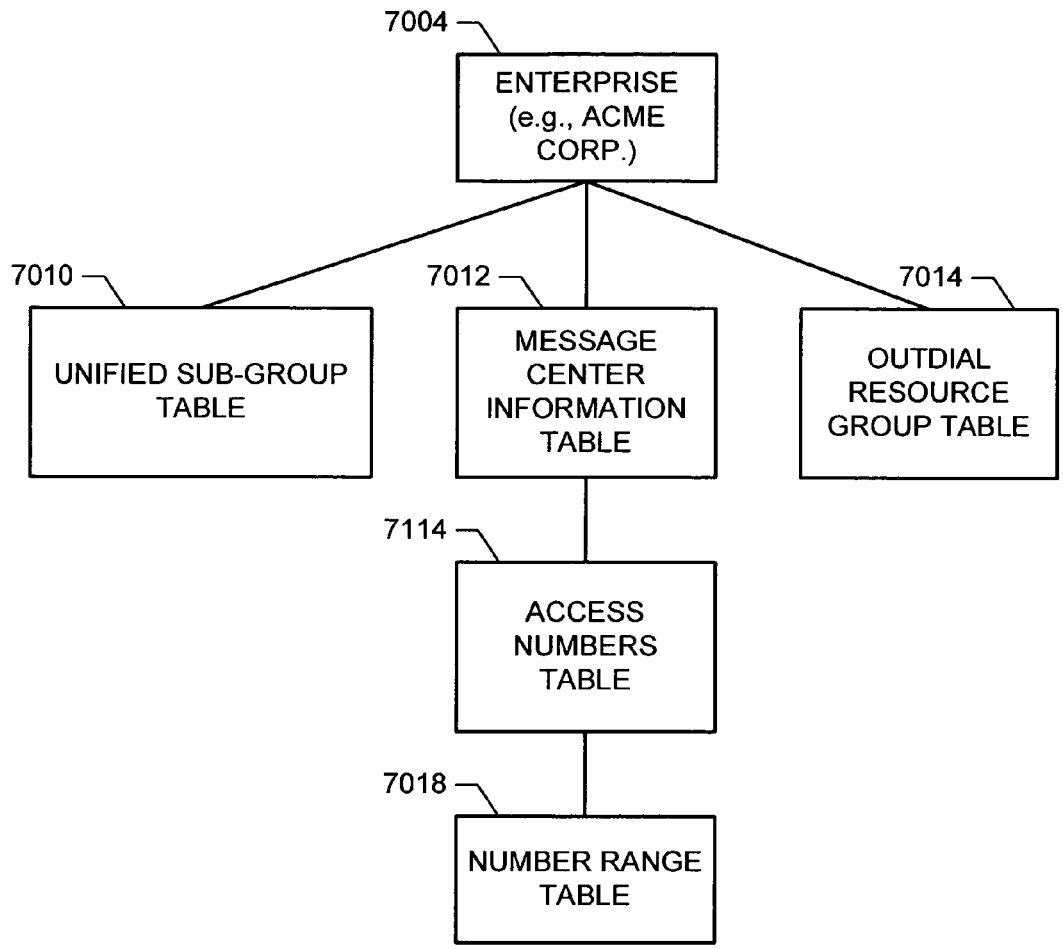
FIG. 56 is a block diagram depicting example entity relationships among some of the data structures stored in the operations database 160 that relate to the example enterprise module of FIG. 55.

FIG. 56 is a block diagram depicting example entity relationships among some of the data structures stored in the operations database 160 that relate to the example enterprise module 7004 of FIG. 55. In the illustrated example, the enterprise module 7004 links to a plurality of data structures associated with providing communication services to a plurality of persons associated with the enterprise Acme Corp. To access identifications, names, or other information of the unified sub-groups (e.g., the unified sub-groups 225A and 225B of FIG. 4) that may be used to establish outdial calls, the enterprise module 7004 links to a unified sub-groups table 7010, which may be implemented as shown in FIG. 68. The unified sub-group table 7010 is linked to an ODRG-to-unified sub-group linking table 7094 (implemented as shown in FIG. 69) that links one or more ODRGs to one or more unified sub-groups. Specifically, the unified sub-group table 7010 includes a list of each unified sub-group and, for each unified sub-group, the ODRG-to-unified sub-group linking table 7094 may include an identification of one or more ODRGs that may use that unified sub-group.

To access identifications, names, and/or any other information defining a message center accessible by the enterprise module 7004, the enterprise module 7004 links to a message center information table 7012 (depicted in detail in FIG. 71). To access identifications, names, and/or other information of ODRGs defined in the operations database 160 and that may be used for authorization and/or routing outdial calls for the enterprise Acme Corp., the enterprise module 7004 links to an outdial resource group table 7014 (depicted in detail in FIG. 64).

To access the access numbers (e.g., CFNs) associated with the subscribers of each message center (e.g., the message center 130), the enterprise module 7004 links to an access number table 7114 (depicted in FIG. 72). If, for example, the message center 130 corresponds to three sets of subscribers, each set of subscribers is assigned to a number range (e.g., a range of mailbox numbers). In this manner, a different number in the number range may be assigned to each subscriber in a set of subscribers. To access the message center 130 or to forward calls associated with each subscriber to the message center 130 each number range and/or each set of subscribers is associated with a CFN. In the illustrated example, the message center 130 is associated with three CFNs, each assigned to a different one of the three sets of subscribers. To store the number ranges associated with the enterprise module 7004, operations database 160 includes a number range table 7018 (depicted in detail in FIG. 73).

Figure 57:
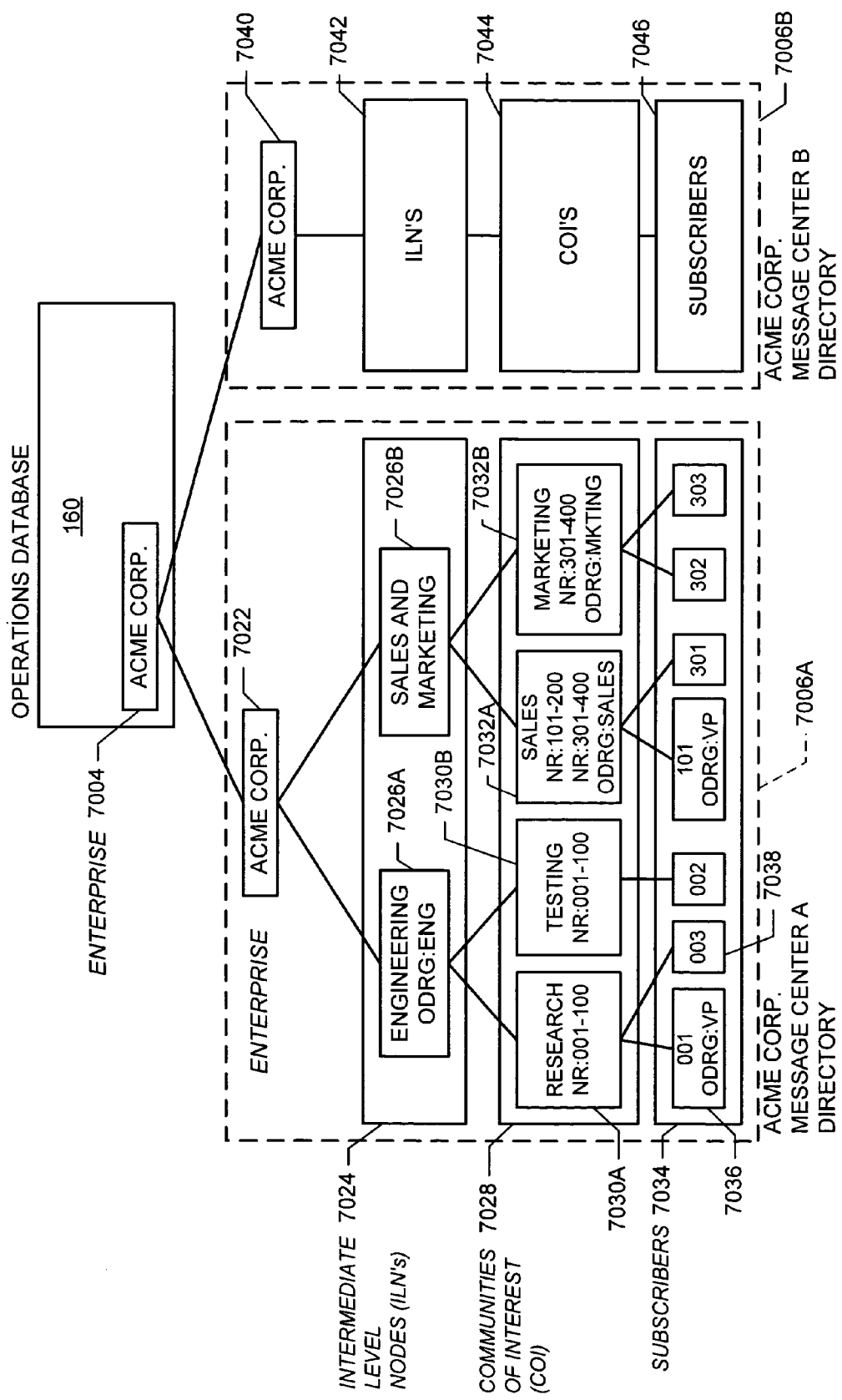
FIG. 57 illustrates an example hierarchy used to implement the example message center directories of FIG. 55.

FIG. 57 illustrates an example hierarchy used to implement the example message center directories 7006A and 7006B of FIG. 55. Because the subscribers of each message center (e.g., the message center 130) use the message center features to establish communications via a communications network, the message center features are dependent upon communication network configuration information stored in the operations database 160. Accordingly, some information (e.g., number ranges) stored in the operations database 160 is replicated or copied into each message center served by the operations database 160. In this manner, each message center can enable its corresponding subscribers to establish communications via a communications network (e.g., a PSTN network, a VoIP network, etc.).

As shown in FIG. 57, the message center A directory 7006A includes an enterprise node 7022 that is communicatively coupled with and/or linked to the enterprise module 7004 based on the distinguishing name 'ACME CORP.' Of course the distinguishing name may be any other string such as, for example, 'ACME,' 'MAILBOXES,' etc. The enterprise node 7022 is communicatively coupled to intermediate level nodes (ILNs) 7024. The enterprise node 7022 and the ILNs 7024 may be replicated in each message center that is served by the operations database 160. In the illustrated example, the ILNs 7024 include an engineering ILN 7026A and a sales and marketing ILN 7026B. The engineering ILN 7026A includes one or more sets or groups of subscribers (e.g., employees of the enterprise Acme Corp.) associated with a common subscriber attribute. In the illustrated example, the common subscriber attribute for the subscribers in the engineering ILN 7026A is a work assignment or employment within an engineering business division (e.g., an ILN subscriber group identification). The engineering ILN 7026A specifies an ENG ODRG that will be used by every subscriber within the engineering ILN 7026A except those subscribers associated with ODRGs that override the ENG ODRG.

Each of the ILNs 7026A and 7026B includes one or more sets of subscribers that may be further separated into communities of interest (COI) 7028. For instance, the example engineering ILN 7026B of FIG. 57 includes a research COI 7030A and a testing COI 7030B. The example research COI 7030A corresponds to a set of subscribers (or a subscriber group) having a common subscriber attribute or characteristic indicative of work assignment or employment within a research engineering division (e.g., a COI subscriber group identification) of the enterprise node 7022, while the example testing COI 7030B corresponds to a set of subscribers (or a subscriber group) within a test engineering division of the enterprise node 7022. As indicated in FIG. 57, subscribers associated with the research COI 7030A and the testing COI 7030B are assigned a number within the number range ("NR") 001-100. These number ranges correspond to number ranges stored in the number range table 7018 (FIG. 56) of the operations database 160. For purposes of clarity, although telephone numbers and/or mailbox numbers typically contain more digits, the numbers described herein are represented using any three digits. Further, the any of a variety of numbering schemes applicable to communication systems and/or networks may be utilized. For example, the 10-digit telephone numbering schemed employed in North America.

The example sales and marketing ILN 7026B includes a sales COI 7032A and a marketing COI 7032B. A shown in FIG. 57, the example sales and marketing COIs 7032A and 7032B also include respective number ranges. Specifically, the sales COI 7032A includes two number ranges (NR: 101-200 and NR: 301-400) and the example marketing COI 7032B includes one number range (NR: 301-400). Also, each of the example sales and marketing COIs 7032A and 7032B specify a respective ODRG. Specifically, each subscriber within the example sales COI 7032A is assigned a SALES ODRG, while each subscriber in the marketing COI 7032B is assigned a MKTING ODRG. Of course, any subscriber that specifies its own ODRG will override the ODRG specified at the COI level or at the ILN level.

A plurality of subscribers associated with each of the example COIs 7030A, 7030B, 7032A, and 7032B are illustrated at a subscribers level 7034 in FIG. 57. Specifically, a set of subscribers associated with the research COI 7030A includes a subscriber 7036 assigned number 001 and a subscriber 7038 assigned number 003. As shown in FIG. 57, the subscriber 7036 specifies an ODRG named "VP", which overrides the ENG ODRG specified by the engineering ILN 7026. In other words, ODRGs specified at lower levels of the directory hierarchy override ODRGs specified at higher levels of the directory hierarchy. Although not shown, the enterprise node 7022 may specify an ODRG for all the subscribers within the message center A directory 7006A that do not otherwise specify an overriding ODRG at a lower hierarchical level (e.g., one or more of the ILN level 7024, the COI level 7028, and/or the subscribers level 7034).

Also shown in FIG. 57 is a detailed diagram of the message center B directory 7006B, which includes an enterprise node 7040, an ILN level 7042, a COI level 7044, and a subscriber level 7046. The enterprise node 7040 and the ILN level 7042 respectively include information that is identical to the enterprise node 7022 and the ILN level 7024 of the message center A directory 7006A. Specifically, in the illustrated example, the information in the enterprise nodes 7022 and 7040 and the ILN levels 7028 and 7042 is copied from the enterprise module message center A directory 7006A to the message center B directory 7006B. However, the information associated with the COI level 7044 and the subscriber level 7046 of the message center B directory 7006B is different from the information associated with the COI level 7028 and the subscriber level 7034 of the message center A directory 7006A. In particular, although the COI level 7044 of the message center B directory 7006B may include a research COI (not shown) and a testing COI (not shown), in the illustrated example, the number ranges associated therewith are different than the number ranges (e.g., NR: 001-100) assigned to the research and testing COIs 7030A and 7030B of the message center A directory 7006A.

Figure 58:
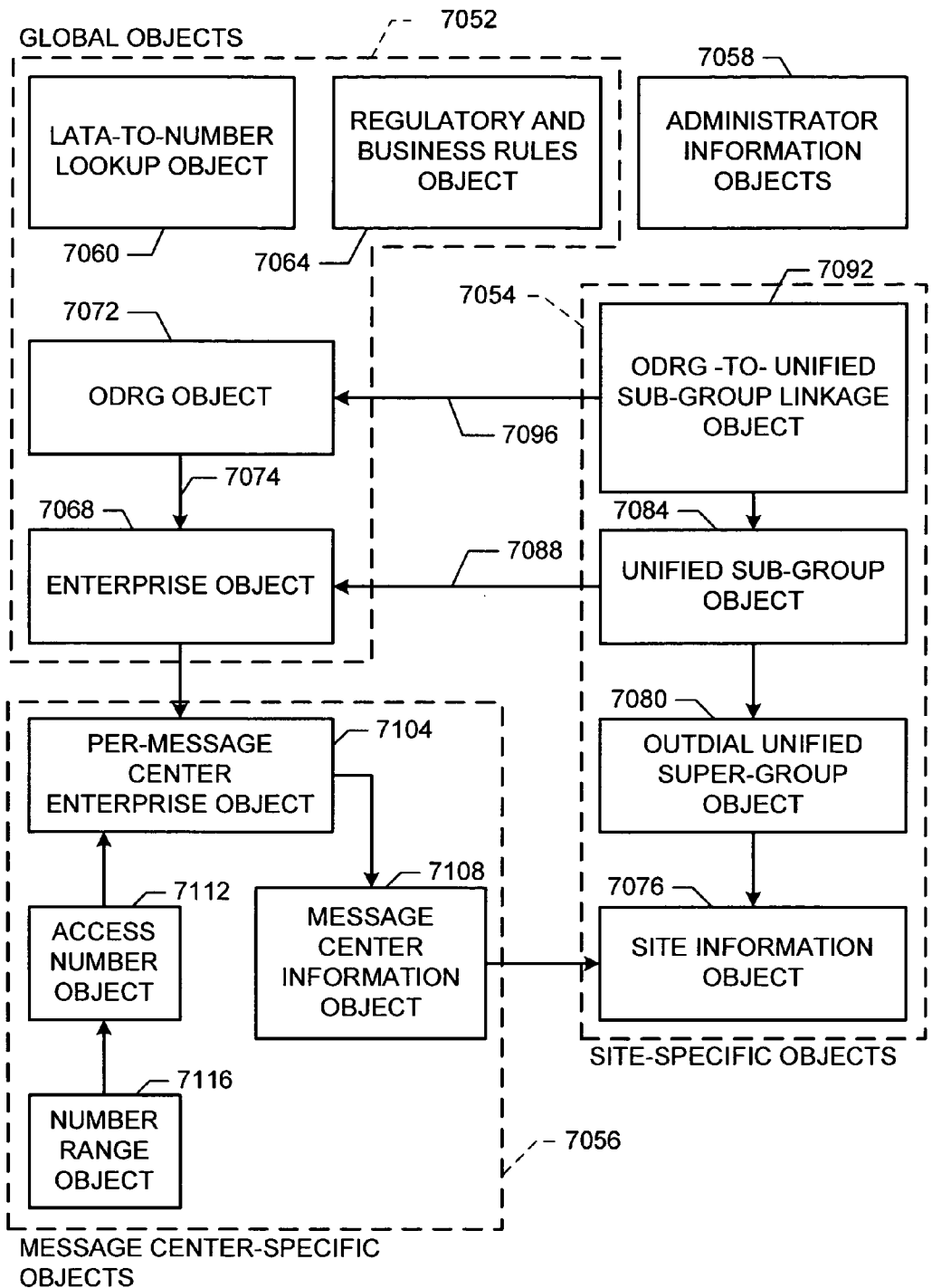
FIG. 58 depicts a plurality of data access objects used to access data structures stored in the example operations database and example message center directories of FIGS. 55 and 57.

FIG. 58 depicts a plurality of example data access objects used to access data structures (e.g., the tables of FIGS. 61-78) stored in the example operations database 160 and/or the example message center directories (e.g., the directories 7006A and 7006B of FIGS. 55 and 56). The example data access objects can be grouped into a global objects group 7052, a site-specific objects group 7054, a message center-specific objects group 7056, and an administrator information objects group 7058. The objects in each of the groups 7052, 7054, 7056, and 7058 may be used to implement applications for accessing information stored in data structures such as the example tables of FIGS. 61-78 and/or any other desired data structures. For example, the objects may be invoked by application program interfaces used to create command line user interfaces or GUI user interfaces. Also, use of any or all of the objects and/or access to any or all of the objects may be restricted based on privilege levels assigned to administrators. For example, an administrator of a host enterprise may have access to more object than an administrator of a client enterprise.

The example global objects group 7052 of FIG. 58 includes objects that can be used to access information stored in data structures (e.g., the example tables of FIGS. 61-64) having information related to a communications network and accessed by operations databases and message centers located the communications network. The information accessed using the global objects 7052 is typically stored in the operations database 160 (FIGS. 1, 55, and 57). In the illustrated example, the global objects group 7052 is provided with the global objects described below.

To lookup or determine which LATAs are associated with one or more particular telephone numbers (e.g., access numbers, mailbox numbers, CFNs, CTANs, etc.), the global objects group 7052 is provided with a LATA-to-number lookup object 7060. Specifically, the LATA-to-number lookup object 7060 is used to access LATA-to-number lookup information organized in one or more data structures such as the example LATA-to-number lookup table 7062 of FIG. 61. In an example implementation of FIG. 61, the policy server 150 (FIGS. 1 and 3) may access LATA-to-number lookup information using the LATA-to-number lookup object 7060 and store or cache the LATA-to-number lookup information in the memory 1005 (FIG. 3) for subsequent use by the processor 1010 (FIG. 3), the outdial authorizer 1020 (FIG. 3) and/or the resource locator 1025 (FIG. 3).

To access regulatory and business authorization and routing rules, the global objects group 7052 is provided with a regulatory and business rules object 7064. Specifically, the regulatory and business rules object 7064 is used to access regulatory and business authorization and routing rules organized in one or more data structures such as the example regulatory and business authorization and routing rules table 7066 of FIG. 62. In some example implementations, the policy server 150 (FIG. 1) may access regulatory and business authorization and routing rules using the regulatory and business rules object 7066 and store or cache the regulatory and business authorization and routing rules in the memory 1005 (FIG. 3) for subsequent use by the outdial authorizer 1020 (FIG. 3).

To access enterprise information (e.g., identification, description, distinguishing name (DN), public/private status, etc.) associated with enterprises located throughout a communications network, the global objects group 7052 is provided with an enterprise object 7068. Specifically, the example enterprise object 7068 of FIG. 58 is used to access enterprise information organized in one or more data structures such as the example enterprise table 7070 of FIG. 63. In some example implementations, the policy server 150 (FIG. 1) may use the enterprise object 7068 to retrieve enterprise-related information (e.g., a list of available shared outdial sub-groups (4020C of FIG. 38) and/or a list of private outdial unified sub-groups (4020B of FIG. 38)) related to one or more enterprises implemented in a particular site and to store and/or cache the enterprise-related information in the memory 1005 (FIG. 3).

To access ODRG information including circuit type information (e.g., public, private, shared) and/or feature information (e.g., the outdial communication services of FIG. 3) associated with ODRGs throughout a communications network, the global objects group 7052 is provided with an outdial resource group object 7072. Specifically, the example outdial resource group object 7072 of FIG. 58 is used to access ODRG information organized in one or more data structures such as the example outdial resource group table 7014 of FIG. 64. An arrow 7074 shown pointing from the outdial resource group object 7072 to the enterprise object 7068 indicates that the outdial resource group object 7072 is keyed to point into a particular entry of the enterprise object 7068. Specifically, in the illustrated example, a KeyEnterprise entry 7075 (FIG. 64) points to a particular enterprise data structure organized according to the enterprise table 7070 of FIG. 63.

The example site-specific objects group 7054 of FIG. 58 includes objects that can be used to access information stored in data structures (e.g., the data structures of FIGS. 65-69) having information related to a specific message center site that contains one or more message centers. The information accessed using the site-specific objects 7054 may be stored in the operations database 160 and/or in the message center directories (e.g., the directories 7006A and 7006B of FIGS. 55 and 57). In the illustrated example, the site-specific objects group 7054 is provided with the site-specific objects described below.

To access information about sites having one or more message centers (e.g., one or more of the message centers 130), the site-specific objects group 7054 of FIG. 58 is provided with a site information object 7076. The example site information object 7076 of FIG. 58 is used to access site information organized in one or more data structures such as the example site information table 7078 of FIG. 65.

To access information associated with outdial unified super-groups (e.g., the outdial unified super-group 220B of FIG. 2) available in a particular site, the example site-specific objects group 7054 of FIG. 58 is provided with an outdial unified super-group object 7080. The example outdial unified super-group object 7080 of FIG. 58 is used to access outdial unified super-group information organized in one or more data structures such as the example outdial unified super-group table 7082 of FIG. 66.

To access information associated with unified sub-groups (e.g., the unified sub-groups 225A and 225B of FIG. 2), the example site-specific objects group 7054 of FIG. 58 is provided with a unified sub-group object 7084. The example unified sub-group object 7054 of FIG. 58 is used to access unified sub-group information organized in one or more data structures such as the example unified sub-group table 7010 of FIG. 68. An arrow 7088 shown pointing from the unified sub-group object 7084 to the enterprise object 7068 of FIG. 58 indicates that the example unified sub-group object 7084 is keyed to point into a particular entry of the example enterprise object 7068. Specifically, a KeyEnterprise entry 7090 (FIG.

68) points to a particular enterprise data structure such as the example enterprise table 7070 of FIG. 63. In some example implementations, the policy server 150 (FIG. 1) uses the unified sub-group object 7084 to retrieve unified sub-group related information and stores or caches the returned information in the memory 1005 (FIG. 3) for subsequent use by, for example, the processor 1010 (FIG. 3) and/or the resource allocator 1025 (FIG. 3).

To access information associated with linkings between ODRGs and unified sub-groups (e.g., the unified sub-groups 225A and 225B of FIG. 2), the example site-specific objects group 7054 of FIG. 58 is provided with an ODRG-to-unified sub-group linkage object 7092. The example ODRG-to-unified sub-group linkage object 7092 of FIG. 58 is used to access linking information organized in one or more data structures such as the ODRG-to-unified sub-group linkage table 7094 of FIG. 69. The arrow 7096 shown pointing from the ODRG-to-unified sub-group linkage object 7092 to the outdial resource group object 7072 of FIG. 58 indicates that a KeyODRG entry 7098 (FIG. 69) points to a particular ODRG data structure such as the example outdial resource group table 7014 of FIG. 64. In some example implementations, the policy server 150 (FIG. 1) uses the ODRG-to-unified sub-group linkage object 7092 to retrieve mapping information between unified sub-group and ODRGs and stores or caches the returned information in the memory 1005 (FIG. 3) for subsequent use by, for example, the processor 1010 (FIG. 3) and/or the resource allocator 1025 (FIG. 3).

Although not shown, the site-specific objects group 7054 may also be provided with a TBCT object to access information indicating, for a given access number, a unified sub-group for which a link release may be performed. In particular, the TBCT object may be used to access information organized in data structures according to the two B-channel transfer table 7102 of FIG. 67. While the example TBCT table 7102 illustrates a single TBCT capable unified sub-group per access number, persons of ordinary skill in the art will readily appreciate that multiple TBCT capable unified sub-groups could be associated with an access number. For example, the unified sub-group field could contain a list of TBCT capable unified sub-groups or multiple table entries indexed by the same access number could be utilized.

The example message center-specific objects group 7056 of FIG. 58 includes objects that can be used to access information stored in one or more data structures (e.g., the tables of FIGS. 70-73) having information related to one or more specific message centers (e.g., information related specifically to the message center 130). The information accessed using the message center-specific objects 7056 may be stored in one or more message center directories (e.g., the directories 7006A and 7006B of FIGS. 55 and 57). In the illustrated example, the message center-specific objects group 7056 is provided with the message center-specific objects described below.

To access information indicating the message centers (e.g., the message centers 7002A and 7002B of FIG. 55) in which particular enterprises (e.g., the enterprise nodes 7022 and 7040 of FIG. 57) are implemented, the example message center-specific objects group 7056 of FIG. 58 is provided with a per-message center enterprise object 7104. The example per-message center enterprise object 7104 of FIG. 58 is used to access message center and enterprise identifications or keys organized in one or more data structures such as the example per-message center enterprise table 7106 of FIG. 70.

To access identifications of each message center (e.g., the message center 130) and other information related to each message center, the example message center-specific objects group 7056 of FIG. 58 is provided with a message center information object 7108. The example message center information object 7108 of FIG. 58 is used to access information in one or more data structures such as the example message center information table 7012 of FIG. 71. In some example implementations, for each site having one or more message centers (e.g., one or more of the message center 130 of FIG. 1 or the message centers 7002A and 7002B of FIG. 55), the policy server 150 (FIG. 1) may use the message center information object 7108 to retrieve a list of the message center(s) and store or cache the list of message center(s) in the memory 1005 (FIG. 3).

To retrieve, for example, a LATA associated with an access number (e.g., CFN, CTAN, etc.), the example message center-specific object group 7056 of FIG. 58 is provided with an access number object 7112. The example access number object 7112 of FIG. 58 is used to retrieve routing and other configuration applicable to all subscribers using the access number and is organized in one or more data structures such as the access number table 7114 of FIG. 72. In some example implementations, the policy server 150 (FIGS. 1 and 3) uses the access number object 7112 to determine access number related information (e.g., an indial gateway of a LATA, a reference to the enterprise, etc.) and stores or caches the information in the memory 1005 (FIG. 3) for subsequent use by the outdial authorizer 1020 and/or the resource allocator 1025 of FIG. 3.

To determine number ranges (e.g., NR: 001-100 assigned to the research and testing COIs 7030A and 7030B of FIG. 57) associated with message centers, the example message center-specific objects group 7056 of FIG. 58 is provided with a number range object 7116. The example number range object 7116 of FIG. 58 is used to access one or more number ranges organized in one or more data structures such as the example number range table 7018 of FIG. 73.

The example administrator information objects group 7058 of FIG. 58 is provided with a plurality of objects (not shown) associated with accessing administrator identifications, administrator groups, passwords, and data access privileges associated with administrators that may access at least some of the information described above. Specifically, the objects in the example administrator information objects group 7058 of FIG. 58 may be used to access information organized in one or more data structures such as the example administrative-related tables depicted in FIGS. 74 through 78.

Although only those objects described above are shown, any other objects may be implemented to access any other information whether or not such information is depicted in the example tables of FIGS. 61-78.

Figures 59, 60:
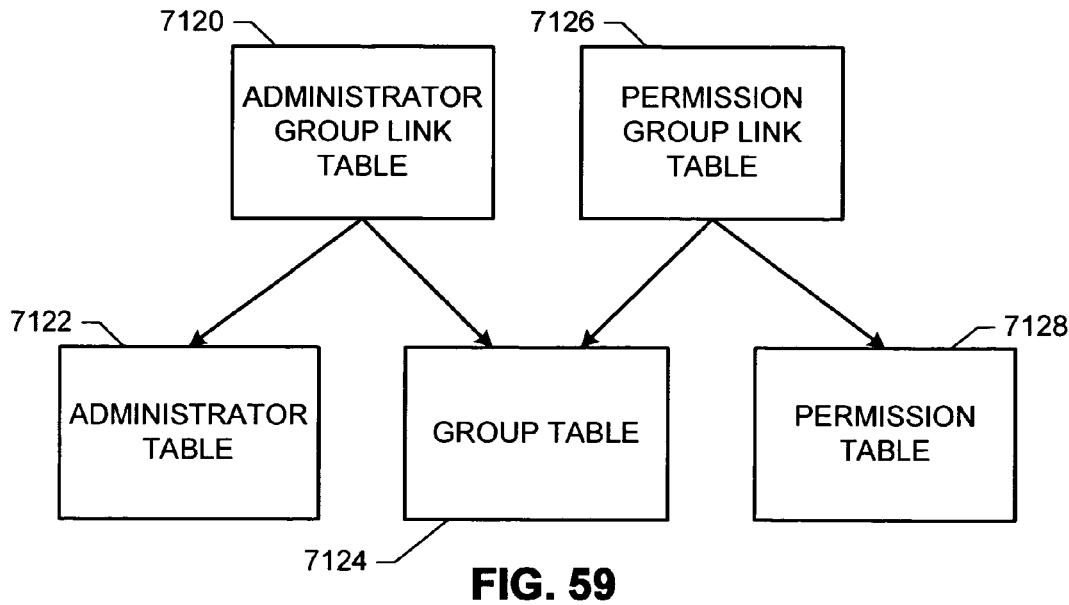
FIG. 59 depicts an example logical relationship between the example tables of FIGS. 74-78 storing information used to manage access rights of administrators.
FIG. 60 depicts a detailed example implementation of the example logical relationship of FIG. 59.

FIG. 59 depicts example logical relationships between the example administrative-related tables of FIGS. 74-78 which store information used to manage access rights of administrators. As shown in FIG. 59, an example administrator group link table 7120 (depicted in detail in FIG. 77) links administrator identifications stored in an administrator table 7122 (depicted in detail in FIG. 74) with group identifications stored in a group table 7124 (depicted in detail in FIG. 75). Specifically, the administrator group link table 7120 provides information indicating groups with which administrators are associated. Each of the groups may be associated with particular permissions so that an administrator assigned to a particular group inherits all of the permissions of that group. Each group is assigned permissions based on a permission group link table 7126 (depicted in detail in FIG. 78), which includes linking information between groups of the group table 7124 and permissions stored in a permission table 7128 (depicted in detail in FIG. 76).

FIG. 60 depicts a detailed example implementation of the example logical relationships of FIG. 59. In particular, FIG. 60 depicts example data structure or table implementations containing information organized according to the tables 7120, 7122, 7124, 7126, and 7128 of FIGS. 74-78 and 59 to manage administrator access rights. The logical relationships depicted in FIGS. 59 and 60 enable changing permissions of particular administrators or particular groups of administrators without affecting the rights of other administrators. The logical relationships also allows changing the rights of a plurality of administrators simultaneously by, for example, changing a permission in the permission table that is assigned to a group of administrators for whom the permission should be changed.

As shown in FIG. 60, an example administrator group link table 7130 and an example permission group link table 7132 are used in combination to assign permissions 2, 3, and 4 to administrators B and C. In particular, the example permission group link table 7132 associates or links permissions 2, 3, and 4 with group I, and the example administrator group link table 7130 associates or links administrators B and C with group I.

Figure 79:
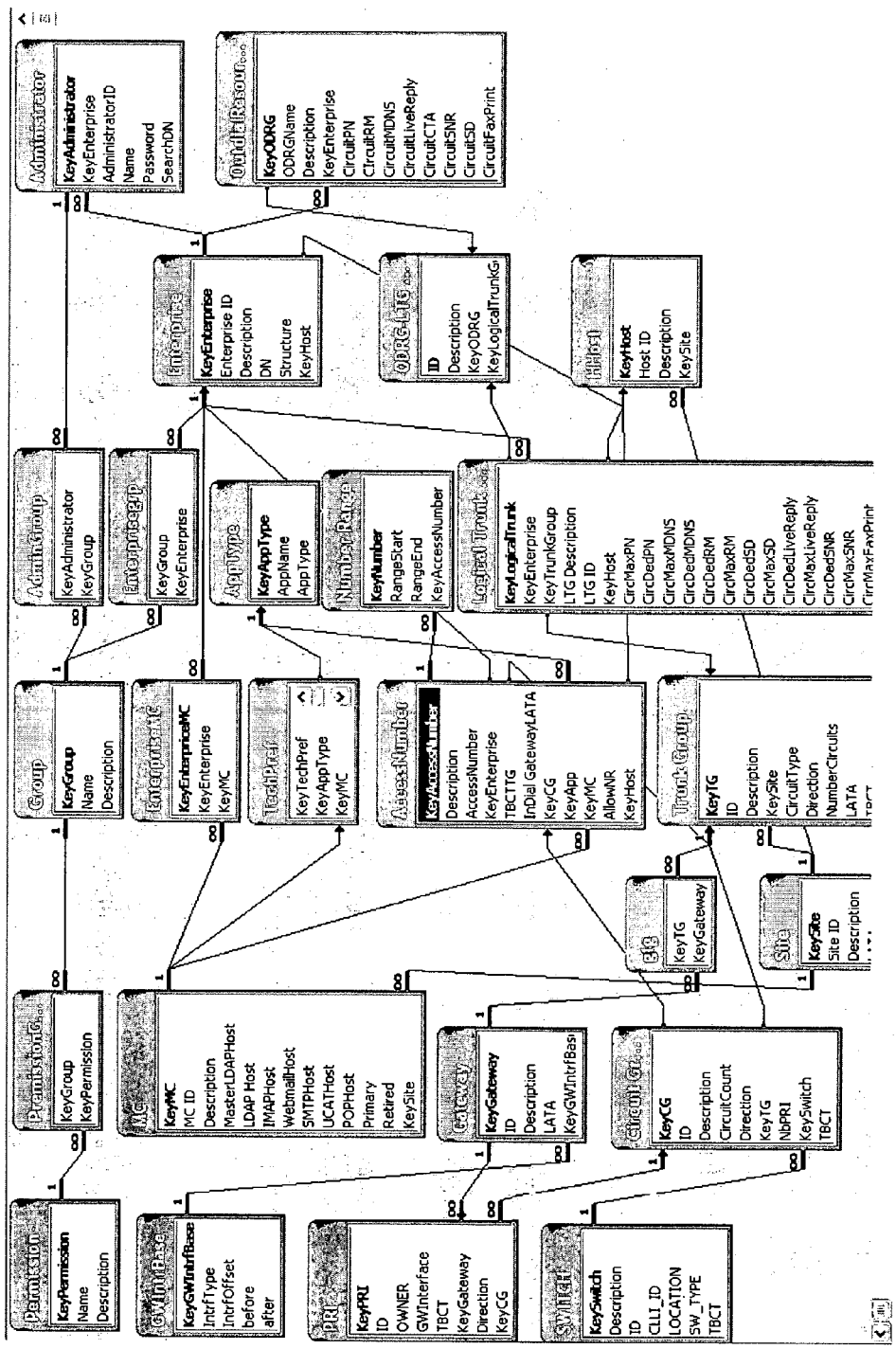
FIG. 79 depicts an example logical entity relationship between the example tables depicted in FIGS. 61-78.

FIG. 79 depicts a logical entity relationship between the tables depicted in FIGS. 61-78 and other example tables.

Figure 80:
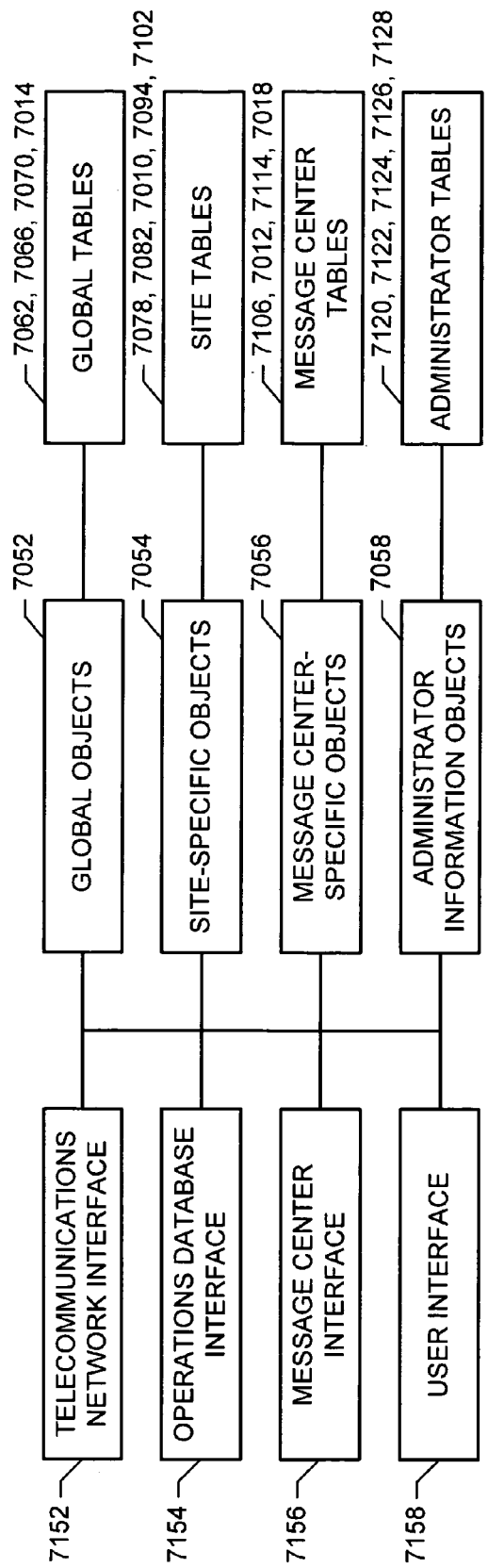
FIG. 80 is a block diagram of an example system that may be implemented according to the example systems and methods described herein to access information associated with operational databases and message centers.

FIG. 80 is a block diagram of an example system that may be used to access information associated with one or more operations databases (e.g., the operations database 160 of FIGS. 1, 55, and 57) and one or more message centers (e.g., the message center 130 of FIG. 1 and the message centers 7006A and 7006B of FIGS. 55 and 57). In particular, the example system of FIG. 80 includes a communications network interface 7152 to obtain communications network configuration information. To access (e.g., retrieve, modify, add, or delete) information stored in one or more operations databases (e.g., the operations database 160), the example system is provided with an operations database interface 7154. To access information stored in one or more message center directories, the example system is provided with a message center interface 7156. To enable a user (e.g., an administrator) to access any of the information accessible via the communications network interface 7152, the operations database interface 7154, or the message center interface 7156, the example system is provided with a user interface 7158. The user interface 7158 may be implemented using one or more command line interfaces and/or one or more graphical user interfaces (GUIs). In the illustrated example, the user interface 7158 provides administrator access to at least one of the operations database 160 or message centers (e.g., the message centers 130 of FIG. 1 or 7002A or 7002B of FIG. 55) based on administrator permissions stored in, for example, the administrator information tables 7120, 7122, 7124, 7126, and 7128 of FIGS. 74-78. For example, the user interface 7158 may be implemented using an operations database GUI that is used to access enterprise-level information (e.g., information stored in the enterprise module 7004) stored in the operations database 160. For instance, the user interface 7158 may provide access via a GUI interface to information stored in at least some of the global tables 7062, 7066, 7070, 7014 of FIGS. 61-64 and/or the site tables 7078, 7082, 7102, 7010, 7094 of FIGS. 65-69. Additionally, a message center GUI may be used to access information in one or more message center directories (e.g., information stored in the directories 7006A and/or 7006B of FIGS. 1 and 3. For instance, the user interface 7158 may provide access via a GUI interface to information stored in at least some of the message center tables 7106, 7012, 7114, 7018 of FIGS. 70-73.

As shown in FIG. 80, the interfaces 7152, 7154, 7156, and 7158 are communicatively coupled with the objects in the object groups 7052, 7054, 7056, 7058 described above in connection with FIG. 58. In this manner, the interfaces 7152, 7154, 7156, and 7158 may be used to access the information stored in the tables depicted in FIGS. 61-78 described above. To restrict access based on permissions for each administrator, for each administrator that logs in, the user interface 7158 assesses permissions stored in the administrator-related tables of FIGS. 74-78 to determine what access rights have been assigned to that administrator.

FIGS. 81-86 are flow diagrams representative of example machine readable instructions that may be used to implement the example methods and systems described herein. The machine readable instructions of FIGS. 81-86 may be executed by a processor, a controller and/or any other suitable processing device. For example, the machine readable instructions of FIGS. 81-86 may be embodied in coded instructions stored on a tangible medium such as a flash memory, or RAM associated with the processor 8010 shown in the example processor platform 8000 and discussed below in conjunction with FIG. 87. Alternatively, some or all of the example machine readable instructions of FIGS. 81-86 may be implemented using an application specific integrated circuit (ASIC), a programmable logic device (PLD), a field programmable logic device (FPLD), discrete logic, hardware, etc. Also, some or all of the machine readable instructions of FIGS. 81-86 may be implemented manually or as combinations of any of the foregoing techniques. Further, although the example machine readable instructions of FIGS. 81-86 are described with reference to the flowcharts of FIGS. 81-86, persons of ordinary skill in the art will readily appreciate that many other methods may be employed. For example, the order of execution of the blocks may be changed, and/or some of the blocks described may be changed, eliminated, subdivided, or combined.

Figure 81:
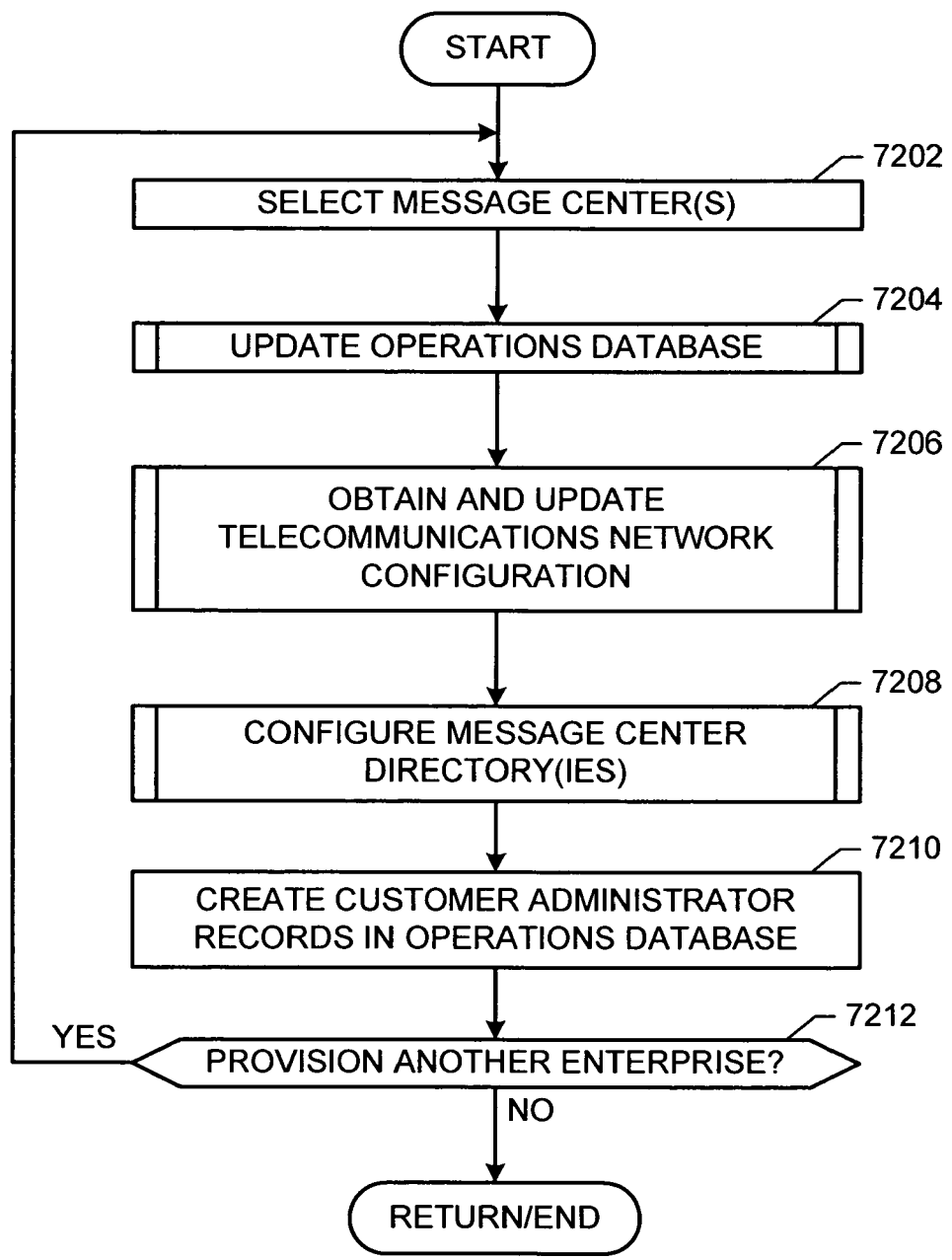
FIG. 81 is a flow diagram representative of example machine readable instructions that may be executed to implement an example method to provision a new enterprise.

FIG. 81 is a flow diagram representative of example machine readable instructions that may be executed to implement an example method to provision a new enterprise. The operations described below may be performed by an administrator having sufficient privileges to provision a new enterprise via the user interface 7158 described above in connection with FIG. 80. Initially, the administrator selects one or more message centers to be used in connection with the new enterprise (block 7202). The administrator then updates the operations database 160 (FIG. 1) to include information associated with the new enterprise and the message centers selected at block 7202 (block 7204). The operation of block 7204 is described in detail below in connection with FIG. 82.

The administrator then obtains and updates communications network configuration information (block 7206). For example, the administrator may obtain the communications network configuration information from a network operation and update the information in the operations database 160. The operation of block 7206 is described in detail below in connection with FIG. 83.

The administrator then configures one or more message center directories (block 7208) for the one or more message centers selected at block 7202. The operation of block 7208 is described in detail below in connection with FIG. 84.

The administrator then stores customer administrator records in the operations database 160 (FIGS. 1, 55, and 57) (block 7210). The administrator records may be used to assign access rights or permissions to customer administrators (e.g., administrators of an enterprise such as Acme Corp. shown in FIGS. 55 and 57) based on, for example, the administrator information tables 7120, 7122, 7124, 7126, and 7128 of FIGS. 59 and 74-78. In the illustrated example, the customer administrator records enable customer administrator to manage subscriber services and other subscriber information for any or all subscribers assigned to any one or more message centers within a site associated with the operations database 160.

The administrator then determines whether to provision another enterprise (block 7212). If the administrator determines that another enterprise is to be provisioned (block 7212), then control returns to block 7202. Otherwise, control returns to a calling process or function and/or the process depicted by the flow diagram of FIG. 81 is ended.

Figure 82:
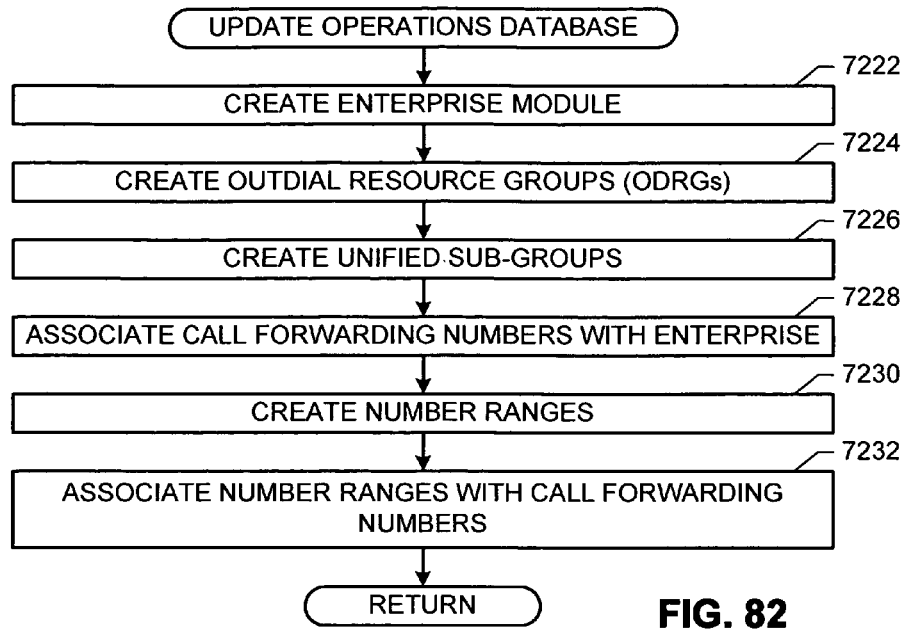
FIG. 82 is a flow diagram representative of example machine readable instructions that may be executed to update an operations database in connection with the example method of FIG. 81.

FIG. 82 is a flow diagram representative of example machine readable instructions that may be executed to update an operations database in connection with the example method of FIG. 81. Initially, the operations database interface 7154 (FIG. 80) creates an enterprise module (e.g., the enterprise module 7004 of FIGS. 55-57) in the operations database 160 (block 7222). For example, the operations database interface 7154 may use the enterprise object 7068 (FIG. 58) to store enterprise information in the operations database 160.

The operations database interface 7154 then creates ODRGs for the enterprise (block 7224). For example, the operations database interface 7154 may use the outdial resource group object 7072 (FIG. 58) to store information in the operations database 160 about the ODRGs that are allocated to the enterprise. The operations database interface 7154 then creates any new unified sub-groups (e.g., the unified sub-groups 225A and 225B of FIG. 2) in the operations database 160 (block 7226). For example, the operations database may use the unified sub-group object 7084 (FIG. 58) to store information in the operations database 160 for any new unified sub-group(s) allocated for use by the enterprise.

The operations database interface 7154 then associates one or more CFNs with the enterprise (block 7228). For example, the operations database interface 7154 may associate CFNs stored in the access numbers table 7114 (FIG. 56) with the enterprise and store the associations in the operations database 160. The operations database interface 7154 then creates the number ranges (e.g., NR: 001-200 and NR: 301-400 assigned in the message center A directory 7006A as shown in FIG. 57) for the enterprise (block 7230) and associates each number range with one of the CFNs associated with the enterprise at block 7228 (block 7232). Control is then returned to a calling process or function such as, for example, the example process depicted by the flow diagram of FIG. 81.

Figure 83:
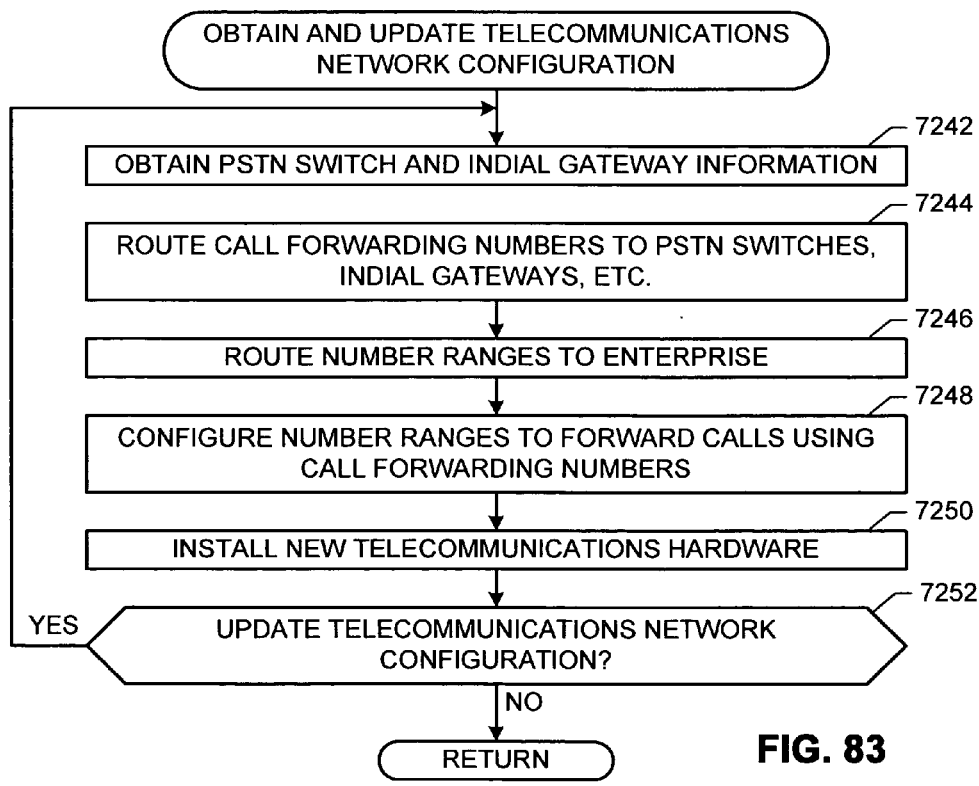
FIG. 83 is a flow diagram representative of example machine readable instructions that may be executed to obtain and update communication network configuration information in connection with the example method of FIG. 81.

FIG. 83 is a flow diagram representative of example machine readable instructions that may be executed to configure a communications network in connection with the example method of FIG. 81. Initially, the communications network interface 7152 (FIG. 80) obtains PSTN switch information (e.g., information about the PSTN switches 115A, 115B, and 115C of FIG. 1) and indial gateway information (e.g., information about the gateways 120A and 120B of FIG. 1) for each LATA in which the enterprise will be implemented (block 7242). Based on the information, the communications network (e.g., the PSTN or a VoIP network) is configured to route each CFN to a specific PSTN switch and via a specific circuit group to one of at least one indial gateway at block 7242 associated with the CFN (block 7244).

The operations database interface 7154 then, if not previously configured, configures a communications network (e.g., the PSTN or a VoIP network) to route each of the numbers in the number ranges to the client enterprise (e.g., to a PBX associated with the client enterprise) (block 7246). In some example implementations, the assigned number ranges are terminated at corresponding private branch exchanges (PBXs).

The operations database interface 7154 then, using the association between each of the numbers and a CFN, configures the client enterprise and/or a communications network to forward unanswered calls placed to the numbers to be forwarded to the associated CFN (block 7248).

The administrator then installs or schedules installation of any new communications hardware required to provision the enterprise (block 7250). For example, if the administrator determines that any of the operations described above require more hardware (e.g., PSTN switches, circuit groups, indial gateways, etc.) to accommodate, for example, the numbers, the CFNs, etc., then the administrator installs or schedules installation of the additional required hardware (block 7250). The administrator then determines if the communications network configuration should be updated (block 7252) in the operations database 160. For example, if the administrator adds new hardware at block 7250, then the communications network configuration should be updated. Accordingly, if the administrator determines that the communications network configuration should be updated, then control returns to block 7242. Otherwise, control is returned to a calling process or function such as, for example, the example process depicted in the flow diagram of FIG. 81.

Figure 84:
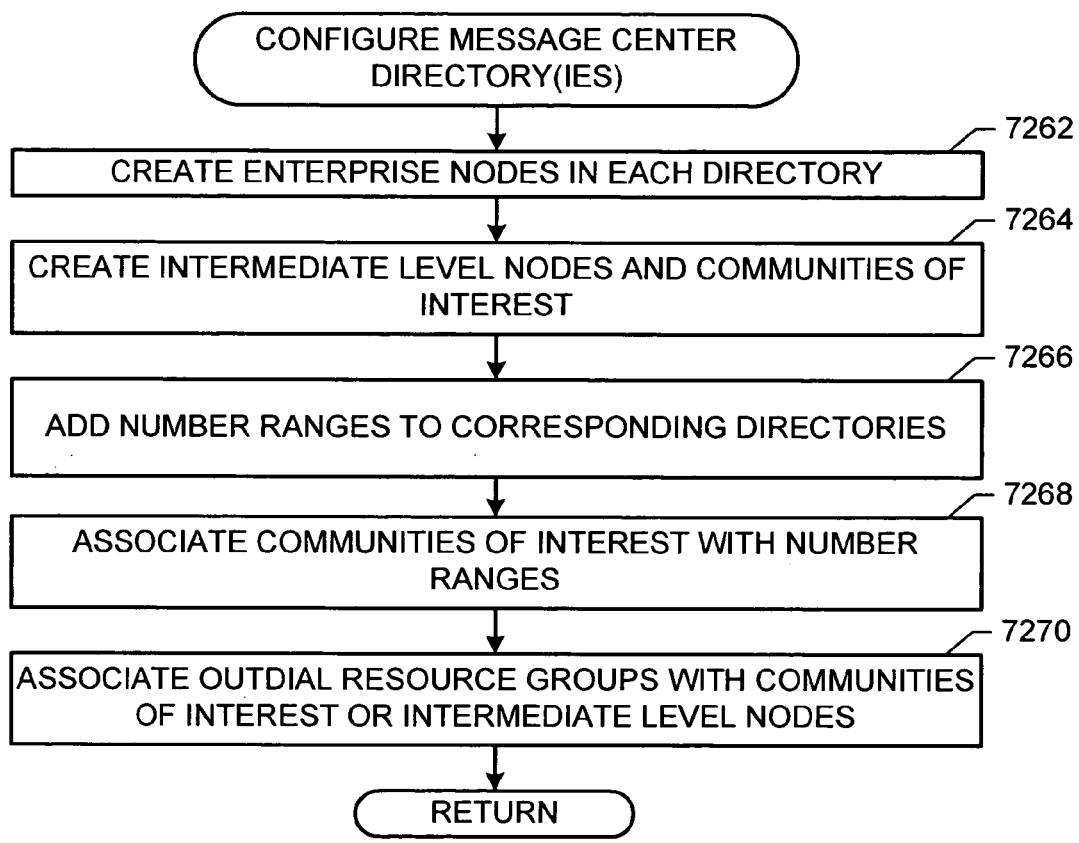
FIG. 84 is a flow diagram representative of example machine readable instructions that may be executed to configure one or more message center directories in connection with the example method of FIG. 81.

FIG. 84 is a flow diagram representative of example machine readable instructions that may be executed to configure one or more message center directories in connection with the example method of FIG. 81. Initially, the example message center interface 7156 (FIG. 80) creates one or more enterprise nodes (e.g., the enterprise nodes 7022 and 7040 of FIG. 57) in each message center directory (block 7262) associated with the message centers selected at block 7202 (FIG. 81). For example, for each message center directory, the message center interface 7156 may use the per-message center enterprise object 7104 (FIG. 58) to create and/or update an enterprise node data structure such as the per-message center enterprise table 7106 of FIG. 70.

The message center interface 7156 then creates intermediate level nodes (e.g., the ILNs 7026A and 7026B of FIG. 57) and communities of interest (e.g., the COIs 7030A, 7030B, 7032A, and 7032B of FIG. 57) (block 7264) for each of the enterprise nodes created at block 7262. The message center interface 7156 then adds number ranges to corresponding directories (e.g., the message center directories created at block 7262) (block 7266) by, for example, using the number range object 7116 (FIG. 58) to access one or more data structures such as the example number range table 7018 (FIG. 73).

The message center interface 7156 then associates COIs with corresponding number ranges (block 7268). For example, in the illustrated example of FIG. 57, the message center interface 7156 may associated number ranges 001-100 with the research COI 7030A and/or the testing COI 7030B. The message center interface 7156 then associates ODRGs with COIs or ILNs (block 7270). For example, in the illustrated example of FIG. 57, the message center interface 7156 may associate ODRG: ENG to the engineering ILN 7026A and ODRG: SALES to the sales COI 7032A. Control is then returned to a calling process or function such as, for example, the example process depicted by the flow diagram of FIG. 81.

Figure 85:
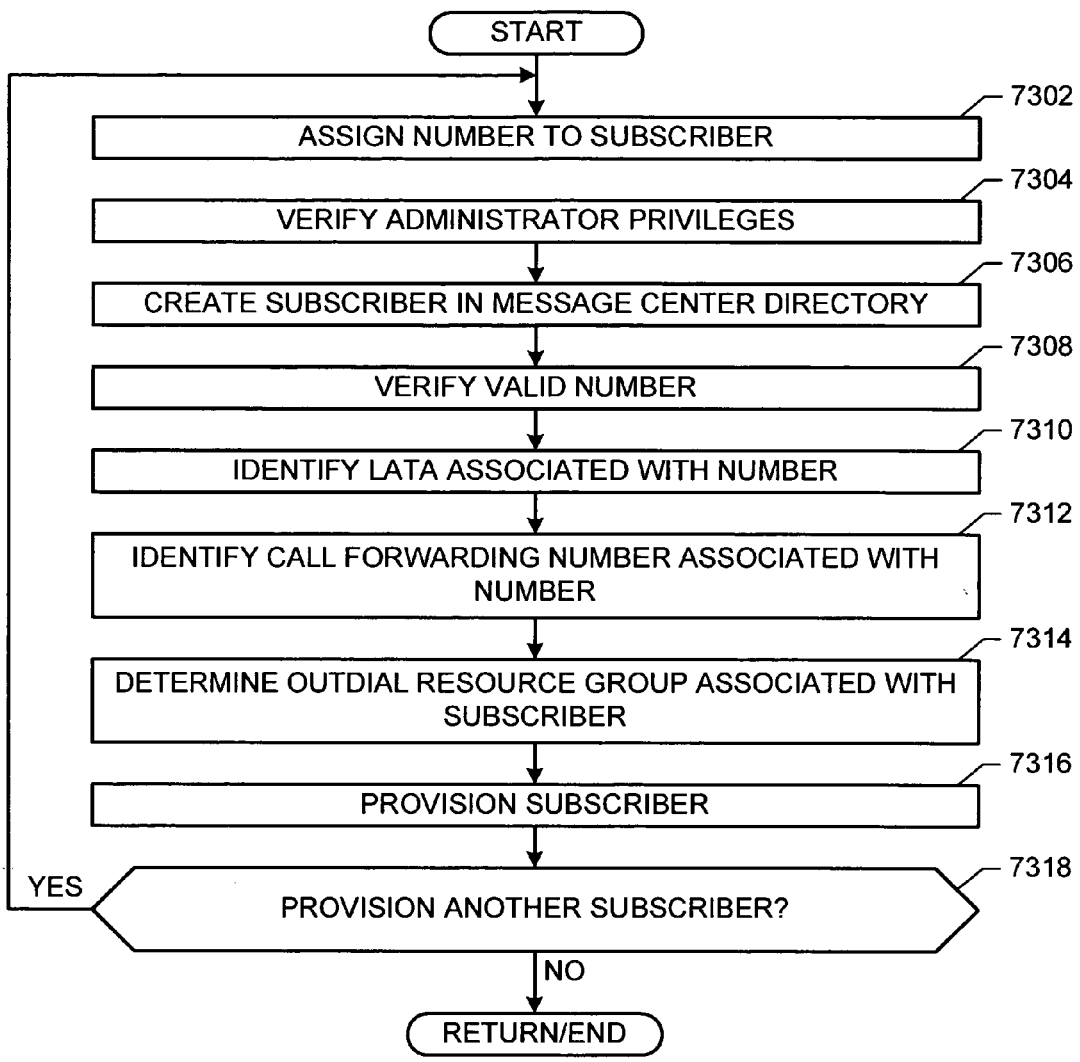
FIG. 85 is a flow diagram representative of example machine readable instructions that may be executed to implement an example method to provision subscribers.

FIG. 85 is a flow diagram representative of example machine readable instructions that may be executed to implement an example method to provision private (e.g., business) and/or public (e.g., mass consumer market) subscribers. Initially, an administrator assigns a number (e.g., a mailbox number) to a subscriber (block 7302). In the operation of block 7302, the administrator may also assign the subscriber to a particular community of interest (e.g., one of the COIs 7030A, 7030B, 7032A, and 7032B of FIG. 57) and/or a class of service.

The interface used by the administrator verifies the administrative privileges for the administrator (block 7304), having been verified, the administrator creates the subscriber (e.g., at the subscriber level 7304 of FIG. 57) in a corresponding message center directory (e.g., one of the directories 7006A or 7006B of FIGS. 55 and 57) (block 7306) and verifies that the assigned number is valid (block 7308). For example, the administrator may verify the subscriber's administrator privileges as described above in connection with FIG. 60. Also, the administrator may verify that the assigned number is valid by ensuring that it is not already assigned to another subscriber.

The administrator then identifies the LATA associated with the number (block 7308) by using, for example, the LATA-to-number lookup object 7060 (FIG. 58) to access a LATA-to-number lookup table. Then the administrator identifies a CFN associated with the subscriber number (block 7312) by, for example, accessing a data structure associated with the subscriber number (e.g., the number range table 7018 of FIG. 73). Then the administrator determines which ODRG(s) are associated with the subscriber (block 7314). For enterprise subscribers, a default ODRG may be overridden. However, in the illustrated example, the default ODRG may not be overridden for public subscribers.

The administrator then provisions the subscriber (block 7316) and determines if another subscriber should be provisioned (block 7318). If another subscriber should be provisioned then control is passed back to block 7302. Otherwise, control is returned to a calling process or function and/or the example process of FIG. 85 is ended.

Figure 86:
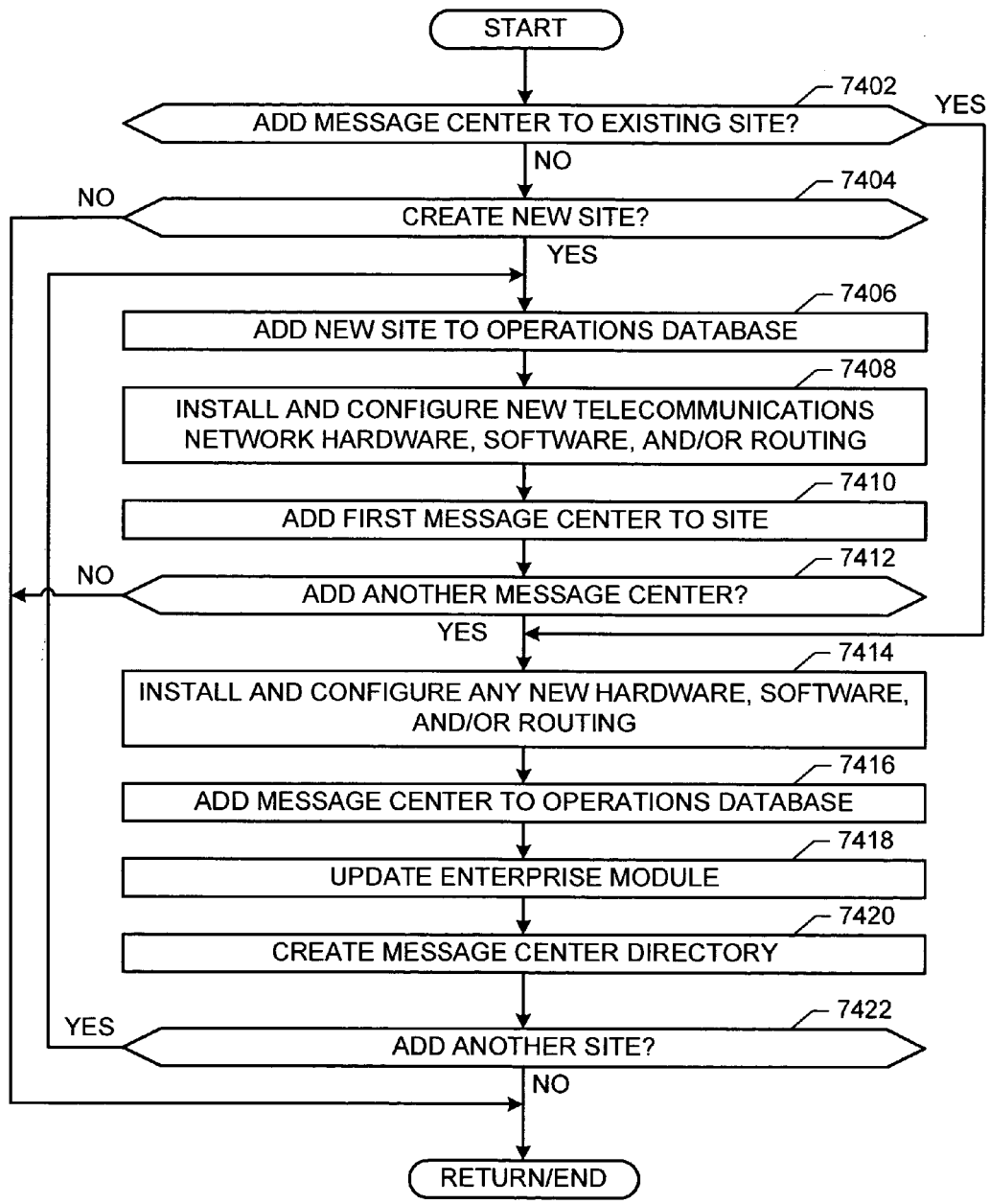
FIG. 86 is a flow diagram representative of machine readable instructions that may be executed to implement an example method to add sites and message centers.

FIG. 86 is a flow diagram representative of machine readable instructions that may be executed to implement an example method to add sites and message centers. Initially, an administrator determines if a message center (e.g., the message center 130 of FIG. 1) should be added to an existing site (block 7402). If a message center is not to be added to an existing site, then the administrator determines if a new site is to be created (block 7404). If a new site is to be created, then the administrator adds information about the new site to the operations database 160 (block 7406) by, for example, storing information in one or more data structures such as the site information table 7078 (FIG. 65). The administrator then installs and configures any required new communications network hardware, software, and/or network routing (block 7408).

The administrator then adds a first message center (e.g., the message center 130 of FIG. 1) to the site (block 7410) and determines if another message center should be added (block 7412). If the administrator determines at block 7412 or at block 7402 that another message center should be added, then the administrator installs any new required hardware, software, and/or network routing (block 7414). The administrator then stores information about the message center in the operations database 160 (block 7416) and updates a corresponding enterprise module (e.g., the enterprise module 7004 of FIGS. 55-57) that is intended to be used in combination with the new message center (e.g., an enterprise module associated with subscribers within the new message center).

The administrator then creates a message center directory (e.g., one of the message center directories 7006A and 7006B of FIGS. 55 and 57) in the message center (block 7420). For example, the message center directory may be used to accommodate subscribers within the message center that are associated with the enterprise module updated at block 7418. The administrator then determines if another site is to be added (block 7422). If another site is not to be added at this time or if the administrator determines at block 7404 that a new site is not to be created, then control is returned to a calling process or function and/or the example process depicted in FIG. 86 is ended.

IX. Example Processor Platform

Figure 87:
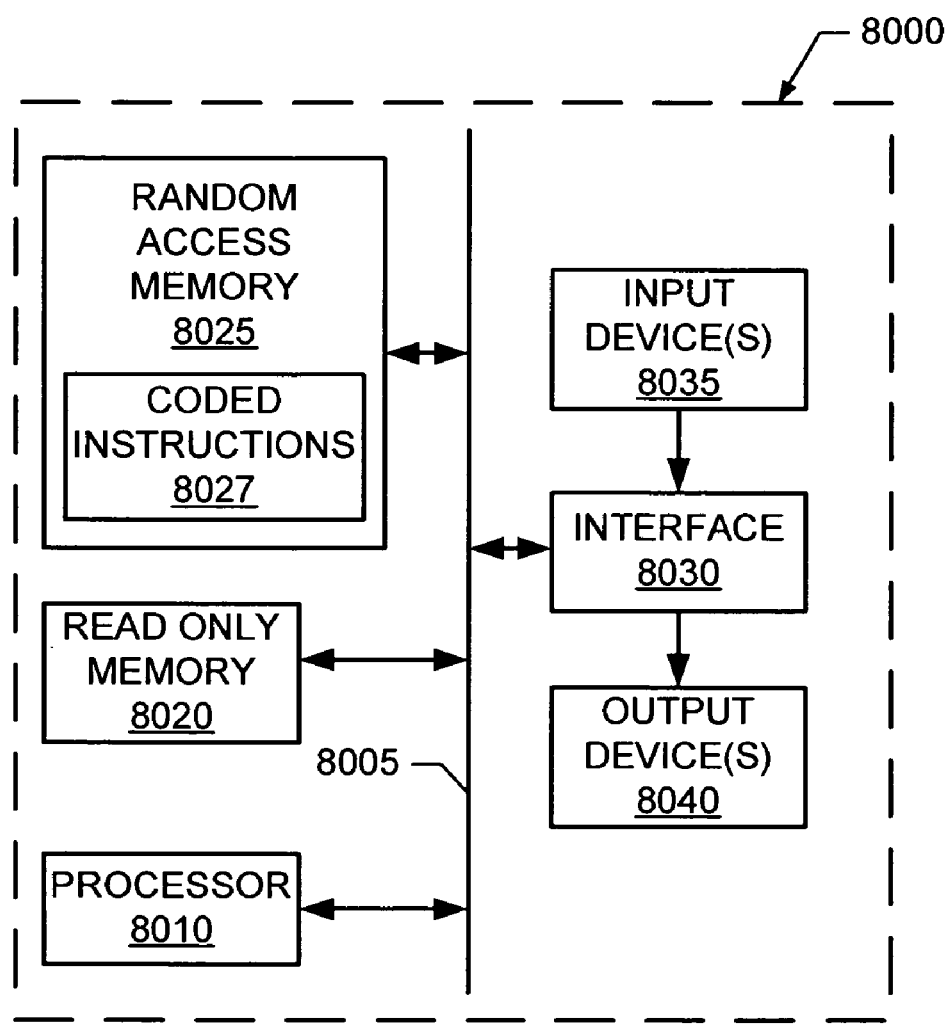
FIG. 87 is a schematic illustration of an example computer system capable of executing, among other things, the example message exchanges of FIG. 5-8, the example machine readable instructions of FIGS. 9A-D, 17, 30-36, 42-43, 47, 48, 53, 54A-C and/or 81-86, and/or the resource allocation methods mathematically expressed in EQNS 1-6.

FIG. 87 is a schematic diagram of an example processor platform 8000 capable of executing, among other things, the example message exchanges of FIGS. 5-8, the example machine readable instructions of FIGS. 9A-D, 17, 30-36, 42-43, 47, 48, 53, 54A-C and/or 81-86, and/or the resource allocation methods mathematically expressed in EQNS 1-6. For example, the processor platform 8000 can be implemented by one or more general purpose microprocessors, microcontrollers, etc.

In a networked deployment, the example processor platform 8000 may operate in the capacity of a server or as a client user computer in a server-client user network environment, or as a peer computer system in a peer-to-peer (or distributed) network environment. The example processor platform 8000 can also be implemented as or incorporated into various devices, such as a PC, a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, and/or any other machine capable of executing a set of instructions (sequential or otherwise) that specify actions to be taken by that machine. Further, the example processor platform 8000 can be implemented using one or more electronic devices that provide voice, video or data communication. While a single example processor platform 8000 is illustrated, the term "system" shall also be taken in this patent to include any collection of systems or sub-systems that individually or jointly execute a set, or multiple sets, of instructions to perform one or more functions.

The processor platform 8000 of the example of FIG. 87 includes a general purpose programmable processor 8010. The processor 8010 executes coded instructions 8027 present in main memory of the processor 8010 (e.g., within a RAM 8025). The processor 8010 may be any type of processing unit, such as a microprocessor from the Intel®, AMD®, IBM®, or SUN® families of microprocessors. The processor 8010 may implement, among other things, the example message exchanges of FIGS. 5-8, the example machine readable instructions of FIGS. 9A-D, 17, 30-36, 42-43, 47, 48, 53, 54A-C and/or 81-86, and/or the resource allocation methods mathematically expressed in EQNS 1-6.

The processor 8010 is in communication with the main memory (including a ROM 8020 and the RAM 8025) via a bus 8005. The RAM 8025 may be implemented by Synchronous Dynamic Random Access Memory (SDRAM), Dynamic DRAM, and/or any other type of RAM device. The ROM 8020 may be implemented by flash memory and/or any other desired type of memory device. Access to the memory 8020 and 8025 is typically controlled by a memory controller (not shown) in a conventional manner.

The processor platform 8000 also includes a conventional interface circuit 8030. The interface circuit 8030 may be implemented by any type of well known interface standard, such as an external memory interface, serial port, general purpose input/output, etc.

One or more input devices 8035 and one or more output devices 8040 are connected to the interface circuit 8030. The input devices 8035 and output devices 8040 may be used to implement interfaces between, for example, the policy server 150 and the operations database 160, the gatekeeper 135, the message center 130 and/or the application servers 132, between the operations database 160 and the gateway provisioner 162, and/or between the gateway provisioner 162 and a gateway.

Of course, persons of ordinary skill in the art will recognize that the order, size, and proportions of the memory illustrated in the example systems may vary. Additionally, although this patent discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

Although the present specification describes example components and example functions that may be implemented with reference to particular standard communication devices, and standards and/or protocols, no claim of this patent is limited to such devices, standards and/or protocols unless explicitly so stated in the claim itself. For example, standards for Internet and other packet switched network transmission (e.g., VoIP, Transmission Control Protocol (TCP)/IP, User Datagram Protocol (UDP)/IP, HTML, HyperText Transfer Protocol (HTTP), H.323, H.450-2, SIP, H.225, Q.931, T.37, TBCT, H.323 ECS) and circuit-based network transmission (e.g., DS1, Optical Carrier Level 48 (OC-48), etc.), and standard communication devices (e.g., gateways, gatekeepers, proxy servers, softswitches, softswitch/proxy servers, PSTN switches) represent examples of the state of the art. Such standards and/or devices are periodically superseded by different, faster and/or more efficient equivalents. Accordingly, replacement devices, standards and protocols to those disclosed herein are considered equivalents thereof.

The above disclosed subject matter is to be considered illustrative, and not restrictive, and the appended claims are intended to cover any and all modifications, enhancements, and other examples which fall within the true spirit and scope of this patent. Thus, to the maximum extent allowed by law, the scope of the claims are to be determined by the broadest permissible interpretation, and shall not be restricted or limited by the foregoing detailed description.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    sending an admittance request message containing a destination from a communication device to a gatekeeper;
    receiving an admittance response message containing an address of a gateway at the communication device;
    receiving a unified super-group identifier;
    establishing a simple message transfer protocol (SMTP) session with the gateway;
    sending the destination and the unified super-group identifier to the gateway; and
    transmitting a copy of a stored facsimile from the communication device via the gateway to the destination, the copy of the stored facsimile to be transmitted to the destination via the identified unified super-group.

2. A method as defined in claim 1, wherein the communication device is at least one of a voice over Internet protocol (VoIP) application server or a messaging center.

3. A method as defined in claim 1, wherein at least one of the admittance request message or the admittance response message is based on the International Telecommunication Union (ITU) H.323 standard.

4. A method as defined in claim 1, wherein transmitting the copy of the stored facsimile via the gateway to the destination comprises:
    forwarding the copy of the stored facsimile to the gateway via the SMTP session;
    sending the unified super-group identifier to the gateway via the SMTP session; and
    transmitting the copy of the stored facsimile to the destination from the gateway via the identified unified super-group.

5. A method as defined in claim 4, wherein at least one of the admittance request message or the admittance response message is based on the International Telecommunication Union (ITU) H.323 standard.

6. A method as defined in claim 1, wherein the SMTP session with the gateway is via a message transfer agent.

7. A method as defined in claim 1, wherein the SMTP session is based on the International Telecommunication Union (ITU) 1.37 standard.

8. A method as defined in claim 1, further comprising sending at least one of an authorization request or a combined authorization and routing request containing a time duration to a policy server, wherein the time duration represents a period of time over which the facsimile will be transmitted.

9. A method as defined in claim 8, further comprising releasing a shared communication resource located between the gateway and an endpoint for the destination when the period of time has passed.

10. A method as defined in claim 1, further comprising releasing a shared communication resource located between the gateway and an endpoint for the destination when a release request message is received from an application server.

11. A method as defined in claim 1, further comprising:
combining the unified super-group identifier with the destination; and
sending the combined unified super-group identifier and destination to the gateway.

12. A method as defined in claim 1, wherein the destination is at least one of a destination phone number, a destination address, a destination email address or a destination internet protocol (IP) address.

13. A system comprising:
a gateway;
an application server to send an admittance request message containing a destination;
a policy server, wherein the application server is to send a routing request to the policy server and to receive a unified super-group identifier from the policy server; and
a gatekeeper to receive the admittance request and to provide an admittance response message containing an address of the gateway, wherein the application server is to establish a simple message transfer protocol (SMTP) session with the gateway at the address and to forward a copy of a stored facsimile to the gateway via the SMTP session, wherein the application server is to send the destination and the unified super-group identifier to the gateway, and wherein the gateway is to transmit the copy of the facsimile to the destination via the identified unified super-group.

14. A system as defined in claim 13, wherein at least one of the admittance request message or the admittance response message is based on the International Telecommunication Union (ITU) H.323 standard.

15. A system as defined in claim 13, wherein the unified super-group identifier and the destination are concatenated with a delimiter prior to sending them to the gateway.

16. A system as defined in claim 13, wherein the routing request contains a time duration, wherein the time duration represents a period of time over which the facsimile will be transmitted.

17. A system as defined in claim 13, wherein the SMTP session is based on the International Telecommunication Union (ITU) T.37 standard.

18. A system as defined in claim 13, further comprising a message transfer agent, wherein the SMTP session to the gateway is via the message transfer agent.

19. A system as defined in claim 13, wherein the destination is at least one of a destination phone number, a destination address, a destination email address or a destination internet protocol (IP) address.

20. A tangible computer readable medium storing machine readable instructions which, when executed, cause a machine to implement a method comprising:
sending an admittance request message containing a destination to a gatekeeper;
receiving an admittance response message containing an address of a gateway;
receiving a unified super-group identifier;
establishing a simple message transfer protocol (SMTP) session with the gateway;
sending the destination and the unified super-group identifier to the gateway; and
transmitting a copy of a stored facsimile from the communication device via the gateway to the destination, the copy of the stored facsimile to be transmitted to the destination via the identified super-group.

21. A tangible computer readable medium as defined in claim 20, wherein at least one of the admittance request message or the admittance response message is based on the International Telecommunication Union (ITU) H.323 standard.

22. A tangible computer readable medium as defined in claim 20, wherein the machine readable instructions, when executed, cause the machine to implement the method, the method further comprising:
forwarding the copy of the stored facsimile to the gateway via the SMTP session; and
sending the unified super-group identifier to the gateway via the SMTP session, wherein the gateway transmits the copy of the stored facsimile to the destination via the identified unified super-group.

23. A tangible computer readable medium as defined in claim 20, wherein the machine readable instructions, when executed, cause the machine to implement the method, the method further comprising sending at least one of an authorization request or a combined authorization and routing request containing a time duration to a policy server, wherein the time duration represents a period of time over which the facsimile will be transmitted.

24. A tangible computer readable medium as defined in claim 20, wherein the destination is at least one of a destination phone number, a destination address, a destination email address or a destination internet protocol (IP) address.

* * * * *

UNITED STATES PATENT AND TRADEMARK OFFICE
CERTIFICATE OF CORRECTION

PATENT NO.         : 7,630,360 B2                              Page 1 of 1
APPLICATION NO.    : 11/363394
DATED              : December 8, 2009
INVENTOR(S)        : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Twenty-first Day of December, 2010

David J. Kappos
*Director of the United States Patent and Trademark Office*